US012491246B2

(12) United States Patent
Rastelli et al.

(10) Patent No.: US 12,491,246 B2
(45) Date of Patent: Dec. 9, 2025

(54) COMBINATION THERAPY OF ARMS AND NATURAL KILLER CELLS

(71) Applicant: KLEO PHARMACEUTICALS, INC., New Haven, CT (US)

(72) Inventors: Luca Rastelli, Madison, CT (US); Anna Bunin, Hamden, CT (US)

(73) Assignee: BIOHAVEN THERAPEUTICS LTD., New Haven, CT (US)

( * ) Notice: Subject to any disclaimer, the term of this patent is extended or adjusted under 35 U.S.C. 154(b) by 1117 days.

(21) Appl. No.: 17/312,419

(22) PCT Filed: Dec. 20, 2019

(86) PCT No.: PCT/US2019/068086
§ 371 (c)(1),
(2) Date: Jun. 10, 2021

(87) PCT Pub. No.: WO2020/132588
PCT Pub. Date: Jun. 25, 2020

(65) Prior Publication Data
US 2022/0040231 A1 Feb. 10, 2022

Related U.S. Application Data

(60) Provisional application No. 62/783,036, filed on Dec. 20, 2018.

(51) Int. Cl.
| | |
|---|---|
| *A61K 40/15* | (2025.01) |
| *A61K 38/08* | (2019.01) |
| *A61K 38/12* | (2006.01) |
| *A61K 39/395* | (2006.01) |
| *A61K 40/42* | (2025.01) |
| *A61K 47/54* | (2017.01) |
| *A61K 47/60* | (2017.01) |
| *A61K 47/62* | (2017.01) |
| *A61K 47/64* | (2017.01) |
| *A61P 35/00* | (2006.01) |

(52) U.S. Cl.
CPC ............ *A61K 40/15* (2025.01); *A61K 38/08* (2013.01); *A61K 38/12* (2013.01); *A61K 39/395* (2013.01); *A61K 40/4212* (2025.01); *A61K 47/545* (2017.08); *A61K 47/60* (2017.08); *A61K 47/62* (2017.08); *A61K 47/64* (2017.08); *A61P 35/00* (2018.01); *A61K 2239/31* (2023.05); *A61K 2239/38* (2023.05); *A61K 2239/48* (2023.05)

(58) Field of Classification Search
None
See application file for complete search history.

(56) References Cited

U.S. PATENT DOCUMENTS

| | | |
|---|---|---|
| 2004/0253247 A1 | 12/2004 | Dennis et al. |
| 2006/0292156 A1 | 12/2006 | Campbell |
| 2008/0029274 A1 | 2/2008 | Rytlewski et al. |
| 2016/0082112 A1 | 3/2016 | Spiegel et al. |
| 2016/0346403 A1 | 12/2016 | Prudent |
| 2016/0356095 A1 | 12/2016 | Perez et al. |
| 2018/0155332 A1 | 6/2018 | Spiegel et al. |
| 2018/0230184 A1 | 8/2018 | Minami |
| 2018/0311300 A1 | 11/2018 | Beswick et al. |
| 2023/0028880 A1 | 1/2023 | Rastelli et al. |

FOREIGN PATENT DOCUMENTS

| | | |
|---|---|---|
| EP | 1251598 A1 | 10/2002 |
| EP | 2188487 B1 | 7/2015 |
| WO | 2009139863 A2 | 11/2009 |
| WO | 2015044208 A2 | 4/2015 |
| WO | 2018089476 A1 | 5/2018 |
| WO | 2018197509 A1 | 11/2018 |
| WO | 2018222987 A1 | 12/2018 |
| WO | 2019002842 A1 | 1/2019 |
| WO | 2019023501 A1 | 1/2019 |

OTHER PUBLICATIONS

Achilli et al., "Antibody Recruiting Molecules (ARMS): Synthetic Immunotherapeutics to Fight Cancer," RSC Chemical Biology, (2021), vol. 2, (No. 3), 713-724.
Bhat et al., "Serial Killing of Tumor Cells by Human Natural Killer Cells—Enhancement by Therapeutic Antibodies," Plos One, (2007), vol. 2, (No. 3), 1-7.
Bunin et al., "A Novel Class of Bifunctional Immunotherapeutic that Exploits a Universal Antibody Binding Terminus (uABT) to Recruit Endogenous Antibodies to Cell Expressing CD38 Demonstrate In Vivo Efficacy in Three Distinct Animal Models," Blood American Society of Hematology, US, (2019), vol. 134, 1-3.
Burga et al., "Improving Efficacy of Cancer Immunotherapy by Genetic Modification of Natural Killer Cells," International Society for Cellular Therapy, (2016), vol. 18, (No. 11), 1410-1421.
Corson et al., "Design and Applications of Bifunctional Small Molecules: Why Two Heads Are Better Than One," ACS Chemical Biology, (2008), vol. 3, (No. 11), 1-25.
Extended European Search Report for Application No. 19900293. 2-1112 /3898701 PCT/US2019/068086, dated Sep. 28, 2022, 9 pages.
Mcenaney et al., "Antibody-Recruiting Molecules: An Emerging Paradigm for Engaging Immune Function in Treating Human Disease," ACS Chemical Biology, (2012), vol. 7, (No. 7), 1139-1151.

(Continued)

*Primary Examiner* — Zachariah Lucas
*Assistant Examiner* — Sarah A Alsomairy
(74) *Attorney, Agent, or Firm* — CANTOR COLBURN LLP

(57) ABSTRACT

Among other things, the present disclosure provides technologies comprising immune cells and antibody-recruiting molecules. In some embodiments, immune cells are memory-like natural killer cells. In some embodiments, provided technologies are particularly useful for treating a condition, disorder or disease like cancer. In some embodiments, provided technologies provide high efficacy. In some embodiments, provided technologies provide less or less severe side effects associated with natural killer cell therapy.

12 Claims, 5 Drawing Sheets

(56) References Cited

OTHER PUBLICATIONS

Parihar et al., "IL-12 Enhances the Natural Killer Cell Cytokine Response to Ab-Coated Tumor Cells," Journal of Clinical Investigation, (2002), vol. 110, (No. 7), 983-992.

Rullo et al., "Re-engineering the Immune Response to Metastatic Cancer: Antibody-Recruiting Small Molecules Targeting the Urokinase Receptor," Angewandte Chemie, Wiley-VCH Verlag Gmbh & Co., (2016), vol. 128, (No. 11), 3706-3710.

International Search Report dated Mar. 30, 2020 issued for the corresponding application PCT/US2020/068086 (2 pages).

Written Opinion dated Mar. 30, 2020 issued for the corresponding application PCT/US2020/068086 (8 pages).

Choe, et al., "Fc-Binding Ligands of Immunoglobulin G: An Overview of High Affinity Proteins and Peptides" Materials 2016 vol. 9, No. 994, (pp. 1-17).

Perdomo, et al., "Neutralization of HIV-1 by redirection of natural antibodies" Proc Natl Acad Sci USA, Aug. 21, 2008, vol. 105, No. 34 (pp. 12515-12520).

Sasaki, et al., "A peptide inhibitor of antibody-dependent cell-mediated cytotoxicity against EGFR/folate receptor-α double positive cells" Medchemcomm, Feb. 26, 2018, vol. 9, No. 5 (pp. 783-788).

Extended European Search Report for EP Application No. 20834827.6; Dated—Sep. 12, 2023; 9 pages.

International Preliminary Report dated Dec. 28, 2021 issued for International Application No. PCT/US2020/39466 (10 pages).

International Search Report; International Application No. PCT/US2020/39466; International Filing Date—Jun. 24, 2020; Date of Mailing—Jan. 5, 2021; 6 pages.

Jakab et al., "Synthesis and Antibody Recognition of Cyclic Epitope Peptides, Together with Their Dimer and Conjugated Derivatives Based on Residues 9-22 of Herpes Simplex Virus Type 1 Glycoprotein D," Bioconjugate Chem., (2009), vol. 20, 683-692.

Written Opinion; International Application No. PCT/US2020/39466; International Filing Date—Jun. 24, 2020; Date of Mailing—Jan. 5, 2021; 9 pages.

Kang et al., "Developing an antibody-binding protein cage as a molecular recognition drug modular nanoplatform" Biomaterials 33 5423-5430 (2012).

Yoon et al., "Understanding of molecular mechanisms in natural killer cell therapy" Experimental & Molecular Medicine, 2015, vol. 47, e141, 12 pages.

(A)

(A)

(B)

COMBINATION THERAPY OF ARMS AND NATURAL KILLER CELLS

CROSS-REFERENCE TO RELATED APPLICATIONS

The present application is a national stage application under 35 U.S.C. § 371 of International Application No. PCT/US2019/068086 filed Dec. 20, 2019, which claims priority to and the benefit of U.S. Provisional Application No. 62/783,036, filed Dec. 20, 2018, the entirety of which is incorporated herein by reference.

BACKGROUND

Immune system activities may be utilized to prevent or treat various conditions, disorders and diseases including cancer.

SUMMARY

Natural killer (NK) cells are capable of inducing cell death of various targets, e.g., diseased cells such as cancer cells. Among other things, NK cells (e.g., in vitro-expanded and/or pre-activated NK cells) are being developed for use in cancer therapy. In some embodiments, the present disclosure encompasses the recognition that NK cell therapy can be significantly improved by agents that can facilitate and/or promote of recognition of targets by NK cells. In some embodiments, the present disclosure provides technologies (e.g., methods, compositions, etc.) comprising NK cells and such agents, particularly, in some embodiments, the present disclosure provides technologies comprising NK cells and antibody-recruiting molecules (ARMs), which comprise (i) an antibody binding moiety that can bind to one or more antibodies or fragments thereof, (ii) a target-binding moiety that can bind to the cell, and optionally (iii) a linker moiety connecting the antibody binding moiety with the target binding moiety.

In some embodiments, ARMs can significantly improve efficiency of NK cell therapy, for example, by facilitating the recognition of target cells by NK cells. In some embodiments, ARMs can enhance interactions between NK cells and their target cells, and/or promote target cell deaths induced by NK cells. In some embodiments, ARMs promote activation of NK cells, for example, by recruiting antibodies to target cells, which antibodies can then recruit and activate NK cells.

Additionally or alternatively, in some embodiments, ARMs reduce and/or delay onset of one or more side effects of NK cell therapy, for example, by directing NK cells to target cells and reducing off-target effects. In some embodiments, NK cells are typically activated, enriched and/or expanded before administration to a subject. Such pre-activated NK cells are more powerful and may be necessary for efficient killing of target cells, however, due to their activation, these cells may cause significantly more side effects, e.g., killing of unintended cells. Among other things, the present disclosure provides technologies by which ARMs can direct NK cells to target cells and reduce side effects and toxicity associated with NK cell therapy. Further, in view of reduced off-target effects, in some embodiments, more activated NK cells may be utilized to further improve therapeutic efficiency.

Among other things, an antibody binding moiety (in some embodiments referred to as an antibody binding terminus (ABT)) can bind to antibodies (or fragments thereof). In some embodiments, antibody binding moieties bond to variable regions. In some embodiments, antibody binding moieties bind to Fab regions. In some embodiments, antibody binding moieties can, among other things, recruit antibodies (or fragments thereof) of various antigen-specificity, e.g., through binding to Fc regions ("universal ABTs", or "uABTs"). In some embodiments, utilization of uABTs can circumvent dependence of specific antibody populations and undesirable effects that may result from individual variations of specific antibody populations. In some embodiments, uABTs enables recruitment preferentially of IgG1, IgG2, and/or IgG4. In some embodiments, recruitment of antibodies, e.g., IgG subclasses, is limited by the administered dose of an ARM, and/or is not by levels of antibodies having a particular Fab region in an individual. In some embodiments, ABTs bind to and recruit endogenous antibodies. In some embodiments, uABTs bind to IgG molecules preferably over human IgA or IgM. Typically, after being bound by antibody binding moieties, antibodies remain capable of performing one or more of their immune activities, e.g., interactions with NK cells which can lead to killing of target cells by NK cells.

Typically, a target binding moiety (in some embodiments referred to as a target binding terminus (TBT)) can confer specificity of an ARM to its target, e.g., a diseased cell of interest, through, e.g., binding an entity (e.g., a cell surface receptor) differentiating a target from a non-target (e.g., diseased cells from other cell types).

Among other things, ARMs can enable target-specific recruitment of antibodies, e.g., endogenous antibodies, administered antibodies, etc., through ABTs, and/or trigger, generate, encourage, and/or enhance NK-cell related immune activities, e.g., killing of target cells by NK cells. Various technologies, e.g., assays, reagents, methods, etc. are available for assessing antibody binding moieties, target binding moieties and ARMs and can be utilized in accordance with the present disclosure.

In some embodiments, an ARM comprises:
an antibody binding moiety,
a target binding moiety, and
optionally a linker moiety,
wherein the antibody binding moiety can bind to a Fab region of an antibody.

In some embodiments, an ARM comprises:
an antibody binding moiety,
a target binding moiety, and
optionally a linker moiety,
wherein the antibody binding moiety can bind to a Fc region of an antibody.

In some embodiments, an ARM comprises:
an antibody binding moiety,
a target binding moiety, and
optionally a linker moiety,
wherein the antibody binding moiety can bind to two or more antibodies which have different Fab regions.

In some embodiments, an antibody binding moiety, e.g., a universal antibody binding moiety, binds to an Fc region of an antibody. In some embodiments, an antibody binding moiety, e.g., a universal antibody binding moiety, binds to a conserved Fc region of an antibody. In some embodiments, an antibody binding moiety binds to an Fc region of an IgG antibody.

In some embodiments, an agent, e.g., an ARM, of the present disclosure is a compound having the structure of formula I:

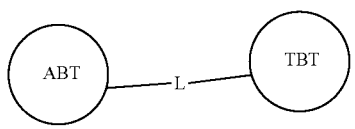

or a pharmaceutically acceptable salt thereof, wherein each variable is as defined and described herein. In some embodiments, an agent is a compound of formula I or a salt thereof.

In some embodiments, an agent is a compound of formula I-a:

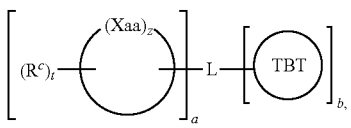

or a salt thereof, wherein each variable is as defined and described in the present disclosure. In some embodiments, an agent, e.g., an ARM, is of formula I-a or a pharmaceutically acceptable salt thereof. In some embodiments, a compound of formula I is a compound of formula I-a.

In some embodiments, an agent is a compound of formula I-b:

or a salt thereof, wherein each variable is as defined and described in the present disclosure. In some embodiments, an agent, e.g., an ARM, is of formula I-b or a pharmaceutically acceptable salt thereof. In some embodiments, a provided compound of formula I is a compound of formula I-b.

In some embodiments, an agent, e.g., an ARM, is a compound having the structure of formula II:

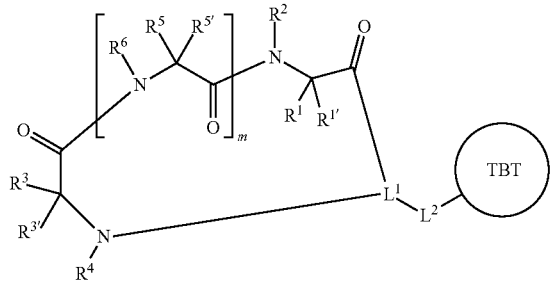

or a pharmaceutically acceptable salt thereof, wherein each variable is as defined and described herein. In some embodiments, an agent is a compound of formula II or a salt thereof. In some embodiments, a compound of formula I is a compound of formula II or a salt thereof. In some embodiments, a compound having the structure of formula I-a is a compound of formula II.

In some embodiments, an agent, e.g., an ARM, is a compound having the structure of formula III:

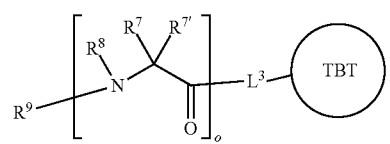

or a pharmaceutically acceptable salt thereof, wherein each variable is as defined and described herein. In some embodiments, an agent is a compound of formula III or a salt thereof. In some embodiments, a compound of formula I is a compound of formula III or a salt thereof. In some embodiments, a compound having the structure of formula I-b is a compound of formula III.

Combinations of NK cells and agents of the present disclosure, e.g., ARMs, can be particularly effective in treating various conditions, disorders or diseases including cancer. In some embodiments, the present disclosure provides a combination comprising:

an expanded, enriched and/or pre-activated population of natural killer cells; and an antibody-recruiting molecule (ARM), wherein:

the ARM comprises an antibody binding moiety that can bind to one or more antibodies, or fragments thereof, a target-binding moiety that can bind to a target entity, and optionally a linker moiety connecting the antibody binding moiety with the target binding moiety.

In some embodiments, the present disclosure provides a method for inducing cell death, inhibiting cell growth and/or reducing the number of cells in a system, comprising administering to the system:

one or both of:

a plurality of natural killer cells; and an antibody-recruiting molecule (ARM), wherein the ARM comprises an antibody binding moiety that can bind to one or more antibodies or fragments thereof, a target-binding moiety that can bind to the cell, and optionally a linker moiety connecting the antibody binding moiety with the target binding moiety.

so that the system is exposed to both and the number of cells in the system is reduced compared to absence of both the natural killer cells and the antibody-recruiting molecule.

Those skilled in the art will appreciate that provided technologies are suitable for various systems as described herein. For example, in some embodiments, a system is an organism. In some embodiments, a system is a subject. In some embodiments, a system is a human. In some embodiments, a system is a patient. In some embodiments, a system is a non-human animal. In some embodiments, a system is a non-human animal useful as a disease model. In some embodiments, a system is an organ. In some embodiments, a system is a tissue. In some embodiments, a system is an in vivo system. In some embodiments, a system is an ex vivo system. In some embodiments, a system is an in vitro system. In some embodiments, a system is or comprises cell culture.

In some embodiments, the present disclosure provides a method for treating cancer, comprising administering to a subject suffering therefrom:
one or both of:
a plurality of natural killer cells; and
an antibody-recruiting molecule (ARM),
wherein the ARM comprises an antibody binding moiety that can bind to one or more antibodies or fragments thereof, a target-binding moiety that can bind to the cancer cells, and optionally a linker moiety connecting the antibody binding moiety with the target binding moiety.
so that the subject is exposed to both.

In some embodiments, a subject is a human. In some embodiments, a subject is a human patient. In some embodiments, a subject is a non-human animal. In some embodiments, a subject is a non-human animal useful as a disease model.

In some embodiments, the number of cancer cells in the subject is reduced compared to absence of both the natural killer cells and the antibody-recruiting molecule. In some embodiments, growth of cancer cells in the subject is reduced compared to absence of both the natural killer cells and the antibody-recruiting molecule. In some embodiments, proliferation of cancer cells in the subject is reduced compared to absence of both the natural killer cells and the antibody-recruiting molecule. In some embodiments, volumes of cancer cells in the subject are reduced compared to absence of both the natural killer cells and the antibody-recruiting molecule.

In some embodiments, the present disclosure provides a method for treating cancer, comprising administering to a subject suffering therefrom:
a plurality of natural killer cells; and
an antibody-recruiting molecule,
wherein the ARM comprises an antibody binding moiety that can bind to one or more antibodies or fragments thereof, a target-binding moiety that can bind to the cancer cells, and optionally a linker moiety connecting the antibody binding moiety with the target binding moiety.

In some embodiments, the present disclosure provides a method for reducing toxicity or side effects of a treatment using natural killer cells, comprising administering to a subject:
a plurality of natural killer cells; and
an antibody-recruiting molecule,
wherein the ARM comprises an antibody binding moiety that can bind to one or more antibodies or fragments thereof, a target-binding moiety that can bind to a target entity of the treatment, and optionally a linker moiety connecting the antibody binding moiety with the target binding moiety.

In some embodiments, the present disclosure provides, in a method of treating a subject by administering a plurality of natural killer cells, the improvement that comprises also administering an antibody-recruiting molecule (ARM), wherein the ARM comprises an antibody binding moiety that can bind to one or more antibodies, or fragments thereof, a target-binding moiety that can bind to a target entity, and optionally a linker moiety connecting the antibody binding moiety with the target binding moiety.

Agents, e.g., ARMs, of the present disclosure can be administered prior to, concurrent with, and/or subsequent to NK cells, e.g., expanded, enriched and/or pre-activated NK cells.

DETAILED DESCRIPTION OF CERTAIN EMBODIMENTS

Figure 1:
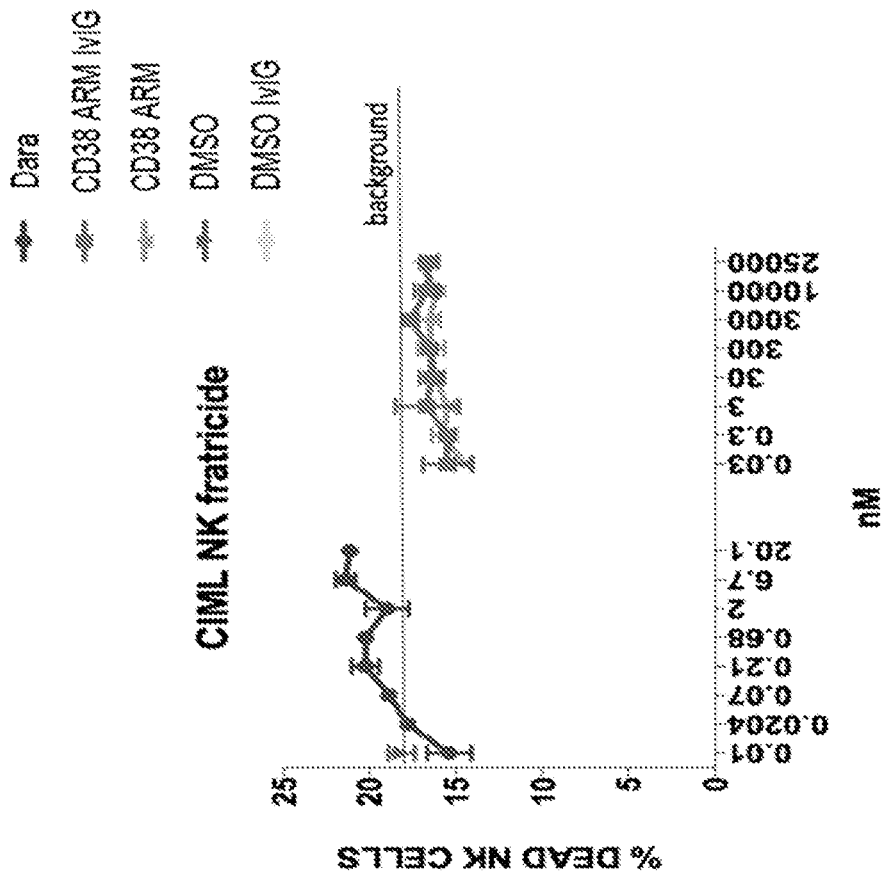
FIG. 1. Provided technologies have low toxicity. A. Frequencies of dead NK cells. B. Frequencies of dead NK cells normalized to DMSO-treated control.
Figure 1:
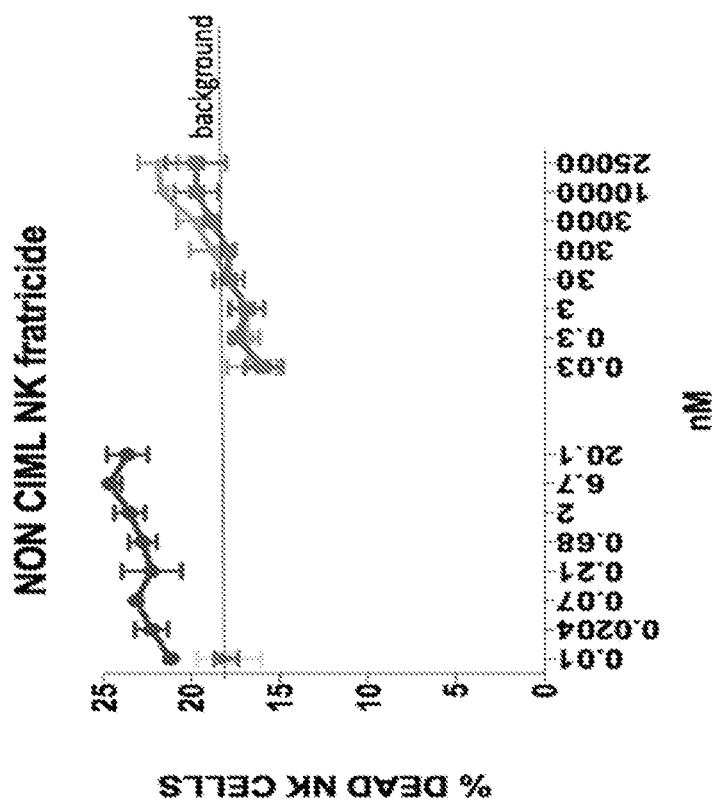
Figure 1:
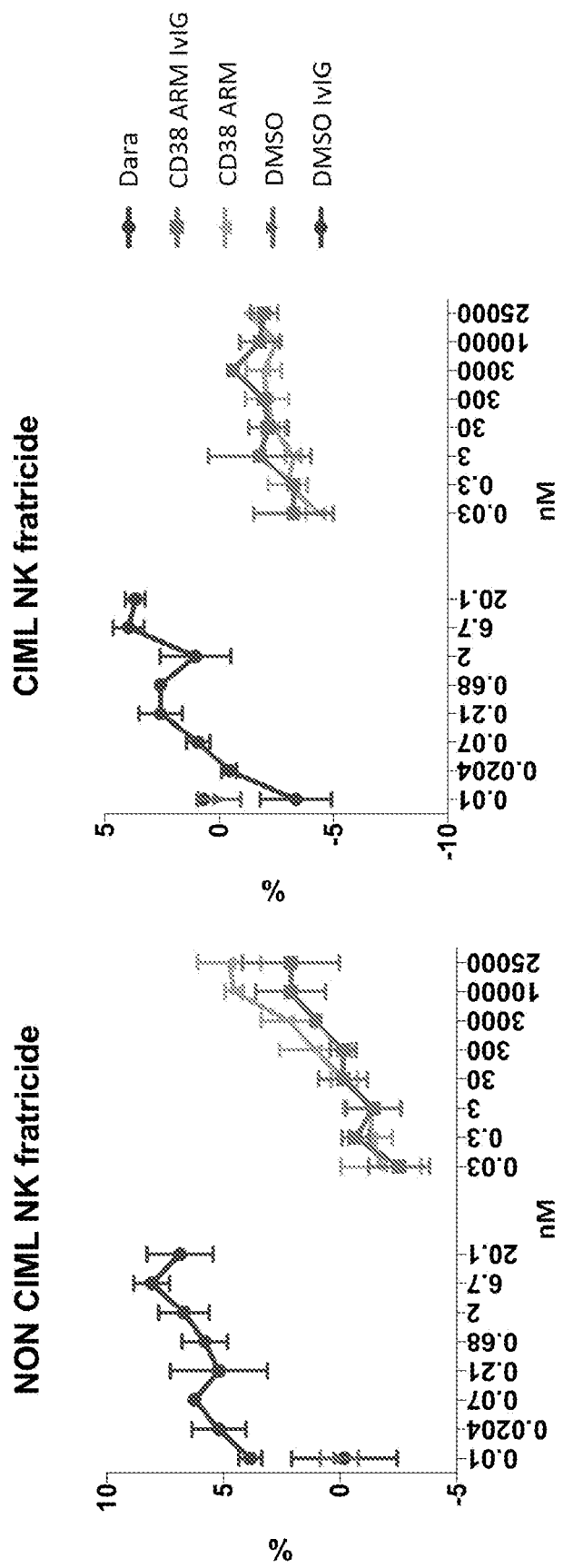

1. General Description of Certain Embodiments of the Invention

As noted above, in some embodiments, the present disclosure provides technologies for inducing cell death, inhibiting cell growth and/or reducing the number of cells in a system. Alternatively or additionally, in some embodiments, the present disclosure provides technologies for treating cancer and/or for reducing toxicity and/or side effects of a cellular immunotherapy (e.g., NK cell therapy).

In some embodiments, the present disclosure utilizes ARM agents together with cellular immunotherapy such as NK cell therapy (e.g., involving in vitro expansion of NK cells). In some embodiments, one or more ARM agents as described herein is administered to a subject who has received, is receiving or will receive NK cell therapy, or otherwise has or will have a population of NK cells targeted to a site of interest (e.g., to a tumor). Conversely, in some embodiments, cellular immunotherapy (e.g. NK cell therapy) is administered to a subject who has received, is receiving, or will receive therapy with an ARM agent as described herein.

In some embodiments, the present disclosure utilizes ARM agents that comprise antibody binding moieties that can bind to antibodies (or fragments thereof) with different Fab structures ("uABT"). Particularly, in some embodiments, relevant ARM agents comprise antibody binding moieties that bind to Fc region of antibodies; in certain embodiments, such binding to Fc regions of antibodies does not interfere one or more immune activities of the antibodies, e.g., interaction with Fc receptors (e.g., CD16a), recruitment of effector cells like NK cells for ADCC, etc. As those skilled in the art will appreciate, provided technologies (agents, compounds, compositions, methods, etc.) of the present disclosure comprising uABTs can provide various advantages, for example, provided technologies can utilize antibodies having various Fab regions in the immune system to avoid or minimize undesired effects of antibody variations among a patient population, and can trigger, and/or enhance, immune activities toward targets, e.g., killing target diseased cells such as cancer cells.

In some embodiments, technologies of the present disclosure are useful for recruiting antibodies and NK cells to various targets, e.g., cancer cells. In some embodiments, provided technologies are useful for modulating immune activities, such as ADCC involving NK cells, against targets (diseased cells, foreign objects or entities, etc.). In some embodiments, provided technologies are useful for modulating NK cell activities against target cells, e.g., diseased cells such as cancer cells. In some embodiments, a target binding moiety is an inhibitor moiety. In some embodiments, a target binding moiety is an enzyme inhibitor moiety. In some embodiments, a target binding moiety binds to a cell surface entity, e.g., a protein, carbohydrate, lipid, etc.

In some embodiments, an agent, e.g., an ARM, comprises:
an antibody binding moiety,
a target binding moiety, and
optionally a linker moiety,
wherein the antibody binding moiety can bind to a Fab region.

In some embodiments, an agent, e.g., an ARM, comprises:
an antibody binding moiety,
a target binding moiety, and
optionally a linker moiety,
wherein the antibody binding moiety can bind to a Fc region.

In some embodiments, an agent, e.g., an ARM, comprises:
an antibody binding moiety,
a target binding moiety, and
optionally a linker moiety,
wherein the antibody binding moiety can bind to two or more antibodies which have different Fab regions.

In some embodiments, agents useful in the practice of technologies of the present disclosure comprise two or more antibody binding moieties. In some embodiments, useful agents comprise two or more target binding moieties.

An antibody binding moiety may interact with any portion of an antibody. In some embodiments, an antibody binding moiety binds to an Fc region of an antibody. In some embodiments, an antibody binding moiety binds to a conserved Fc region of an antibody. In some embodiments, an antibody binding moiety binds to an Fc region of an IgG antibody. As appreciated by those skilled in the art, various antibody binding moieties, linkers, and target binding moieties can be utilized in accordance with the present disclosure. Among other things, as demonstrated in the Examples, in some embodiments, the present disclosure provides antibody binding moieties, linkers, and target binding moieties and combinations thereof that are particularly useful and effective for constructing ARM molecules to recruit antibodies to target cells, and/or to trigger, generate, encourage, and/or enhance immune system activities toward target cells, e.g., diseased cells such as cancer cells.

In some embodiments, antibody binding moieties can bind to a Fc region that is bound to Fc receptors, e.g., FcγRIIIa, CD16a, etc. In some embodiments, provided moieties and/or agents (e.g., compounds/ARMs of various formulae as described in the present disclosure) comprise antibody binding moieties that bind to a complex comprising an Fc region and an Fc receptor. In some embodiments, a complex comprises:
an agent comprising:
an antibody binding moiety,
a target binding moiety, and
optionally a linker moiety,
an Fc region, and
an Fc receptor,
wherein the antibody binding moiety of the agent can bind to two or more antibodies which have different Fab regions.

In some embodiments, an Fc region is an Fc region of an endogenous antibody of a subject. In some embodiments, an Fc region is an Fc region of an exogenous antibody. In some embodiments, an Fc region is an Fc region of an administered agent. In some embodiments, an Fc receptor is of a diseased cell in a subject. In some embodiments, an Fc receptor is of a cancer cell in a subject.

In certain embodiments, an agent, e.g., an ARM, is of formula I:

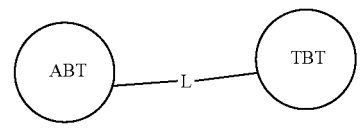

I or a pharmaceutically acceptable salt thereof, wherein:
ABT is an antibody binding moiety;
L is a bivalent linker moiety that connects ABT with TBT; and
TBT is a target binding moiety.

In some embodiments, ABT is a universal antibody binding moiety.

In some embodiments, an antibody binding moiety comprises one or more amino acid residues. In some embodiments, an antibody binding moiety is or comprises a peptide moiety. In some embodiments, an antibody binding moiety is or comprises a cyclic peptide moiety. In some embodiments, such antibody binding moiety comprises one or more natural amino acid residues. In some embodiments, such antibody binding moiety comprises one or more unnatural natural amino acid residues.

In some embodiments, an amino acid has the structure of formula A-I:

$$NH(R^{a1})\text{-}L^{a1}\text{-}C(R^{a2})(R^{a3})\text{-}L^{a2}\text{---}COOH,$$  A-I or a salt thereof, wherein:
each of $R^{a1}$, $R^{a2}$, $R^{a3}$ is independently $-L^a$-R';
each of $L^{a1}$ and $L^{a2}$ is independently $L^a$;
each $L^a$ is independently a covalent bond, or an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—;
each -Cy- is independently an optionally substituted bivalent group selected from a $C_{3-20}$ cycloaliphatic ring, a $C_{6-20}$ aryl ring, a 5-20 membered heteroaryl ring having 1-10 heteroatoms independently selected from oxygen, nitrogen, sulfur, phosphorus and silicon, and a 3-20 membered heterocyclyl ring having 1-10 heteroatoms independently selected from oxygen, nitrogen, sulfur, phosphorus and silicon;
each R' is independently —R, —C(O)R, —CO$_2$R, or —SO$_2$R;
each R is independently —H, or an optionally substituted group selected from $C_{1-30}$ aliphatic, $C_{1-30}$ heteroaliphatic having 1-10 heteroatoms independently selected from oxygen, nitrogen, sulfur, phosphorus and silicon, $C_{6-30}$ aryl, $C_{6-30}$ arylaliphatic, $C_{6-30}$ arylheteroaliphatic having 1-10 heteroatoms independently selected from oxygen, nitrogen, sulfur, phosphorus and silicon, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon, or
two R groups are optionally and independently taken together to form a covalent bond, or:
two or more R groups on the same atom are optionally and independently taken together with the atom to form an optionally substituted, 3-30 membered, monocyclic, bicyclic or polycyclic ring having, in addition to the atom, 0-10 heteroatoms independently selected from oxygen, nitrogen, sulfur, phosphorus and silicon; or two or more R groups on two or more atoms are optionally and independently taken together with their intervening atoms to form an optionally substituted, 3-30 membered, monocyclic, bicyclic or polycyclic ring having, in addition to the intervening atoms, 0-10 heteroatoms independently selected from oxygen, nitrogen, sulfur, phosphorus and silicon.

In some embodiments, an antibody-binding moiety is a cyclic peptide moiety. In some embodiments, a compound, e.g., an agent, an ARM, is formula I-a:

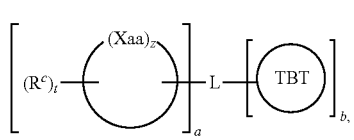

or a salt thereof, wherein:
each Xaa is independently an amino acid residue;
t is 0-50;
z is 1-50;
L is a linker moiety;
TBT is a target binding moiety;
each $R^c$ is independently -$L^a$-R';
each of a and b is independently 1-200;
each $L^a$ is independently a covalent bond, or an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)—, —S(O)—, —S(O)$_2$—, —S(O)$_2$N(R')—, —C(O)S—, or —C(O)O—;
each -Cy- is independently an optionally substituted bivalent group selected from a $C_{3-20}$ cycloaliphatic ring, a $C_{6-20}$ aryl ring, a 5-20 membered heteroaryl ring having 1-10 heteroatoms independently selected from oxygen, nitrogen, sulfur, phosphorus and silicon, and a 3-20 membered heterocyclyl ring having 1-10 heteroatoms independently selected from oxygen, nitrogen, sulfur, phosphorus and silicon;
each R' is independently —R, —C(O)R, CO$_2$R, or —SO$_2$R;
each R is independently —H, or an optionally substituted group selected from $C_{1-30}$ aliphatic, $C_{1-30}$ heteroaliphatic having 1-10 heteroatoms independently selected from oxygen, nitrogen, sulfur, phosphorus and silicon, $C_{6-30}$ aryl, $C_{6-30}$ arylaliphatic, $C_{6-30}$ arylheteroaliphatic having 1-10 heteroatoms independently selected from oxygen, nitrogen, sulfur, phosphorus and silicon, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon, or
two R groups are optionally and independently taken together to form a covalent bond, or:
two or more R groups on the same atom are optionally and independently taken together with the atom to form an optionally substituted, 3-30 membered, monocyclic, bicyclic or polycyclic ring having, in addition to the atom, 0-10 heteroatoms independently selected from oxygen, nitrogen, sulfur, phosphorus and silicon; or two or more R groups on two or more atoms are optionally and independently taken together with their intervening atoms to form an optionally substituted, 3-30 membered, monocyclic, bicyclic or polycyclic ring having, in addition to the intervening atoms, 0-10 heteroatoms independently selected from oxygen, nitrogen, sulfur, phosphorus and silicon.

In some embodiments, a is 1. In some embodiments, b is 1. In some embodiments, a is 1 and b is 1, and a compound of formula I-a has the structure of

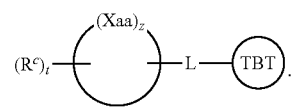

In some embodiments, each amino acid residue, e.g., each Xaa in formula I-a, is independently a residue of amino acid having the structure of formula A-I. In some embodiments, each Xaa independently has the structure of —N($R^{a1}$)-$L^{a1}$-C($R^{a2}$)($R^{a3}$)-$L^{a2}$—CO—. In some embodiments, two or more side chains of the amino acid residues, e.g., in compounds of formula I-a, (e.g., $R^{a2}$ or $R^{a3}$ of one amino acid residue with $R^{a2}$ or $R^{a3}$ of another amino acid residue) are optionally take together to form a bridge (e.g., compounds I-10, I-12, I-14, I-18, I-19, I-22, I-23, I-25, etc.), e.g., in some embodiments, two cysteine residues form a —S—S— bridge as typically observed in natural proteins. In some embodiments, a formed bridge has the structure of $L^b$, wherein $L^b$ is $L^a$ as described in the present disclosure. In some embodiments, each end of $L^b$ independently connects to a backbone atom of a cyclic peptide (e.g., a ring atom of the ring formed by -(Xaa)$_z$- in formula I-a). In some embodiments, $L^b$ comprises an R group (e.g., when a methylene unit of $L^b$ is replaced with —C(R)$_2$— or —N(R)—), wherein the R group is taken together with an R group attached to a backbone atom (e.g., $R^{a1}$, $R^{a2}$, $R^{a3}$, etc. if being R) and their intervening atoms to form a ring. In some embodiments, $L^b$ connects to a ring, e.g., the ring formed by -(Xaa)$_z$- in formula I-a through a side chain of an amino acid residue (e.g., Xaa in formula I-a). In some embodiments, such a side chain comprises an amino group or a carboxylic acid group.

In some embodiments,

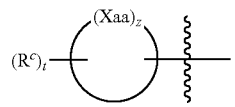

is an antibody binding moiety (

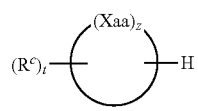

binds to an antibody). In some embodiments,

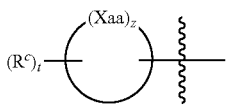

is a universal antibody binding moiety. In some embodiments,

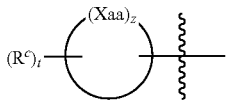

is a universal antibody binding moiety which can bind to antibodies having different Fab regions. In some embodiments,

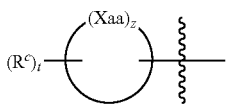

is a universal antibody binding moiety that can bind to a Fc region. In some embodiments, an antibody binding moiety, e.g., a universal antibody binding moiety having the structure of

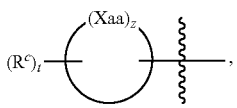

can bind to a Fc region bound to an Fc receptor. In some embodiments, an antibody binding moiety, e.g., of an antibody binding moiety having the structure of

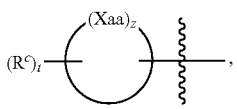

has the structure of

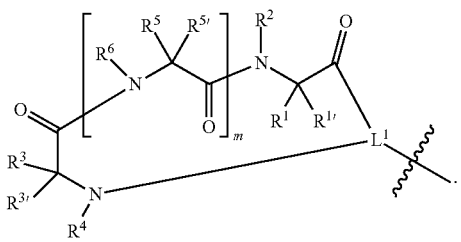

In some embodiments,

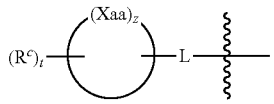

has the structure of

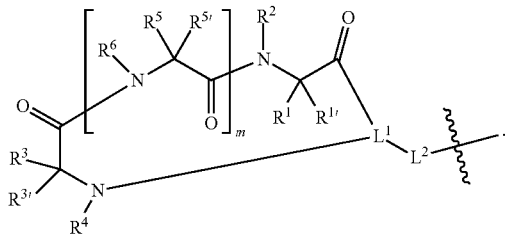

In certain embodiments, a compound, e.g., an agent, an ARM, etc., is of formula II:

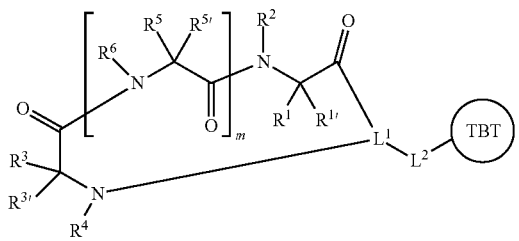

II or a pharmaceutically acceptable salt thereof, wherein:
each of $R^1$, $R^3$ and $R^5$ is independently hydrogen or an optionally substituted group selected from $C_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur; or:
$R^1$ and $R^{1'}$ are optionally taken together with their intervening carbon atom to form a 3-8 membered optionally substituted saturated or partially unsaturated spirocyclic carbocyclic ring or a 3-8 membered saturated or partially unsaturated spirocyclic heterocyclic ring having 1-2 heteroatoms independently selected from nitrogen, oxygen, or sulfur;
$R^3$ and $R^{3'}$ are optionally taken together with their intervening carbon atom to form a 3-8 membered optionally substituted saturated or partially unsaturated spirocyclic carbocyclic ring or a 3-8 membered saturated or partially unsaturated spirocyclic heterocyclic ring having 1-2 heteroatoms independently selected from nitrogen, oxygen, or sulfur;
an $R^5$ group and the $R^{5'}$ group attached to the same carbon atom are optionally taken together with their intervening carbon atom to form a 3-8 membered optionally substituted saturated or partially unsaturated spirocyclic carbocyclic ring or a 3-8 membered saturated or partially unsaturated spirocyclic heterocyclic ring having 1-2 heteroatoms independently selected from nitrogen, oxygen, or sulfur; or two $R^5$ groups are optionally taken together with their intervening atoms to form a $C_{1-10}$ optionally substituted bivalent straight or branched saturated or unsaturated hydrocarbon chain wherein 1-3 methylene units of the chain are independently and optionally replaced with —S—, —SS—, —N(R)—, —O—, —C(O)—, —OC(O)—, —C(O)O—, —C(O)N(R)—, —N(R)C(O)—, —S(O)—, —S(O)$_2$—, or -Cy$^1$-, wherein each -Cy$^1$- is independently a 5-6 membered heteroarylenyl with 1-4 heteroatoms independently selected from nitrogen, oxygen or sulfur;

each of $R^{1'}$, $R^{3'}$ and $R^{5'}$ is independently hydrogen or optionally substituted $C_{1-3}$ aliphatic;

each of $R^2$, $R^4$ and $R^6$ is independently hydrogen, or optionally substituted $C_{1-4}$ aliphatic, or:

$R^2$ and $R^1$ are optionally taken together with their intervening atoms to form a 4-8 membered, optionally substituted saturated or partially unsaturated monocyclic heterocyclic ring having 1-2 heteroatoms independently selected from nitrogen, oxygen, or sulfur;

$R^4$ and $R^3$ are optionally taken together with their intervening atoms to form a 4-8 membered optionally substituted saturated or partially unsaturated monocyclic heterocyclic ring having 1-2 heteroatoms independently selected from nitrogen, oxygen, or sulfur; or an $R^6$ group and its adjacent $R^5$ group are optionally taken together with their intervening atoms to form a 4-8 membered optionally substituted saturated or partially unsaturated monocyclic heterocyclic ring having 1-2 heteroatoms independently selected from nitrogen, oxygen, or sulfur;

$L^1$ is a trivalent linker moiety that connects

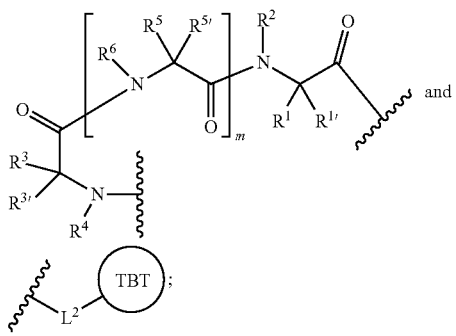

and $L^2$ is a covalent bond or a $C_{1-30}$ optionally substituted bivalent straight or branched saturated or unsaturated hydrocarbon chain wherein 1-10 methylene units of the chain are independently and optionally replaced with —S—, —N(R)—, —O—, —C(O)—, —OC(O)—, —C(O)O—, C(O)N(R)—, —N(R)C(O)—, —S(O)—, —S(O)$_2$—,

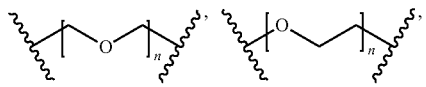

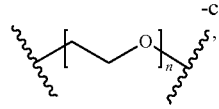

or -Cy$^1$-, wherein each -Cy$^1$- is independently a 5-6 membered heteroarylenyl with 1-4 heteroatoms independently selected from nitrogen, oxygen or sulfur;

TBT is a target binding moiety; and each of m and n is independently 1, 2, 3, 4, 5, 6, 7, 8, 9, or 10.

In some embodiments, an antibody binding moiety is or comprises a peptide moiety. In some embodiments, a compound, e.g., an agent, an ARM, etc., has the structure of formula I-b:

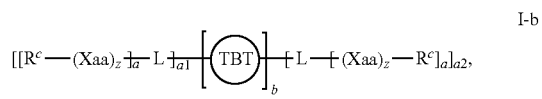

or a salt thereof, wherein:
each Xaa is independently an amino acid residue;
each z is independently 1-50;
each L is independently a linker moiety;
TBT is a target binding moiety,
each $R^c$ is independently -$L^a$-R';
each of a1 and a2 is independently 0 or 1, wherein at least one of a1 and a2 is not 0;
each of a and b is independently 1-200;
each $L^a$ is independently a covalent bond, or an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R'), —N(R')C(O)N(R')—, —N(R')C(O)O—, —S(O)—, —S(O)$_2$—, —S(O)$_2$N(R')—, —C(O)S—, or —C(O)O—;
each -Cy- is independently an optionally substituted bivalent group selected from a $C_{3-20}$ cycloaliphatic ring, a $C_{6-20}$ aryl ring, a 5-20 membered heteroaryl ring having 1-10 heteroatoms independently selected from oxygen, nitrogen, sulfur, phosphorus and silicon, and a 3-20 membered heterocyclyl ring having 1-10 heteroatoms independently selected from oxygen, nitrogen, sulfur, phosphorus and silicon;
each R' is independently —R, —C(O)R, —CO$_2$R, or —SO$_2$R;
each R is independently —H, or an optionally substituted group selected from $C_{1-30}$ aliphatic, $C_{1-30}$ heteroaliphatic having 1-10 heteroatoms independently selected from oxygen, nitrogen, sulfur, phosphorus and silicon, $C_{6-30}$ aryl, $C_{6-30}$ arylaliphatic, $C_{6-30}$ arylheteroaliphatic having 1-10 heteroatoms independently selected from oxygen, nitrogen, sulfur, phosphorus and silicon, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon, or
two R groups are optionally and independently taken together to form a covalent bond, or:

two or more R groups on the same atom are optionally and independently taken together with the atom to form an optionally substituted, 3-30 membered, monocyclic, bicyclic or polycyclic ring having, in addition to the atom, 0-10 heteroatoms independently selected from oxygen, nitrogen, sulfur, phosphorus and silicon; or two or more R groups on two or more atoms are optionally and independently taken together with their intervening atoms to form an optionally substituted, 3-30 membered, monocyclic, bicyclic or polycyclic ring having, in addition to the intervening atoms, 0-10 heteroatoms independently selected from oxygen, nitrogen, sulfur, phosphorus and silicon.

In some embodiments, a1 is 1. In some embodiments, a2 is 1. In some embodiments, b is 1. In some embodiments, a compound of formula I-b has the structure of

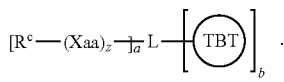

In some embodiments, a compound of formula I-b has the structure of

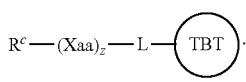

In some embodiments, a compound of formula I-b has the structure of

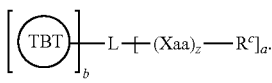

In some embodiments, a compound of formula I-b has the structure of

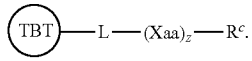

In some embodiments, each amino acid residue, e.g., each Xaa in formula I-b, is independently a residue of amino acid having the structure of formula A-I. In some embodiments, each Xaa independently has the structure of —N(R$^{a1}$)-L$^{a1}$—C(R$^{a2}$)(R$^{a3}$)-L$^{a2}$—CO—. In some embodiments, two or more side chains of the amino acid residues, e.g., in compounds of formula I-a, (e.g., R$^{a2}$ or R$^{a3}$ of one amino acid residue with R$^{a2}$ or R$^{a3}$ of another amino acid residue) are optionally take together to form a bridge (e.g., compounds I-10, I-12, I-14, I-18, I-19, I-22, I-23, I-25, etc.), e.g., in some embodiments, two cysteine residues form a —S—S— bridge as typically observed in natural proteins. In some embodiments, a formed bridge has the structure of L$^b$, wherein L$^b$ is L$^a$ as described in the present disclosure. In some embodiments, each end of L$^b$ independently connects to a backbone atom of a cyclic peptide (e.g., a ring atom of the ring formed by -(Xaa)$_z$- in formula I-a). In some embodiments, L$^b$ comprises an R group (e.g., when a methylene unit of L$^b$ is replaced with —C(R)$_2$— or —N(R)—), wherein the R group is taken together with an R group attached to a backbone atom (e.g., R$^{a1}$, R$^{a2}$, R$^{a3}$, etc. if being R) and their intervening atoms to form a ring. In some embodiments, L$^b$ connects to a ring, e.g., the ring formed by -(Xaa)$_z$- in formula I-b through a side chain of an amino acid residue (e.g., Xaa in formula I-a). In some embodiments, such a side chain comprises an amino group or a carboxylic acid group.

In some embodiments, R$^c$-(Xaa)$_z$- is an antibody binding moiety (R$^c$-(Xaa)$_z$-H binds to an antibody). In some embodiments, R$^c$-(Xaa)$_z$- is a universal antibody binding moiety. In some embodiments, R$^c$-(Xaa)$_z$- is a universal antibody binding moiety which can bind to antibodies having different Fab regions. In some embodiments, R$^c$-(Xaa)$_z$- is a universal antibody binding moiety that can bind to a Fc region. In some embodiments, an antibody binding moiety, e.g., a universal antibody binding moiety having the structure of R$^c$-(Xaa)$_z$-, can bind to a Fc region which binds to an Fc receptor. In some embodiments, R$^c$-(Xaa)$_z$- has the structure of

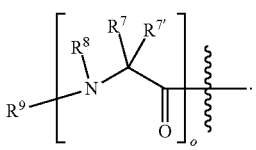

In some embodiments, R$^c$-(Xaa)$_z$-L- has the structure of

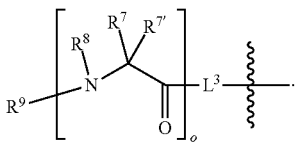

In certain embodiments, a compound, e.g., an agent, an ARM, etc., is of formula III:

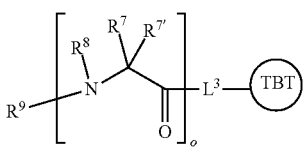

or a pharmaceutically acceptable salt thereof, wherein:
each of R$^7$ is independently hydrogen or an optionally substituted group selected from C$_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur; or:
an R$^7$ group and the R$^{7'}$ group attached to the same carbon atom are optionally taken together with their intervening carbon atom to form a 3-8 membered optionally substituted saturated or partially unsaturated spirocyclic carbocyclic ring or a 3-8 membered optionally substituted saturated or partially unsaturated spirocyclic heterocyclic ring having 1-2 heteroatoms independently selected from nitrogen, oxygen, or sulfur;

each of $R^{7''}$ is independently hydrogen or optionally substituted $C_{1-3}$ aliphatic;

each of $R^8$ is independently hydrogen, or optionally substituted $C_{1-4}$ aliphatic, or:

an $R^8$ group and its adjacent $R^7$ group are optionally taken together with their intervening atoms to form a 4-8 membered optionally substituted saturated or partially unsaturated monocyclic heterocyclic ring having 1-2 heteroatoms independently selected from nitrogen, oxygen, or sulfur;

$R^9$ is hydrogen, optionally substituted $C_{1-3}$ aliphatic, or —C(O)-(optionally substituted $C_{1-3}$ aliphatic);

$L^3$ is a bivalent linker moiety that connects

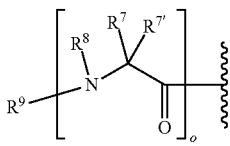

with TBT;

TBT is a target binding moiety; and o is 1, 2, 3, 4, 5, 6, 7, 8, 9, or 10.

2. Definitions:

Compounds of the present invention include those described generally herein, and are further illustrated by the classes, subclasses, and species disclosed herein. As used herein, the following definitions shall apply unless otherwise indicated. For purposes of this invention, the chemical elements are identified in accordance with the Periodic Table of the Elements, CAS version, Handbook of Chemistry and Physics, 75th Ed. Additionally, general principles of organic chemistry are described in "Organic Chemistry", Thomas Sorrell, University Science Books, Sausalito: 1999, and "March's Advanced Organic Chemistry", 5th Ed., Ed.: Smith, M. B. and March, J., John Wiley & Sons, New York: 2001, the entire contents of which are hereby incorporated by reference.

Administration: As used herein, the term "administration" typically refers to the administration of a composition to a subject or system. Those of ordinary skill in the art will be aware of a variety of routes that may, in appropriate circumstances, be utilized for administration to a subject, for example a human. For example, in some embodiments, administration may be ocular, oral, parenteral, topical, etc. In some particular embodiments, administration may be bronchial (e.g., by bronchial instillation), buccal, dermal (which may be or comprise, for example, one or more of topical to the dermis, intradermal, interdermal, transdermal, etc.), enteral, intra-arterial, intradermal, intragastric, intramedullary, intramuscular, intranasal, intraperitoneal, intrathecal, intravenous, intraventricular, within a specific organ (e.g., intrahepatic), mucosal, nasal, oral, rectal, subcutaneous, sublingual, topical, tracheal (e.g., by intratracheal instillation), vaginal, vitreal, etc. In some embodiments, administration may involve dosing that is intermittent (e.g., a plurality of doses separated in time) and/or periodic (e.g., individual doses separated by a common period of time) dosing. In some embodiments, administration may involve continuous dosing (e.g., perfusion) for at least a selected period of time.

Agent: In general, the term "agent", as used herein, may be used to refer to a compound or entity of any chemical class including, for example, a polypeptide, nucleic acid, saccharide, lipid, small molecule, metal, or combination or complex thereof. In appropriate circumstances, as will be clear from context to those skilled in the art, the term may be utilized to refer to an entity that is or comprises a cell or organism, or a fraction, extract, or component thereof. Alternatively or additionally, as context will make clear, the term may be used to refer to a natural product in that it is found in and/or is obtained from nature. In some instances, again as will be clear from context, the term may be used to refer to one or more entities that is man-made in that it is designed, engineered, and/or produced through action of the hand of man and/or is not found in nature. In some embodiments, an agent may be utilized in isolated or pure form; in some embodiments, an agent may be utilized in crude form. In some embodiments, potential agents may be provided as collections or libraries, for example that may be screened to identify or characterize active agents within them. In some cases, the term "agent" may refer to a compound or entity that is or comprises a polymer; in some cases, the term may refer to a compound or entity that comprises one or more polymeric moieties. In some embodiments, the term "agent" may refer to a compound or entity that is not a polymer and/or is substantially free of any polymer and/or of one or more particular polymeric moieties. In some embodiments, the term may refer to a compound or entity that lacks or is substantially free of any polymeric moiety. In some embodiments, an agent is a compound. In some embodiments, an agent is an ARM as described herein.

Aliphatic: As used herein, "aliphatic" means a straight-chain (i.e., unbranched) or branched, substituted or unsubstituted hydrocarbon chain that is completely saturated or that contains one or more units of unsaturation, or a substituted or unsubstituted monocyclic, bicyclic, or polycyclic hydrocarbon ring that is completely saturated or that contains one or more units of unsaturation, or combinations thereof. Unless otherwise specified, aliphatic groups contain 1-100 aliphatic carbon atoms. In some embodiments, aliphatic groups contain 1-20 aliphatic carbon atoms. In other embodiments, aliphatic groups contain 1-10 aliphatic carbon atoms. In other embodiments, aliphatic groups contain 1-9 aliphatic carbon atoms. In other embodiments, aliphatic groups contain 1-8 aliphatic carbon atoms. In other embodiments, aliphatic groups contain 1-7 aliphatic carbon atoms. In other embodiments, aliphatic groups contain 1-6 aliphatic carbon atoms. In still other embodiments, aliphatic groups contain 1-5 aliphatic carbon atoms, and in yet other embodiments, aliphatic groups contain 1, 2, 3, or 4 aliphatic carbon atoms. Suitable aliphatic groups include, but are not limited to, linear or branched, substituted or unsubstituted alkyl, alkenyl, alkynyl groups and hybrids thereof.

Alkenyl: As used herein, the term "alkenyl" refers to an aliphatic group, as defined herein, having one or more double bonds.

Alkenylene: The term "alkenylene" refers to a bivalent alkenyl group.

Alkyl: As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some embodiments, alkyl has 1-100 carbon atoms. In certain embodiments, a straight chain or branched chain alkyl has about 1-20 carbon atoms in its backbone (e.g., $C_1$-$C_{20}$ for straight chain, $C_2$-$C_{20}$ for branched chain), and alternatively, about 1-10. In some embodiments, cycloalkyl rings have from about 3-10 carbon atoms in their ring structure where such rings are monocyclic, bicyclic, or polycyclic, and alternatively about 5, 6 or 7 carbons in the ring structure. In some embodiments, an alkyl group may be a lower alkyl group, wherein a lower alkyl group comprises 1~4 carbon atoms (e.g., $C_1$-$C_4$ for straight chain lower alkyls).

Alkylene: The term "alkylene" refers to a bivalent alkyl group.

Amino acid: In its broadest sense, as used herein, refers to any compound and/or substance that can be incorporated into a polypeptide chain, e.g., through formation of one or more peptide bonds. In some embodiments, an amino acid comprising an amino group and a carboxylic acid group. In some embodiments, an amino acid has the general structure NH(R')—C(R')$_2$—COOH, wherein each R' is independently as described in the present disclosure. In some embodiments, an amino acid has the general structure $H_2N$—C(R')$_2$—COOH, wherein R' is as described in the present disclosure. In some embodiments, an amino acid has the general structure $H_2N$—C(H)(R')—COOH, wherein R' is as described in the present disclosure. In some embodiments, an amino acid is a naturally-occurring amino acid. In some embodiments, an amino acid is a non-natural amino acid; in some embodiments, an amino acid is a D-amino acid; in some embodiments, an amino acid is an L-amino acid. "Standard amino acid" refers to any of the twenty standard L-amino acids commonly found in naturally occurring peptides. "Nonstandard amino acid" refers to any amino acid, other than the standard amino acids, regardless of whether it is prepared synthetically or obtained from a natural source. In some embodiments, an amino acid, including a carboxy- and/or amino-terminal amino acid in a polypeptide, can contain a structural modification as compared with the general structure above. For example, in some embodiments, an amino acid may be modified by methylation, amidation, acetylation, pegylation, glycosylation, phosphorylation, and/or substitution (e.g., of the amino group, the carboxylic acid group, one or more protons, one or more hydrogens, and/or the hydroxyl group) as compared with the general structure. In some embodiments, such modification may, for example, alter the circulating half-life of a polypeptide containing the modified amino acid as compared with one containing an otherwise identical unmodified amino acid. In some embodiments, such modification does not significantly alter a relevant activity of a polypeptide containing the modified amino acid, as compared with one containing an otherwise identical unmodified amino acid. As will be clear from context, in some embodiments, the term "amino acid" may be used to refer to a free amino acid; in some embodiments it may be used to refer to an amino acid residue of a polypeptide.

Animal: As used herein refers to any member of the animal kingdom. In some embodiments, "animal" refers to humans, of either sex and at any stage of development. In some embodiments, "animal" refers to non-human animals, at any stage of development. In certain embodiments, the non-human animal is a mammal (e.g., a rodent, a mouse, a rat, a rabbit, a monkey, a dog, a cat, a sheep, cattle, a primate, and/or a pig). In some embodiments, animals include, but are not limited to, mammals, birds, reptiles, amphibians, fish, insects, and/or worms. In some embodiments, an animal may be a transgenic animal, genetically engineered animal, and/or a clone.

Antibody: As used herein, the term "antibody" refers to a polypeptide that includes canonical immunoglobulin sequence elements sufficient to confer specific binding to a particular target antigen. As is known in the art, intact antibodies as produced in nature are approximately 150 kD tetrameric agents comprised of two identical heavy chain polypeptides (about 50 kD each) and two identical light chain polypeptides (about 25 kD each) that associate with each other into what is commonly referred to as a "Y-shaped" structure. Each heavy chain is comprised of at least four domains (each about 110 amino acids long)—an amino-terminal variable (VH) domain (located at the tips of the Y structure), followed by three constant domains: CH1, CH2, and the carboxy-terminal CH3 (located at the base of the Y's stem). A short region, known as the "switch", connects the heavy chain variable and constant regions. The "hinge" connects CH2 and CH3 domains to the rest of the antibody. Two disulfide bonds in this hinge region connect the two heavy chain polypeptides to one another in an intact antibody. Each light chain is comprised of two domains—an amino-terminal variable (VL) domain, followed by a carboxy-terminal constant (CL) domain, separated from one another by another "switch". Intact antibody tetramers are comprised of two heavy chain-light chain dimers in which the heavy and light chains are linked to one another by a single disulfide bond; two other disulfide bonds connect the heavy chain hinge regions to one another, so that the dimers are connected to one another and the tetramer is formed. Naturally-produced antibodies are also glycosylated, typically on the CH2 domain. Each domain in a natural antibody has a structure characterized by an "immunoglobulin fold" formed from two beta sheets (e.g., 3-, 4-, or 5-stranded sheets) packed against each other in a compressed antiparallel beta barrel. Each variable domain contains three hypervariable loops known as "complement determining regions" (CDR1, CDR2, and CDR3) and four somewhat invariant "framework" regions (FR1, FR2, FR3, and FR4). When natural antibodies fold, the FR regions form the beta sheets that provide the structural framework for the domains, and the CDR loop regions from both the heavy and light chains are brought together in three-dimensional space so that they create a single hypervariable antigen binding site located at the tip of the Y structure. The Fc region of naturally-occurring antibodies binds to elements of the complement system, and also to receptors on effector cells, including for example effector cells that mediate cytotoxicity. As is known in the art, affinity and/or other binding attributes of Fc regions for Fc receptors can be modulated through glycosylation or other modification. In some embodiments, antibodies produced and/or utilized in accordance with the present disclosure include glycosylated Fc domains, including Fc domains with modified or engineered such glycosylation. For purposes of the present disclosure, in certain embodiments, any polypeptide or complex of polypeptides that includes sufficient immunoglobulin domain sequences as found in natural antibodies can be referred to and/or used as an "antibody", whether such polypeptide is naturally produced (e.g., generated by an organism reacting to an antigen), or produced by recombinant engineering, chemical synthesis, or other artificial system or methodology. In some embodiments, an antibody is polyclonal; in some embodiments, an antibody is monoclonal. In some embodiments, an antibody has constant region sequences that are characteristic of mouse, rabbit, primate, or human antibodies. In some embodiments, antibody sequence elements are humanized, primatized, chimeric, etc., as is known in the art. Moreover, the term "antibody" as used herein, can refer in appropriate embodiments (unless otherwise stated or clear from context) to any of the art-known or developed constructs or formats for utilizing antibody structural and functional features in alternative presentation. For example, in some embodiments, an antibody utilized in accordance with the present disclosure is in a format selected from, but not limited to, intact IgA, IgG, IgE or IgM antibodies; bi- or multi-specific antibodies (e.g., Zybodies®, etc.); antibody fragments such as Fab fragments, Fab' fragments, F(ab')2 fragments, Fd' fragments, Fd fragments, and isolated CDRs or sets thereof; single chain Fvs; polypeptide-Fc fusions; single domain antibodies (e.g., shark single domain antibodies such as IgNAR or fragments thereof); cameloid antibodies; masked antibodies (e.g., Probodies®); Small Modular ImmunoPharmaceuticals ("SMIPs™"); single chain or Tandem diabodies (TandAb®); VHHs; Anticalins®; Nanobodies®; minibodies; BiTE®s; ankyrin repeat proteins or DARPINs®; Avimers®; DARTs; TCR-like antibodies; Adnectins®; Affilins®; Trans-bodies®; Affibodies®; TrimerX®; MicroProteins; Fynomers®, Centyrins®; KALBITOR®s; CovX-Bodies; and CrossMabs. In some embodiments, an antibody may lack a covalent modification (e.g., attachment of a glycan) that it would have if produced naturally. In some embodiments, an antibody may contain a covalent modification (e.g., attachment of a glycan, a payload [e.g., a detectable moiety, a therapeutic moiety, a catalytic moiety, etc.], or other pendant group [e.g., poly-ethylene glycol, etc.]).

Approximately: As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Aryl: The term "aryl" used alone or as part of a larger moiety as in "aralkyl," "aralkoxy," "aryloxyalkyl," etc. refers to monocyclic, bicyclic or polycyclic ring systems having a total of five to thirty ring members, wherein at least one ring in the system is aromatic. In some embodiments, an aryl group is a monocyclic, bicyclic or polycyclic ring system having a total of five to fourteen ring members, wherein at least one ring in the system is aromatic, and wherein each ring in the system contains 3 to 7 ring members. In some embodiments, an aryl group is a biaryl group. The term "aryl" may be used interchangeably with the term "aryl ring." In certain embodiments of the present disclosure, "aryl" refers to an aromatic ring system which includes, but not limited to, phenyl, biphenyl, naphthyl, binaphthyl, anthracyl and the like, which may bear one or more substituents. In some embodiments, also included within the scope of the term "aryl," as it is used herein, is a group in which an aromatic ring is fused to one or more non-aromatic rings, such as indanyl, phthalimidyl, naphthimidyl, phenanthridinyl, or tetrahydronaphthyl, and the like, where a radical or point of attachment is on an aryl ring.

Associated with: Two events or entities are "associated" with one another, as that term is used herein, if the presence, level and/or form of one is correlated with that of the other. For example, a particular entity (e.g., nucleic acid (e.g., genomic DNA, transcripts, mRNA, etc.), polypeptide, genetic signature, metabolite, microbe, cells, etc.) is considered to be associated with a particular disease, disorder, or condition, if its presence, level and/or form correlates with incidence of and/or susceptibility to the disease, disorder, or condition (e.g., across a relevant population).

Carrier: as used herein, refers to a diluent, adjuvant, excipient, or vehicle with which a composition is administered. In some exemplary embodiments, carriers can include sterile liquids, such as, for example, water and oils, including oils of petroleum, animal, vegetable or synthetic origin, such as, for example, peanut oil, soybean oil, mineral oil, sesame oil and the like. In some embodiments, carriers are or include one or more solid components.

Comparable: As used herein, the term "comparable" refers to two or more agents, entities, situations, sets of conditions, etc., that may not be identical to one another but that are sufficiently similar to permit comparison there between so that one skilled in the art will appreciate that conclusions may reasonably be drawn based on differences or similarities observed. In some embodiments, comparable sets of conditions, circumstances, individuals, or populations are characterized by a plurality of substantially identical features and one or a small number of varied features. Those of ordinary skill in the art will understand, in context, what degree of identity is required in any given circumstance for two or more such agents, entities, situations, sets of conditions, etc. to be considered comparable. For example, those of ordinary skill in the art will appreciate that sets of circumstances, individuals, or populations are comparable to one another when characterized by a sufficient number and type of substantially identical features to warrant a reasonable conclusion that differences in results obtained or phenomena observed under or with different sets of circumstances, individuals, or populations are caused by or indicative of the variation in those features that are varied.

Cycloaliphatic: The term "cycloaliphatic," as used herein, refers to saturated or partially unsaturated aliphatic monocyclic, bicyclic, or polycyclic ring systems having, e.g., from 3 to 30, members, wherein the aliphatic ring system is optionally substituted. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic" may also include aliphatic rings that are fused to one or more aromatic or nonaromatic rings, such as decahydronaphthyl or tetrahydronaphthyl, where a radical or point of attachment is on an aliphatic ring. In some embodiments, a carbocyclic group is bicyclic. In some embodiments, a carbocyclic group is tricyclic. In some embodiments, a carbocyclic group is polycyclic. In some embodiments, "cycloaliphatic" (or "carbocycle" or "cycloalkyl") refers to a monocyclic $C_3$-$C_6$ hydrocarbon, or a $C_8$-$C_{10}$ bicyclic hydrocarbon that is completely saturated or that contains one or more units of unsaturation, but which is not aromatic, or a $C_9$-$C_{16}$ tricyclic hydrocarbon that is completely saturated or that contains one or more units of unsaturation, but which is not aromatic.

Derivative: As used herein, the term "derivative" refers to a structural analogue of a reference substance. That is, a "derivative" is a substance that shows significant structural similarity with the reference substance, for example sharing a core or consensus structure, but also differs in certain discrete ways. In some embodiments, a derivative is a substance that can be generated from the reference substance by chemical manipulation. In some embodiments, a derivative is a substance that can be generated through performance of a synthetic process substantially similar to (e.g., sharing a plurality of steps with) one that generates the reference substance.

Dosage form or unit dosage form: Those skilled in the art will appreciate that the term "dosage form" may be used to refer to a physically discrete unit of an active agent (e.g., a therapeutic or diagnostic agent) for administration to a subject. Typically, each such unit contains a predetermined quantity of active agent. In some embodiments, such quantity is a unit dosage amount (or a whole fraction thereof) appropriate for administration in accordance with a dosing regimen that has been determined to correlate with a desired or beneficial outcome when administered to a relevant population (i.e., with a therapeutic dosing regimen). Those of ordinary skill in the art appreciate that the total amount of a therapeutic composition or agent administered to a particular subject is determined by one or more attending physicians and may involve administration of multiple dosage forms.

Dosing regimen: Those skilled in the art will appreciate that the term "dosing regimen" may be used to refer to a set of unit doses (typically more than one) that are administered individually to a subject, typically separated by periods of time. In some embodiments, a given therapeutic agent has a recommended dosing regimen, which may involve one or more doses. In some embodiments, a dosing regimen comprises a plurality of doses each of which is separated in time from other doses. In some embodiments, individual doses are separated from one another by a time period of the same length; in some embodiments, a dosing regimen comprises a plurality of doses and at least two different time periods separating individual doses. In some embodiments, all doses within a dosing regimen are of the same unit dose amount. In some embodiments, different doses within a dosing regimen are of different amounts. In some embodiments, a dosing regimen comprises a first dose in a first dose amount, followed by one or more additional doses in a second dose amount different from the first dose amount. In some embodiments, a dosing regimen comprises a first dose in a first dose amount, followed by one or more additional doses in a second dose amount same as the first dose amount. In some embodiments, a dosing regimen is correlated with a desired or beneficial outcome when administered across a relevant population (i.e., is a therapeutic dosing regimen).

Halogen: The term "halogen" means F, Cl, Br, or I.

Heteroaliphatic: The term "heteroaliphatic" is given its ordinary meaning in the art and refers to aliphatic groups as described herein in which one or more carbon atoms are replaced with one or more heteroatoms (e.g., oxygen, nitrogen, sulfur, silicon, phosphorus, and the like).

Heteroaryl: The terms "heteroaryl" and "heteroar-," used alone or as part of a larger moiety, e.g., "heteroaralkyl," or "heteroaralkoxy," refer to monocyclic, bicyclic or polycyclic ring systems having, for example, a total of five to thirty, e.g., 5, 6, 9, 10, 14, etc., ring members, wherein at least one ring in the system is aromatic and at least one aromatic ring atom is a heteroatom. In some embodiments, a heteroatom is nitrogen, oxygen or sulfur. In some embodiments, a heteroaryl group is a group having 5 to 14 ring atoms (i.e., monocyclic, bicyclic or polycyclic), in some embodiments 5, 6, 9, 10 or 14 ring atoms. In some embodiments, a heteroaryl group has 6, 10, or 14 π electrons shared in a cyclic array; and having, in addition to carbon atoms, from one to five heteroatoms. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, and pteridinyl. In some embodiments, a heteroaryl is a heterobiaryl group, such as bipyridyl and the like. The terms "heteroaryl" and "heteroar-", as used herein, also include groups in which a heteroaromatic ring is fused to one or more aryl, cycloaliphatic, or heterocyclyl rings, where a radical or point of attachment is on a heteroaromatic ring. Non-limiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3 (4H)-one. A heteroaryl group may be monocyclic, bicyclic or polycyclic. The term "heteroaryl" may be used interchangeably with the terms "heteroaryl ring," or "heteroaryl group," any of which terms include rings that are optionally substituted. The term "heteroaralkyl" refers to an alkyl group substituted by a heteroaryl group, wherein the alkyl and heteroaryl portions independently are optionally substituted.

Heteroatom: The term "heteroatom" means an atom that is not carbon and is not hydrogen. In some embodiments, a heteroatom is oxygen, sulfur, nitrogen, phosphorus, boron or silicon (including any oxidized form of nitrogen, sulfur, phosphorus, or silicon; the quaternized form of any basic nitrogen or a substitutable nitrogen of a heterocyclic ring (for example, N as in 3,4-dihydro-2H-pyrrolyl), NH (as in pyrrolidinyl) or $NR^+$ (as in N-substituted pyrrolidinyl); etc.). In some embodiments, a heteroatom is boron, nitrogen, oxygen, silicon, sulfur, or phosphorus. In some embodiments, a heteroatom is nitrogen, oxygen, silicon, sulfur, or phosphorus. In some embodiments, a heteroatom is nitrogen, oxygen, sulfur, or phosphorus. In some embodiments, a heteroatom is nitrogen, oxygen or sulfur.

Heterocyclyl: As used herein, the terms "heterocycle," "heterocyclyl," "heterocyclic radical," and "heterocyclic ring" are used interchangeably and refer to a monocyclic, bicyclic or polycyclic ring moiety (e.g., 3-30 membered) that is saturated or partially unsaturated and has one or more heteroatom ring atoms. In some embodiments, a heteroatom is boron, nitrogen, oxygen, silicon, sulfur, or phosphorus. In some embodiments, a heteroatom is nitrogen, oxygen, silicon, sulfur, or phosphorus. In some embodiments, a heteroatom is nitrogen, oxygen, sulfur, or phosphorus. In some embodiments, a heteroatom is nitrogen, oxygen or sulfur. In some embodiments, a heterocyclyl group is a stable 3- to 7-membered monocyclic or 7- to 10-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes substituted nitrogen. As an example, in a saturated or partially unsaturated ring having 0-3 heteroatoms selected from oxygen, sulfur or nitrogen, the nitrogen may be N (as in 3,4-dihydro-2H pyrrolyl), NH (as in pyrrolidinyl), or $^+NR$ (as in N-substituted pyrrolidinyl). A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle," "heterocyclyl," "heterocyclyl ring," "heterocyclic group," "heterocyclic moiety," and "heterocyclic radical," are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where a radical or point of attachment is on a heteroaliphatic ring. A heterocyclyl group may be monocyclic, bicyclic or polycyclic. The term "heterocyclylalkyl" refers to an alkyl group substituted by a heterocyclyl, wherein the alkyl and heterocyclyl portions independently are optionally substituted.

"Improved," "increased" or "reduced": As used herein, these terms, or grammatically comparable comparative terms, indicate values that are relative to a comparable reference measurement. For example, in some embodiments, an assessed value achieved with an agent of interest may be "improved" relative to that obtained with a comparable reference agent. Alternatively or additionally, in some embodiments, an assessed value achieved in a subject or system of interest may be "improved" relative to that obtained in the same subject or system under different conditions (e.g., prior to or after an event such as administration of an agent of interest), or in a different, comparable subject (e.g., in a comparable subject or system that differs from the subject or system of interest in presence of one or more indicators of a particular disease, disorder or condition of interest, or in prior exposure to a condition or agent, etc.). In some embodiments, comparative terms refer to statistically relevant differences (e.g., that are of a prevalence and/or magnitude sufficient to achieve statistical relevance). Those skilled in the art will be aware, or will readily be able to determine, in a given context, a degree and/or prevalence of difference that is required or sufficient to achieve such statistical significance.

Partially unsaturated: As used herein, the term "partially unsaturated" refers to a moiety that includes at least one double or triple bond. The term "partially unsaturated" is intended to encompass groups having multiple sites of unsaturation, but is not intended to include aryl or heteroaryl moieties.

Pharmaceutical composition: As used herein, the term "pharmaceutical composition" refers to an active agent, e.g., a compound, formulated together with one or more pharmaceutically acceptable carriers. In some embodiments, active agent is present in unit dose amount appropriate for administration in a therapeutic regimen that shows a statistically significant probability of achieving a predetermined therapeutic effect when administered to a relevant population. In some embodiments, pharmaceutical compositions may be specially formulated for administration in solid or liquid form, including those adapted for the following: oral administration, for example, drenches (aqueous or non-aqueous solutions or suspensions), tablets, e.g., those targeted for buccal, sublingual, and systemic absorption, boluses, powders, granules, pastes for application to the tongue; parenteral administration, for example, by subcutaneous, intramuscular, intravenous or epidural injection as, for example, a sterile solution or suspension, or sustained-release formulation; topical application, for example, as a cream, ointment, or a controlled-release patch or spray applied to the skin, lungs, or oral cavity; intravaginally or intrarectally, for example, as a pessary, cream, or foam; sublingually; ocularly; transdermally; or nasally, pulmonary, and to other mucosal surfaces.

Pharmaceutically acceptable: As used herein, the phrase "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

Pharmaceutically acceptable carrier: As used herein, the term "pharmaceutically acceptable carrier" means a pharmaceutically-acceptable material, composition or vehicle, such as a liquid or solid filler, diluent, excipient, or solvent encapsulating material, involved in carrying or transporting the subject compound from one organ, or portion of the body, to another organ, or portion of the body. Each carrier must be "acceptable" in the sense of being compatible with the other ingredients of the formulation and not injurious to the patient. Some examples of materials which can serve as pharmaceutically-acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; pH buffered solutions; polyesters, polycarbonates and/or polyanhydrides; and other non-toxic compatible substances employed in pharmaceutical formulations.

Pharmaceutically acceptable salt: The term "pharmaceutically acceptable salt", as used herein, refers to salts of such compounds that are appropriate for use in pharmaceutical contexts, i.e., salts which are, within the scope of sound medical judgment, suitable for use in contact with the tissues of humans and lower animals without undue toxicity, irritation, allergic response and the like, and are commensurate with a reasonable benefit/risk ratio. Pharmaceutically acceptable salts are well known. For example, S. M. Berge, et al. describes pharmaceutically acceptable salts in detail in J. Pharmaceutical Sciences, 66:1-19 (1977). In some embodiments, pharmaceutically acceptable salts include, but are not limited to, nontoxic acid addition salts, which are salts of an amino group formed with inorganic acids such as hydrochloric acid, hydrobromic acid, phosphoric acid, sulfuric acid and perchloric acid or with organic acids such as acetic acid, maleic acid, tartaric acid, citric acid, succinic acid or malonic acid or by using other known methods such as ion exchange. In some embodiments, pharmaceutically acceptable salts include, but are not limited to, adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. In some embodiments, pharmaceutically acceptable salts include, but are not limited to, nontoxic base addition salts, such as those formed by acidic groups of provided compounds with bases. Representative alkali or alkaline earth metal salts include salts of sodium, lithium, potassium, calcium, magnesium, and the like. In some embodiments, pharmaceutically acceptable salts are ammonium salts (e.g., —N(R)$_3^+$). In some embodiments, pharmaceutically acceptable salts are sodium salts. In some embodiments, pharmaceutically acceptable salts are calcium salts. In some embodiments, pharmaceutically acceptable salts include, when appropriate, nontoxic ammonium, quaternary ammonium, and amine cations formed using counterions such as halide, hydroxide, carboxylate, sulfate, phosphate, nitrate, alkyl having from 1 to 6 carbon atoms, sulfonate and aryl sulfonate. In some embodiments, a provided compound is in the form of a pharmaceutically acceptable salt.

Protecting Group: The phrase "protecting group" or "protection group," as used herein, refers to temporary substituents which protect a potentially reactive functional group from undesired chemical transformations. Examples of such protecting groups include esters of carboxylic acids, silyl ethers of alcohols, and acetals and ketals of aldehydes and ketones, respectively. A "Si protecting group" is a protecting group comprising a Si atom, such as Si-trialkyl (e.g., trimethylsilyl, tributylsilyl, t-butyldimethylsilyl), Si-triaryl, Si-alkyl-diphenyl (e.g., t-butyldiphenylsilyl), or Si-aryl-dialkyl (e.g., Si-phenyldialkyl). Generally, a Si protecting group is attached to an oxygen atom. The field of protecting group chemistry has been reviewed (Greene, T. W.; Wuts, P. G. M. Protective Groups in Organic Synthesis, 2nd ed.; Wiley: New York, 1991). Such protecting groups (and associated protected moieties) are described in detail below.

Protected hydroxyl groups are well known in the art and include those described in detail in *Protecting Groups in Organic Synthesis*, T. W. Greene and P. G. M. Wuts, 3$^{rd}$ edition, John Wiley & Sons, 1999, the entirety of which is incorporated herein by reference. Examples of suitably protected hydroxyl groups further include, but are not limited to, esters, carbonates, sulfonates, allyl ethers, ethers, silyl ethers, alkyl ethers, arylalkyl ethers, and alkoxyalkyl ethers. Examples of suitable esters include formates, acetates, propionates, pentanoates, crotonates, and benzoates. Specific examples of suitable esters include formate, benzoyl formate, chloroacetate, trifluoroacetate, methoxyacetate, triphenylmethoxyacetate, p-chlorophenoxyacetate, 3-phenylpropionate, 4-oxopentanoate, 4,4-(ethylenedithio) pentanoate, pivaloate (trimethylacetate), crotonate, 4-methoxy-crotonate, benzoate, p-benzylbenzoate, 2,4,6-trimethylbenzoate. Examples of suitable carbonates include 9-fluorenylmethyl, ethyl, 2,2,2-trichloroethyl, 2-(trimethylsilyl)ethyl, 2-(phenylsulfonyl)ethyl, vinyl, allyl, and p-nitrobenzyl carbonate. Examples of suitable silyl ethers include trimethylsilyl, triethylsilyl, t-butyldimethylsilyl, t-butyldiphenylsilyl, triisopropylsilyl ether, and other trialkylsilyl ethers. Examples of suitable alkyl ethers include methyl, benzyl, p-methoxybenzyl, 3,4-dimethoxybenzyl, trityl, t-butyl, and allyl ether, or derivatives thereof. Alkoxyalkyl ethers include acetals such as methoxymethyl, methylthiomethyl, (2-methoxyethoxy)methyl, benzyloxymethyl, beta-(trimethylsilyl) ethoxymethyl, and tetrahydropyran-2-yl ether. Examples of suitable arylalkyl ethers include benzyl, p-methoxybenzyl (MPM), 3,4-dimethoxybenzyl, O-nitrobenzyl, p-nitrobenzyl, p-halobenzyl, 2,6-dichlorobenzyl, p-cyanobenzyl, 2- and 4-picolyl ethers.

Protected amines are well known in the art and include those described in detail in Greene (1999). Suitable mono-protected amines further include, but are not limited to, aralkylamines, carbamates, allyl amines, amides, and the like. Examples of suitable mono-protected amino moieties include t-butyloxycarbonylamino (—NHBOC), ethyloxycarbonylamino, methyloxycarbonylamino, trichloroethyloxycarbonylamino, allyloxycarbonylamino (-NHAlloc), benzyloxycarbonylamino (—NHCBZ), allylamino, benzylamino (-NHBn), fluorenylmethoxycarbonylamino (-NHFmoc), formamido, acetamido, chloroacetamido, dichloroacetamido, trichloroacetamido, phenylacetamido, trifluoroacetamido, benzamido, t-butyldiphenylsilyl, and the like. Suitable di-protected amines include amines that are substituted with two substituents independently selected from those described above as mono-protected amines, and further include cyclic imides, such as phthalimide, maleimide, succinimide, and the like. Suitable di-protected amines also include pyrroles and the like, 2,2,5,5-tetramethyl-[1,2,5]azadisilolidine and the like, and azide.

Protected aldehydes are well known in the art and include those described in detail in Greene (1999). Suitable protected aldehydes further include, but are not limited to, acyclic acetals, cyclic acetals, hydrazones, imines, and the like. Examples of such groups include dimethyl acetal, diethyl acetal, diisopropyl acetal, dibenzyl acetal, bis(2-nitrobenzyl) acetal, 1,3-dioxanes, 1,3-dioxolanes, semicarbazones, and derivatives thereof.

Protected carboxylic acids are well known in the art and include those described in detail in Greene (1999). Suitable protected carboxylic acids further include, but are not limited to, optionally substituted $C_{1-6}$ aliphatic esters, optionally substituted aryl esters, silyl esters, activated esters, amides, hydrazides, and the like. Examples of such ester groups include methyl, ethyl, propyl, isopropyl, butyl, isobutyl, benzyl, and phenyl ester, wherein each group is optionally substituted. Additional suitable protected carboxylic acids include oxazolines and ortho esters.

Protected thiols are well known in the art and include those described in detail in Greene (1999). Suitable protected thiols further include, but are not limited to, disulfides, thioethers, silyl thioethers, thioesters, thiocarbonates, and thiocarbamates, and the like. Examples of such groups include, but are not limited to, alkyl thioethers, benzyl and substituted benzyl thioethers, triphenylmethyl thioethers, and trichloroethoxycarbonyl thioester, to name but a few.

Reference: As used herein describes a standard or control relative to which a comparison is performed. For example, in some embodiments, an agent, animal, individual, population, sample, sequence or value of interest is compared with a reference or control agent, animal, individual, population, sample, sequence or value. In some embodiments, a reference or control is tested and/or determined substantially simultaneously with the testing or determination of interest. In some embodiments, a reference or control is a historical reference or control, optionally embodied in a tangible medium. Typically, as would be understood by those skilled in the art, a reference or control is determined or characterized under comparable conditions or circumstances to those under assessment. Those skilled in the art will appreciate when sufficient similarities are present to justify reliance on and/or comparison to a particular possible reference or control.

Substitution: As described herein, compounds of the disclosure may contain optionally substituted and/or substituted moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this disclosure are preferably those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein.

Suitable monovalent substituents include halogen; —$(CH_2)_{0-4}R°$; —$(CH_2)_{0-4}OR°$; —$O(CH_2)_{0-4}R°$, —O—$(CH_2)_{0-4}C(O)OR°$; —$(CH_2)_{0-4}CH(OR°)_2$; —$(CH_2)_{0-4}Ph$, which may be substituted with $R°$; —$(CH_2)_{0-4}O(CH_2)_{0-1}Ph$ which may be substituted with $R°$; —CH=CHPh, which may be substituted with $R°$; —$(CH_2)_{0-4}O(CH_2)_{0-1}$-pyridyl which may be substituted with $R°$; —$NO_2$; —CN; —$N_3$; —$(CH_2)_{0-4}N(R°)_2$; —$(CH_2)_{0-4}N(R°)C(O)R°$; —$N(R°)C(S)R°$; —$(CH_2)_{0-4}N(R°)C(O)N(R°)_2$; —$N(R°)C(S)N(R°)_2$; —$(CH_2)_{0-4}N(R°)C(O)OR°$; —$N(R°)N(R°)C(O)R°$; —$N(R°)N(R°)C(O)N(R°)_2$; —$N(R°)N(R°)C(O)OR°$; —$(CH_2)_{0-4}C(O)R°$; —$C(S)R°$; —$(CH_2)_{0-4}C(O)OR°$; —$(CH_2)_{0-4}C(O)SR°$; —$(CH_2)_{0-4}C(O)OSi(R°)_3$; —$(CH_2)_{0-4}OC(O)R°$; —$OC(O)(CH_2)_{0-4}SR°$, —$(CH_2)_{0-4}SC(O)R°$; —$(CH_2)_{0-4}C(O)N(R°)_2$; —$C(S)N(R°)_2$; —$C(S)SR°$; —SC(S)SR°$, —$(CH_2)_{0-4}OC(O)N(R°)_2$; —$C(O)N(OR°)R°$; —$C(O)C(O)R°$; —$C(O)CH_2C(O)R°$; —$C(NOR°)R°$; —$(CH_2)_{0-4}SSR°$; —$(CH_2)_{0-4}S(O)_2R°$; —$(CH_2)_{0-4}S(O)_2OR°$; —$(CH_2)_{0-4}OS(O)_2R°$; —$S(O)_2N(R°)_2$; —$(CH_2)_{0-4}S(O)R°$; —$N(R°)S(O)_2N(R°)_2$; —$N(R°)S(O)_2R°$; —$N(OR°)R°$; —$C(NH)N(R°)_2$; —$Si(R°)_3$; —$OSi(R°)_3$; —$OSi(OR°)_3$; —$P(R°)_2$; —$P(OR°)_2$; —$OP(R°)_2$; —$OP(OR°)_2$; —$N(R°)P(R°)_2$; —$OP(O)(R°)_2$; —$OP(O)(OR°)_2$; —$N(R°)P(O)(R°)_2$; —$N(R°)P(O)(OR°)_2$; —$B(R°)_2$; —$OB(R°)_2$; —$OB(OR°)_2$; —$P(O)(R°)_2$; —$OP(O)(R°)_2$; —$(C_{1-4}$ straight or branched alkylene)O—$N(R°)_2$; or —$(C_{1-4}$ straight or branched alkylene)C(O)O—$N(R°)_2$; wherein each $R°$ may be substituted as defined below and is independently hydrogen, $C_{1-20}$ aliphatic, $C_{1-20}$ heteroaliphatic having 1-5 heteroatoms independently selected from nitrogen, oxygen, sulfur, silicon and phosphorus, —$CH_2$—$(C_{6-14}$ aryl), —$O(CH_2)_{0-1}$ ($C_{6-14}$ aryl), —$CH_2$-(5-14 membered heteroaryl ring), a 5-20 membered, monocyclic, bicyclic, or polycyclic, saturated, partially unsaturated or aryl ring having 0-5 heteroatoms independently selected from nitrogen, oxygen, sulfur, silicon and phosphorus, or, notwithstanding the definition above, two independent occurrences of $R°$, taken together with their intervening atom(s), form a 3-20 membered, monocyclic, bicyclic, or polycyclic, saturated, partially unsaturated or aryl ring having 0-5 heteroatoms independently selected from nitrogen, oxygen, sulfur, silicon and phosphorus, which may be substituted as defined below.

Suitable monovalent substituents on $R°$ (or the ring formed by taking two independent occurrences of $R°$ together with their intervening atoms), are independently halogen, —$(CH_2)_{0-2}R^•$, -(halo$R^•$), —$(CH_2)_{0-2}OH$, —$(CH_2)_{0-2}OR^•$, —$(CH_2)_{0-2}CH(OR^•)_2$; —O(halo$R^•$), —CN, —$N_3$, —$(CH_2)_{0-2}C(O)R^•$, —$(CH_2)_{0-2}C(O)OH$, —$(CH_2)_{0-2}C(O)OR^•$, —$(CH_2)_{0-2}SR^•$, —$(CH_2)_{0-2}SH$, —$(CH_2)_{0-2}NH_2$, —$(CH_2)_{0-2}NHR^•$, —$(CH_2)_{0-2}NR^•_2$, —$NO_2$, —$SiR^•_3$, —$OSiR^•_3$, —$C(O)SR'$, —$(C_{1-4}$ straight or branched alkylene)C(O)OR'', or —$SSR^•$ wherein each $R^•$ is unsubstituted or where preceded by "halo" is substituted only with one or more halogens, and is independently selected from $C_{1-4}$ aliphatic, —$CH_2Ph$, —$O(CH_2)_{0-1}Ph$, and a 5-6-membered saturated, partially unsaturated, or aryl ring having 0-4 heteroatoms independently selected from nitrogen, oxygen, and sulfur. Suitable divalent substituents on a saturated carbon atom of $R°$ include =O and =S.

Suitable divalent substituents, e.g., on a suitable carbon atom, nitrogen atom, etc., include independently the following: =O, =S, =$CR^*_2$, =$NNR^*_2$, =$NNHC(O)R^*$, —$NNHC(O)OR^*$, =$NNHS(O)_2R^*$, =$NR^*$, =$NOR^*$, —$O(C(R^*_2))_{2-3}O$—, or —$S(C(R^*_2))_{2-3}S$—, wherein each $R^*$ may be substituted as defined below and is independently hydrogen, $C_{1-20}$ aliphatic, $C_{1-20}$ heteroaliphatic having 1-5 heteroatoms independently selected from nitrogen, oxygen, sulfur, silicon and phosphorus, —$CH_2$—$(C_{6-20}$ aryl), —$O(CH_2)_{0-1}$ ($C_{6-20}$ aryl), —$CH_2$-(5-20 membered heteroaryl ring having 1-5 heteroatoms independently selected from nitrogen, oxygen, sulfur, silicon and phosphorus), a 5-20 membered, monocyclic, bicyclic, or polycyclic, saturated, partially unsaturated or aryl ring having 0-5 heteroatoms independently selected from nitrogen, oxygen, sulfur, silicon and phosphorus, or, notwithstanding the definition above, two independent occurrences of $R^*$, taken together with their intervening atom(s), form a 3-20 membered, monocyclic, bicyclic, or polycyclic, saturated, partially unsaturated or aryl ring having 0-5 heteroatoms independently selected from nitrogen, oxygen, sulfur, silicon and phosphorus, which may be substituted as defined below. Suitable divalent substituents that are bound to vicinal substitutable atoms of an "optionally substituted" group include: —$O(CR^*_2)_{2-3}O$—.

Suitable monovalent substituents on $R^*$ (or the ring formed by taking two independent occurrences of $R^*$ together with their intervening atoms), are independently halogen, —$(CH_2)_{0-2}R^•$), -(halo$R^•$), —$(CH_2)_{0-2}OH$, —$(CH_2)_{0-2}OR^•$, —$(CH_2)_{0-2}CH(OR^•)_2$; —O(halo$R^•$), —CN, —$N_3$, —$(CH_2)_{0-2}C(O)R^•$, —$(CH_2)_{0-2}C(O)OH$, —$(CH_2)_{0-2}C(O)OR^•$, —$(CH_2)_{0-2}SR^•$, —$(CH_2)_{0-2}SH$, —$(CH_2)_{0-2}NH_2$, —$(CH_2)_{0-2}NHR^•$, —$(CH_2)_{0-2}NR^•_2$, —$NO_2$, —$SiR^•_3$, $OSiR^•_3$, —$C(O)SR^•$, —$(C_{1-4}$ straight or branched alkylene)C(O)OR^•$, or —$SSR^•$ wherein each $R^•$ is unsubstituted or where preceded by "halo" is substituted only with one or more halogens, and is independently selected from $C_{1-4}$ aliphatic, —$CH_2Ph$, —$O(CH_2)_{0-1}Ph$, and a 5-6-membered saturated, partially unsaturated, or aryl ring having 0-4 heteroatoms independently selected from nitrogen, oxygen, and sulfur. Suitable divalent substituents of $R^•$ include =O and =S.

In some embodiments, suitable substituents on a substitutable nitrogen of an "optionally substituted" group include —$R^†$, —$NR^†_2$, —$C(O)R^†$, —$C(O)OR^†$, —$C(O)C(O)R^†$, —$C(O)CH_2C(O)R^†$, —$S(O)_2R^†$, —$S(O)_2NR^†_2$, —$C(S)NR^†_2$, —$C(NH)NR^†_2$, or —$N(R^†)S(O)_2R^†$; wherein each $R^†$ is independently hydrogen, $C_{1-6}$ aliphatic which may be substituted as defined below, unsubstituted —OPh, or an unsubstituted 5-6 membered saturated, partially unsaturated, or aryl ring having 0-4 heteroatoms independently selected from nitrogen, oxygen, or sulfur, or, notwithstanding the definition above, two independent occurrences of $R^†$, taken together with their intervening atom(s) form an unsubstituted 3-12 membered saturated, partially unsaturated, or aryl mono- or bicyclic ring having 0-4 heteroatoms independently selected from nitrogen, oxygen, or sulfur.

In some embodiments, suitable substituents on the aliphatic group of $R^†$ are independently halogen, —$R^•$, -(halo$R^•$), —OH, —$OR^•$, —O(halo$R^•$), —CN, —C(O)OH, —$C(O)OR^•$, —$NH_2$, —$NHR^•$, —$NR^•_2$, or —$NO_2$, wherein each $R^•$ is unsubstituted or where preceded by "halo" is substituted only with one or more halogens, and is independently $C_{1-4}$ aliphatic, —$CH_2Ph$, —$O(CH_2)_{0-1}Ph$, or a 5-6 membered saturated, partially unsaturated, or aryl ring having 0-4 heteroatoms independently selected from nitrogen, oxygen, or sulfur.

Subject: As used herein, the term "subject" or "test subject" refers to any organism to which a provided compound or composition is administered in accordance with the present disclosure e.g., for experimental, diagnostic, prophylactic, and/or therapeutic purposes. Typical subjects include animals (e.g., mammals such as mice, rats, rabbits, non-human primates, and humans; insects; worms; etc.) and plants. In some embodiments, a subject may be suffering from, and/or susceptible to a disease, disorder, and/or condition. In some embodiments, a subject is a human.

Susceptible to: An individual who is "susceptible to" a disease, disorder, and/or condition is one who has a higher risk of developing the disease, disorder, and/or condition than does a member of the general public. In some embodiments, an individual who is susceptible to a disease, disorder and/or condition may not have been diagnosed with the disease, disorder, and/or condition. In some embodiments, an individual who is susceptible to a disease, disorder, and/or condition may exhibit symptoms of the disease, disorder, and/or condition. In some embodiments, an individual who is susceptible to a disease, disorder, and/or condition may not exhibit symptoms of the disease, disorder, and/or condition. In some embodiments, an individual who is susceptible to a disease, disorder, and/or condition will develop the disease, disorder, and/or condition. In some embodiments, an individual who is susceptible to a disease, disorder, and/or condition will not develop the disease, disorder, and/or condition.

Therapeutic agent: As used herein, the phrase "therapeutic agent" refers to an agent that, when administered to a subject, has a therapeutic effect and/or elicits a desired biological and/or pharmacological effect. In some embodiments, a therapeutic agent is any substance that can be used to alleviate, ameliorate, relieve, inhibit, prevent, delay onset of, reduce severity of, and/or reduce incidence of one or more symptoms or features of a disease, disorder, and/or condition. In some embodiments, provided compounds are useful as therapeutic agents.

Therapeutic regimen: A "therapeutic regimen", as that term is used herein, refers to a dosing regimen whose administration across a relevant population may be correlated with a desired or beneficial therapeutic outcome.

Therapeutically effective amount: As used herein, the term "therapeutically effective amount" means an amount of a substance (e.g., a therapeutic agent, composition, and/or formulation) that elicits a desired biological response when administered as part of a therapeutic regimen. In some embodiments, a therapeutically effective amount of a substance is an amount that is sufficient, when administered to a subject suffering from or susceptible to a disease, disorder, and/or condition, to treat, diagnose, prevent, and/or delay the onset of the disease, disorder, and/or condition. As will be appreciated by those of ordinary skill in this art, the effective amount of a substance may vary depending on such factors as the desired biological endpoint, the substance to be delivered, the target cell or tissue, etc. For example, the effective amount of compound in a formulation to treat a disease, disorder, and/or condition is the amount that alleviates, ameliorates, relieves, inhibits, prevents, delays onset of, reduces severity of and/or reduces incidence of one or more symptoms or features of the disease, disorder, and/or condition. In some embodiments, a therapeutically effective amount is administered in a single dose; in some embodiments, multiple unit doses are required to deliver a therapeutically effective amount. In some embodiments, provided compounds are administered in therapeutically effective amount, either in a single dose or in multiple unit doses.

Treat: As used herein, the term "treat," "treatment," or "treating" refers to any method used to partially or completely alleviate, ameliorate, relieve, inhibit, prevent, delay onset of, reduce severity of, and/or reduce incidence of one or more symptoms or features of a disease, disorder, and/or condition. Treatment may be administered to a subject who does not exhibit signs of a disease, disorder, and/or condition. In some embodiments, treatment may be administered to a subject who exhibits only early signs of the disease, disorder, and/or condition, for example for the purpose of decreasing the risk of developing pathology associated with the disease, disorder, and/or condition.

Unit dose: The expression "unit dose" as used herein refers to an amount administered as a single dose and/or in a physically discrete unit of a pharmaceutical composition. In many embodiments, a unit dose contains a predetermined quantity of an active agent. In some embodiments, a unit dose contains an entire single dose of the agent. In some embodiments, more than one unit dose is administered to achieve a total single dose. In some embodiments, administration of multiple unit doses is required, or expected to be required, in order to achieve an intended effect. A unit dose may be, for example, a volume of liquid (e.g., an acceptable carrier) containing a predetermined quantity of one or more therapeutic agents, a predetermined amount of one or more therapeutic agents in solid form, a sustained release formulation or drug delivery device containing a predetermined amount of one or more therapeutic agents, etc. It will be appreciated that a unit dose may be present in a formulation that includes any of a variety of components in addition to the therapeutic agent(s). For example, acceptable carriers (e.g., pharmaceutically acceptable carriers), diluents, stabilizers, buffers, preservatives, etc., may be included as described infra. It will be appreciated by those skilled in the art, in many embodiments, a total appropriate daily dosage of a particular therapeutic agent may comprise a portion, or a plurality, of unit doses, and may be decided, for example, by the attending physician within the scope of sound medical judgment. In some embodiments, the specific effective dose level for any particular subject or organism may depend upon a variety of factors including the disorder being treated and the severity of the disorder; activity of specific active compound employed; specific composition employed; age, body weight, general health, sex and diet of the subject; time of administration, and rate of excretion of the specific active compound employed; duration of the treatment; drugs and/ or additional therapies used in combination or coincidental with specific compound(s) employed, and like factors well known in the medical arts.

Unsaturated: The term "unsaturated" as used herein, means that a moiety has one or more units of unsaturation.

Wild-type: As used herein, the term "wild-type" has its art-understood meaning that refers to an entity having a structure and/or activity as found in nature in a "normal" (as contrasted with mutant, diseased, altered, etc.) state or context. Those of ordinary skill in the art will appreciate that wild-type genes and polypeptides often exist in multiple different forms (e.g., alleles).

Unless otherwise specified, salts, such as pharmaceutically acceptable acid or base addition salts, stereoisomeric forms, and tautomeric forms, of provided compounds (e.g., agents, ARMs, etc.) are included. Unless otherwise specified, structures depicted herein also include compounds that comprise various isotopes, e.g., replacement of hydrogen by deuterium or tritium, replacement of a carbon by a $^{13}C$ or $^{14}C$, etc. In some embodiments, a composition comprising a compound comprises an enriched level of an isotope in the compound. Such compounds and compositions are useful, among other things, as analytical tools, as probes in biological assays, or as therapeutic agents, etc.

Unless otherwise clear from context, in the present disclosure, (i) the term "a" may be understood to mean "at least one"; (ii) the term "or" may be understood to mean "and/or"; (iii) the terms "comprising" and "including" may be understood to encompass itemized components or steps whether presented by themselves or together with one or more additional components or steps; and (iv) the terms "about" and "approximately" may be understood to permit standard variation as would be understood by those of ordinary skill in the art; and (v) where ranges are provided, endpoints are included.

3. Cellular Immunotherapy

Various immune cells, particularly NK cells, may be utilized together with agents described herein to treat various conditions, disorders or diseases including cancer. Such cells may be administered prior to, concurrently with, and/or subsequent to agents described herein, e.g., ARMs. In some embodiments, such cells, e.g., NK cells, are administered concurrently with an agent, e.g., an ARM, in the same composition comprising both NK cells and an ARM. In some embodiments, such cells, e.g., NK cells, are administered concurrently with an agent, e.g., an ARM, in separate compositions, e.g., one composition comprising NK cells but no ARMs, and one composition comprising an ARM but no NK cells.

As appreciated by those skilled in the art, useful immune cells such as NK cells may be from various sources and/or be engineered in a number of ways. For example, in some embodiments, NK cells are derived from stem cells. In some embodiments, NK cells are derived from iPSC lines. In some embodiments, NK cells are derived from a clonal master iPSC line. In some embodiments, NK cells are engineered to express certain receptors, e.g., a high-affinity, optionally non-cleavable CD16 receptor. In some embodiments, NK cells are engineered to express chimeric antigen receptors (CARs), e.g., in some embodiments, NK cells may be engineered to express anti-CD19 CAR. In some embodiments, NK cells are CAR-NK cells. In some embodiments, NK cells are engineered to express cytokine receptor. In some embodiments, NK cells comprise a IL-15 receptor fusion that enhances the persistence and expansion capabilities without requiring co-administration of cytokine support. In some embodiments, NK cells are engineered to prevent expression of certain cell proteins, e.g., certain cell surface proteins. In some embodiments, NK cells are engineered to prevent expression of CD38. In some embodiments, NK cells are derived from placenta. In some embodiments, NK cells are donor NK cells. In some embodiments, NK cells are haploidentical donor NK cells. In some embodiments, NK cells are mismatched donor NK cells. In some embodiments, NK cells are related donor NK cells, e.g., mismatched related donor NK cells. In some embodiments, NK cells are unrelated donor NK cells. In some embodiments, NK cells are derived from a subject, e.g., a patient. In some embodiments, provided technologies comprise an innate cell engager, e.g., an innate cell engager binding to innate cells (e.g., NK cells and macrophages) while binding simultaneously to specific tumor cells. In some embodiments, NK cells are derived from cord blood stem and progenitor cells. In some embodiments, NK cells are derived with modulation of a signaling pathway, e.g., the Notch signaling pathway. In some embodiments, nanoparticles are utilized to improve and/or sustain growth of NK cells. In some embodiments, as described herein, NK cells are generated ex vivo. In some embodiments, NK cells may be cryopreserved and stored in multiple doses as off-the-shelf cell therapy. Examples of certain such technologies include those utilized by Fate Therapeutics, NantKwest Inc., Cellularity, Inc., GC Pharma, Sorrento Therapeutics, Inc., Affimed GmbH/MD Anderson Cancer Center, Gamida Cell Ltd., Nohla Therapeutics, Kiadis Pharma N.V., etc. Those skilled in the art will appreciate that, which they can be optionally utilized, antibodies and/or CARs toward specific antigens utilized in certain such technologies may not be required in provided technologies comprising ARMs as described herein.

Cell Populations/Preparations

In some embodiments, useful cells, e.g., NK cells, are processed before administration to a subject. In many embodiments, NK cells are enriched, pre-activated and/or expanded in vitro before administration to a subject. In some embodiments, a composition comprising NK cells for administration is enriched for NK cells compare to a reference composition, e.g., blood from a subject to whom such composition is to be administered. In some embodiments, an enrichment is or comprises an increased number of cells in a unit volume, e.g., per mL. In some embodiments, an enrichment is or comprises an increased percentage of NK cells in such composition. In some embodiments, an enrichment is or comprises an increased number of cells in a unit volume and an increased percentage of NK cells is a composition. In some embodiments, a composition is a substantially pure composition of NK cells in that the non-NK cells in the composition are "impurities" from the production process (e.g., due to incomplete isolation, purification, etc.). As appreciated by those skilled in the art, chemical and biological processes rarely, if ever, go to completion and/or proceed to completeness or achieve or avoid an absolute result. The term "substantially" is therefore used in the present disclosure to capture the potential lack of completeness inherent in many biological and/or chemical phenomena.

Various technologies for enriching NK cells are available in the art and can be utilized in accordance with the present disclosure. For example, in some embodiments, NK cells are isolated using leukapheresis optionally with purification steps such as CD3 depletion and/or CD56 positive selection. In some embodiments, compared to a reference population of NK cells (e.g., NK cells in the blood of a donor or a subject), NK cells, e.g., pre-activated, memory-like NK cells are enriched for CD56 and depleted from CD3 expressing cells.

Before administration to a subject, NK cells are typically pre-activated, e.g., preactivadtion with cytokines, such as IL-12, IL-15, and IL-18 for a suitable period of time (e.g., 1, 2, 3, 4, 5, 6, 7, 8, 9, 10, 11, 12, 13, 14, 15, 16, 17, 18, 19, 20, 21, 22, 23, 24, or 25, or more hours, e.g., about 16 hours). In some embodiments, prior to administration NK cells are treated with cytokines. In some embodiments, NK cells are treated with a suitable amount of IL-12 (e.g., about 10 ng/ml), IL-15 (e.g., 50 ng/ml) and IL-18 (e.g., 50 ng/mL) for a suitable period of time (e.g., 1, 2, 3, 4, 5, 6, 7, 8, 9, 10, 11, 12, 13, 14, 15, 16, 17, 18, 19, 20, 21, 22, 23, 24, or 25, or more hours, e.g., about 16 hours) so that they are pre-activated. Conditions for preactivation of NK cells, and pre-activated NK cells may be assessed through assessment of one or more makers, e.g., CD94, NKG2A, NKp46, CD25, NKp30, NKp44, CD62L, CD27, TRAIL, cytotoxic molecules proforin and granzyme B, etc. Certain useful markers are described in Romee et al., Blood 120, 4751-4760, (2012); Leong et al., Biol. Blood Marrow Transplant. 20, 463-473 (2014); Romee et al., Sci. Transl. Med. 2016 Sep. 21; 8(357): 357ra123. doi: 10.1126/scitranslmed.aaf2341; etc. In some embodiments, NK cells are primary human NK cells differentiated in vitro into memory-like NK cells via pre-activation with IL-12, IL-15, and IL-18.

Among other things, such cytokine-induced memory like NK cells exhibit enhanced responses to cytokine or activating receptor restimulation for weeks to months after preactivation, and can be particularly useful for treating various conditions, disorders or diseases including cancer. In some embodiments, such pre-activated memory-like NK cells have enhanced interferon-γ (IFN-γ) production and/or cytotoxicity against target cells, e.g., cancer cells. Exemplary procedures for preparing, assessing, and administering such NK cells can be found in Romee et al., Blood 120, 4751-4760, (2012); Leong et al., Biol. Blood Marrow Transplant. 20, 463-473 (2014); Romee et al., Sci Transl Med. 2016 Sep. 21; 8(357): 357ra123. doi: 10.1126/scitranslmed.aaf2341; etc. In some embodiments, such NK cells have enhanced proliferation, express or express higher level of high-affinity IL-2 receptor αβγ, and/or provide increased IFN-γ production after re-stimulation (e.g., with cytokines or via activating receptors, etc.) compared to comparable reference NK cells, e.g., NK cells that are similarly prepared but are not pre-activated (e.g., not-treated with cytokines, treated with low-dose IL-15 only, etc.).

Pre-activated memory-like NK cells may have significant differences in expression of a number of proteins compared to reference NK cells, e.g., CD94, NKG2A, NKp46, CD25, NKp30, NKp44, CD62L, CD27, TRAIL, cytotoxic molecules proforin and granzyme B, etc. In some embodiments, such NK cells display a decrease in NKp80 expression. Such markers, among other things, may be utilized to enrich, purify and/or identify memory-like NK cells, either individually or in combination. Exemplary useful markers may be identified using various technologies, e.g., mass cytometry and multidimensional analyses. Exemplary procedures for identifying proteins that can distinguish pre-activated memory-like NK cells from reference (e.g., control) NK cells and exemplary such proteins are described in Romee et al., Sci Transl Med. 2016 Sep. 21; 8(357): 357ra123. doi: 10.1126/scitranslmed.aaf2341.

In some embodiments, immune cells, e.g., NK cells, are contacted with a GSK3α/β inhibitor. In some embodiments, such cells are pre-activated by a GSK3α/β inhibitor.

In some embodiments, immune cells are cytokine-induced memory-like NK cells. In some embodiments, immune cells are IL-12, IL-15, and IL-18-preactivated NK cells. In some embodiments, immune cells are allogeneic, HLA-haploidentical, IL-12, IL-15, and IL-18-preactivated NK cells. Without the intention to be limited by any those, memory-like NK cells after IL-12, IL-15 and IL-18 preactivation may result from a process comprising differentiation that yields a long-term alteration of functional capacity. Memory-like NK cells with such functional capacity may be prepared by treatment with other agents (e.g., other cytokines, or other small molecules, peptides, proteins, etc.). Technologies (e.g., protein markers, assays, etc.) for assessing treatment with such as agents and/or result NK cells are available in the art and may be utilized in accordance with the present disclosure (e.g., those described in Romee et al., Sci Transl Med. 2016 Sep. 21; 8(357): 357ra123. doi: 10.1126/scitranslmed.aaf2341). In some embodiments, memory-like NK cells have increased expression of inhibitory, activating, and cytokine receptors (e.g., CD94/ NKG2A, NKp30, NKp44, NKp46, NKG2D, CD62L, and CD25, etc.), and/or decreased expression of certain proteins (e.g., NKp80). In some embodiments, levels of certain receptors are substantially unchanged (e.g., KIR, CD57, NKG2C, DNAM-1, CD137, CD11b, etc.). In some embodiments, changes in activating, inhibitory, cytokine and adhesion receptors are consistent with differentiation. In some embodiments, pre-activation by cytokines provide epigenetic modulation of certain genes, e.g., IFN-γ. For example, in some embodiments, IL-12, IL-15, and IL-18 activation (e.g., for 5 days) result in reduced methylation of the IFN-γ conserved noncoding sequence 1 locus in human NK cells. In some embodiments, certain preactivated NK cells (e.g., cytokine-induced) cells exist at an enhanced activation state without substantial differentiation.

In some embodiments, NK cells are administered within 1, 2, 3, 4, 5, 6, 7, 8, 9, 10, 11, 12, 13, 14, 15, 16, 17, 18, 19, or 20 weeks, or 4, 5, 6, 7, 8, 9, 10, 11, or months, after pre-activation.

Among other things, the present disclosure encompasses the recognition that such NK cells, with their enhanced properties and/or activities which may provide enhanced inhibition or killing of cancer cells, may lead to more and/or more severe side effects and/or toxicities, e.g., off-target toxicities against normal cells. Thus, in some embodiments, the present disclosure provides technologies for reducing such side effects and/or toxicities, comprising administering one or more agents, particularly ARMs, which, among other things, can promote, encourage, and/or enhance interactions of NK cells with their targets and reduce side effects and/or toxicities associated with NK cell administration.

In some embodiments, NK cells are expanded, e.g., prior to, during, and/or after preactivation. In some embodiments, NK cells are purified before administration to remove, e.g., certain medium (or components thereof), activating cytokines, etc.

In some embodiments, NK cells to be administered to a subject are isolated and/or expanded from the subject (autologous). In some embodiments, NK cells to be administered to a subject are isolated and/or expanded from another subject (allogeneic; e.g., from a HLA-haploidentical donor).

In some embodiments, NK cells, as described above, are treated (e.g., isolation, purification, pre-activation, etc.) before administration. In some embodiments, a NK cell composition for administration comprise certain artificial medium or components thereof, e.g., complete RPMI-1640 medium containing L-glutamine, HEPES, NEAA, penicillin/streptomycin, and 10% human AB serum, optionally supplemented with rhIL-15 (1 ng/mL) to support survival.
Administration Immune cells, e.g., pre-activated memory-like NK cells, may be formulated in various formats as known in the art for administration to a subject. Depending on subjects and/or conditions, disorders or diseases to be treated, suitable amounts of cells are administered to provide clinical benefits. In some embodiments, a cell dose level is 0.01-100, 0.1-50, 0.1-20, 0.1-10, 0.05, 0.1, 0.2, 0.3, 0.3, 0.5, 1, 2, 3, 4, 5, 6, 7, 8, 9, 10, 15, 20, 25, 30, 35, 40, 45, 50, 60, 70, 80 or 90 million per kilogram. In some embodiments, a dose level is $0.5 \times 10^6$ per kg. In some embodiments, a dose level is $1 \times 10^6$ per kg. In some embodiments, a dose level is no more than $10 \times 10^6$ per kg. As appreciated by those skilled in the art, pre-activated memory-like NK cells may be administered at a lower level to achieve the same or more clinical benefits, or provide more clinical benefits when administered at the same level when compared to un-activated NK cells, or pre-activated NK cells that are not memory-like (e.g., treated by only IL-2 or IL-15 for, e.g., overnight).

In many embodiments, cells are administered via intravenous infusion. In some embodiments, compositions comprising cells, e.g., pre-activated NK cells, are administered via infusion. In some embodiments, such compositions are administered by adoptive transfer.

In some embodiments, subjects, e.g., AML patients, are preconditioned (e.g., on day 0) with a chemotherapy medication for administration of cells. For example, in some embodiments, AML patients are preconditioned with fludarabine/cyclophosphamide on day 0.

In some embodiments, immune cells, e.g., pre-activated NK cells, are administered prior to administration of agents such as ARMs. In some embodiments, they are administered concurrently with agents such as ARMs. In some embodiments, they are administered subsequent to agents such as ARMs. In some embodiments, when not administered concurrently, immune cells, e.g., pre-activated NK cells, and agents such as ARMs are administered in such manners that a subject is exposed to both. Certain technologies for administration of NK cells are described in Miller et al., Blood 105, 3051-3057 (2005) and may be utilized in accordance with the present disclosure.

In some embodiments, after or concurrently with administration of immune cells, certain cytokines are administered to support administered immune cells. In some embodiments, rhIL-2, typically a low dose, is administered to support memory-like NK cells through their induced high-affinity IL-2Rαβγ. As an example, see Leong, et al., Biol. Blood Marrow Transplant, 20, 463-473 (2014).

In some embodiments, donor memory-like NK cells are tracked in the blood of a subject with informative HLA, e.g., using donor- or patient-specific anti-HLA monoclonal antibodies. In some embodiments, such cells peak in frequency at, e.g., 7 to 14 days after infusion, and may decrease in number after recipient T cell recovery. If desired, additional dose of such NK cells may be administered (in some embodiments, 1, 2, 3, 4, 5, 6, 7, 8, 9, 10 or more doses can be administered). In some embodiments, memory-like NK cells comprise no less than about 10%, 15%, 20%, 25%, 30%, 35%, 40%, 45%, 50%, 60%, 70%, 80%, or 90% of blood NK cells at a time after administration (e.g., at day 7). In some embodiments, the level is more than about 10%. In some embodiments, the level is more than about 20%. In some embodiments, the level is more than about 30%. In some embodiments, the level is more than about 40%. In some embodiments, the level is more than about 50%. In some embodiments, the level is more than about 60%. In some embodiments, the level is more than about 70%. In some embodiments, the level is more than about 80%. In some embodiments, the level is more than about 90%. In some embodiments, counts of memory-like NK cells, e.g., in blood, increase at least 50, 100, 150, 200, 250, 300, 350, 400, 450, 500, 550, 600, 650, 700, 750, 800, 850, 900, 950, or 1000 fold comparing day 1 and a later time point (e.g., day 7). In some embodiments, the increase is at least 100 fold. In some embodiments, the increase is at least 200 fold. In some embodiments, the increase is at least 300 fold. In some embodiments, the increase is at least 400 fold. In some embodiments, the increase is at least 500 fold. In some embodiments, the increase is at least 600 fold. In some embodiments, the increase is at least 700 fold. In some embodiments, the increase is at least 800 fold. In some embodiments, the increase is at least 900 fold. In some embodiments, the increase is at least 1000 fold. Typically, percentages and absolute numbers (counts) of memory-like NK cells are also increased, e.g., to percentages (e.g., no less than about 10%, 15%, 20%, 25%, 30%, 35%, 40%, 45%, 50%, 60%, 70%, 80%, or 90%; in some embodiments, at least 90%) and counts (e.g., 50, 100, 150, 200, 250, 300, 350, 400, 450, 500, 550, 600, 650, 700, 750, 800, 850, 900, 950, or 1000 fold or more; in some embodiments, 100, 200, 300, 400, 500, 600 fold or more) described above after administration of memory-like NK cells (e.g., at day 5, 6, 7, 8, 9, 10, 11, 12, 13, and/or 14).

In some embodiments, after administration memory-like NK cells have enhanced functionality, e.g., as demonstrated by increased IFN-γ production upon stimulation.

In some embodiments, memory-like NK cells have increased proliferation (Ki-67$^+$) after administration (e.g., at days 3 and/or 7).

In some embodiments, pre-activated memory-like NK cells are cytokine-induced memory-like NK cells. In some embodiments, memory-like NK cells express inhibitory KIR receptor. In some embodiments, such cells can perform one or more functions (e.g., inhibition and/or killing of target cells such as cancer cells) regardless of KIR-ligand interactions.

In some embodiments, administered immune cells, e.g., memory-like NK cells, are detectable in the blood and bone marrow of a subject for 1, 2, 3, 4, 5, 6, 7, 8, 9, 10 days, or 1, 2, 3, 4, 5, 6, 7, 8, 9, 10 weeks, or more. In some embodiments, such cells proliferate and/or expand in vivo after administration to a subject. In some embodiments, such cells differentiate in a subject in vivo and exhibit enhanced functionality against targets such as cancer cells (e.g., leukemia cells).

In some embodiments, immune cells, e.g., pre-activated NK cells, are administered concurrently with an ARM. In some embodiments, they are administered in a single composition. In some embodiments, they are administered as separate compositions.

In some embodiments, together with ARMS, a suitable amount of antibodies may also be administered, either in the same composition or in separate compositions (and optionally may be administered prior to, concurrently with or subsequent to ARMs). In some embodiments, a composition comprising an ARM, pre-activated NK cells, and optionally an antibody or a fragment thereof is administered. In some embodiments, a composition comprising an ARM comprising a uABT, pre-activated NK cells, and optionally an IgM is administered. In some embodiments, a provided composition comprising a complex comprising a NK cell, an antibody or a fragment thereof, and an ARM. In some embodiments, in such a complex A CD16a receptor of an NK cells interacts with an antibody or a fragment thereof, and an antibody binding moiety of an ARM interacts with the same antibody or a fragment thereof.

4. Exemplary ARM Agents

Various ARM agents may be utilized in accordance with the present disclosure. In some embodiments, ARMs comprise antibody binding moieties that interact with Fab regions, and may preferably bind to and recruit antibodies (and/or fragments thereof) that contain such Fab regions. In some embodiments, ARMs comprise antibody binding moieties that interact with Fc regions (e.g., uABTs described herein), and may bind to and recruit various antibodies (and/or fragments thereof) that contain such Fc regions. As appreciated by those skilled in the art, antibodies (and/or fragments thereof) recruited by such ARMs may contain diverse Fab regions and may have diverse specificity. In some embodiments, no individual recruited antibodies (or fragments thereof) are more than 1%, 2%, 3%, 4%, 5%, 6%, 7%, 8%, 9%, 10%, 15%, 20%, 25%, 30%, 35%, 40%, 45%, 50%, 60%, 70%, 80%, or 90% of total recruited antibodies and fragments thereof.

In certain embodiments, a useful ARM is a compound of formula I:

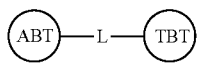
I or a pharmaceutically acceptable salt thereof, wherein:
ABT is an antibody binding moiety;
L is a bivalent linker moiety that connects ABT with TBT; and
TBT is a target binding moiety.

In some embodiments, a useful ARM is a compound of formula I-a or a salt thereof.

In some embodiments, a useful ARM is a compound of formula I-b or a salt thereof.

In certain embodiments, a useful ARM is a compound of formula II, or a pharmaceutically acceptable salt thereof, wherein:
each of $R^1$, $R^3$ and $R^5$ is independently hydrogen or an optionally substituted group selected from $C_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur; or:
$R^1$ and $R^{1'}$ are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur;
$R^3$ and $R^{3'}$ are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur;
an $R^5$ group and the $R^{5'}$ group attached to the same carbon atom are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur; or
two $R^5$ groups are optionally taken together with their intervening atoms to form a $C_{1-10}$ bivalent straight or branched saturated or unsaturated hydrocarbon chain wherein 1-3 methylene units of the chain are independently and optionally replaced with —S—, —SS—, —N(R)—, —O—, —C(O)—, —OC(O)—, —C(O)O—, —C(O)N(R)—, —N(R)C(O)—, —S(O)—, —S(O)$_2$—, or -Cy$^1$-, wherein each -Cy$^1$- is independently a 5-6 membered heteroarylenyl with 1-4 heteroatoms independently selected from nitrogen, oxygen or sulfur;
each of $R^{1'}$, $R^{3'}$ and $R^{5'}$ is independently hydrogen or $C_{1-3}$ aliphatic;
each of $R^2$, $R^4$ and $R^6$ is independently hydrogen, or $C_{1-4}$ aliphatic, or:
$R^2$ and $R^1$ are optionally taken together with their intervening atoms to form a 4-8 membered saturated or partially unsaturated monocyclic heterocyclic ring having 1-2 heteroatoms independently selected from nitrogen, oxygen, or sulfur;
$R^4$ and $R^3$ are optionally taken together with their intervening atoms to form a 4-8 membered saturated or partially unsaturated monocyclic heterocyclic ring having 1-2 heteroatoms independently selected from nitrogen, oxygen, or sulfur; or
an $R^6$ group and its adjacent $R^5$ group are optionally taken together with their intervening atoms to form a 4-8 membered saturated or partially unsaturated monocyclic heterocyclic ring having 1-2 heteroatoms independently selected from nitrogen, oxygen, or sulfur;
L' is a trivalent linker moiety that connects

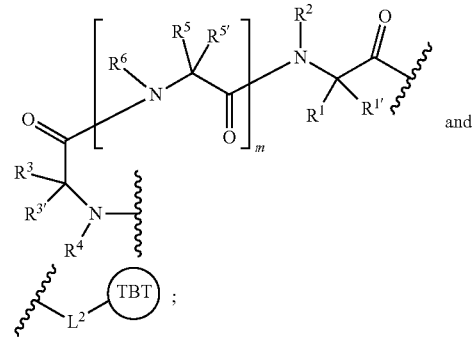

$L^2$ is a covalent bond or a $C_{1-10}$ bivalent straight or branched saturated or unsaturated hydrocarbon chain wherein 1-3 methylene units of the chain are independently and optionally replaced with —S—, —N(R)—, —O—, —C(O)—, —OC(O)—, —C(O)O—, —C(O)N(R)—, —N(R)C(O)—, —S(O)—, —S(O)$_2$—,

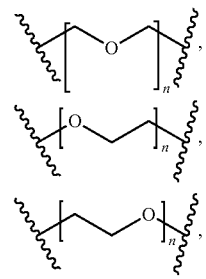

or -Cy$^1$-, wherein each -Cy$^1$- is independently a 5-6 membered heteroarylenyl with 1-4 heteroatoms independently selected from nitrogen, oxygen or sulfur;
TBT is a target binding moiety; and
each of m and n is independently 1, 2, 3, 4, 5, 6, 7, 8, 9, or 10.

In certain embodiments, a useful ARM is a compound of formula III:

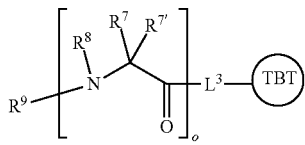

or a pharmaceutically acceptable salt thereof, wherein:
each of $R^7$ is independently hydrogen or an optionally substituted group selected from $C_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur; or:
  an $R^7$ group and the $R^{7'}$ group attached to the same carbon atom are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur;
each of $R^{7'}$ is independently hydrogen or $C_{1-3}$ aliphatic;
each of $R^8$ is independently hydrogen, or $C_{1-4}$ aliphatic, or:
  an $R^8$ group and its adjacent $R^7$ group are optionally taken together with their intervening atoms to form a 4-8 membered saturated or partially unsaturated monocyclic heterocyclic ring having 1-2 heteroatoms independently selected from nitrogen, oxygen, or sulfur;
$R^9$ is hydrogen, $C_{1-3}$ aliphatic, or $—C(O)C_{1-3}$ aliphatic;
$L^3$ is a bivalent linker moiety that connects

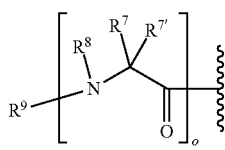

with TBT;
TBT is a target binding moiety; and
o is 1, 2, 3, 4, 5, 6, 7, 8, 9, or 10.

Antibody Binding Moieties

Various antibody binding moieties are known in the art and may be utilized in accordance with the present disclosure.

In some embodiments, antibody binding moieties primarily interact with Fab regions. In some embodiments, antibody binding moieties primarily interact with antibodies and/or fragments thereof that comprise certain Fab structures and/or are directed to certain antigens.

In some embodiments, antibody binding moieties interact with Fc regions. In some embodiments, antibody binding moieties described herein, e.g., uABTs, interact with Fc regions and may recruit Fc regions connected to Fab regions having diverse structures and/or antigen specificity. In some embodiments, useful agents comprise universal antibody binding moieties which can bind to antibodies having different Fab regions and different specificity. In some embodiments, antibody binding moieties are universal antibody binding moieties that bind to Fc regions. In some embodiments, binding of antibody binding moieties to antibodies (or fragments thereof), e.g., by uABTs to Fc regions, can happen at the same time as binding of Fc receptors, e.g., CD16a, to the same antibodies (or fragments thereof) (e.g., may at different locations/amino acid residues of the same Fc regions in case of uABT binding to Fc). In some embodiments, upon binding of universal antibody binding moieties an Fc region can still interact with Fc receptors and perform one or more or all of its immune activities, including recruitment of immune cells (e.g., effector cells such as NK cells), and/or triggering, generating, encouraging, and/or enhancing immune system activities toward target cells, tissues, objects and/or entities, for example, antibody-dependent cell-mediated cytotoxicity (ADCC) and/or ADCP.

Various universal antibody binding moieties can be utilized in accordance with the present disclosure, and many technologies, e.g., those described in the Examples, are available for identifying and/or assessing universal antibody binding moieties. In some embodiments, a universal antibody binding moiety comprises one or more amino acid residues, each independently natural or unnatural. In some embodiments, a universal antibody binding moiety has the structure of

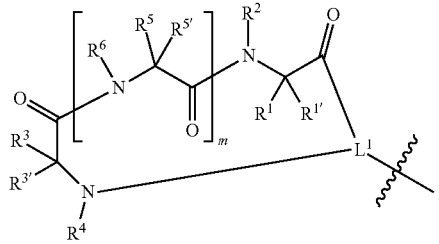

or salt form thereof. In some embodiments, a universal antibody binding moiety has the structure of

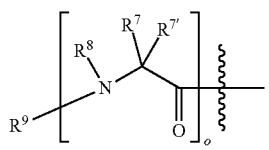

or salt form thereof. In some embodiments, a universal antibody binding moiety is or comprises a peptide moiety, e.g., a moiety having the structure of $R^c$-$(Xaa)_z$-. In some embodiments, a universal antibody binding moiety is or comprises a cyclic peptide moiety, e.g., a moiety having the structure of

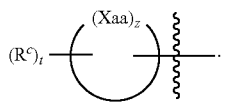

In some embodiments, a universal antibody binding moiety is $R^c$-$(Xaa)_z$- or

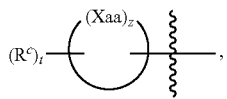

and is or comprises a peptide unit. In some embodiments, -$(Xaa)_z$- is or comprises a peptide unit. In some embodiments, a peptide unit comprises an amino acid residue, e.g., a residue of an amino acid of formula A-I that has a positively charged side chain (e.g., at physiological pH about 7.4, "positively charged amino acid residue", $Xaa^P$). In some embodiments, a peptide unit comprises R. In some embodiments, at least one Xaa is R. In some embodiments, a peptide unit is or comprises APAR. In some embodiments, a peptide unit is or comprises RAPA. In some embodiments, a peptide unit comprises an amino acid residue, e.g., a residue of an amino acid of formula A-I, that has a side chain comprising an aromatic group ("aromatic amino acid residue", $Xaa^A$). In some embodiments, a peptide unit comprises a positively charged amino acid residue and an aromatic amino acid residue. In some embodiments, a peptide unit comprises W. In some embodiments, a peptide unit comprises a positively charged amino acid residue and an aromatic amino acid residue. In some embodiments, a peptide unit is or comprises $Xaa^A Xaa Xaa^P Xaa^P$. In some embodiments, a peptide unit is or comprises $Xaa^P Xaa^P Xaa Xaa^A$. In some embodiments, a peptide unit is or comprises $Xaa^P Xaa^A Xaa^P$. In some embodiments, a peptide unit is or comprises two or more $Xaa^P Xaa^A Xaa^P$. In some embodiments, a peptide unit is or comprises $Xaa^P Xaa^A Xaa^P Xaa Xaa^P Xaa^A Xaa^P$. In some embodiments, a peptide unit is or comprises $Xaa^P Xaa^A Xaa^P Xaa^A Xaa^P$. In some embodiments, a peptide unit is or comprises $Xaa^P Xaa^P Xaa^P Xaa^A$. In some embodiments, a peptide unit is or comprises two or more $Xaa^A Xaa^A Xaa^P$. In some embodiments, a peptide residue comprises one or more proline residues. In some embodiments, a peptide unit is or comprises HWRGWA. In some embodiments, a peptide unit is or comprises WGRR. In some embodiments, a peptide unit is or comprises RRGW. In some embodiments, a peptide unit is or comprises NRFRGKYK. In some embodiments, a peptide unit is or comprises NARKFYK. In some embodiments, a peptide unit comprises a positively charged amino acid residue, an aromatic amino acid residue, and an amino acid residue, e.g., a residue of an amino acid of formula A-I, that has a negatively charged side chain (e.g., at physiological pH about 7.4, "negatively charged amino acid residue", $Xaa^N$). In some embodiments, a peptide residue is RHRENKD. In some embodiments, a peptide unit is TY. In some embodiments, a peptide unit is TYK. In some embodiments, a peptide unit is RTY. In some embodiments, a peptide unit is RTYK. In some embodiments, a peptide unit is or comprises a sequence selected from PAM. In some embodiments, a peptide unit is WHL. In some embodiments, a peptide unit is ELVW. In some embodiments, a peptide unit is or comprises a sequence selected from AWHLGELVW. In some embodiments, a peptide unit is or comprises a sequence selected from DCAWHLGELVWCT, which the two cysteine residues can form a disulfide bond as found in natural proteins. In some embodiments, a peptide unit is or comprises a sequence selected from Fc-III. In some embodiments, a peptide unit is or comprises a sequence selected from DpLpAWHLGELVW. In some embodiments, a peptide unit is or comprises a sequence selected from FcBP-1. In some embodiments, a peptide unit is or comprises a sequence selected from DpLpDCAWHLGELVWCT. In some embodiments, a peptide unit is or comprises a sequence selected from FcBP-2. In some embodiments, a peptide unit is or comprises a sequence selected from CDCAWHLGELVWCTC, wherein the first and the last cysteines, and the two cysteines in the middle of the sequence, can each independently form a disulfide bond as in natural proteins. In some embodiments, a peptide unit is or comprises a sequence selected from Fc-III-4c. In some embodiments, a peptide unit is or comprises a sequence selected from FcRM. In some embodiments, a peptide unit is or comprises a cyclic peptide unit. In some embodiments, a cyclic peptide unit comprises amide group formed by an amino group of a side chain and the C-terminus —COOH.

In some embodiments, -$(Xaa)z$- is or comprises $[X^1]_{p1}[X^2]_{p2}$-$X^3 X^4 X^5 X^6 X^7 X^8 X^9 X^{10} X^{11} X^{12}$-$[X^{13}]_{p13}$-$[X^{14}]_{p14}$ $[X^{15}]_{p15}[X^{16}]_{p16}$, wherein each of $X^1$, $X^2$, $X^3$, $X^4$, $X^5$, $X^6$, $X^7$, $X^8$, $X^9$, $X^{10}$, $X^{11}$, $X^{12}$, and $X^{13}$ is independently an amino acid residue, e.g., of an amino acid of formula A-I, and each of p1, p2, p13, p14, p15 and p16 is independently 0, 1, 2, 3, 4, 5, 6, 7, 8, 9, or 10. In some embodiments, each of $X^1$, $X^2$, $X^3$, $X^4$, $X^5$, $X^6$, $X^7$, $X^8$, $X^9$, $X^{10}$, $X^{11}$, $X^{12}$, and $X^{13}$ is independently an amino acid residue of an amino acid of formula A-I. In some embodiments, each of $X^1$, $X^2$, $X^3$, $X^4$, $X^5$, $X^6$, $X^7$, $X^8$, $X^9$, $X^{10}$, $X^{11}$, $X^{12}$, and $X^{13}$ is independently a natural amino acid residue. In some embodiments, one or more of $X^1$, $X^2$, $X^3$, $X^4$, $X^5$, $X^6$, $X^7$, $X^8$, $X^9$, $X^{10}$, $X^{11}$, $X^{12}$, and $X^{13}$ are independently an unnatural amino acid residue as described in the present disclosure.

In some embodiments, a peptide unit comprises a functional group in an amino acid residue that can react with a functional group of another amino acid residue. In some embodiments, a peptide unit comprises an amino acid residue with a side chain which comprises a functional group that can react with another functional group of the side chain of another amino acid residue to form a linkage (e.g., see compounds in Table 1). In some embodiments, one functional group of one amino acid residue is connected to a functional group of another amino acid residue to form a linkage (or bridge). Linkages are bonded to backbone atoms of peptide units and comprise no backbone atoms. In some embodiments, a peptide unit comprises a linkage formed by two side chains of non-neighboring amino acid residues. In some embodiments, a linkage is bonded to two backbone atoms of two non-neighboring amino acid residues. In some embodiments, both backbone atoms bonded to a linkage are carbon atoms. In some embodiments, a linkage has the structure of $L^b$, wherein $L^b$ is $L^a$ as described in the present disclosure, wherein $L^a$ is not a covalent bond. In some embodiments, $L^a$ comprises -Cy-. In some embodiments, $L^a$ comprises -Cy-, wherein -Cy- is optionally substituted heteroaryl. In some embodiments, -Cy- is

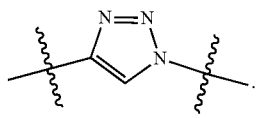 [SMILES: *c1cn(*)nn1]

In some embodiments, $L^a$ is

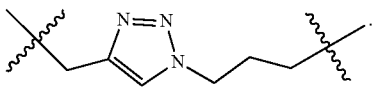 [SMILES: *CCCn1cc(C*)nn1]

In some embodiments, such an $L^a$ can be formed by a —$N_3$ group of the side chain of one amino acid residue, and the -≡- of the side chain of another amino acid residue. In some embodiments, a linkage is formed through connection of two thiol groups, e.g., of two cysteine residues. In some embodiments, $L^a$ comprises —S—S—. In some embodiments, $L^a$ is —$CH_2$—S—S—$CH_2$—. In some embodiments, a linkage is formed through connection of an amino group (e.g., —$NH_2$ in the side chain of a lysine residue) and a carboxylic acid group (e.g., COOH in the side chain of an aspartic acid or glutamic acid residue). In some embodiments, $L^a$ comprises —C(O)—N(R')—. In some embodiments, $L^a$ comprise —C(O)—NH—. In some embodiments, $L^a$ is —$CH_2$CONH—$(CH_2)_3$—. In some embodiments, $L^a$ comprises —C(O)—N(R')—, wherein R' is R, and is taken together with an R group on the peptide backbone to form a ring (e.g., in I-27). In some embodiments, $L^a$ is —$(CH_2)_2$—N(R')—CO—$(CH_2)_2$—. In some embodiments, -Cy- is optionally substituted phenylene. In some embodiments, -Cy- is optionally substituted 1,2-phenylene. In some embodiments, $L^a$ is

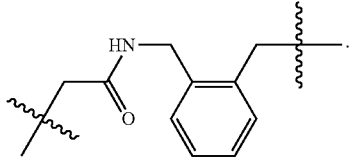 [SMILES: *CC(=O)NCc1ccccc1C*]

In some embodiments, $L^a$ is

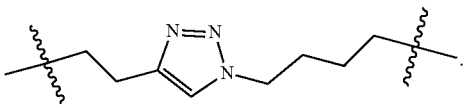 [SMILES: *CCCCn1cc(CC*)nn1]

In some embodiments, $L^a$ is optionally substituted bivalent $C_{2-20}$ bivalent aliphatic. In some embodiments, $L^a$ is optionally substituted —$(CH_2)_9$—CH=CH—$(CH_2)_9$—. In some embodiments, $L^a$ is —$(CH_2)_3$CH=CH—$(CH_2)_3$—.

In some embodiments, two amino acid residues bonded to a linkage are separated by 1, 2, 3, 4, 5, 6, 7, 8, 9, 10, 11, 12, 13, 14, 15, or more than 15 amino acid residues between them (excluding the two amino acid residues bonded to the linkage). In some embodiments, the number is 1. In some embodiments, the number is 2. In some embodiments, the number is 3. In some embodiments, the number is 4. In some embodiments, the number is 5. In some embodiments, the number is 6. In some embodiments, the number is 7. In some embodiments, the number is 8. In some embodiments, the number is 9. In some embodiments, the number is 10. In some embodiments, the number is 11. In some embodiments, the number is 12. In some embodiments, the number is 13. In some embodiments, the number is 14. In some embodiments, the number is 15.

In some embodiments, each of p1, p2, p13, p14, p15 and p16 is 0. In some embodiments, -(Xaa)z- is or comprises -$X^3X^4X^5X^6X^7X^8X^9X^{10}X^{11}X^{12}$-, wherein:
  each of $X^3$, $X^4$, $X^5$, $X^6$, $X^7$, $X^8$, $X^9$, $X^{10}$, $X^{11}$, and $X^{12}$ is independently an amino acid residue;
  $X^6$ is $Xaa^A$ or $Xaa^P$;
  $X^9$ is $Xaa^N$; and
  $X^{12}$ is $Xaa^A$ or $Xaa^P$.

In some embodiments, each of $X^3$, $X^4$, $X^5$, $X^6$, $X^7$, $X^8$, $X^9$, $X^{10}$, $X^{11}$, and $X^{12}$ is independently an amino acid residue of an amino acid of formula A-I as described in the present disclosure. In some embodiments, $X^5$ is $Xaa^A$ or $Xaa^P$. In some embodiments, $X^5$ is $Xaa^A$. In some embodiments, $X^5$ is $Xaa^P$. In some embodiments, $X^5$ is an amino acid residue whose side chain comprises an optionally substituted saturated, partially saturated or aromatic ring. In some embodiments, $X^5$ is

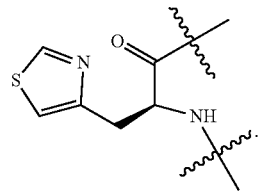 [SMILES: *N[C@@H](Cc1cscn1)C(*)=O]

In some embodiments, $X^5$ is

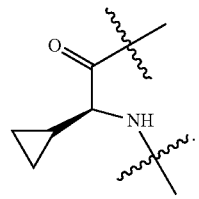 [SMILES: *N[C@H](C(*)=O)C1CC1]

In some embodiments, $X^6$ is $Xaa^A$. In some embodiments, $X^6$ is $Xaa^P$. In some embodiments, $X^6$ is His. In some embodiments, $X^{12}$ is $Xaa^A$. In some embodiments, $X^{12}$ is $Xaa^P$. In some embodiments, $X^9$ is Asp. In some embodiments, $X^9$ is Glu. In some embodiments, $X^{12}$ is

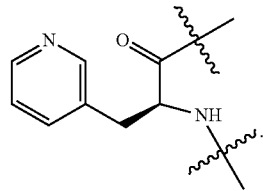 [SMILES: *N[C@@H](Cc1cccnc1)C(*)=O]

In some embodiments, $X^{12}$ is

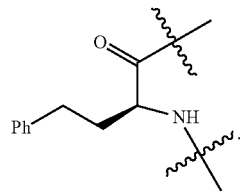 [SMILES: *N[C@@H](CCc1ccccc1)C(*)=O]

In some embodiments, each of $X^7$, $X^{10}$, and $X^{11}$ is independently an amino acid residue with a hydrophobic side chain ("hydrophobic amino acid residue", $Xaa^H$). In some embodiments, $X^7$ is $Xaa^H$. In some embodiments, $X^7$ is

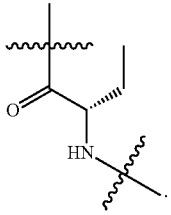 [SMILES: *N[C@@H](CC)C(*)=O]

In some embodiments, $X^7$ is Val. In some embodiments, $X^{10}$ is $Xaa^H$. In some embodiments, $X^{10}$ is Met. In some embodiments, $X^{10}$ is

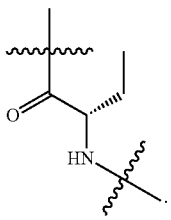 [SMILES: *N[C@@H](CC)C(*)=O]

In some embodiments, $X^{11}$ is $Xaa^H$. In some embodiments, $X^{11}$ is

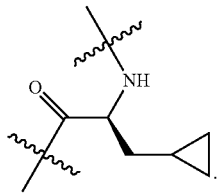 [SMILES: *N[C@@H](CC1CC1)C(*)=O]

In some embodiments, $X^8$ is Gly. In some embodiments, $X^4$ is Pro. In some embodiments, $X^3$ is Lys. In some embodiments, the —COOH of $X^{12}$ forms an amide bond with the side chain amino group of Lys ($X^3$), and the other amino group of the Lys ($X^3$) is connected to a linker moiety and then a target binding moiety.

In some embodiments, -(Xaa)z- is or comprises -$X^3X^4X^5X^6X^7X^8X^9X^{10}X^{11}X^{12}$-, wherein:
each of $X^3$, $X^4$, $X^5$, $X^6$, $X^7$, $X^8$, $X^9$, $X^{10}$, $X^{11}$, and $X^{12}$ is independently an amino acid residue;
at least two amino acid residues are connected through one or more linkages $L^b$;
$L^b$ is an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—, wherein $L^b$ is bonded to a backbone atom of one amino acid residue and a backbone atom of another amino acid residue, and comprises no backbone atoms;

$X^6$ is $Xaa^A$ or $Xaa^P$;
$X^9$ is $Xaa^N$; and
$X^{12}$ is $Xaa^A$ or $Xaa^P$.

In some embodiments, each of $X^3$, $X^4$, $X^5$, $X^6$, $X^7$, $X^8$, $X^9$, $X^{10}$, $X^{11}$, and $X^{12}$ is independently an amino acid residue of an amino acid of formula A-I as described in the present disclosure. In some embodiments, two non-neighboring amino acid residues are connected by $L^b$. In some embodiments, $X^5$ and $X^{10}$ are connected by $L^b$. In some embodiments, there is one linkage $L^b$. In some embodiments, $X^6$ is $Xaa^A$. In some embodiments, $X^6$ is $Xaa^P$. In some embodiments, $X^6$ is His. In some embodiments, $X^9$ is Asp. In some embodiments, $X^9$ is Glu. In some embodiments, $X^{12}$ is $Xaa^A$. In some embodiments, $X^{12}$ is

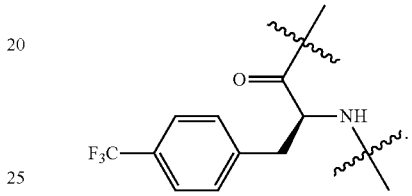

In some embodiments, $X^{12}$ is

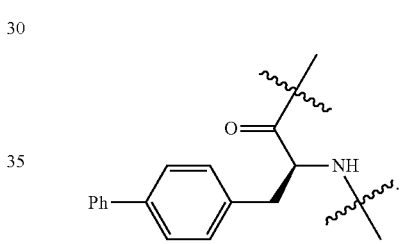

In some embodiments, $X^{12}$ is

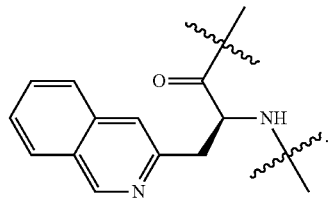 [SMILES: *N[C@@H](Cc1cc2ccccc2cn1)C(*)=O]

In some embodiments, each of $X^4$, $X^7$, and $X^{11}$ is independently $Xaa^H$. In some embodiments, $X^4$ is $Xaa^H$. In some embodiments, $X^4$ is Ala. In some embodiments, $X^7$ is $Xaa^H$. In some embodiments, $X^7$ is

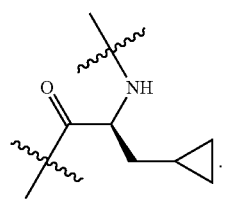 [SMILES: *N[C@@H](CC1CC1)C(*)=O]

In some embodiments, $X^{11}$ is $Xaa^H$. In some embodiments, $X^{11}$ is

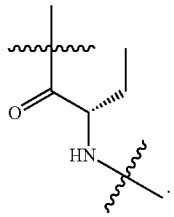 [SMILES: *N[C@@H](CC)C(*)=O]

In some embodiments, $X^8$ is Gly. In some embodiments, $X^3$ is Lys. In some embodiments, the —COOH of $X^{12}$ forms an amide bond with the side chain amino group of Lys ($X^3$), and the other amino group of the Lys ($X^3$) is connected to a linker moiety and then a target binding moiety. In some embodiments, $L^b$ is

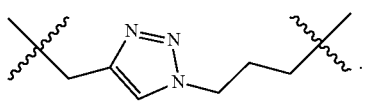

In some embodiments, $L^b$ is

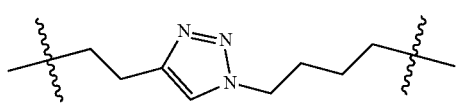

In some embodiments, $L^b$ connects two alpha-carbon atoms of two different amino acid residues. In some embodiments, both $X^5$ and $X^{10}$ are Cys, and the two —SH groups of their side chains form —S—S-($L^b$ is —CH$_2$—S—S—CH$_2$—).

In some embodiments, -(Xaa)z- is or comprises -$X^2X^3X^4X^5X^6X^7X^8X^9X^{10}X^{11}X^{12}$-, wherein:
each of $X^2$, $X^3$, $X^4$, $X^5$, $X^6$, $X^7$, $X^8$, $X^9$, $X^{10}$, $X^{11}$, and $X^{12}$ is independently an amino acid residue;
at least two amino acid residues are connected through one or more linkages $L^b$;
$L^b$ is an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR'), —C(O)N(R')—, —N(R')C(O)N(R')—, —N(R')C(O)O—, —S(O)—, —S(O)$_2$—, —S(O)$_2$N(R')—, —C(O)S—, or —C(O)O—, wherein $L^b$ is bonded to a backbone atom of one amino acid residue and a backbone atom of another amino acid residue, and comprises no backbone atoms;
$X^4$ is $Xaa^A$;
$X^5$ is $Xaa^A$ or $Xaa^P$;
$X^8$ is $Xaa^N$; and
$X^{11}$ is $Xaa^A$.

In some embodiments, each of $X^2$, $X^3$, $X^4$, $X^5$, $X^6$, $X^7$, $X^8$, $X^9$, $X^{10}$, $X^{11}$, and $X^{12}$ is independently an amino acid residue of an amino acid of formula A-I as described in the present disclosure. In some embodiments, two non-neighboring amino acid residues are connected by $L^b$. In some embodiments, there is one linkage $L^b$. In some embodiments, $X^2$ and $X^{12}$ are connected by $L^b$. In some embodiments, $L^b$ is —CH$_2$—S—S—CH$_2$—. In some embodiments, $L^b$ is —CH$_2$—CH$_2$—S—CH$_2$—. In some embodiments, $L^b$ is

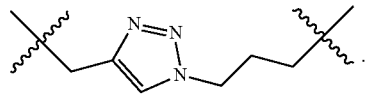 [SMILES: *CCCn1cc(C*)nn1]

In some embodiments, $L^b$ is

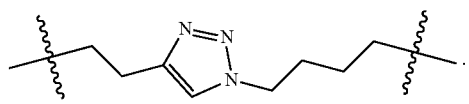 [SMILES: *CCCCn1cc(CC*)nn1]

In some embodiments, $L^b$ is —CH$_2$CH$_2$CO—N(R')—CH$_2$CH$_2$—. In some embodiments, R' are taken together with an R group on the backbone atom that —N(R')—CH$_2$CH$_2$— is bonded to form a ring, e.g., as in I-27. In some embodiments, a formed ring is 3-, 4-, 5-, 6-, 7- or 8-membered. In some embodiments, a formed ring is monocyclic. In some embodiments, a formed ring is saturated. In some embodiments, $L^b$ is

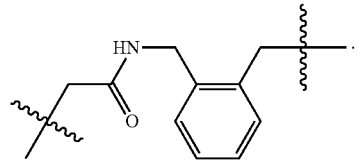 [SMILES: *CC(=O)NCc1ccccc1C*]

In some embodiments, $L^b$ connects two alpha-carbon atoms of two different amino acid residues. In some embodiments, $X^4$ is $Xaa^A$. In some embodiments, $X^4$ is Tyr. In some embodiments, $X^5$ is $Xaa^A$. In some embodiments, $X^5$ is $Xaa^P$. In some embodiments, $X^5$ is His. In some embodiments, $X^8$ is Asp. In some embodiments, $X^8$ is Glu. $X^{11}$ is Tyr. In some embodiments, both $X^2$ and $X^{12}$ are Cys, and the two —SH groups of their side chains form —S—S-($L^b$ is —CH$_2$—S—S—CH$_2$—). In some embodiments, each of $X^3$, $X^6$, $X^9$, and $X^{10}$ is independently $Xaa^H$. In some embodiments, $X^3$ is $Xaa^H$. In some embodiments, $X^3$ is Ala. In some embodiments, $X^6$ is $Xaa^H$. In some embodiments, $X^6$ is Leu. In some embodiments, $X^9$ is $Xaa^H$. In some embodiments, $X^9$ is Leu. In some embodiments, $X^9$ is

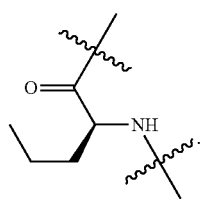 [SMILES: *N[C@@H](CCC)C(*)=O]

In some embodiments, $X^{10}$ is $Xaa^H$. In some embodiments, $X^{10}$ is Val. In some embodiments, $X^{10}$ is

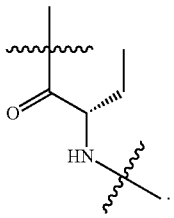 [SMILES: *N[C@@H](CC)C(*)=O]

In some embodiments, $X^7$ is Gly. In some embodiments, p1 is 1. In some embodiments, $X^1$ is Asp. In some embodiments, p13, p14, p15 and p16 are 0. In some embodiments, $X^{13}$ is an amino acid residue comprising a polar uncharged side chain (e.g., at physiological pH, "polar uncharged amino acid residue", $Xaa^L$). In some embodiments, $X^{13}$ is Val. In some embodiments, p13 is 0. In some embodiments, $R^c$ is —NHCH$_2$CH(OH)CH$_3$. In some embodiments, $R^c$ is (R)—NHCH$_2$CH(OH)CH$_3$. In some embodiments, $R^c$ is (S)—NHCH$_2$CH(OH)CH$_3$.

In some embodiments, -(Xaa)z- is or comprises -$X^2X^3X^4X^5X^6X^7X^8X^9X^{10}X^{11}X^{12}$-, wherein:
 each of $X^2$, $X^3$, $X^4$, $X^5$, $X^6$, $X^7$, $X^8$, $X^9$, $X^{10}$, $X^{11}$, and $X^{12}$ is independently an amino acid residue;
 at least two amino acid residues are connected through one or more linkages $L^b$;
 $L^b$ is an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—, wherein $L^b$ is bonded to a backbone atom of one amino acid residue and a backbone atom of another amino acid residue, and comprises no backbone atoms;
 $X^5$ is $Xaa^A$ or $Xaa^P$;
 $X^8$ is $Xaa^N$; and
 $X^{11}$ is $Xaa^A$.

In some embodiments, each of $X^2$, $X^3$, $X^4$, $X^5$, $X^6$, $X^7$, $X^8$, $X^9$, $X^{10}$, $X^{11}$, and $X^{12}$ is independently an amino acid residue of an amino acid of formula A-I as described in the present disclosure. In some embodiments, two non-neighboring amino acid residues are connected by $L^b$. In some embodiments, there is one linkage $L^b$. In some embodiments, there are two or more linkages $L^b$. In some embodiments, there are two linkages $L^b$. In some embodiments, $X^2$ and $X^{12}$ are connected by $L^b$. In some embodiments, $X^4$ and $X^9$ are connected by $L^b$. In some embodiments, $X^4$ and $X^{10}$ are connected by $L^b$. In some embodiments, $L^b$ is —CH$_2$—S—S—CH$_2$—. In some embodiments, $L^b$ is

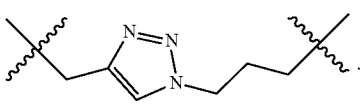 [SMILES: *CCCn1cc(C*)nn1]

In some embodiments, $L^b$ is

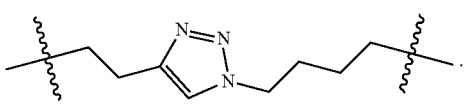 [SMILES: *CCCCn1cc(CC*)nn1]

In some embodiments, both $X^2$ and $X^{12}$ are Cys, and the two —SH groups of their side chains form —S—S-($L^b$ is —CH$_2$—S—S—CH$_2$—). In some embodiments, both $X^4$ and $X^{10}$ are Cys, and the two —SH groups of their side chains form —S—S-($L^b$ is —CH$_2$—S—S—CH$_2$—). In some embodiments, $X^4$ and $X^9$ are connected by $L^b$, wherein $L^b$ is

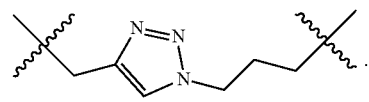 [SMILES: *CCCn1cc(C*)nn1]

In some embodiments, $X^4$ and $X^9$ are connected by $L^b$, wherein $L^b$ is

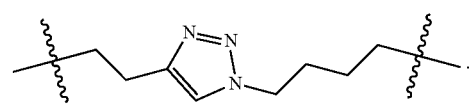 [SMILES: *CCCCn1cc(CC*)nn1]

In some embodiments, $X^5$ is $Xaa^A$. In some embodiments, $X^5$ is $Xaa^P$. In some embodiments, $X^5$ is His. In some embodiments, $X^8$ is Asp. In some embodiments, $X^8$ is Glu. In some embodiments, $X^{11}$ is Tyr. In some embodiments, $X^{11}$ is

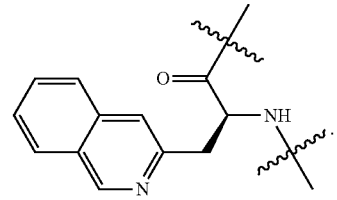 [SMILES: *N[C@@H](Cc1cc2ccccc2cn1)C(*)=O]

In some embodiments, $X^2$ and $X^{12}$ are connected by $L^b$, wherein $L^b$ is —CH$_2$—S—CH$_2$CH$_2$—. In some embodiments, $L^b$ connects two alpha-carbon atoms of two different amino acid residues. In some embodiments, each of $X^3$, $X^6$, and $X^9$ is independently $Xaa^H$. In some embodiments, $X^3$ is $Xaa^H$. In some embodiments, $X^3$ is Ala. In some embodiments, $X^6$ is $Xaa^H$. In some embodiments, $X^6$ is Leu. In some embodiments, $X^6$ is

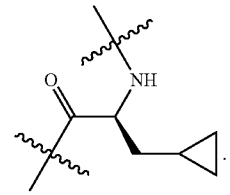 [SMILES: *N[C@@H](CC1CC1)C(*)=O]

In some embodiments, $X^9$ is $Xaa^H$. In some embodiments, $X^9$ is Leu. In some embodiments, $X^9$ is

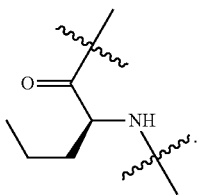 [SMILES: *N[C@@H](CCC)C(*)=O]

In some embodiments, $X^{10}$ is $Xaa^H$. In some embodiments, $X^{10}$ is Val. In some embodiments, $X^7$ is Gly. In some embodiments, p1 is 1. In some embodiments, $X^1$ is $Xaa^N$. In some embodiments, $X^1$ is Asp. In some embodiments, $X^1$ is Glu. In some embodiments, p13 is 1. In some embodiments, p14, p15 and p16 are 0. In some embodiments, $X^{13}$ is $Xaa^L$. In some embodiments, $X^{13}$ is Val.

In some embodiments, -(Xaa)z- is or comprises -$X^2X^3X^4X^5X^6X^7X^8X^9X^{10}X^{11}X^{12}X^{13}X^{14}X^{15}X^{16}$-, wherein:

each of $X^2$, $X^3$, $X^4$, $X^5$, $X^6$, $X^7$, $X^8$, $X^9$, $X^{10}$, $X^{11}$, $X^{12}$, $X^{13}$, $X^{14}$, $X^{15}$, and $X^{16}$ is independently an amino acid residue;

at least two amino acid residues are connected through a linkage $L^b$;

$L^b$ is an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—, wherein $L^b$ is bonded to a backbone atom of one amino acid residue and a backbone atom of another amino acid residue, and comprises no backbone atoms;

$X^3$ is $Xaa^N$;
$X^6$ is $Xaa^A$;
$X^7$ is $Xaa^A$ or $Xaa^P$;
$X^9$ is $Xaa^N$; and
$X^{13}$ is $Xaa^A$.

In some embodiments, each of $X^2$, $X^3$, $X^4$, $X^5$, $X^6$, $X^7$, $X^8$, $X^9$, $X^{10}$, $X^{11}$, and $X^{12}$ is independently an amino acid residue of an amino acid of formula A-I as described in the present disclosure. In some embodiments, two non-neighboring amino acid residues are connected by $L^b$. In some embodiments, there is one linkage $L^b$. In some embodiments, there are two or more linkages $L^b$. In some embodiments, there are two linkages $L^b$. In some embodiments, $X^2$ are connected to $X^{16}$ by $L^b$. In some embodiments, $X^4$ are connected to $X^{14}$ by $L^b$. In some embodiments, both $X^2$ and $X^{16}$ are Cys, and the two —SH groups of their side chains form —S—S-($L^b$ is —CH$_2$—S—S—CH$_2$—). In some embodiments, both $X^4$ and $X^{14}$ are Cys, and the two —SH groups of their side chains form —S—S— ($L^b$ is —CH$_2$—S—S—CH$_2$—). In some embodiments, $L^b$ connects two alpha-carbon atoms of two different amino acid residues. In some embodiments, $X^3$ is Asp. In some embodiments, $X^3$ is Glu. In some embodiments, $X^5$ is $Xaa^H$. In some embodiments, $X^5$ is Ala. In some embodiments, $X^6$ is $Xaa^A$. In some embodiments, $X^6$ is Tyr. In some embodiments, $X^7$ is $Xaa^A$. In some embodiments, $X^7$ is $Xaa^P$. In some embodiments, $X^7$ is His. In some embodiments, $X^8$ is $Xaa^H$. In some embodiments, $X^8$ is Ala. In some embodiments, $X^9$ is Gly. In some embodiments, $X^{10}$ is Asp. In some embodiments, $X^{10}$ is Glu. In some embodiments, $X^{11}$ is $Xaa^H$. In some embodiments, $X^{11}$ is Leu. In some embodiments, $X^{12}$ is $Xaa^H$. In some embodiments, $X^{12}$ is Val. In some embodiments, $X^{13}$ is $Xaa^A$. In some embodiments, $X^{13}$ is Tyr. In some embodiments, $X^{15}$ is an amino acid residue comprising a polar uncharged side chain (e.g., at physiological pH, "polar uncharged amino acid residue", $Xaa^L$). In some embodiments, $X^{15}$ is Val. In some embodiments, p1 is 1. In some embodiments, In some embodiments, $X^1$ is $Xaa^N$. In some embodiments, $X^1$ is Asp. In some embodiments, $X^1$ is Glu.

As appreciated by those skilled in the art, an amino acid residue may be replaced by another amino acid residue having similar properties, e.g., one $Xaa^H$ (e.g., Val, Leu, etc.) may be replaced with another $Xaa^H$ (e.g., Leu, Ile, Ala, etc.), one $Xaa^A$ may be replaced with another $Xaa^A$, one $Xaa^P$ may be replaced with another $Xaa^P$, one $Xaa^N$ may be replaced with another $Xaa^N$, one $Xaa^L$ may be replaced with another $Xaa^L$, etc.

In some embodiments, an antibody binding moiety, e.g., a universal antibody binding moiety, is a universal antibody binding moiety of a compound in Table 1. In some embodiments, an antibody binding moiety, e.g., a universal antibody binding moiety, is or comprises optionally substituted

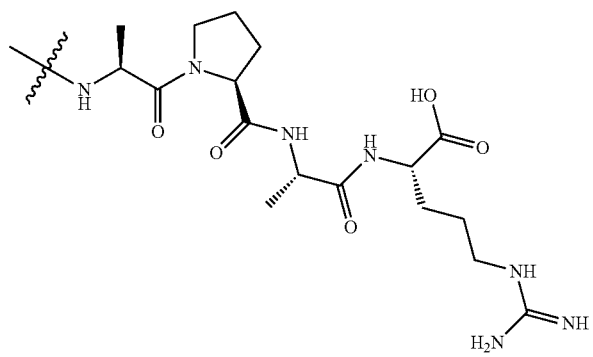 [SMILES: *N[C@@H](C)C(=O)N1CCC[C@H]1C(=O)N[C@@H](C)C(=O)N[C@@H](CCCNC(=N)N)C(=O)O]

A-1

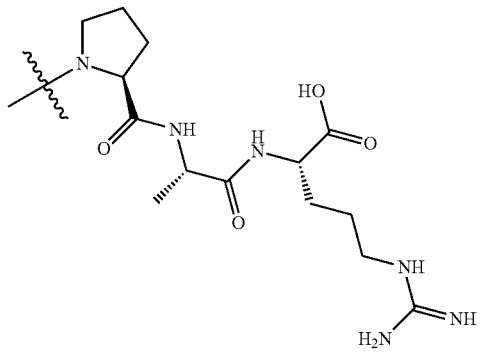 [SMILES: *N1CCC[C@H]1C(=O)N[C@@H](C)C(=O)N[C@@H](CCCNC(=N)N)C(=O)O]
A-2
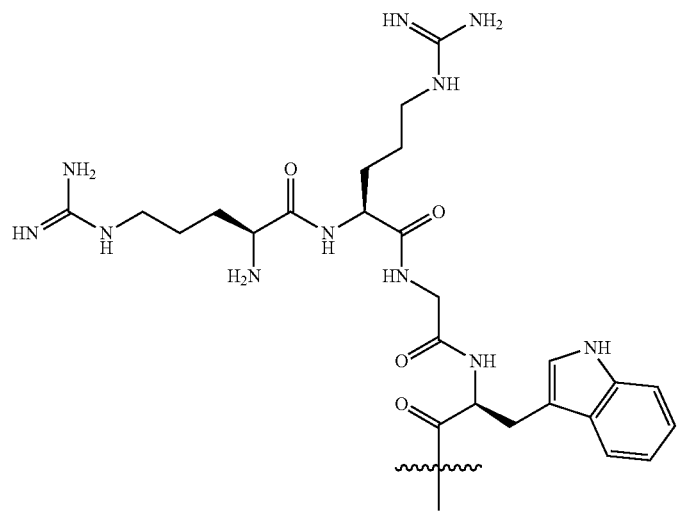 [SMILES: *C(=O)[C@H](Cc1c[nH]c2ccccc12)NC(=O)CNC(=O)[C@H](CCCNC(=N)N)NC(=O)[C@@H](N)CCCNC(=N)N]
A-3
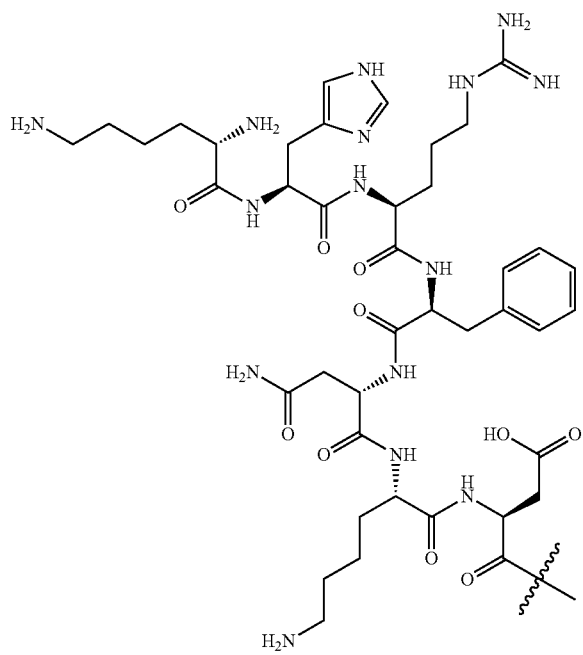 [SMILES: *C(=O)[C@H](CC(=O)O)NC(=O)[C@H](CCCCN)NC(=O)[C@H](CC(N)=O)NC(=O)[C@H](Cc1ccccc1)NC(=O)[C@H](CCCNC(=N)N)NC(=O)[C@H](Cc1c[nH]cn1)NC(=O)[C@@H](N)CCCCN]
A-4

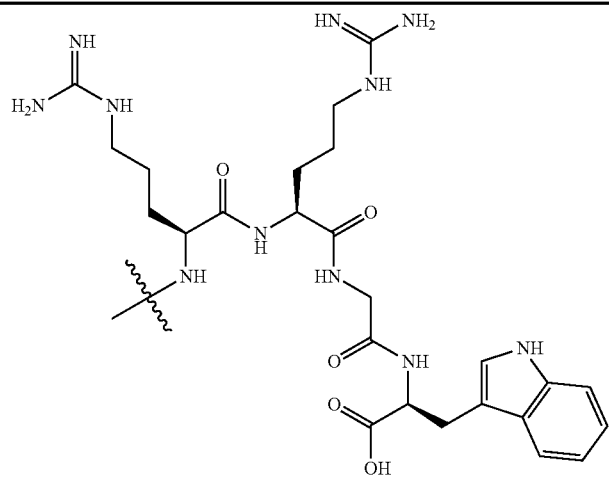
A-5
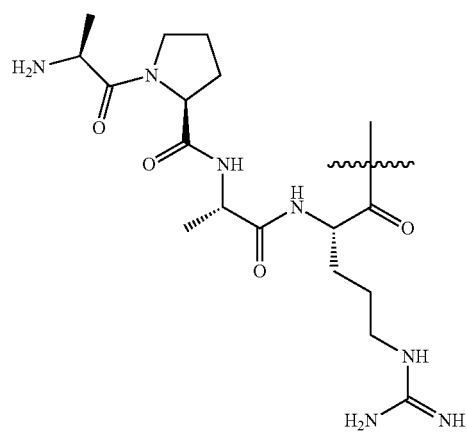 [SMILES: *C(=O)[C@H](CCCNC(=N)N)NC(=O)[C@H](C)NC(=O)[C@@H]1CCCN1C(=O)[C@H](C)N]
A-6
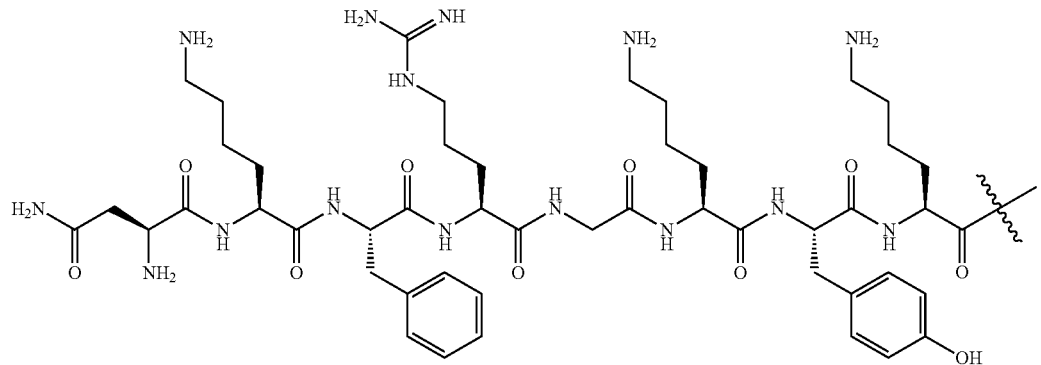 [SMILES: *C(=O)[C@H](CCCCN)NC(=O)[C@H](Cc1ccc(O)cc1)NC(=O)[C@H](CCCCN)NC(=O)CNC(=O)[C@H](CCCNC(=N)N)NC(=O)[C@H](Cc1ccccc1)NC(=O)[C@H](CCCCN)NC(=O)[C@@H](N)CC(N)=O]
A-7

A-8
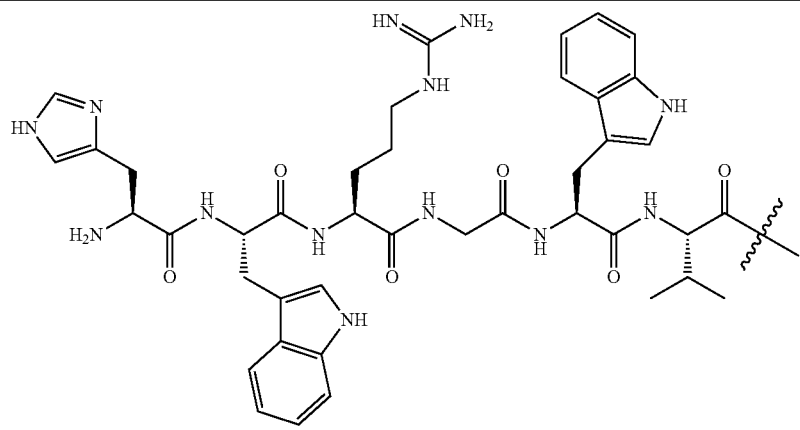
A-9
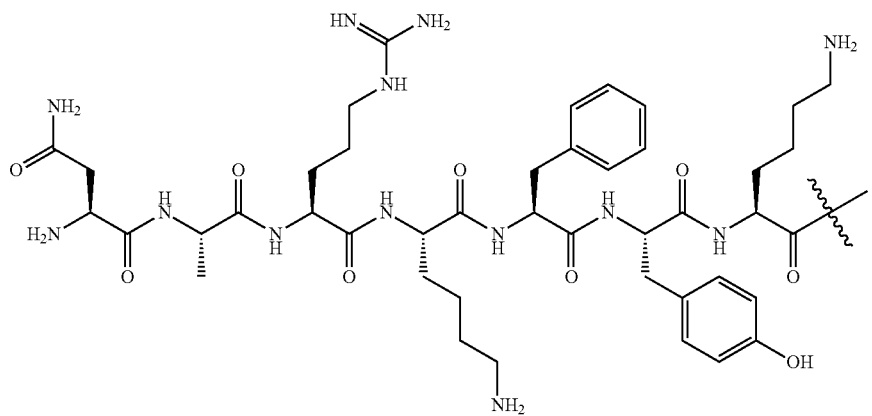 [SMILES: *C(=O)[C@H](CCCCN)NC(=O)[C@H](Cc1ccc(O)cc1)NC(=O)[C@H](Cc1ccccc1)NC(=O)[C@H](CCCCN)NC(=O)[C@H](CCCNC(=N)N)NC(=O)[C@H](C)NC(=O)[C@@H](N)CC(N)=O]
A-10
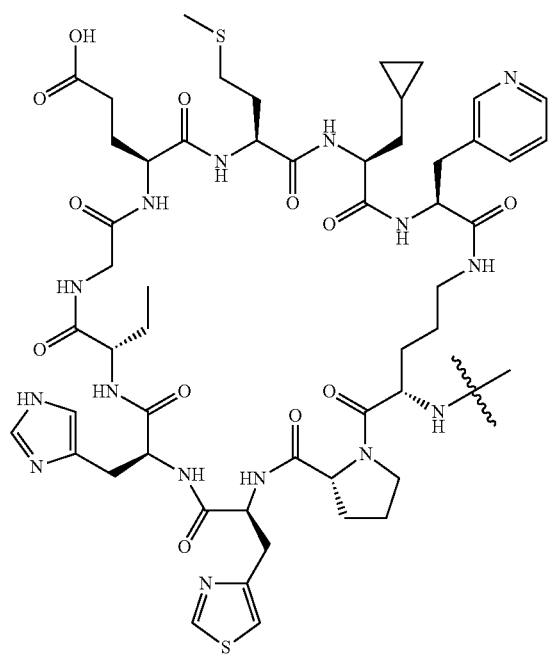 [SMILES: *N[C@H]1CCCNC(=O)[C@H](Cc2cccnc2)NC(=O)[C@H](CC2CC2)NC(=O)[C@H](CCSC)NC(=O)[C@H](CCC(=O)O)NC(=O)CNC(=O)[C@H](CC)NC(=O)[C@H](Cc2c[nH]cn2)NC(=O)[C@H](Cc2cscn2)NC(=O)[C@H]2CCCN2C1=O]

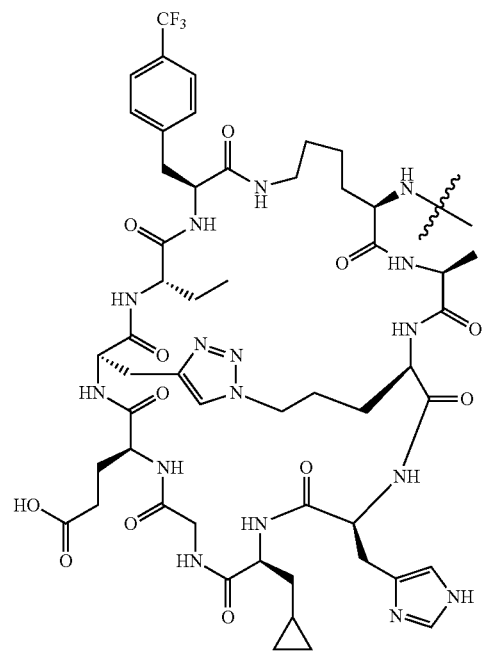 [SMILES: *N[C@@H]1CCCCNC(=O)[C@H](Cc2ccc(C(F)(F)F)cc2)NC(=O)[C@H](CC)NC(=O)[C@H]2Cc3cn(nn3)CCC[C@@H](NC(=O)[C@H](C)NC1=O)C(=O)N[C@@H](Cc1c[nH]cn1)C(=O)N[C@@H](CC1CC1)C(=O)NCC(=O)N[C@@H](CCC(=O)O)C(=O)N2]
A-11
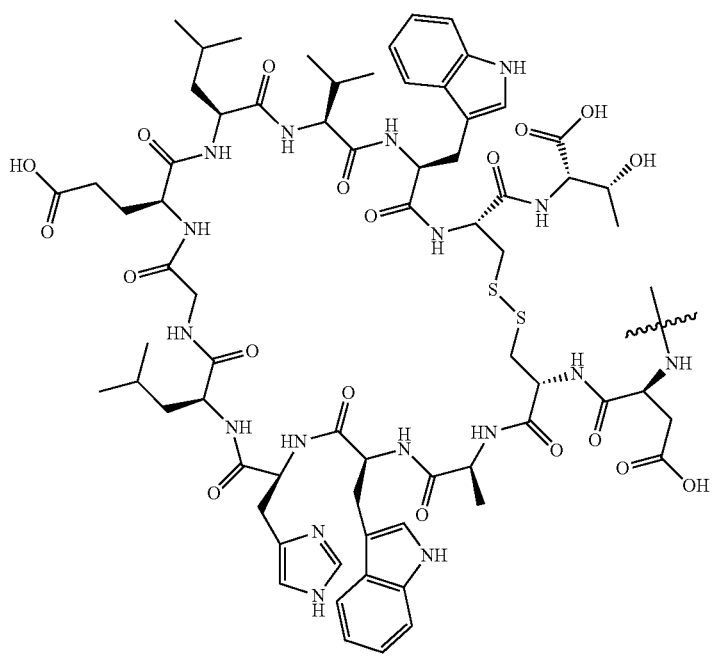 [SMILES: *N[C@@H](CC(=O)O)C(=O)N[C@H]1CSSC[C@@H](C(=O)N[C@H](C(=O)O)[C@@H](C)O)NC(=O)[C@H](Cc2c[nH]c3ccccc23)NC(=O)[C@H](C(C)C)NC(=O)[C@H](CC(C)C)NC(=O)[C@H](CCC(=O)O)NC(=O)CNC(=O)[C@H](CC(C)C)NC(=O)[C@H](Cc2c[nH]cn2)NC(=O)[C@H](Cc2c[nH]c3ccccc23)NC(=O)[C@H](C)NC1=O]
A-12

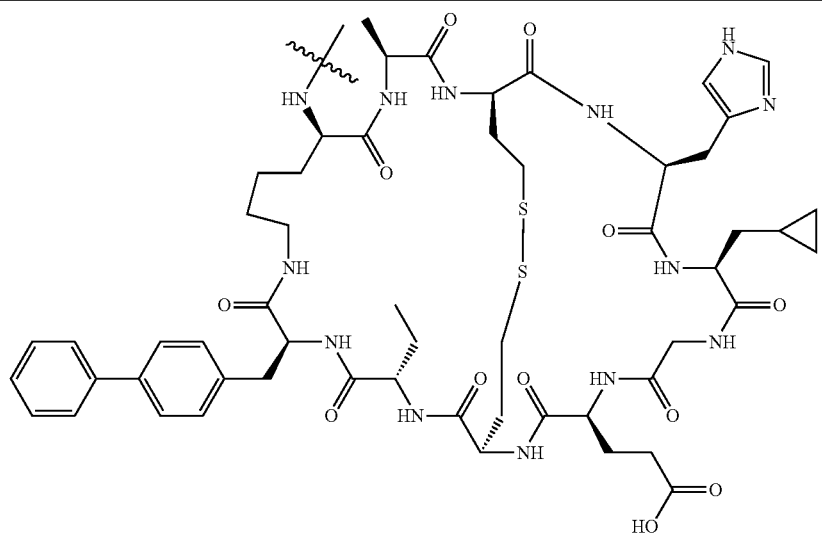
A-13
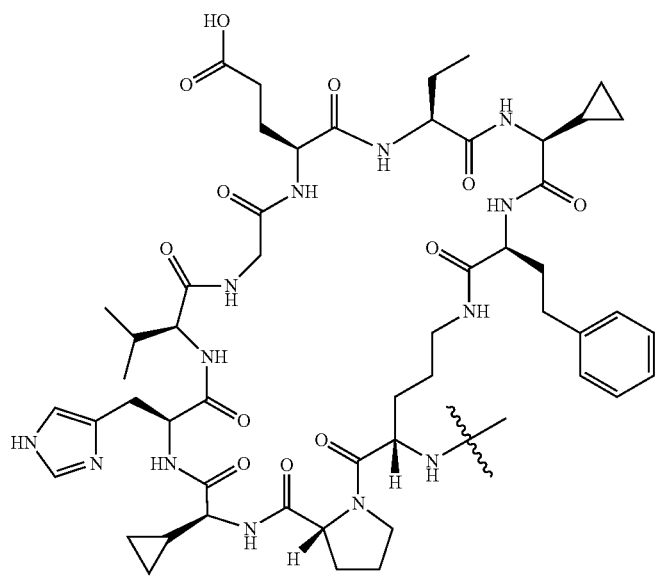 [SMILES: *N[C@H]1CCCNC(=O)[C@H](CCc2ccccc2)NC(=O)[C@H](C2CC2)NC(=O)[C@H](CC)NC(=O)[C@H](CCC(=O)O)NC(=O)CNC(=O)[C@H](C(C)C)NC(=O)[C@H](Cc2c[nH]cn2)NC(=O)[C@H](C2CC2)NC(=O)[C@H]2CCCN2C1=O]
A-14
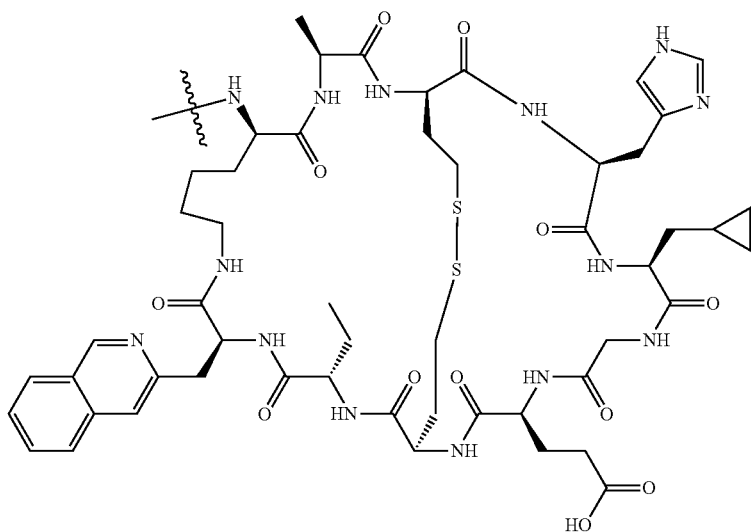 [SMILES: *N[C@@H]1CCCCNC(=O)[C@H](Cc2cc3ccccc3cn2)NC(=O)[C@H](CC)NC(=O)[C@H]2CCSSCC[C@@H](NC(=O)[C@H](C)NC1=O)C(=O)N[C@@H](Cc1c[nH]cn1)C(=O)N[C@@H](CC1CC1)C(=O)NCC(=O)N[C@@H](CCC(=O)O)C(=O)N2]
A-15

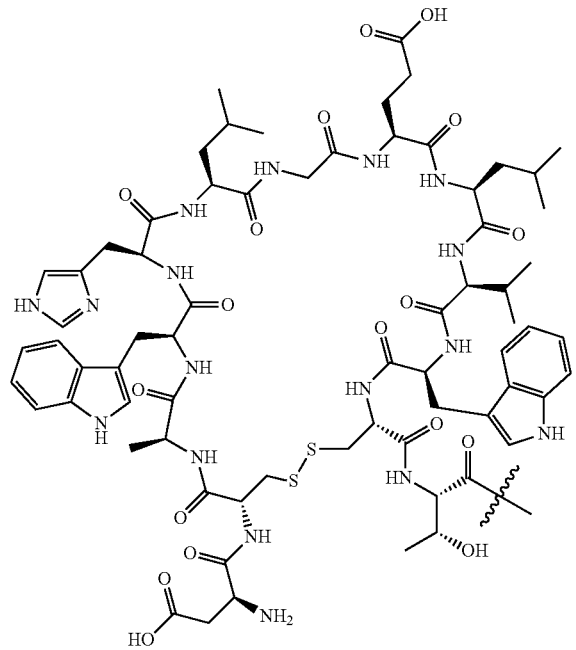 [SMILES: *C(=O)[C@@H](NC(=O)[C@@H]1CSSC[C@H](NC(=O)[C@@H](N)CC(=O)O)C(=O)N[C@@H](C)C(=O)N[C@@H](Cc2c[nH]c3ccccc23)C(=O)N[C@@H](Cc2c[nH]cn2)C(=O)N[C@@H](CC(C)C)C(=O)NCC(=O)N[C@@H](CCC(=O)O)C(=O)N[C@@H](CC(C)C)C(=O)N[C@@H](C(C)C)C(=O)N[C@@H](Cc2c[nH]c3ccccc23)C(=O)N1)[C@@H](C)O]
A-16
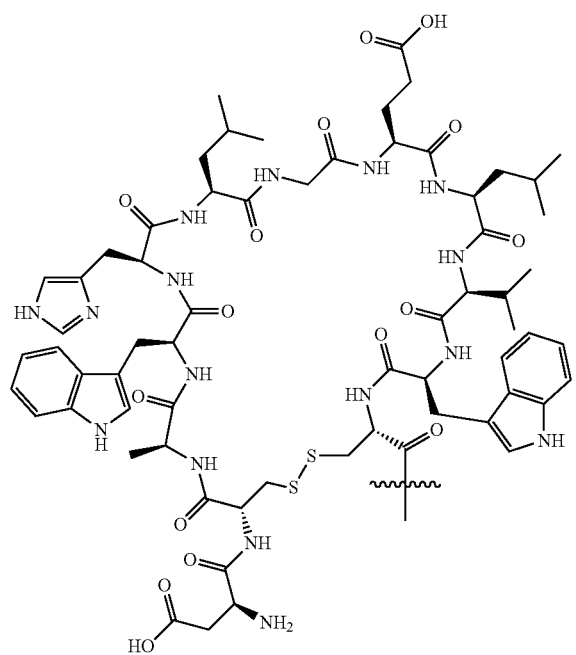 [SMILES: *C(=O)[C@@H]1CSSC[C@H](NC(=O)[C@@H](N)CC(=O)O)C(=O)N[C@@H](C)C(=O)N[C@@H](Cc2c[nH]c3ccccc23)C(=O)N[C@@H](Cc2c[nH]cn2)C(=O)N[C@@H](CC(C)C)C(=O)NCC(=O)N[C@@H](CCC(=O)O)C(=O)N[C@@H](CC(C)C)C(=O)N[C@@H](C(C)C)C(=O)N[C@@H](Cc2c[nH]c3ccccc23)C(=O)N1]
A-17

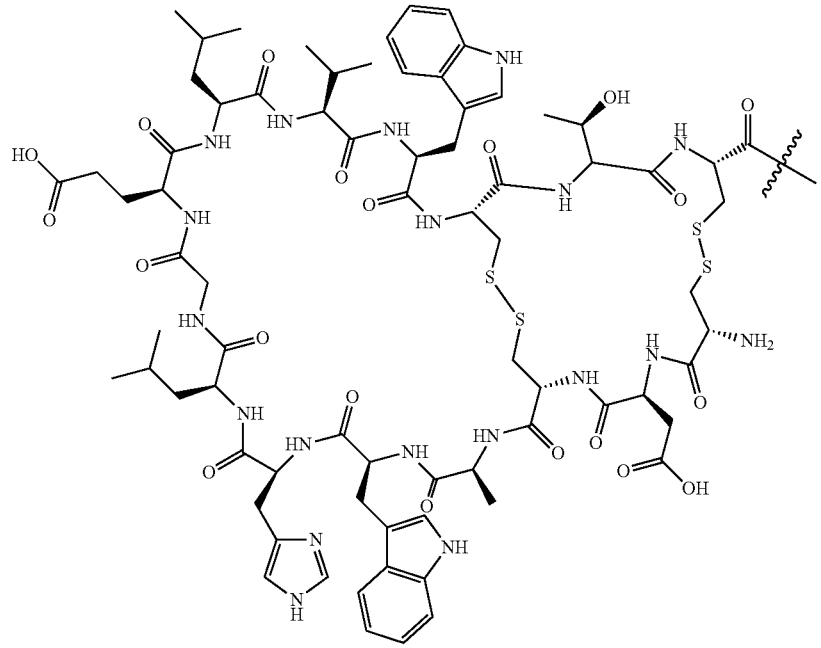 [SMILES: *C(=O)[C@@H]1CSSC[C@H](N)C(=O)N[C@@H](CC(=O)O)C(=O)N[C@H]2CSSC[C@H](NC(=O)[C@H](Cc3c[nH]c4ccccc34)NC(=O)[C@H](C(C)C)NC(=O)[C@H](CC(C)C)NC(=O)[C@H](CCC(=O)O)NC(=O)CNC(=O)[C@H](CC(C)C)NC(=O)[C@H](Cc3c[nH]cn3)NC(=O)[C@H](Cc3c[nH]c4ccccc34)NC(=O)[C@H](C)NC2=O)C(=O)NC([C@@H](C)O)C(=O)N1]
A-18
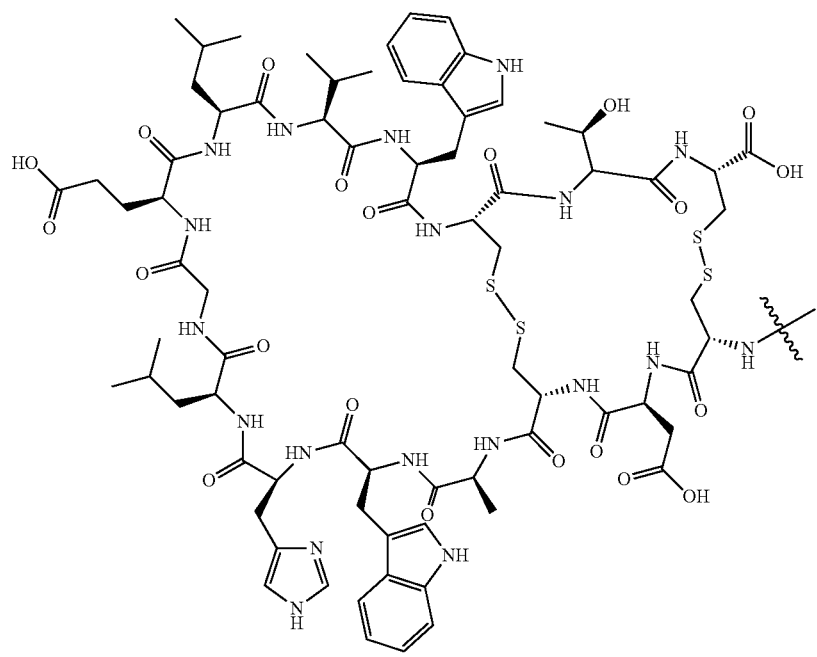 [SMILES: *N[C@H]1CSSC[C@@H](C(=O)O)NC(=O)C([C@@H](C)O)NC(=O)[C@@H]2CSSC[C@H](NC(=O)[C@H](CC(=O)O)NC1=O)C(=O)N[C@@H](C)C(=O)N[C@@H](Cc1c[nH]c3ccccc13)C(=O)N[C@@H](Cc1c[nH]cn1)C(=O)N[C@@H](CC(C)C)C(=O)NCC(=O)N[C@@H](CCC(=O)O)C(=O)N[C@@H](CC(C)C)C(=O)N[C@@H](C(C)C)C(=O)N[C@@H](Cc1c[nH]c3ccccc13)C(=O)N2]
A-19

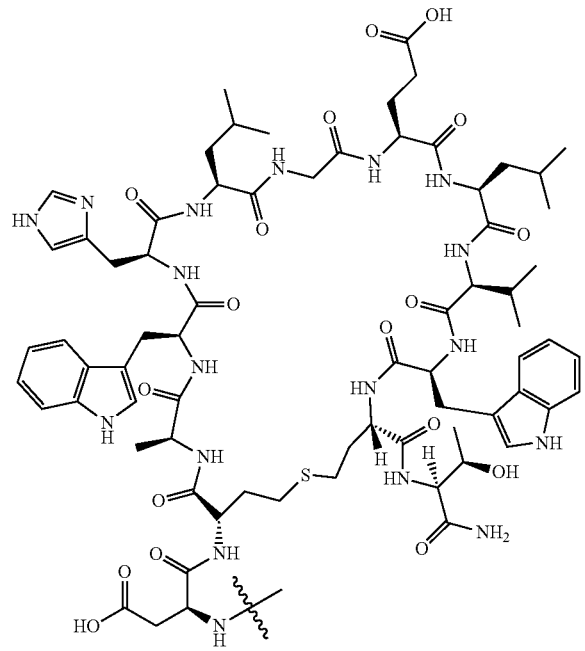
A-20
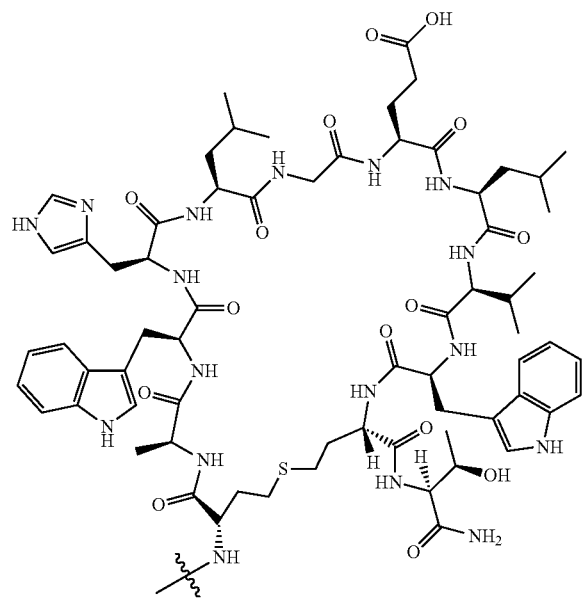
A-21

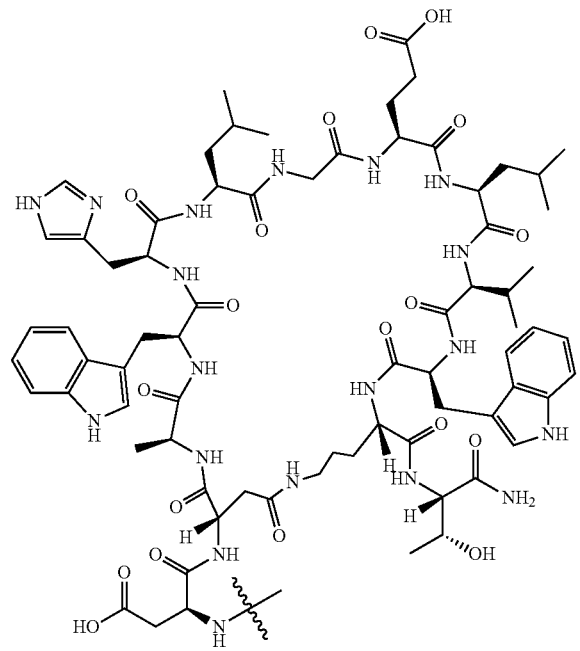 [SMILES: *N[C@@H](CC(=O)O)C(=O)N[C@H]1CC(=O)NCCC[C@@H](C(=O)N[C@H](C(N)=O)[C@@H](C)O)NC(=O)[C@H](Cc2c[nH]c3ccccc23)NC(=O)[C@H](C(C)C)NC(=O)[C@H](CC(C)C)NC(=O)[C@H](CCC(=O)O)NC(=O)CNC(=O)[C@H](CC(C)C)NC(=O)[C@H](Cc2c[nH]cn2)NC(=O)[C@H](Cc2c[nH]c3ccccc23)NC(=O)[C@H](C)NC1=O]
A-22
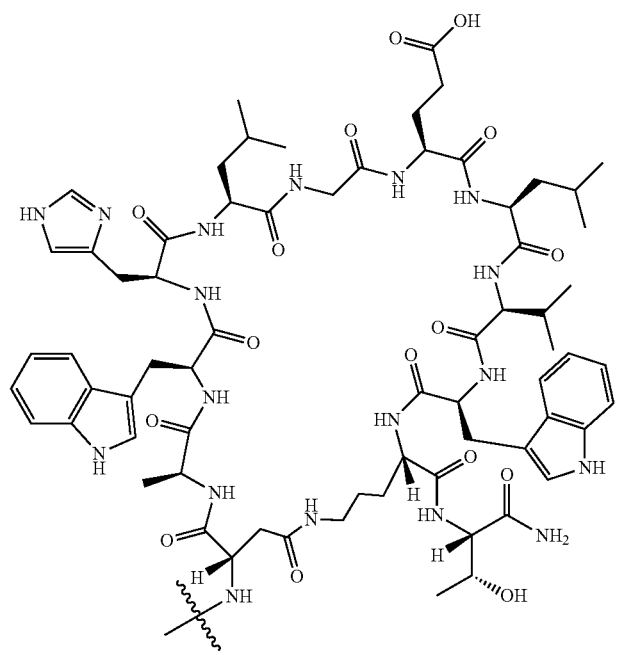 [SMILES: *N[C@H]1CC(=O)NCCC[C@@H](C(=O)N[C@H](C(N)=O)[C@@H](C)O)NC(=O)[C@H](Cc2c[nH]c3ccccc23)NC(=O)[C@H](C(C)C)NC(=O)[C@H](CC(C)C)NC(=O)[C@H](CCC(=O)O)NC(=O)CNC(=O)[C@H](CC(C)C)NC(=O)[C@H](Cc2c[nH]cn2)NC(=O)[C@H](Cc2c[nH]c3ccccc23)NC(=O)[C@H](C)NC1=O]
A-23

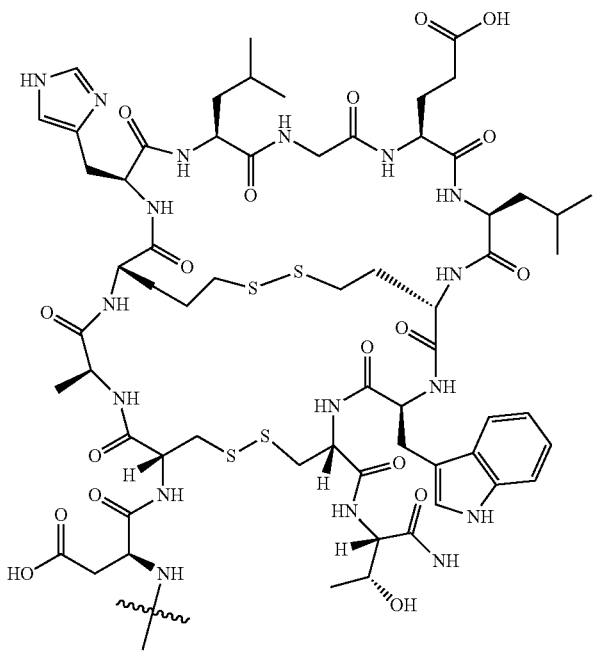 [SMILES: *N[C@@H](CC(=O)O)C(=O)N[C@H]1CSSC[C@@H](C(=O)N[C@H](C(N)=O)[C@@H](C)O)NC(=O)[C@H](Cc2c[nH]c3ccccc23)NC(=O)[C@@H]2CCSSCCC[C@H](NC(=O)[C@H](C)NC1=O)C(=O)N[C@@H](Cc1c[nH]cn1)C(=O)N[C@@H](CC(C)C)C(=O)NCC(=O)N[C@@H](CCC(=O)O)C(=O)N[C@@H](CC(C)C)C(=O)N2]
A-24
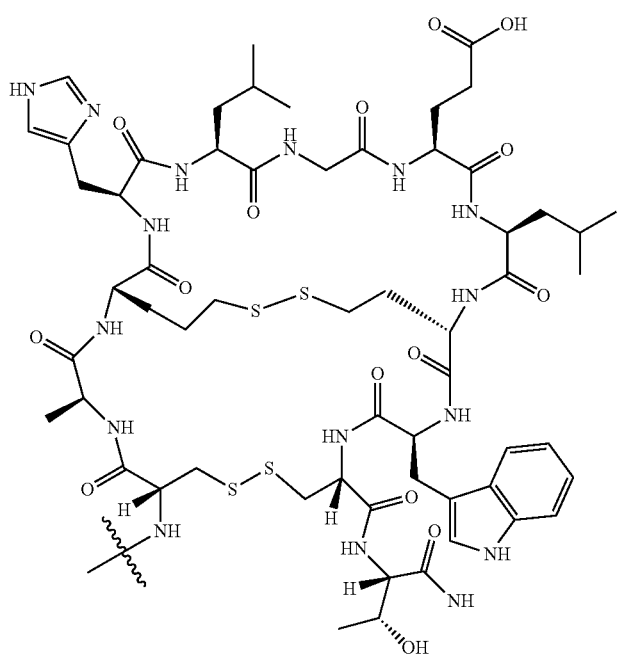 [SMILES: *N[C@H]1CSSC[C@@H](C(=O)N[C@H](C(N)=O)[C@@H](C)O)NC(=O)[C@H](Cc2c[nH]c3ccccc23)NC(=O)[C@@H]2CCSSCCC[C@H](NC(=O)[C@H](C)NC1=O)C(=O)N[C@@H](Cc1c[nH]cn1)C(=O)N[C@@H](CC(C)C)C(=O)NCC(=O)N[C@@H](CCC(=O)O)C(=O)N[C@@H](CC(C)C)C(=O)N2]
A-25

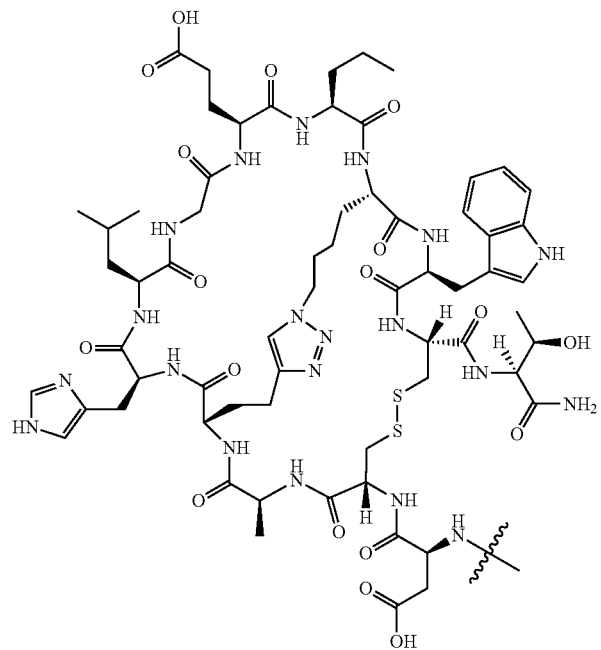 [SMILES: *N[C@@H](CC(=O)O)C(=O)N[C@H]1CSSC[C@@H](C(=O)N[C@H](C(N)=O)[C@@H](C)O)NC(=O)[C@H](Cc2c[nH]c3ccccc23)NC(=O)[C@@H]2CCCCn3cc(nn3)CC[C@H](NC(=O)[C@H](C)NC1=O)C(=O)N[C@@H](Cc1c[nH]cn1)C(=O)N[C@@H](CC(C)C)C(=O)NCC(=O)N[C@@H](CCC(=O)O)C(=O)N[C@@H](CCC)C(=O)N2]
A-26
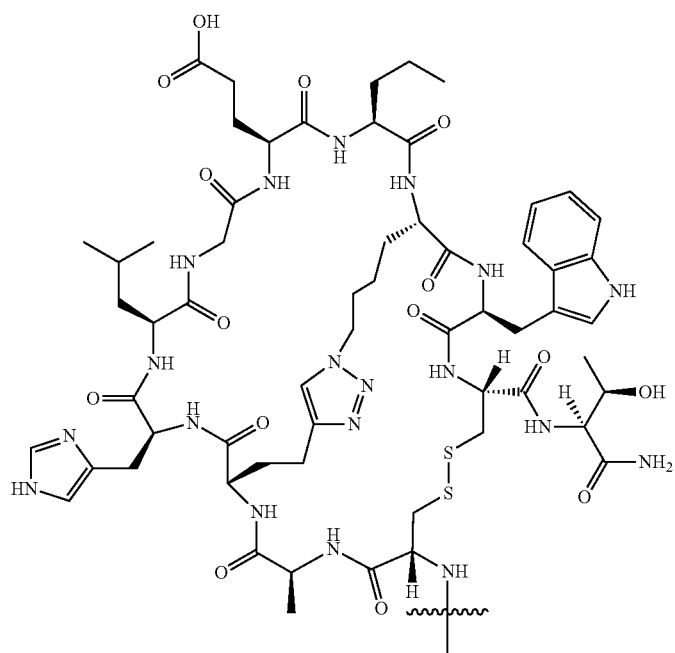 [SMILES: *N[C@H]1CSSC[C@@H](C(=O)N[C@H](C(N)=O)[C@@H](C)O)NC(=O)[C@H](Cc2c[nH]c3ccccc23)NC(=O)[C@@H]2CCCCn3cc(nn3)CC[C@H](NC(=O)[C@H](C)NC1=O)C(=O)N[C@@H](Cc1c[nH]cn1)C(=O)N[C@@H](CC(C)C)C(=O)NCC(=O)N[C@@H](CCC(=O)O)C(=O)N[C@@H](CCC)C(=O)N2]
A-27

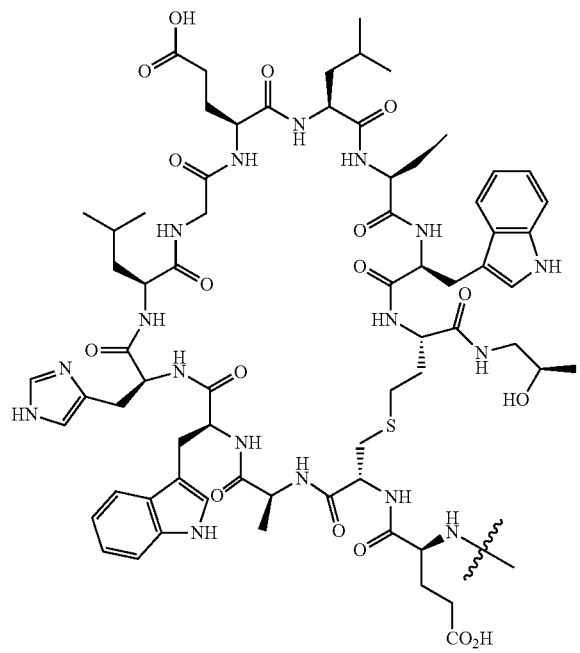 [SMILES: *N[C@@H](CCC(=O)O)C(=O)N[C@H]1CSCC[C@@H](C(=O)NC[C@@H](C)O)NC(=O)[C@H](Cc2c[nH]c3ccccc23)NC(=O)[C@H](CC)NC(=O)[C@H](CC(C)C)NC(=O)[C@H](CCC(=O)O)NC(=O)CNC(=O)[C@H](CC(C)C)NC(=O)[C@H](Cc2c[nH]cn2)NC(=O)[C@H](Cc2c[nH]c3ccccc23)NC(=O)[C@H](C)NC1=O]
A-28
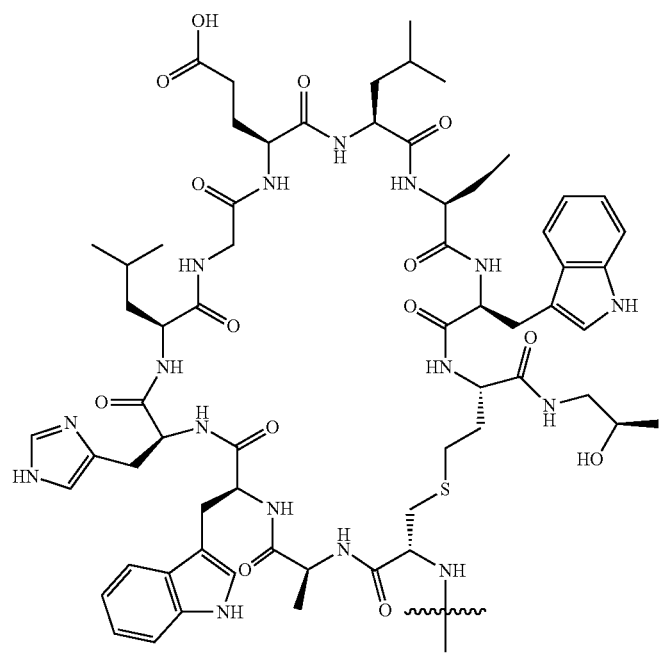 [SMILES: *N[C@H]1CSCC[C@@H](C(=O)NC[C@@H](C)O)NC(=O)[C@H](Cc2c[nH]c3ccccc23)NC(=O)[C@H](CC)NC(=O)[C@H](CC(C)C)NC(=O)[C@H](CCC(=O)O)NC(=O)CNC(=O)[C@H](CC(C)C)NC(=O)[C@H](Cc2c[nH]cn2)NC(=O)[C@H](Cc2c[nH]c3ccccc23)NC(=O)[C@H](C)NC1=O]
A-29

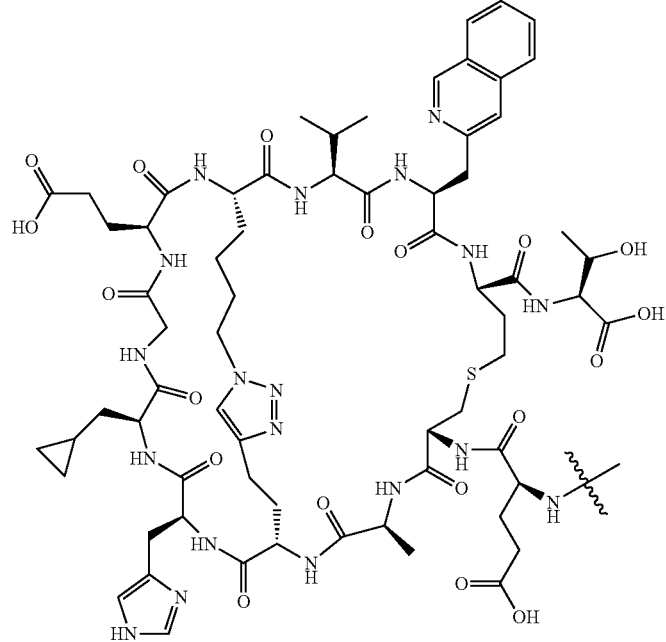 [SMILES: *N[C@@H](CCC(=O)O)C(=O)N[C@H]1CSCC[C@@H](C(=O)N[C@H](C(=O)O)C(C)O)NC(=O)[C@H](Cc2cc3ccccc3cn2)NC(=O)[C@H](C(C)C)NC(=O)[C@@H]2CCCCn3cc(nn3)CC[C@H](NC(=O)[C@H](C)NC1=O)C(=O)N[C@@H](Cc1c[nH]cn1)C(=O)N[C@@H](CC1CC1)C(=O)NCC(=O)N[C@@H](CCC(=O)O)C(=O)N2]
A-30
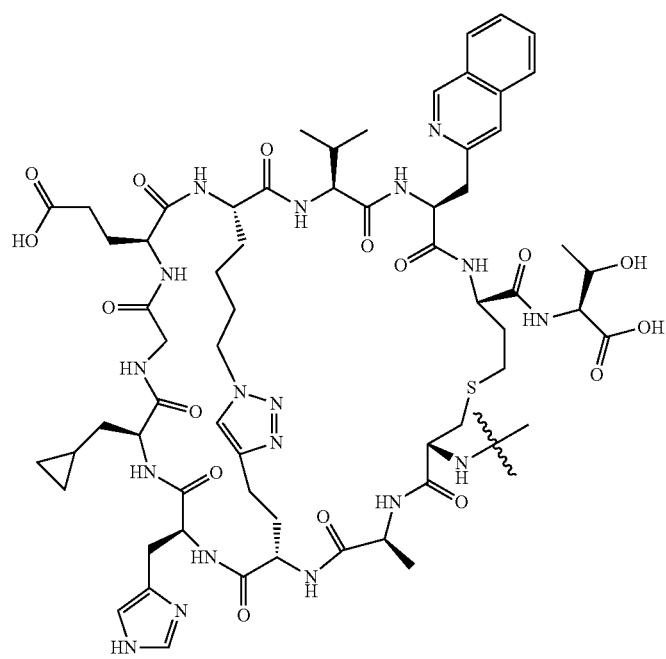 [SMILES: *N[C@H]1CSCC[C@@H](C(=O)N[C@H](C(=O)O)C(C)O)NC(=O)[C@H](Cc2cc3ccccc3cn2)NC(=O)[C@H](C(C)C)NC(=O)[C@@H]2CCCCn3cc(nn3)CC[C@H](NC(=O)[C@H](C)NC1=O)C(=O)N[C@@H](Cc1c[nH]cn1)C(=O)N[C@@H](CC1CC1)C(=O)NCC(=O)N[C@@H](CCC(=O)O)C(=O)N2]
A-31

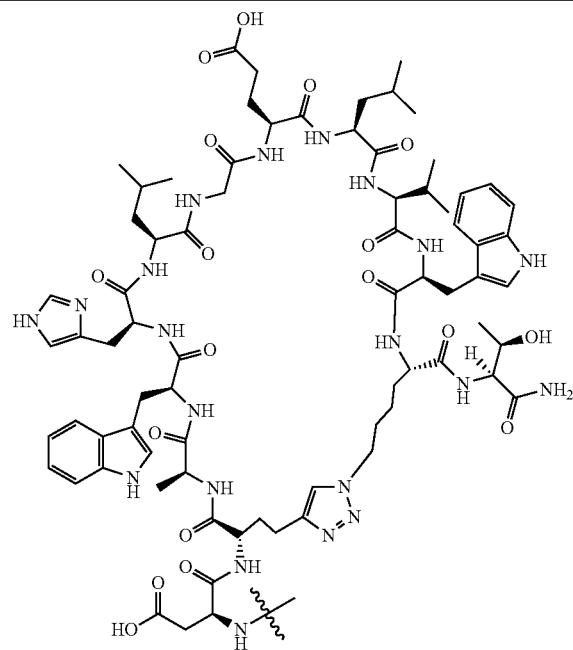
A-32
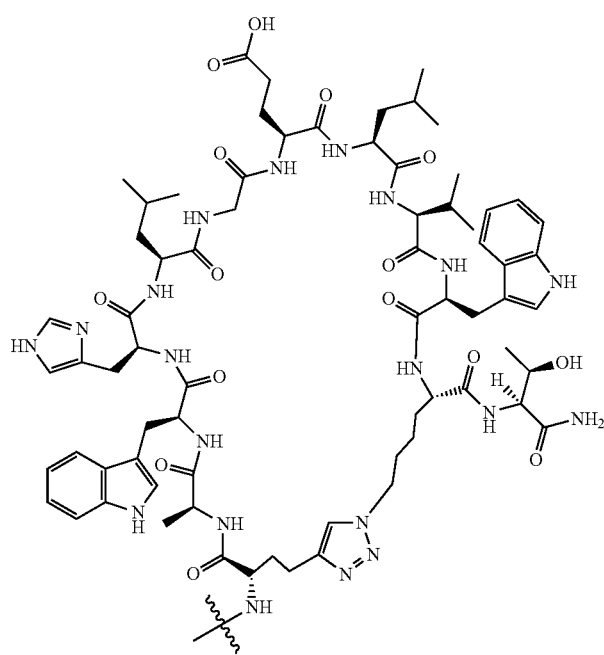
A-33

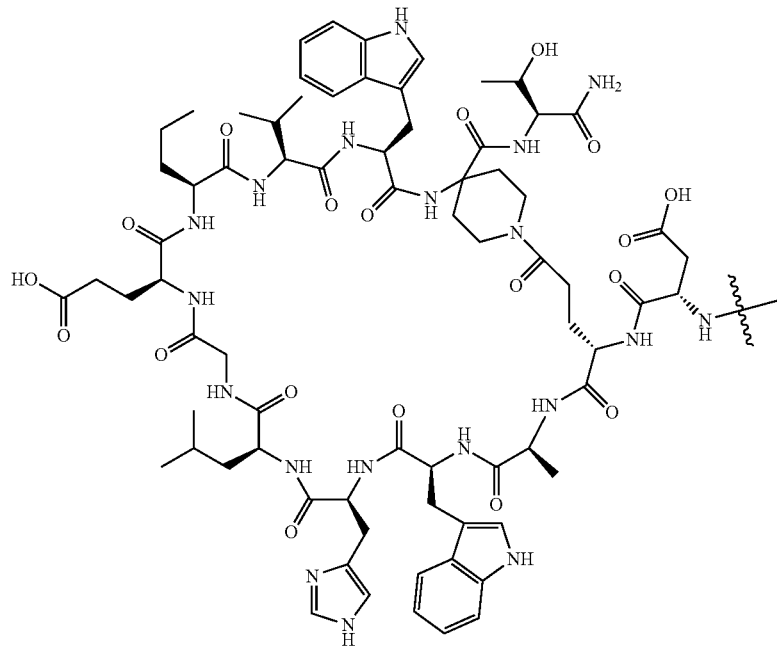 [SMILES: *N[C@@H](CC(=O)O)C(=O)N[C@H]1CCC(=O)N2CCC(C(=O)N[C@H](C(N)=O)C(C)O)(CC2)NC(=O)[C@H](Cc2c[nH]c3ccccc23)NC(=O)[C@H](C(C)C)NC(=O)[C@H](CCC)NC(=O)[C@H](CCC(=O)O)NC(=O)CNC(=O)[C@H](CC(C)C)NC(=O)[C@H](Cc2c[nH]cn2)NC(=O)[C@H](Cc2c[nH]c3ccccc23)NC(=O)[C@H](C)NC1=O]
A-34
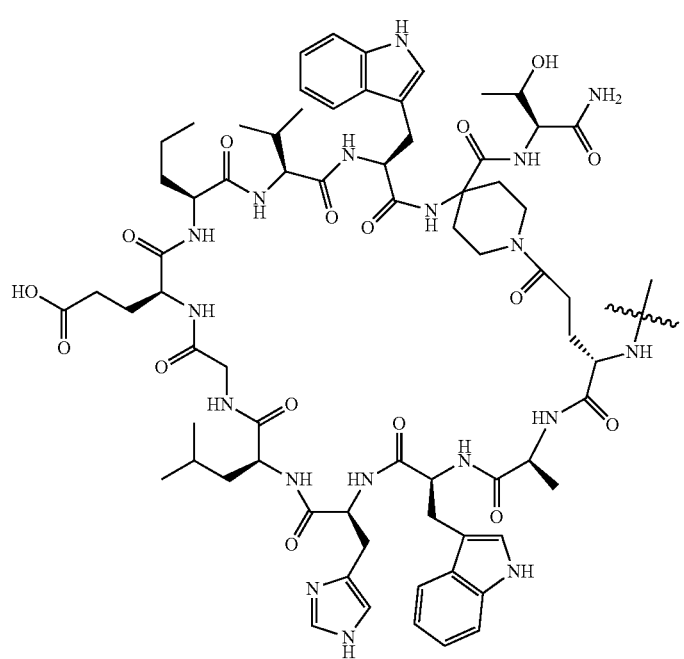 [SMILES: *N[C@H]1CCC(=O)N2CCC(C(=O)N[C@H](C(N)=O)C(C)O)(CC2)NC(=O)[C@H](Cc2c[nH]c3ccccc23)NC(=O)[C@H](C(C)C)NC(=O)[C@H](CCC)NC(=O)[C@H](CCC(=O)O)NC(=O)CNC(=O)[C@H](CC(C)C)NC(=O)[C@H](Cc2c[nH]cn2)NC(=O)[C@H](Cc2c[nH]c3ccccc23)NC(=O)[C@H](C)NC1=O]
A-35

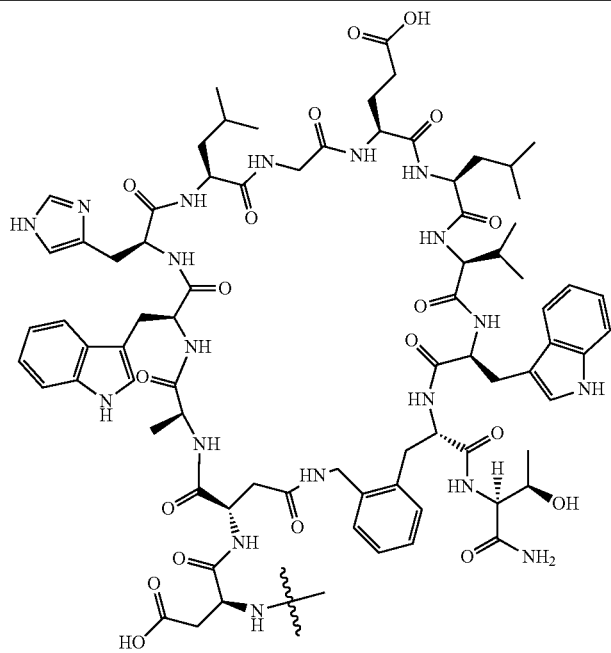
A-36
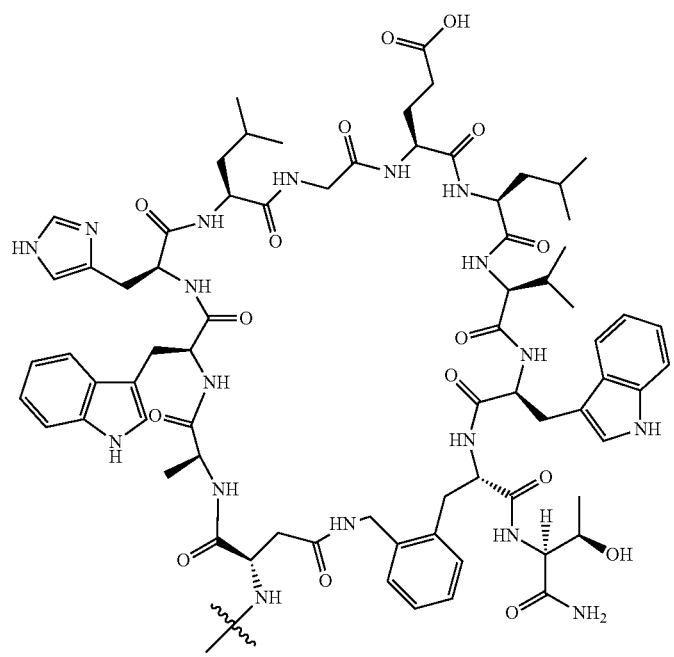
A-37

A-38
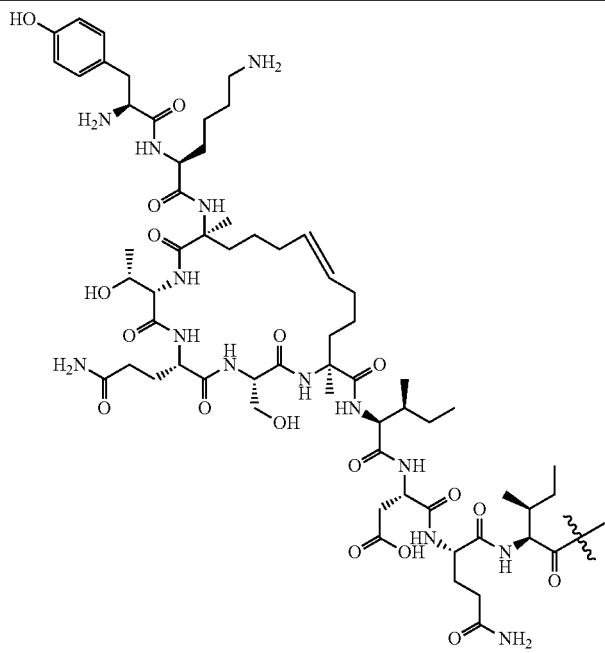
A-39
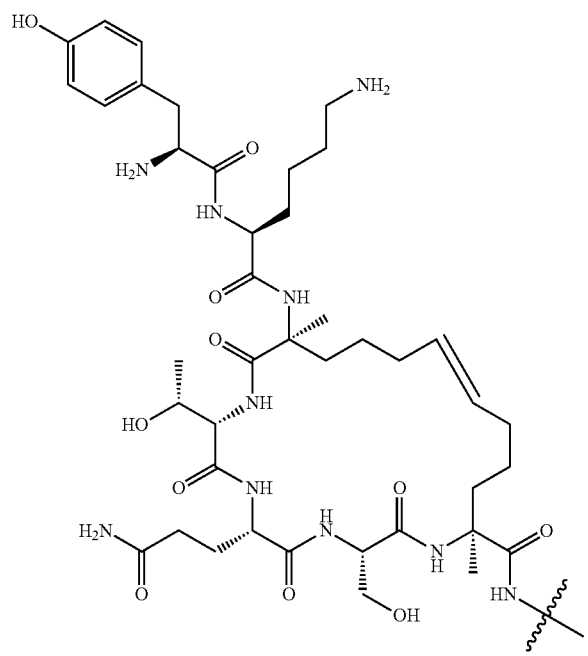 [SMILES: *NC(=O)[C@]1(C)CCC/C=C/CCC[C@](C)(NC(=O)[C@H](CCCCN)NC(=O)[C@@H](N)Cc2ccc(O)cc2)C(=O)N[C@@H]([C@@H](C)O)C(=O)N[C@@H](CCC(N)=O)C(=O)N[C@@H](CO)C(=O)N1]

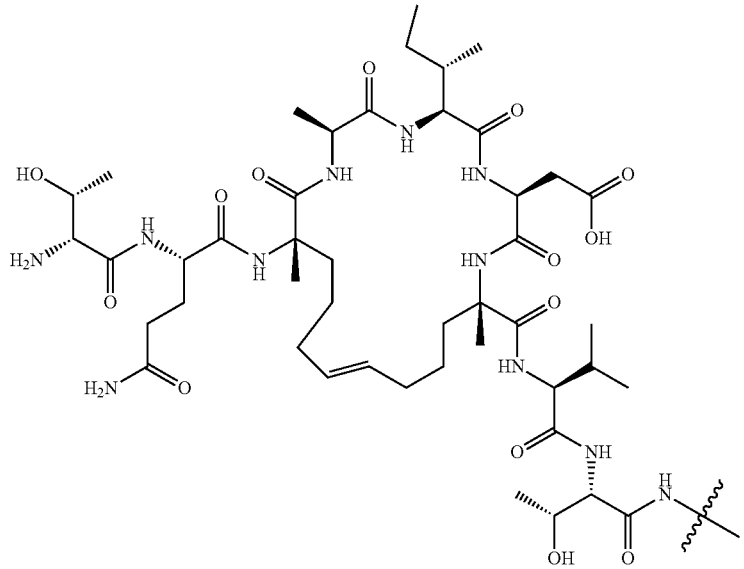 [SMILES: *NC(=O)[C@@H](NC(=O)[C@@H](NC(=O)[C@]1(C)CCC/C=C/CCC[C@](C)(NC(=O)[C@H](CCC(N)=O)NC(=O)[C@H](N)[C@@H](C)O)C(=O)N[C@@H](C)C(=O)N[C@@H]([C@@H](C)CC)C(=O)N[C@@H](CC(=O)O)C(=O)N1)C(C)C)[C@@H](C)O]
A-40
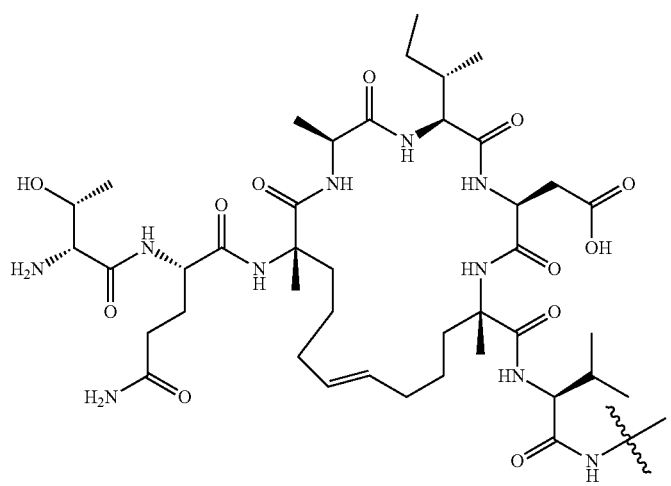 [SMILES: *NC(=O)[C@@H](NC(=O)[C@]1(C)CCC/C=C/CCC[C@](C)(NC(=O)[C@H](CCC(N)=O)NC(=O)[C@H](N)[C@@H](C)O)C(=O)N[C@@H](C)C(=O)N[C@@H]([C@@H](C)CC)C(=O)N[C@@H](CC(=O)O)C(=O)N1)C(C)C]
A-41
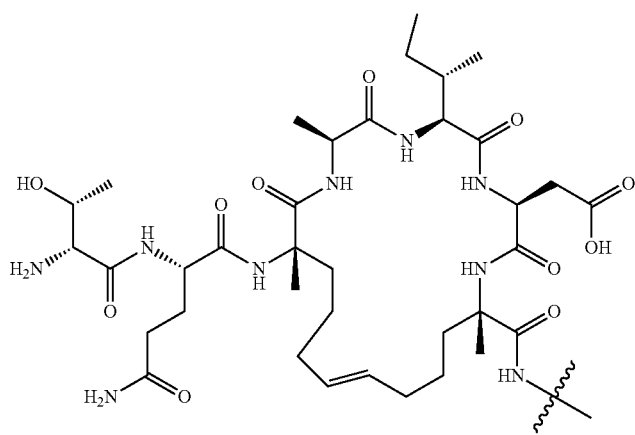 [SMILES: *NC(=O)[C@]1(C)CCC/C=C/CCC[C@](C)(NC(=O)[C@H](CCC(N)=O)NC(=O)[C@H](N)[C@@H](C)O)C(=O)N[C@@H](C)C(=O)N[C@@H]([C@@H](C)CC)C(=O)N[C@@H](CC(=O)O)C(=O)N1]
A-42

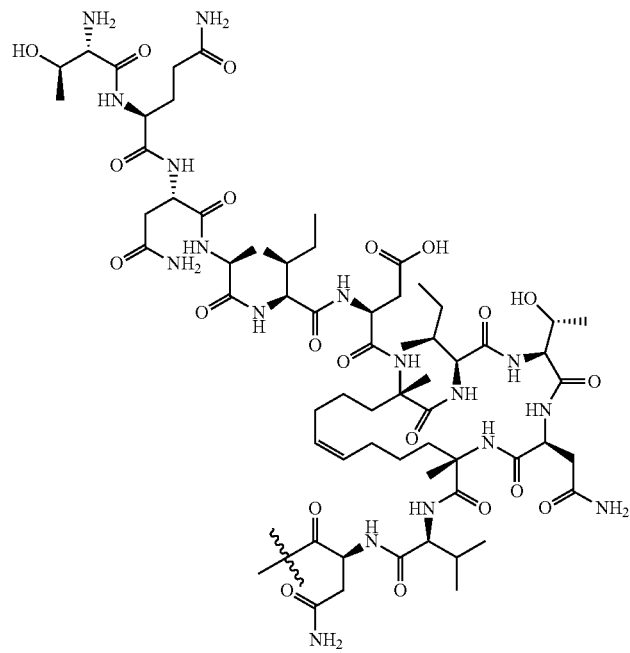 [SMILES: *C(=O)[C@H](CC(N)=O)NC(=O)[C@@H](NC(=O)[C@]1(C)CCC/C=C\CCC[C@](C)(NC(=O)[C@H](CC(=O)O)NC(=O)[C@@H](NC(=O)[C@H](C)NC(=O)[C@H](CC(N)=O)NC(=O)[C@H](CCC(N)=O)NC(=O)[C@@H](N)[C@@H](C)O)[C@@H](C)CC)C(=O)N[C@@H]([C@@H](C)CC)C(=O)N[C@@H]([C@@H](C)O)C(=O)N[C@@H](CC(N)=O)C(=O)N1)C(C)C]
A-43
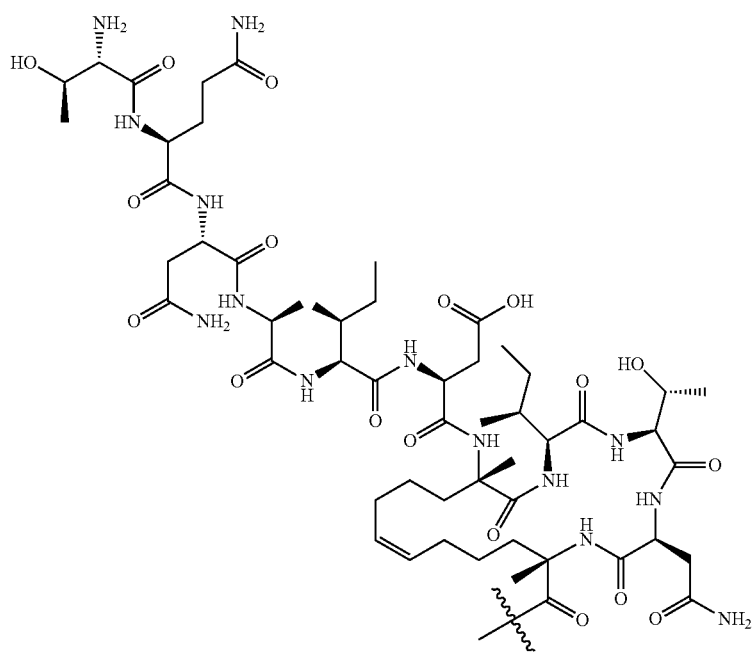 [SMILES: *C(=O)[C@]1(C)CCC/C=C\CCC[C@](C)(NC(=O)[C@H](CC(=O)O)NC(=O)[C@@H](NC(=O)[C@H](C)NC(=O)[C@H](CC(N)=O)NC(=O)[C@H](CCC(N)=O)NC(=O)[C@@H](N)[C@@H](C)O)[C@@H](C)CC)C(=O)N[C@@H]([C@@H](C)CC)C(=O)N[C@@H]([C@@H](C)O)C(=O)N[C@@H](CC(N)=O)C(=O)N1]
A-44

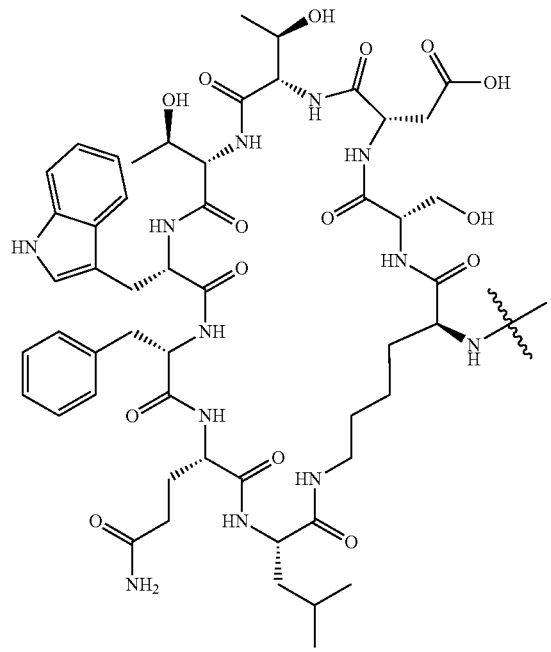 [SMILES: *N[C@H]1CCCCNC(=O)[C@H](CC(C)C)NC(=O)[C@H](CCC(N)=O)NC(=O)[C@H](Cc2ccccc2)NC(=O)[C@H](Cc2c[nH]c3ccccc23)NC(=O)[C@H]([C@@H](C)O)NC(=O)[C@H]([C@@H](C)O)NC(=O)[C@H](CC(=O)O)NC(=O)[C@H](CO)NC1=O]
A-45
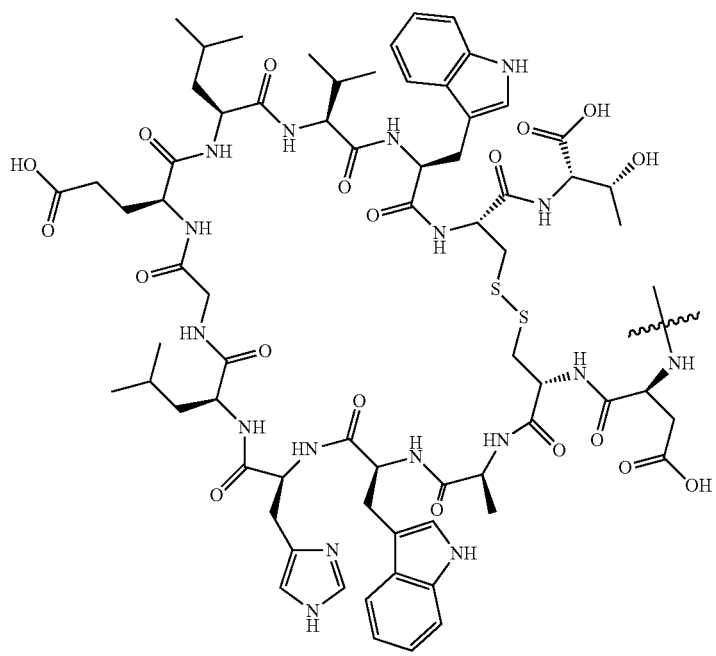 [SMILES: *N[C@@H](CC(=O)O)C(=O)N[C@H]1CSSC[C@@H](C(=O)N[C@H](C(=O)O)[C@@H](C)O)NC(=O)[C@H](Cc2c[nH]c3ccccc23)NC(=O)[C@H](C(C)C)NC(=O)[C@H](CC(C)C)NC(=O)[C@H](CCC(=O)O)NC(=O)CNC(=O)[C@H](CC(C)C)NC(=O)[C@H](Cc2c[nH]cn2)NC(=O)[C@H](Cc2c[nH]c3ccccc23)NC(=O)[C@H](C)NC1=O]
A-46

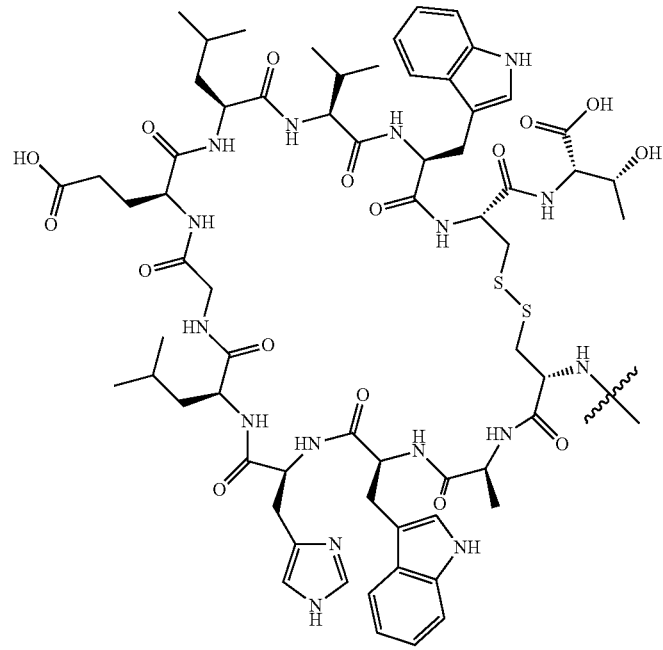 [SMILES: *N[C@H]1CSSC[C@@H](C(=O)N[C@H](C(=O)O)[C@@H](C)O)NC(=O)[C@H](Cc2c[nH]c3ccccc23)NC(=O)[C@H](C(C)C)NC(=O)[C@H](CC(C)C)NC(=O)[C@H](CCC(=O)O)NC(=O)CNC(=O)[C@H](CC(C)C)NC(=O)[C@H](Cc2c[nH]cn2)NC(=O)[C@H](Cc2c[nH]c3ccccc23)NC(=O)[C@H](C)NC1=O]
A-47
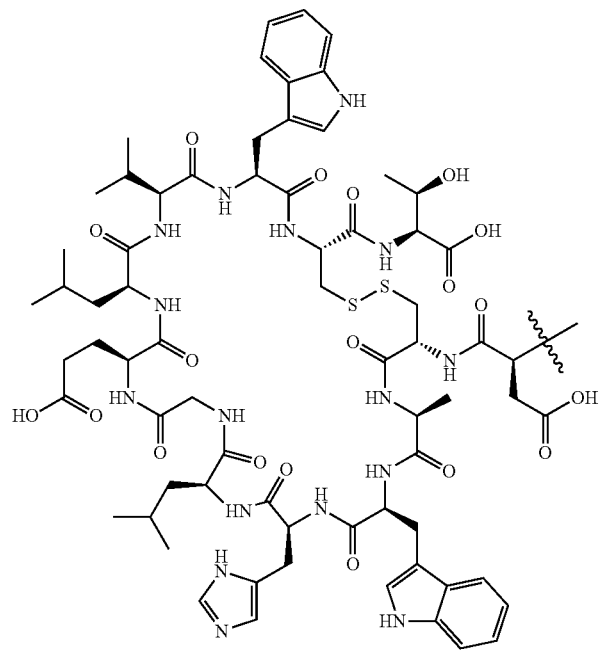 [SMILES: *[C@@H](CC(=O)O)C(=O)N[C@H]1CSSC[C@@H](C(=O)N[C@H](C(=O)O)[C@@H](C)O)NC(=O)[C@H](Cc2c[nH]c3ccccc23)NC(=O)[C@H](C(C)C)NC(=O)[C@H](CC(C)C)NC(=O)[C@H](CCC(=O)O)NC(=O)CNC(=O)[C@H](CC(C)C)NC(=O)[C@H](Cc2cnc[nH]2)NC(=O)[C@H](Cc2c[nH]c3ccccc23)NC(=O)[C@H](C)NC1=O]
A-48
or

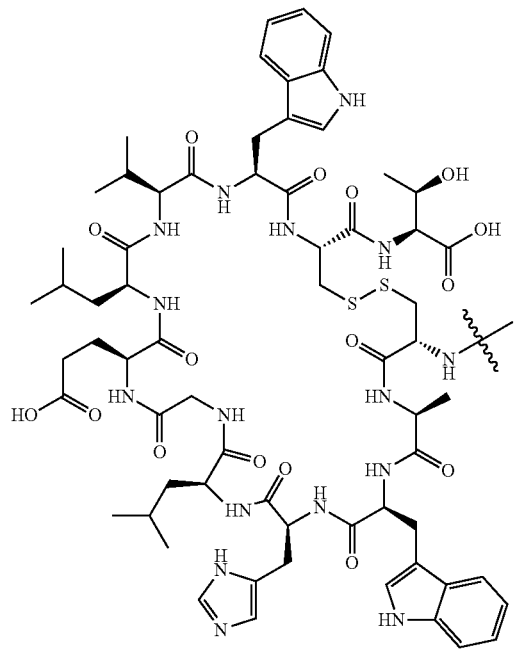 [SMILES: *N[C@H]1CSSC[C@@H](C(=O)N[C@H](C(=O)O)[C@@H](C)O)NC(=O)[C@H](Cc2c[nH]c3ccccc23)NC(=O)[C@H](C(C)C)NC(=O)[C@H](CC(C)C)NC(=O)[C@H](CCC(=O)O)NC(=O)CNC(=O)[C@H](CC(C)C)NC(=O)[C@H](Cc2cnc[nH]2)NC(=O)[C@H](Cc2c[nH]c3ccccc23)NC(=O)[C@H](C)NC1=O]

A-49

In some embodiments, a universal antibody binding moiety is or comprises optionally substituted A-1. In some embodiments, a universal antibody binding moiety is or comprises optionally substituted A-2. In some embodiments, a universal antibody binding moiety is or comprises optionally substituted A-3. In some embodiments, a universal antibody binding moiety is or comprises optionally substituted A-4. In some embodiments, a universal antibody binding moiety is or comprises optionally substituted A-5. In some embodiments, a universal antibody binding moiety is or comprises optionally substituted A-6. In some embodiments, a universal antibody binding moiety is or comprises optionally substituted A-7. In some embodiments, a universal antibody binding moiety is or comprises optionally substituted A-8. In some embodiments, a universal antibody binding moiety is or comprises optionally substituted A-9. In some embodiments, a universal antibody binding moiety is or comprises optionally substituted A-10. In some embodiments, a universal antibody binding moiety is or comprises optionally substituted A-11. In some embodiments, a universal antibody binding moiety is or comprises optionally substituted A-12. In some embodiments, a universal antibody binding moiety is or comprises optionally substituted A-13. In some embodiments, a universal antibody binding moiety is or comprises optionally substituted A-14. In some embodiments, a universal antibody binding moiety is or comprises optionally substituted A-15. In some embodiments, a universal antibody binding moiety is or comprises optionally substituted A-16. In some embodiments, a universal antibody binding moiety is or comprises optionally substituted A-17. In some embodiments, a universal antibody binding moiety is or comprises optionally substituted A-18. In some embodiments, a universal antibody binding moiety is or comprises optionally substituted A-19. In some embodiments, a universal antibody binding moiety is or comprises optionally substituted A-20. In some embodiments, a universal antibody binding moiety is or comprises optionally substituted A-21. In some embodiments, a universal antibody binding moiety is or comprises optionally substituted A-22. In some embodiments, a universal antibody binding moiety is or comprises optionally substituted A-23. In some embodiments, a universal antibody binding moiety is or comprises optionally substituted A-24. In some embodiments, a universal antibody binding moiety is or comprises optionally substituted A-25. In some embodiments, a universal antibody binding moiety is or comprises optionally substituted A-26. In some embodiments, a universal antibody binding moiety is or comprises optionally substituted A-27. In some embodiments, a universal antibody binding moiety is or comprises optionally substituted A-28. In some embodiments, a universal antibody binding moiety is or comprises optionally substituted A-29. In some embodiments, a universal antibody binding moiety is or comprises optionally substituted A-30. In some embodiments, a universal antibody binding moiety is or comprises optionally substituted A-31. In some embodiments, a universal antibody binding moiety is or comprises optionally substituted A-32. In some embodiments, a universal antibody binding moiety is or comprises optionally substituted A-33. In some embodiments, a universal antibody binding moiety is or comprises optionally substituted A-34. In some embodiments, a universal antibody binding moiety is or comprises optionally substituted A-35. In some embodiments, a universal antibody binding moiety is or comprises optionally substituted A-36. In some embodiments, a universal antibody binding moiety is or comprises optionally substituted A-37. In some embodiments, a universal antibody binding moiety is or comprises optionally substituted A-38. In some embodiments, a universal antibody binding moiety is or comprises optionally substituted A-39. In some embodiments, a universal antibody binding moiety is or comprises optionally substituted A-40. In some embodiments, a universal antibody binding moiety is or comprises optionally substituted A-41. In some embodiments, a universal antibody binding moiety is or comprises optionally substituted A-42. In some embodiments, a universal antibody binding moiety is or comprises optionally substituted A-43. In some embodiments, a universal antibody binding moiety is or comprises optionally substituted A-44. In some embodiments, a universal antibody binding moiety is or comprises optionally substituted A-45. In some embodiments, a universal antibody binding moiety is or comprises optionally substituted A-46. In some embodiments, a universal antibody binding moiety is or comprises optionally substituted A-47. In some embodiments, a universal antibody binding moiety is or comprises optionally substituted A-48. In some embodiments, a universal antibody binding moiety is or comprises optionally substituted A-49. In some embodiments, it is unsubstituted. In some embodiments, it is substituted.

In some embodiments, a universal antibody binding moiety comprises a peptide unit, and is connected to a linker moiety through the C-terminus of the peptide unit. In some embodiments, it is connected to a linker moiety through the N-terminus of the peptide unit. In some embodiments, it is connected through a side chain group of the peptide unit.

In some embodiments, an antibody binding moiety, e.g., a universal antibody binding moiety, is or comprises a small molecule entity, with a molecular weight of, e.g., less than 10000, 9000, 8000, 7000, 6000, 5000, 4000, 3000, 2000, 1500, 1000, etc. Suitable such antibody binding moieties include small molecule Fc binder moieties, e.g., those described in U.S. Pat. No. 9,745,339, US 20130131321, etc.

As appreciated by those skilled in the art, antibodies of various properties and activities (e.g., antibodies recognizing different antigens, having optional modifications, etc.) may be recruited by antibody binding moieties described in the present disclosure. In some embodiments, such antibodies include antibodies administered to a subject, e.g., for therapeutic purposes. In some embodiments, antibodies recruited by antibody binding moieties comprise antibodies toward different antigens. In some embodiments, antibodies recruited by antibody binding moieties comprise antibodies whose antigens are not present on the surface or cell membrane of target cells (e.g., target cells such as cancer cells). In some embodiments, antibodies recruited by antibody binding moieties comprise antibodies which are not targeting antigens present on surface or cell membrane of targets (e.g., target cells such as cancer cells). In some embodiments, antigens on surface of target cells may interfere with the structure, conformation, and/or one or more properties and/or activities of recruited antibodies which bind such antigens. In some embodiments, as appreciated by those skilled in the art, provided technologies comprise universal antibody binding moieties which recruit antibodies of diverse specificities, and no more than 1%, 2%, 5%, 10%, 15%, 20%, 25%, 30%, 35%, 40%, 45%, 50%, 55%, 60%, 65%, 70%, 75%, 80%, 85%, 90%, 95% or 99% percent of recruited antibodies are toward the same antigen, protein, lipid, carbohydrate, etc. Among other things, one advantage of the present disclosure is that provided technologies comprising universal antibody binding moieties can utilize diverse pools of antibodies such as those present in serum. In some embodiments, universal antibody binding moieties of the present disclosure (e.g., those in ARMs) are contacted with a plurality of antibodies, wherein no more than 1%, 2%, 5%, 10%, 15%, 20%, 25%, 30%, 35%, 40%, 45%, 50%, 55%, 60%, 65%, 70%, 75%, 80%, 85%, 90%, 95% or 99% percent of the plurality of antibodies are toward the same antigen, protein, lipid, carbohydrate, etc.

Amino Acids

In some embodiments, useful compounds and agents, e.g., ARMs, may comprise one or more amino acid moieties, e.g., in universal antibody binding moieties, linker moieties, etc. Amino acid moieties can either be those of natural amino acids or unnatural amino acids. In some embodiments, an amino acid has the structure of formula A-I:

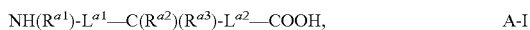

$$\text{NH}(R^{a1})\text{-}L^{a1}\text{—}C(R^{a2})(R^{a3})\text{-}L^{a2}\text{—COOH},  \quad\quad \text{A-I}$$

or a salt thereof, wherein each variable is independent as described in the present disclosure. In some embodiments, an amino acid residue has the structure of —N($R^{a1}$)-$L^{a1}$—C($R^{a2}$)($R^{a3}$)-$L^{a2}$—CO—.

In some embodiments, $L^{a1}$ is a covalent bond. In some embodiments, a compound of formula A-I is of the structure NH($R^{a1}$)—C($R^{a2}$)($R^{a3}$)-$L^{a2}$—COOH.

In some embodiments, $L^{a2}$ is a covalent bond. In some embodiments, a compound of formula A-I is of the structure NH($R^{a1}$)—C($R^{a2}$)($R^{a3}$)-$L^{a2}$—COOH.

In some embodiments, $L^{a1}$ is a covalent bond and $L^{a2}$ is a covalent bond. In some embodiments, a compound of formula A-I is of the structure NH($R^{a1}$)—C($R^{a2}$)($R^{a3}$)—COOH.

In some embodiments, $L^a$ is a covalent bond. In some embodiments, $L^a$ is optionally substituted $C_{1-6}$ bivalent aliphatic. In some embodiments, $L^a$ is optionally substituted $C_{1-6}$ alkylene. In some embodiments, $L^a$ is —$CH_2$—. In some embodiments, $L^a$ is —$CH_2CH_2$—. In some embodiments, $L^a$ is —$CH_2CH_2CH_2$—.

In some embodiments, R' is R. In some embodiments, $R^{a1}$ is R, wherein R is as described in the present disclosure. In some embodiments, $R^{a2}$ is R, wherein R is as described in the present disclosure. In some embodiments, $R^{a3}$ is R, wherein R is as described in the present disclosure. In some embodiments, each of $R^{a1}$, $R^{a2}$, and $R^{a3}$ is independently R, wherein R is as described in the present disclosure.

In some embodiments, $R^{a1}$ is hydrogen. In some embodiments, $R^{a2}$ is hydrogen. In some embodiments, $R^{a3}$ is hydrogen. In some embodiments, $R^{a1}$ is hydrogen, and at least one of $R^{a2}$ and $R^{a3}$ is hydrogen. In some embodiments, $R^{a1}$ is hydrogen, one of $R^{a2}$ and $R^{a3}$ is hydrogen, and the other is not hydrogen.

In some embodiments, $R^{a2}$ is -$L^a$—R, wherein R is as described in the present disclosure. In some embodiments, $R^{a2}$ is -$L^a$—R, wherein R is an optionally substituted group selected from $C_{3-30}$ cycloaliphatic, $C_{5-30}$ aryl, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon. In some embodiments, $R^{a2}$ is -$L^a$—R, wherein R is an optionally substituted group selected from $C_{6-30}$ aryl and 5-30 membered heteroaryl having 1-10 heteroatoms independently selected from oxygen, nitrogen, sulfur, phosphorus and silicon. In some embodiments, $R^{a2}$ is a side chain of an amino acid. In some embodiments, $R^{a2}$ is a side chain of a standard amino acid.

In some embodiments, $R^{a3}$ is -$L^a$—R, wherein R is as described in the present disclosure. In some embodiments, $R^{a3}$ is -$L^a$—R, wherein R is an optionally substituted group selected from $C_{3-30}$ cycloaliphatic, $C_{5-30}$ aryl, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon. In some embodiments, $R^{a3}$ is -$L^a$—R, wherein R is an optionally substituted group selected from $C_{6-30}$ aryl and 5-30 membered heteroaryl having 1-10 heteroatoms independently selected from oxygen, nitrogen, sulfur, phosphorus and silicon. In some embodiments, $R^{a3}$ is a side chain of an amino acid. In some embodiments, $R^{a3}$ is a side chain of a standard amino acid.

In some embodiments, R is a cyclic group. In some embodiments, R is an optionally substituted $C_{3-30}$ cycloaliphatic group. In some embodiments, R is cyclopropyl.

In some embodiments, R is an aromatic group, and an amino acid residue of an amino acid of formula A-I is a $Xaa^A$. In some embodiments, R is optionally substituted phenyl. In some embodiments, R is phenyl. In some embodiments, R is optionally substituted phenyl. In some embodiments, R is 4-trifluoromethylphenyl. In some embodiments, R is 4-phenylphenyl. In some embodiments, R is optionally substituted 5-30 membered heteroaryl having 1-10 heteroatoms independently selected from oxygen, nitrogen, sulfur, phosphorus and silicon. In some embodiments, R is optionally substituted 5-14 membered heteroaryl having 1-5 heteroatoms independently selected from oxygen, nitrogen, and sulfur. In some embodiments, R is

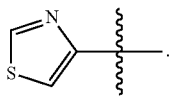 [SMILES: *c1cscn1]

In some embodiments, R is optionally substituted pyridinyl. In some embodiments, R is 1-pyridinyl. In some embodiments, R is 2-pyridinyl. In some embodiments, R is 3-pyridinyl. In some embodiments, R is

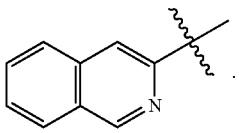 [SMILES: *c1cc2ccccc2cn1]

In some embodiments, R' is —COOH. In some embodiments, a compound of and an amino acid residue of an amino acid of formula A-I is a $Xaa^N$.

In some embodiments, R' is —NH$_2$. In some embodiments, a compound of an amino acid residue of an amino acid of formula A-I is a $Xaa^P$.

In some embodiments, $R^{a2}$ or $R^{a3}$ is R, wherein R is $C_{1-20}$ aliphatic as described in the present disclosure. In some embodiments, a compound of an amino acid residue of an amino acid of formula A-I is a $Xaa^H$. In some embodiments, R is —CH$_3$. In some embodiments, R is ethyl. In some embodiments, R is propyl. In some embodiments, R is cyclopropyl.

In some embodiments, two or more of $R^{a1}$, $R^{a2}$, and $R^{a3}$ are R and are taken together to form an optionally substituted ring as described in the present disclosure.

In some embodiments, $R^{a1}$ and one of $R^{a2}$ and $R^{a3}$ are R and are taken together to form an optionally substituted 3-6 membered ring having no additional ring heteroatom other than the nitrogen atom to which $R^{a1}$ is bonded to. In some embodiments, a formed ring is a 5-membered ring as in proline.

In some embodiments, $R^{a2}$ and $R^{a3}$ are R and are taken together to form an optionally substituted 3-6 membered ring as described in the present disclosure. In some embodiments, $R^{a2}$ and $R^{a3}$ are R and are taken together to form an optionally substituted 3-6 membered ring having one or more nitrogen ring atom. In some embodiments, $R^{a2}$ and $R^{a3}$ are R and are taken together to form an optionally substituted 3-6 membered ring having one and no more than one ring heteroatom which is a nitrogen atom. In some embodiments, a ring is a saturated ring.

In some embodiments, an amino acid is a natural amino acid. In some embodiments, an amino acid is an unnatural amino acid. In some embodiments, an amino acid is an alpha-amino acid. In some embodiments, an amino acid is a beta-amino acid.

Target

In some embodiments, the present disclosure provides technologies for selectively directing agents comprising target binding moieties (e.g. ARM compounds), antibodies, and immune cells, e.g., NK cells, to desired target sites comprising one or more targets. As those skilled in the art will appreciate, provided technologies are useful for various types of targets.

In some embodiments, targets are damaged or defective tissues. In some embodiments, a target is a damaged tissue. In some embodiments, a target is a defective tissue. In some embodiments, a target is associated with a disease, disorder or condition, e.g., cancer, wound, etc. In some embodiments, a target is a tumor. In some embodiments, targets are or comprise diseased cells. In some embodiments, targets are or comprise cancer cells. In some embodiments, a target is a foreign object. In some embodiments, a target is or comprises an infectious agent. In some embodiments, a target is a microbe. In some embodiments, a target is or comprises bacteria. In some embodiments, a target is or comprises viruses.

In many embodiments, targets are tissues and/or cells associated with diseases, disorders or conditions, particularly various types of cancers. In some embodiments, targets are or comprise cancer cells. Among other things, the present disclosure provides technologies that are particularly useful for selectively targeting cancer cells by the immune system through, e.g., recruitment antibodies (e.g., endogenous antibodies) and immune cells, e.g., NK cells, by using ARMs.

In many embodiments, targets are cells of cancer or a proliferative condition, disorder or disease. In some embodiments, a cancer or proliferative condition, disorder or disease is selected from a benign tumor, a malignant tumor, solid tumor, carcinoma of the brain, kidney, liver, adrenal gland, bladder, breast, stomach, gastric tumors, ovaries, colon, rectum, prostate, pancreas, lung, vagina, cervix, testis, genitourinary tract, esophagus, larynx, skin, bone or thyroid, sarcoma, glioblastomas, neuroblastomas, multiple myeloma, gastrointestinal cancer, especially colon carcinoma or colorectal adenoma, a tumor of the neck and head, an epidermal hyperproliferation, psoriasis, prostate hyperplasia, a neoplasia, a neoplasia of epithelial character, adenoma, adenocarcinoma, keratoacanthoma, epidermoid carcinoma, large cell carcinoma, nonsmall-cell lung carcinoma, lymphomas, Hodgkins and Non-Hodgkins, a mammary carcinoma, follicular carcinoma, undifferentiated carcinoma, papillary carcinoma, seminoma, melanoma, hematological malignancies (including leukemia, diffuse large B-cell lymphoma (DLBCL), ABC DLBCL, chronic lymphocytic leukemia (CLL), chronic lymphocytic lymphoma, primary effusion lymphoma, Burkitt lymphoma/leukemia, acute lymphocytic leukemia, B-cell prolymphocytic leukemia, lymphoplasmacytic lymphoma, Waldenström's macroglobulinemia (WM), splenic marginal zone lymphoma, multiple myeloma, plasmacytoma, and intravascular large B-cell lymphoma.

Target sites typically comprise one or more physical, chemical and/or biological markers that can be utilized e.g., by target binding moieties of compounds (e.g., ARMs), for selectively recruiting antibodies and/or fragments thereof, and/or immune cells to targets.

In some embodiments, cells of target sites comprise one or more characteristic agents that are useful for targeting. In some embodiments, such agents are proteins and/or fragments thereof. In some embodiments, such agents are antigens that are specifically associated with diseases, disorders or conditions.

For example, in some embodiments, cancer cells may comprise one or more tumor-specific antigens or tumor-associated antigens. Target binding moieties as described in the present disclosure can selectively bind to such markers. In some embodiments, target binding moieties of the present disclosure are small molecules which are useful for binding to cell surface proteins and/or proteins within cells.

In some embodiments, characteristic agents, e.g., of cells of the target sites, etc., are or comprise carbohydrates, e.g., those on cell surface, in glycosylated proteins, etc. In some embodiments, characteristic agents are or comprise lipids.

In some embodiments, characteristic agents e.g., of cells of the target sites, etc., are extracellular. In some embodiments, characteristic agents are extracellular proteins. In some embodiments, characteristic agents are on cell surface. In some embodiments, characteristic agents are proteins present on cell surface. For example, in many tumor tissues, cell-surface and/or extracellular mucins show different levels and/or patterns of glycosylation, and may be utilized for targeting.

In some embodiments, targeting sites, e.g., disease tissues, etc., have one or more physical, biological and/or chemical properties that can be utilized by target binding moieties. In some embodiments, such a property is pH. In some embodiments, such a property is concentration of one or more chemical substances. For example, tumor microenvironment is often hypoxic, and/or acidic (e.g., pH 6.5-6.9 v. 7.2-7.4).

In some embodiments, targets are or comprise peptides or fragments thereof. In some embodiments, targets are or comprise proteins or fragments thereof. In some embodiments, a target is avidin. In some embodiments, a target is streptavidin. In some embodiments, a target is or comprises an antigen. In some embodiments, a target is or comprises a tumor-specific antigen. In some embodiments, a target is or comprises a tumor-associated antigen (TAA).

In some embodiments, tumor-associated antigens are or comprise carbohydrates. In some embodiments, provided target binding moieties target such TAAs. In some embodiments, a carbohydrate is part of a glycoprotein. In some embodiments, a carbohydrate is part of a glycolipid. Many conditions, disorders and diseases, e.g., various types of cancers, are associated aberrant glycosylation. In some embodiments, tumor-associated carbohydrate antigens (TACAs) include and/or are associated with altered sialic acid expression, altered Lewis carbohydrate antigen expression, altered ganglioside expression, etc. In some embodiments, target binding moieties of the present disclosure can target various types of TACAs, including those described in the art, e.g., in Chua and Durrant, Monoclonal Antibodies Against Tumour-Associated Carbohydrate Antigens, Carbohydrate Mahmut Caliskan, IntechOpen, DOI: 10.5772/66996.

In some embodiments, a tumor-associated antigen is a cell-surface receptor. In some embodiments, a TAA is selected from BMPR1B (bone morphogenetic protein receptor-type IB, Genbank accession no. NM.sub.—001203), E16 (LAT1, SLC7A5, Genbank accession no. NM.sub.—003486), STEAP1 (six transmembrane epithelial antigen of prostate, Genbank accession no. NM.sub.—012449), 0772P (CA125, MUC16, Genbank accession no. AF361486), MPF (MPF, MSLN, SMR, megakaryocyte potentiating factor, mesothelin, Genbank accession no. NM.sub.—005823), Napi3b (NAPI-3B, NPTIIb, SLC34A2, solute carrier family 34 (sodium phosphate), member 2, type II sodium-dependent phosphate transporter 3b, Genbank accession no. NM.sub.—006424), Sema 5b (FLJ10372, KIAA1445, Mm.42015, SEMA5B, SEMAG, Semaphorin 5b Hlog, sema domain, seven thrombospondin repeats (type 1 and type 1-like), transmembrane domain (TM) and short cytoplasmic domain, (semaphorin) 5B, Genbank accession no. AB040878), PSCA hlg (2700050$C_{12}$Rik, C530008016Rik, RIKEN cDNA 2700050C12, RIKEN cDNA 2700050C12 gene, Genbank accession no. AY358628), ETBR (Endothelin type B receptor, Genbank accession no. AY275463), MSG783 (RNF124, hypothetical protein FLJ20315, Genbank accession no. NM.sub.—017763), STEAP2 (HGNC-.sub.—8639, IPCA-1, PCANAP1, STAMP1, STEAP2, STMP, prostate cancer associated gene 1, prostate cancer associated protein 1, six transmembrane epithelial antigen of prostate 2, six transmembrane prostate protein, Genbank accession no. AF455138), TrpM4 (BR22450, FLJ20041, TRPM4, TRPM4B, transient receptor potential cation channel, subfamily M, member 4, Genbank accession no. NM.sub.—017636), CRIPTO (CR, CR1, CRGF, CRIPTO, TDGF1, teratocarcinoma-derived growth factor, Genbank accession no. NP.sub.—003203 or NM.sub.—003212), CD21 (CR2 (Complement receptor 2) or C3DR (C3d/Epstein Barr virus receptor) or Hs.73792 Genbank accession no. M26004), CD79b (CD79B, CD79.beta., IGb (immunoglobulin-associated beta), B29, Genbank accession no. NM.sub.—000626), FcRH2 (IFGP4, IRTA4, SPAP1A (SH2 domain containing phosphatase anchor protein 1a), SPAP1B, SPAP1C, Genbank accession no. NM.sub.—030764), HER2 (Genbank accession no. M1730), NCA (Genbank accession no. M18728), MDP (Genbank accession no. BC017023), IL20Ra (Genbank accession no. AF184971), Brevican (Genbank accession no. AF229053, EphB2R (Genbank accession no. NM.sub.—004442), ASLG659 (Genbank accession no. AX092328), PSCA (Genbank accession no. AJ297436), GEDA (Genbank accession no. AY260763, BAFF—R (B cell-activating factor receptor, BLyS receptor 3, BR3, NP.sub.—443177.1), CD22 (B-cell receptor CD22-B isoform, NP.sub.—001762.1), CD79a (CD79A, CD79.alpha., immunoglobulin-associated alpha, a B cell-specific protein that covalently interacts with Ig beta (CD79B) and forms a complex on the surface with Ig M molecules, transduces a signal involved in B-cell differentiation, Genbank accession No. NP.sub.—001774.1), CXCR5 (Burkitt's lymphoma receptor 1, a G protein-coupled receptor that is activated by the CXCL13 chemokine, functions in lymphocyte migration and humoral defense, plays a role in HIV-2 infection and perhaps development of AIDS, lymphoma, myeloma, and leukemia, Genbank accession No. NP.sub.—001707.1), HLA-DOB (Beta subunit of MHC class II molecule (Ia antigen) that binds peptides and presents them to CD4+ T lymphocytes, Genbank accession No. NP.sub.—002111.1), P2X5 (Purinergic receptor P2X ligand-gated ion channel 5, an ion channel gated by extracellular ATP, may be involved in synaptic transmission and neurogenesis, deficiency may contribute to the pathophysiology of idiopathic detrusor instability, Genbank accession No. NP.sub.—002552.2), CD72 (B-cell differentiation antigen CD72, Lyb-2, Genbank accession No. NP.sub.—001773.1), LY64 (Lymphocyte antigen 64 (RP105), type I membrane protein of the leucine rich repeat (LRR) family, regulates B-cell activation and apoptosis, loss of function is associated with increased disease activity in patients with systemic lupus erythematosis, Genbank accession No. NP.sub.—005573.1), FcRH1 (Fc receptor-like protein 1, a putative receptor for the immunoglobulin Fc domain that contains C2 type Ig-like and ITAM domains, may have a role in B-lymphocyte differentiation, Genbank accession No. NP.sub.—443170.1), IRTA2 (Immunoglobulin superfamily receptor translocation associated 2, a putative immunoreceptor with possible roles in B cell development and lymphomagenesis; deregulation of the gene by translocation occurs in some B cell malignancies, Genbank accession No. NP.sub.—112571.1); and TENB2 (putative transmembrane proteoglycan, related to the EGF/heregulin family of growth factors and follistatin, Genbank accession No. AF 179274.

In some embodiments, targets are or comprise nucleic acids.

In some embodiments, targets are or comprise lipids.

In some embodiments, targets are or comprise carbohydrates. In some embodiments, targets are or comprise carbohydrates associated with diseases, disorders or conditions. In some embodiments, targets are or comprises carbohydrates associated with cancers, e.g., carbohydrates as glycan modifications of proteins, e.g., on the surface of, or extracellular of, cancer cells.

Target Binding Moieties

Target binding moieties of various types and chemical classes can be utilized in accordance with the present disclosure, and a number of technologies (e.g., assays, reagents, kits, etc.) for identifying and/or assessing properties of target binding moieties can be utilized in accordance with the present disclosure. Generally, target binding moieties interact with target sites through one or more physical, biological and/or chemical properties. In some embodiments, target binding moieties bind to characteristic agents as described in the present disclosure. In some embodiments, target binding moieties bind to surface, extracellular, and/or intracellular proteins, carbohydrates and/or nucleic acids. In some embodiments, target binding moieties bind to surface proteins of target cells. In some embodiments, target binding moieties are small molecule moieties. In some embodiments, target binding moieties are antibody agents. In some embodiments, target binding moieties are nucleic acid agents such as aptamers. In some embodiments, target binding moieties are lipid moieties. Certain types of target binding moieties are described below; those skilled in the art appreciate that other types of target binding moieties, including many known in the art, can also be utilized in accordance with the present disclosure.

In some embodiments, targeting binding moieties bind to targets through one or more proteins, lipids, nucleic acids, carbohydrates, small molecules, etc. of the targets. For example, in some embodiments, target binding moieties bind to tumor-specific antigens of target cancer cells. In some embodiments, a tumor-specific antigen is or comprises carbohydrate or a fragment thereof. In some embodiments, a tumor-specific antigen is or comprises a protein or a fragment thereof.

In some embodiments, target binding moieties bind to cell surface proteins, carbohydrates or lipids. In some embodiments, a target binding moiety binds to CD19. In some embodiments, a target binding moiety binds to CD20. In some embodiments, a target binding moiety binds to CD22. In some embodiments, a target binding moiety binds to CD30. In some embodiments, a target binding moiety binds to CD33. In some embodiments, a target binding moiety binds to CD123.

a. Small Molecules

In some embodiments, a target binding moiety is a small molecule moiety. In some embodiments, a small molecule moiety has a molecular weight no more than 8000, 7000, 6000, 5000, 4000, 3000, 2000, 1500, 1000, 900, 800, 700, or 600. In some embodiments, a small molecule moiety has a molecular weight no more than 8000. In some embodiments, a small molecule moiety has a molecular weight no more than 7000. In some embodiments, a small molecule moiety has a molecular weight no more than 6000. In some embodiments, a small molecule moiety has a molecular weight no more than 5000. In some embodiments, a small molecule moiety has a molecular weight no more than 4000. In some embodiments, a small molecule moiety has a molecular weight no more than 3000. In some embodiments, a small molecule moiety has a molecular weight no more than 2000. In some embodiments, a small molecule moiety has a molecular weight no more than 1500. In some embodiments, a small molecule moiety has a molecular weight no more than 1000. In some embodiments, a small molecule moiety has a molecular weight no more than 900. Among other things, the present disclosure encompasses the recognition that small molecule target binding moieties may be able to bind to markers outside of, on the surface of, and/or inside of targets, e.g., cancer cells.

In some embodiments, a small molecule target binding moiety is or comprises a moiety that selectively binds to a protein or a fragment thereof, e.g., cancer antigen. For example, in some embodiments, a target binding moiety is or comprises a moiety that selectively binds to prostate-specific membrane antigen (PSMA). In some embodiments, a target binding moiety is or comprises

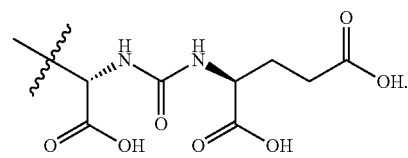 [SMILES: *[C@H](NC(=O)N[C@@H](CCC(=O)O)C(=O)O)C(=O)O]

In some embodiments, a small molecule target binding moiety is or comprises a biotin moiety. In some embodiments, a small molecule target binding moiety is or comprises

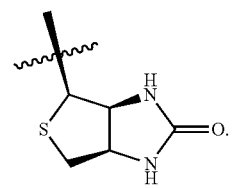

In some embodiments, a small molecule target binding moiety is or comprises

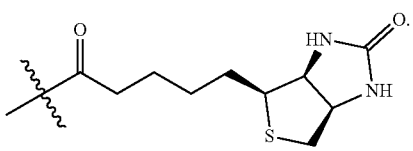 [SMILES: *C(=O)CCCC[C@@H]1SC[C@@H]2NC(=O)N[C@@H]21]

b. Peptide Agents

In some embodiments, a target binding moiety is or comprises a peptide agent. In some embodiments, a target binding moiety is a peptide moiety. In some embodiments, a peptide moiety can either be linier or cyclic. In some embodiments, a target binding moiety is or comprises a cyclic peptide moiety. Various peptide target binding moieties are known in the art and can be utilized in accordance with the present disclosure.

In some embodiments, a target binding moiety is or comprises a peptide aptamer agent.

C. Aptamer Agents

In some embodiments, a target binding moiety is or comprises a nucleic acid agent. In some embodiments, a target binding moiety is or comprises an oligonucleotide moiety. In some embodiments, a target binding moiety is or comprises an aptamer agent. Various aptamer agents are known in the art or can be readily developed using common technologies, and can be utilized in provided technologies in accordance with the present disclosure.

Linker Moieties

In some embodiments, antibody binding moieties are optionally connected to target binding moieties through linker moieties. Linker moieties of various types and/or for various purposes, e.g., those utilized in antibody-drug conjugates, etc., may be utilized in accordance with the present disclosure.

Linker moieties can be either bivalent or polyvalent. In some embodiments, a linker moiety is bivalent. In some embodiments, a linker is polyvalent and connecting more than two moieties.

In some embodiments, a linker moiety is L. In some embodiments, L is a covalent bond, or a bivalent or polyvalent optionally substituted, linear or branched $C_{1-100}$ group comprising one or more aliphatic, aryl, heteroaliphatic having 1-20 heteroatoms, heteroaromatic having 1-20 heteroatoms, or any combinations thereof, wherein one or more methylene units of the group are optionally and independently replaced with $C_{1-6}$ alkylene, $C_{1-6}$ alkenylene, a bivalent $C_{1-6}$ heteroaliphatic group having 1-5 heteroatoms, —C≡C—, -Cy-, —C(R')$_2$—, —O—, —S—, —S—S—, —N(R')—, —C(O)—, —C(S)—, —C(NR')—, —C(O)N(R')—, C(O) C(R')$_2$N(R')—, —N(R')C(O)N(R')—, —N(R')C(O)O—, —S(O)—, —S(0) 2, —S(O)$_2$N(R'), —C(O)S—, —C(O)O—, —P(O)(OR')—, —P(O)(SR')—, —P(O)(R')—, —P(O)(NR')—, —P(S)(OR')—, —P(S)(SR')—, —P(S)(R')—, —P(S)(NR')—, —P(R')—, —P(OR')—, —P(SR')—, —P(NR')—, or —[(—O—C(R')$_2$—C(R')$_2$-)$_n$]—, wherein n is 1-20.

In some embodiments, L is bivalent. In some embodiments, L is a bivalent or optionally substituted, linear or branched group selected from $C_{1-00}$ aliphatic and $C_{1-100}$ heteroaliphatic having 1-50 heteroatoms, wherein one or more methylene units of the group are optionally and independently replaced with $C_{1-6}$ alkylene, $C_{1-6}$ alkenylene, a bivalent $C_{1-6}$ heteroaliphatic group having 1-5 heteroatoms, —C≡C—, -Cy-, —C(R')$_2$—, —O—, —S—, —S—S—, —N(R')—, —C(O)—, —C(S)—, —C(NR')—, C(O)N(R')—, C(O) C(R')$_2$N(R')—, —N(R')C(O)N(R'), —N(R')C(O)O—, —S(O)—, —S(O)$_2$—, —S(O)$_2$N(R')—, —C(O)S—, —C(O)O—, —P(O)(OR')—, —P(O)(SR')—, —P(O)(R')—, —P(O)(NR')—, —P(S)(OR')—, —P(S)(SR')—, —P(S)(R')—, —P(S)(NR')—, —P(R')—, —P(OR')—, —P(SR')—, —P(NR')—, or —[(—O—C(R')$_2$—C(R')$_2$—)$_n$]—.

In some embodiments, L is a covalent bond. In some embodiments, L is a bivalent optionally substituted, linear or branched $C_{1-100}$ aliphatic group wherein one or more methylene units of the group are optionally and independently replaced. In some embodiments, L is a bivalent optionally substituted, linear or branched $C_{6-100}$ arylaliphatic group wherein one or more methylene units of the group are optionally and independently replaced. In some embodiments, L is a bivalent optionally substituted, linear or branched $C_{5-100}$ heteroarylaliphatic group having 1-20 heteroatoms wherein one or more methylene units of the group are optionally and independently replaced. In some embodiments, L is a bivalent optionally substituted, linear or branched $C_{1-100}$ heteroaliphatic group having 1-20 heteroatoms wherein one or more methylene units of the group are optionally and independently replaced.

In some embodiments, a linker moiety (e.g., L) is or comprises one or more polyethylene glycol units. In some embodiments, a linker moiety is or comprises —(CH$_2$CH$_2$O)$_n$—, wherein n is as described in the present disclosure. In some embodiments, one or more methylene units of L are independently replaced with —(CH$_2$CH$_2$O)$_n$—. In some embodiments, n is 1. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10. In some embodiments, n is 11. In some embodiments, n is 12. In some embodiments, n is 13. In some embodiments, n is 14. In some embodiments, n is 15. In some embodiments, n is 16. In some embodiments, n is 17. In some embodiments, n is 18. In some embodiments, n is 19. In some embodiments, n is 20.

In some embodiments, a linker moiety comprises one or more moieties, e.g., amino, carbonyl, etc., that can be utilized for connection with other moieties. In some embodiments, a linker moiety comprises one or more —NR'—, wherein R' is as described in the present disclosure. In some embodiments, —NR'— improves solubility. In some embodiments, —NR'— serves as connection points to another moiety. In some embodiments, R' is —H. In some embodiments, one or more methylene units of L are independently replaced with —NR'—, wherein R' is as described in the present disclosure.

In some embodiments, a linker moiety, e.g., L, comprises a —C(O)— group, which can be utilized for connections with a moiety. In some embodiments, one or more methylene units of L are independently replaced with —C(O)—.

In some embodiments, a linker moiety is or comprises one or more ring moieties, e.g., one or more methylene units of L are replaced with -Cy-. In some embodiments, a linker moiety, e.g., L, comprises an aryl ring. In some embodiments, a linker moiety, e.g., L, comprises an heteroaryl ring. In some embodiments, a linker moiety, e.g., L, comprises an aliphatic ring. In some embodiments, a linker moiety, e.g., L, comprises an heterocyclyl ring. In some embodiments, a linker moiety, e.g., L, comprises a polycyclic ring. In some embodiments, a ring in a linker moiety, e.g., L, is 3-20 membered. In some embodiments, a ring is 5-membered. In some embodiments, a ring is 6-membered. In some embodiments, a ring in a linker is product of a cycloaddition reaction (e.g., click chemistry, and variants thereof) utilized to link different moieties together.

In some embodiments, a linker moiety (e.g., L) is or comprises

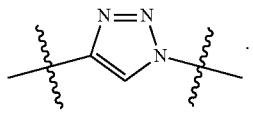 [SMILES: *c1cn(*)nn1]

In some embodiments, a methylene unit of L is replaced with

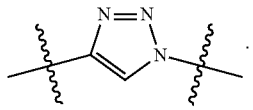 [SMILES: *c1cn(*)nn1]

In some embodiments, -Cy- is

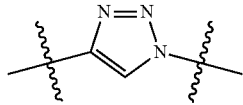 [SMILES: *c1cn(*)nn1]

In some embodiments, a linker moiety is as described in Table 1. Additional linker moiety, for example, include those described for $L^2$. In some embodiments, L is $L^1$ ad present disclosure. In some embodiments, L is $L^2$ as described in the present disclosure. In some embodiments, L is $L^3$ as described in the present disclosure. In some embodiments, L is $L^b$ as described in the present disclosure.

In some embodiments, L is

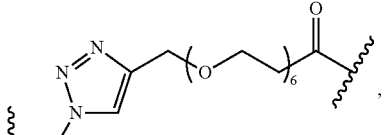

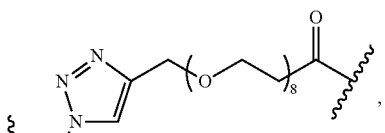

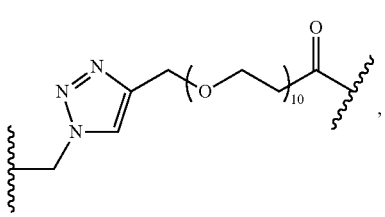

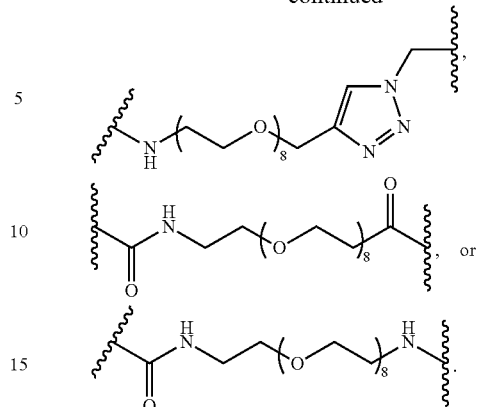

Certain Embodiments of Variables

As examples, exemplary embodiments of variables are described throughout the present disclosure. As appreciated by those skilled in the art, embodiments for different variables may be optionally combined.

As defined above and described herein, ABT is an antibody binding moiety.

In some embodiments, ABT is an antibody binding moiety.

In some embodiments, ABT is selected from those depicted in Table 1, below.

As defined above and described herein, L is a bivalent linker moiety that connects ABT with TBT.

In some embodiments, L is a bivalent linker moiety that connects ABT with TBT.

In some embodiments, L is selected from those depicted in Table 1, below.

As defined above and described herein, TBT is a target binding moiety.

In some embodiments, TBT is a target binding moiety.

In some embodiments, TBT is selected from those depicted in Table 1, below.

As defined above and described herein, each of $R^1$, $R^3$ and $R^5$ is independently hydrogen or an optionally substituted group selected from $C_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur; or: $R^1$ and $R^{1'}$ are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur; $R^3$ and $R^{3'}$ are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur; an $R^5$ group and the $R^{5'}$ group attached to the same carbon atom are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur; or two $R^5$ groups are optionally taken together with their intervening atoms to form a $C_{1-10}$ bivalent straight or branched saturated or unsaturated hydrocarbon chain wherein 1-3 methylene units of the chain are independently and optionally replaced with —S—, —SS—, —N(R)—, —O—, —C(O)—, —OC(O)—, —C(O)O—, —C(O)N(R)—, —N(R)C(O)—, —S(O)—, —S(O)$_2$—, or -Cy$^1$-, wherein each -Cy$^1$- is independently a 5-6 membered heteroarylenyl with 1-4 heteroatoms independently selected from nitrogen, oxygen or sulfur.

In some embodiments, $R^1$ is hydrogen. In some embodiments, $R^1$ is optionally substituted group selected from $C_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur. In some embodiments, $R^1$ is an optionally substituted $C_{1-6}$ aliphatic group. In some embodiments, $R^1$ is an optionally substituted 3-8 membered saturated or partially unsaturated monocyclic carbocyclic ring. In some embodiments, $R^1$ is an optionally substituted phenyl. In some embodiments, $R^1$ is an optionally substituted 8-10 membered bicyclic aromatic carbocyclic ring. In some embodiments, $R^1$ is an optionally substituted 4-8 membered saturated or partially unsaturated monocyclic heterocyclic ring having 1-2 heteroatoms independently selected from nitrogen, oxygen, or sulfur. In some embodiments, $R^1$ is an optionally substituted 5-6 membered monocyclic heteroaromatic ring having 1-4 heteroatoms independently selected from nitrogen, oxygen, or sulfur. In some embodiments, $R^1$ is an optionally substituted 8-10 membered bicyclic heteroaromatic ring having 1-5 heteroatoms independently selected from nitrogen, oxygen, or sulfur.

In some embodiments, $R^1$ is

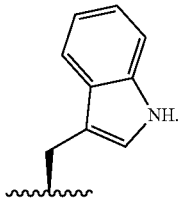

In some embodiments, $R^1$ is

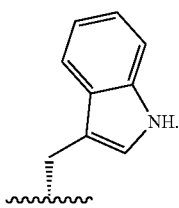

In some embodiments, $R^1$ is

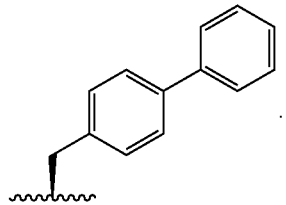

In some embodiments, $R^1$ is

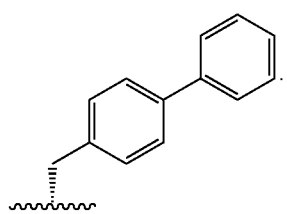

In some embodiments, $R^1$ is

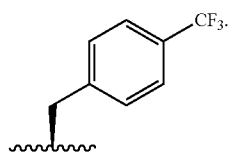

In some embodiments, $R^1$ is

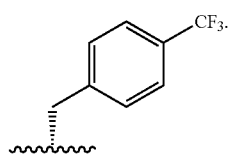

In some embodiments, $R^1$ is

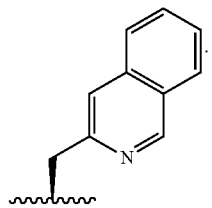

In some embodiments, $R^1$ is

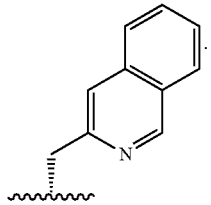

In some embodiments, $R^1$ is

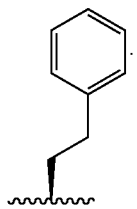

In some embodiments, $R^1$ is

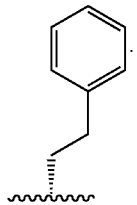

In some embodiments, $R^1$ is

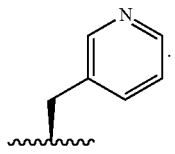

In some embodiments, $R^1$ is

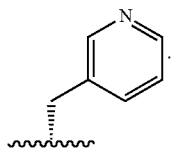

In some embodiments, $R^1$ is

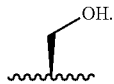

In some embodiments, $R^1$ is

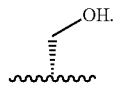

In some embodiments, $R^1$ is

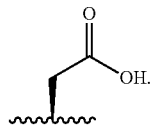

In some embodiments, $R^1$ is

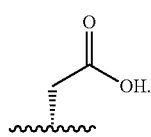

In some embodiments, $R^1$ is

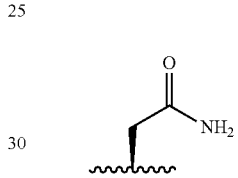

In some embodiments, $R^1$ is

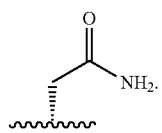

In some embodiments, $R^1$ is

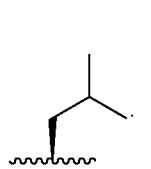

In some embodiments, $R^1$ is

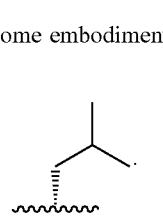

In some embodiments, $R^1$ and $R^{1'}$ are optionally taken together with their intervening carbon atom to form a 3-8 membered saturated or partially unsaturated spirocyclic carbocyclic ring. In some embodiments, $R^1$ and $R^{1'}$ are optionally taken together with their intervening carbon atom to form a 4-8 membered saturated or partially unsaturated spirocyclic heterocyclic ring having 1-2 heteroatoms independently selected from nitrogen, oxygen, or sulfur.

In some embodiments, R¹ is selected from those depicted in Table 1, below.

In some embodiments, R is R¹ as described in the present disclosure. In some embodiments, $R^{a2}$ is R¹ as described in the present disclosure. In some embodiments, $R^{a3}$ is R¹ as described in the present disclosure.

In some embodiments, R³ is hydrogen. In some embodiments, R³ is optionally substituted group selected from $C_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur. In some embodiments, R³ is an optionally substituted $C_{1-6}$ aliphatic group. In some embodiments, R³ is an optionally substituted 3-8 membered saturated or partially unsaturated monocyclic carbocyclic ring. In some embodiments, R³ is an optionally substituted phenyl. In some embodiments, R³ is an optionally substituted 8-10 membered bicyclic aromatic carbocyclic ring. In some embodiments, R³ is an optionally substituted 4-8 membered saturated or partially unsaturated monocyclic heterocyclic ring having 1-2 heteroatoms independently selected from nitrogen, oxygen, or sulfur. In some embodiments, R³ is an optionally substituted 5-6 membered monocyclic heteroaromatic ring having 1-4 heteroatoms independently selected from nitrogen, oxygen, or sulfur. In some embodiments, R³ is an optionally substituted 8-10 membered bicyclic heteroaromatic ring having 1-5 heteroatoms independently selected from nitrogen, oxygen, or sulfur.

In some embodiments, R³ is methyl. In some embodiments, R³ is

In some embodiments, R³ is

In some embodiments, R³ is

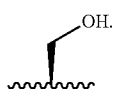

In some embodiments, R³ is

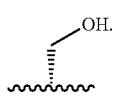

In some embodiments, R³ is

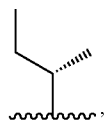 [SMILES: *[C@@H](C)CC]

wherein the site of attachment has (S) stereochemistry. In some embodiments, R³ is

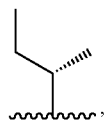 [SMILES: *[C@@H](C)CC]

wherein the site of attachment has (R) stereochemistry. In some embodiments, R³ is

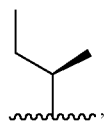 [SMILES: *[C@H](C)CC]

wherein the site of attachment has (S) stereochemistry. In some embodiments, R³ is

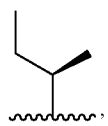 [SMILES: *[C@H](C)CC]

wherein the site of attachment has (R) stereochemistry.
In some embodiments, R³ is

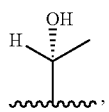

wherein the site of attachment has (S) stereochemistry. In some embodiments, R³ is

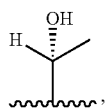

wherein the site of attachment has (R) stereochemistry.

In some embodiments, R³ and $R^{3'}$ are optionally taken together with their intervening carbon atom to form a 3-8 membered saturated or partially unsaturated spirocyclic carbocyclic ring. In some embodiments, R³ and $R^{3'}$ are optionally taken together with their intervening carbon atom to form a 4-8 membered saturated or partially unsaturated spirocyclic heterocyclic ring having 1-2 heteroatoms independently selected from nitrogen, oxygen, or sulfur.

In some embodiments, R³ is selected from those depicted in Table 1, below.

In some embodiments, R is R² as described in the present disclosure. In some embodiments, $R^{a2}$ is R² as described in the present disclosure. In some embodiments, $R^{a3}$ is $R^2$ as described in the present disclosure.

In some embodiments, $R^5$ is hydrogen. In some embodiments, $R^5$ is optionally substituted group selected from $C_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur. In some embodiments, $R^5$ is an optionally substituted $C_{1-6}$ aliphatic group. In some embodiments, $R^5$ is an optionally substituted 3-8 membered saturated or partially unsaturated monocyclic carbocyclic ring. In some embodiments, $R^5$ is an optionally substituted phenyl. In some embodiments, $R^5$ is an optionally substituted 8-10 membered bicyclic aromatic carbocyclic ring. In some embodiments, $R^5$ is an optionally substituted 4-8 membered saturated or partially unsaturated monocyclic heterocyclic ring having 1-2 heteroatoms independently selected from nitrogen, oxygen, or sulfur. In some embodiments, $R^5$ is an optionally substituted 5-6 membered monocyclic heteroaromatic ring having 1-4 heteroatoms independently selected from nitrogen, oxygen, or sulfur. In some embodiments, $R^5$ is an optionally substituted 8-10 membered bicyclic heteroaromatic ring having 1-5 heteroatoms independently selected from nitrogen, oxygen, or sulfur.

In some embodiments, $R^5$ is methyl. In some embodiments, $R^5$ is

In some embodiments, $R^5$ is

In some embodiments, $R^5$ is

In some embodiments, $R^5$ is

In some embodiments, $R^5$ is

In some embodiments, $R^5$ is

In some embodiments, $R^5$ is

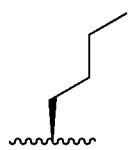

In some embodiments, $R^5$ is

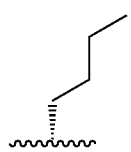

In some embodiments, $R^5$ is

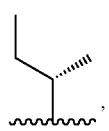 [SMILES: *[C@@H](C)CC]

wherein the site of attachment has (S) stereochemistry. In some embodiments, $R^5$ is

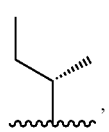

wherein the site of attachment has (R) stereochemistry. In some embodiments, $R^5$ is

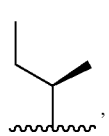 [SMILES: *[C@H](C)CC]

wherein the site of attachment has (S) stereochemistry. In some embodiments, $R^5$ is

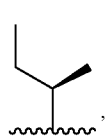

wherein the site of attachment has (R) stereochemistry. In some embodiments, $R^5$ is

In some embodiments, R⁵ is

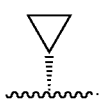

In some embodiments, R⁵ is

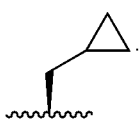

In some embodiments, R⁵ is

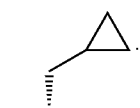

In some embodiments, R⁵ is

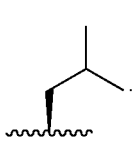

In some embodiments, R⁵ is

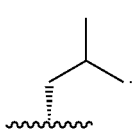

In some embodiments, R⁵ is

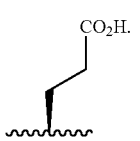

In some embodiments, R⁵ is

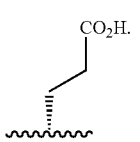

In some embodiments, R⁵ is

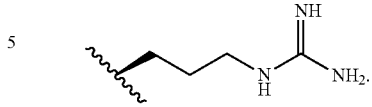

In some embodiments, R⁵ is

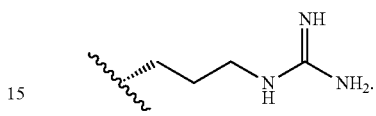

In some embodiments, R⁵ is

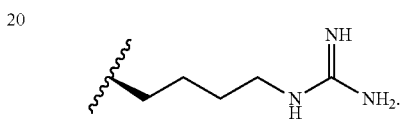

In some embodiments, R⁵ is

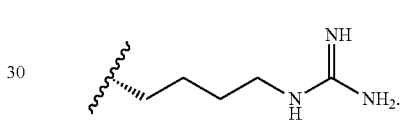

In some embodiments, R⁵ is

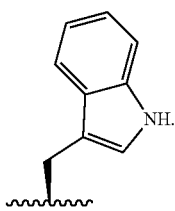

In some embodiments, R⁵ is

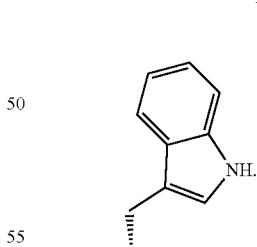

In some embodiments, R⁵ is

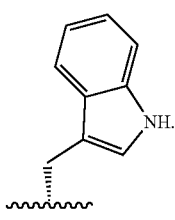

In some embodiments, R⁵ is

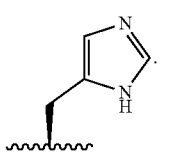

In some embodiments, $R^5$ is

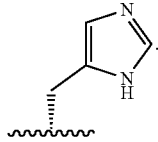

In some embodiments, $R^5$ is

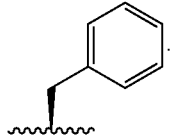

In some embodiments, $R^5$ is

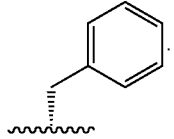

In some embodiments, $R^5$ is

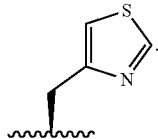

In some embodiments, $R^5$ is

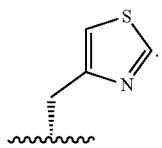

In some embodiments, $R^5$ is

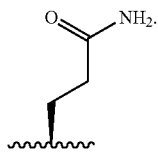

In some embodiments, $R^4$ is

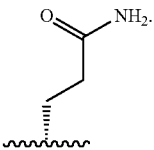

In some embodiments, $R^5$ is

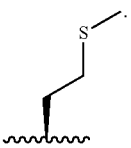

In some embodiments, $R^5$ is

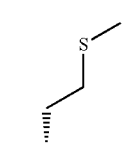

In some embodiments, $R^5$ is

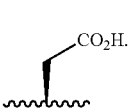

In some embodiments, $R^5$ is

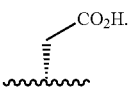

In some embodiments, $R^4$ is

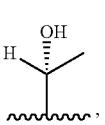

wherein the site of attachment has (S) stereochemistry. In some embodiments, $R^4$ is

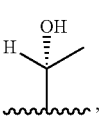

wherein the site of attachment has (R) stereochemistry.

In some embodiments, $R^5$ and the $R^{5'}$ group attached to the same carbon atom are optionally taken together with their intervening carbon atom to form a 3-8 membered saturated or partially unsaturated spirocyclic carbocyclic ring. In some embodiments, $R^5$ and the $R^{5'}$ group attached to the same carbon atom are optionally taken together with their intervening carbon atom to form a 4-8 membered saturated or partially unsaturated spirocyclic heterocyclic ring having 1-2 heteroatoms independently selected from nitrogen, oxygen, or sulfur.

In some embodiments, two $R^5$ groups are taken together with their intervening atoms to form a $C_{1-10}$ bivalent straight or branched saturated or unsaturated hydrocarbon chain wherein 1-3 methylene units of the chain are independently and optionally replaced with —S—, —SS—, —N(R)—, —O—, —C(O)—, —OC(O)—, —C(O)O—, —C(O)N(R)—, —N(R)C(O)—, —S(O)—, —S(O)$_2$—, or -Cy$^1$-, wherein each -Cy$^1$- is independently a 5-6 membered heteroarylenyl with 1-4 heteroatoms independently selected from nitrogen, oxygen or sulfur.

In some embodiments, two $R^5$ groups are taken together with their intervening atoms to form

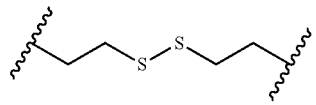

In some embodiments, two $R^5$ groups are taken together with their intervening atoms to form

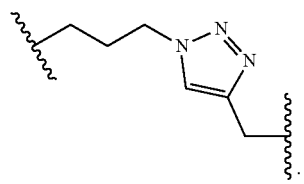 [SMILES: *CCCn1cc(C*)nn1]

In some embodiments, two $R^5$ groups are taken together with their intervening atoms to form

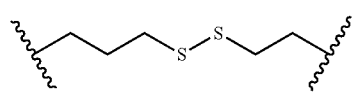

In some embodiments, two $R^5$ groups are taken together with their intervening atoms to form

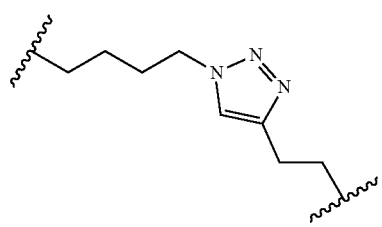

In some embodiments, $R^5$ is selected from those depicted in Table 1, below.

In some embodiments, R is $R^5$ as described in the present disclosure. In some embodiments, $R^{a2}$ is $R^5$ as described in the present disclosure. In some embodiments, $R^{a3}$ is $R^5$ as described in the present disclosure.

As defined above and described herein, each of $R^{1'}$, $R^{3'}$ and $R^{5'}$ is independently hydrogen or $C_{1-3}$ aliphatic.

In some embodiments, $R^{1'}$ is hydrogen. In some embodiments, $R^{1'}$ is $C_{1-3}$ aliphatic.

In some embodiments, $R^{1'}$ is methyl. In some embodiments, $R^{1'}$ is ethyl. In some embodiments, $R^{1'}$ is n-propyl. In some embodiments, $R^{1'}$ is isopropyl. In some embodiments, $R^{1'}$ is cyclopropyl.

In some embodiments, $R^{1'}$ is selected from those depicted in Table 1, below.

In some embodiments, $R^{3'}$ is hydrogen. In some embodiments, $R^{3'}$ is $C_{1-3}$ aliphatic.

In some embodiments, $R^{3'}$ is methyl. In some embodiments, $R^{3'}$ is ethyl. In some embodiments, $R^{3'}$ is n-propyl. In some embodiments, $R^{3'}$ is isopropyl. In some embodiments, $R^{3'}$ is cyclopropyl.

In some embodiments, $R^{3'}$ is selected from those depicted in Table 1, below.

In some embodiments, $R^{5'}$ is hydrogen. In some embodiments, $R^{5'}$ is $C_{1-3}$ aliphatic.

In some embodiments, $R^{5'}$ is methyl. In some embodiments, $R^{5'}$ is ethyl. In some embodiments, $R^{5'}$ is n-propyl. In some embodiments, $R^{5'}$ is isopropyl. In some embodiments, $R^{5'}$ is cyclopropyl.

In some embodiments, $R^{5'}$ is selected from those depicted in Table 1, below.

As defined above and described herein, each of $R^2$, $R^4$ and $R^6$ is independently hydrogen, or $C_{1-4}$ aliphatic, or: $R^2$ and $R^1$ are optionally taken together with their intervening atoms to form a 4-8 membered saturated or partially unsaturated monocyclic heterocyclic ring having 1-2 heteroatoms independently selected from nitrogen, oxygen, or sulfur; $R^4$ and $R^3$ are optionally taken together with their intervening atoms to form a 4-8 membered saturated or partially unsaturated monocyclic heterocyclic ring having 1-2 heteroatoms independently selected from nitrogen, oxygen, or sulfur; or an $R^6$ group and its adjacent $R^5$ group are optionally taken together with their intervening atoms to form a 4-8 membered saturated or partially unsaturated monocyclic heterocyclic ring having 1-2 heteroatoms independently selected from nitrogen, oxygen, or sulfur.

In some embodiments, $R^2$ is hydrogen. In some embodiments, $R^2$ is $C_{1-4}$ aliphatic. In some embodiments, $R^2$ is methyl. In some embodiments, $R^2$ is ethyl. In some embodiments, $R^2$ is n-propyl. In some embodiments, $R^2$ is isopropyl. In some embodiments, $R^2$ is n-butyl. In some embodiments, $R^2$ is isobutyl. In some embodiments, $R^2$ is tert-butyl.

In some embodiments, $R^2$ and $R^1$ are taken together with their intervening atoms to form a 4-8 membered saturated or partially unsaturated monocyclic heterocyclic ring having 1-2 heteroatoms independently selected from nitrogen, oxygen, or sulfur.

In some embodiments, $R^2$ and $R^1$ are taken together with their intervening atoms to form

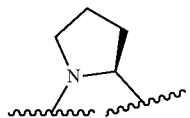

In some embodiments, $R^2$ and $R^1$ are taken together with their intervening atoms to form

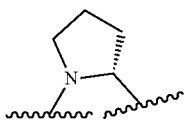

In some embodiments, R² is selected from those depicted in Table 1, below.

In some embodiments, R⁴ is hydrogen. In some embodiments, R⁴ is $C_{1-4}$ aliphatic. In some embodiments, R⁴ is methyl. In some embodiments, R⁴ is ethyl. In some embodiments, R⁴ is n-propyl. In some embodiments, R⁴ is isopropyl. In some embodiments, R⁴ is n-butyl. In some embodiments, R⁴ is isobutyl. In some embodiments, R⁴ is tert-butyl.

In some embodiments, R⁴ and R³ are taken together with their intervening atoms to form a 4-8 membered saturated or partially unsaturated monocyclic heterocyclic ring having 1-2 heteroatoms independently selected from nitrogen, oxygen, or sulfur.

In some embodiments, R⁴ and R³ are taken together with their intervening atoms to form

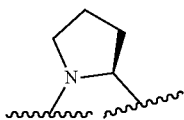

In some embodiments, R⁴ and R³ are taken together with their intervening atoms to form

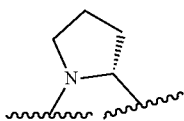

In some embodiments, R⁴ is selected from those depicted in Table 1, below.

In some embodiments, R⁶ is hydrogen. In some embodiments, R⁶ is $C_{1-4}$ aliphatic. In some embodiments, R⁶ is methyl. In some embodiments, R⁶ is ethyl. In some embodiments, R⁶ is n-propyl. In some embodiments, R⁶ is isopropyl. In some embodiments, R⁶ is n-butyl. In some embodiments, R⁶ is isobutyl. In some embodiments, R⁶ is tert-butyl.

In some embodiments, an R⁶ group and its adjacent R⁵ group are taken together with their intervening atoms to form a 4-8 membered saturated or partially unsaturated monocyclic heterocyclic ring having 1-2 heteroatoms independently selected from nitrogen, oxygen, or sulfur.

In some embodiments, an R⁶ group and its adjacent R⁵ group are taken together with their intervening atoms to form

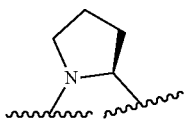

In some embodiments, an R⁶ group and its adjacent R⁵ group are taken together with their intervening atoms to form

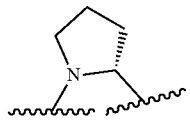

In some embodiments, R⁶ is selected from those depicted in Table 1, below.

In some embodiments, R is $R^{1'}$ as described in the present disclosure. In some embodiments, $R^{a2}$ is $R^{1'}$ as described in the present disclosure. In some embodiments, $R^{a3}$ is $R^{1'}$ as described in the present disclosure. In some embodiments, R is $R^{3'}$ as described in the present disclosure. In some embodiments, $R^{a2}$ is $R^{3'}$ as described in the present disclosure. In some embodiments, $R^{a3}$ is $R^{3'}$ as described in the present disclosure. In some embodiments, R is $R^2$ as described in the present disclosure. In some embodiments, $R^{a2}$ is $R^2$ as described in the present disclosure. In some embodiments, $R^{a3}$ is $R^2$ as described in the present disclosure. In some embodiments, R is $R^4$ as described in the present disclosure. In some embodiments, $R^{a2}$ is $R^4$ as described in the present disclosure. In some embodiments, $R^{a3}$ is $R^4$ as described in the present disclosure. In some embodiments, R is $R^6$ as described in the present disclosure. In some embodiments, $R^{a2}$ is $R^6$ as described in the present disclosure. In some embodiments, $R^{a3}$ is $R^6$ as described in the present disclosure.

As defined above and described herein, $L^1$ is a trivalent linker moiety that connects

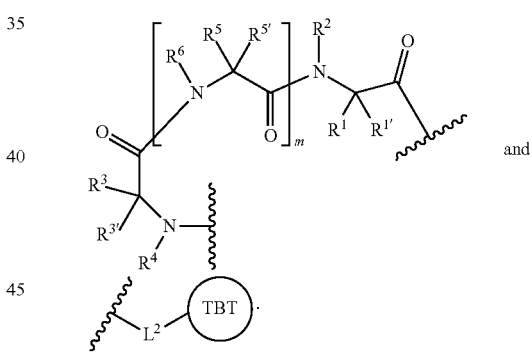 and

In some embodiments, $L^1$ is

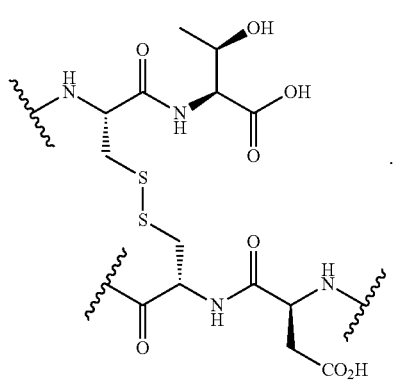 [SMILES: *N[C@@H](CC(=O)O)C(=O)N[C@@H](CSSC[C@H](N*)C(=O)N[C@H](C(=O)O)[C@@H](C)O)C(*)=O]

In some embodiments, L¹ is
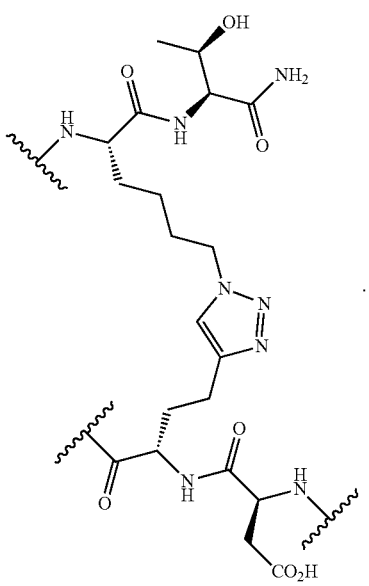 [SMILES: *N[C@@H](CC(=O)O)C(=O)N[C@@H](CCc1cn(CCCC[C@H](N*)C(=O)N[C@H](C(N)=O)[C@@H](C)O)nn1)C(*)=O]
In some embodiments, L¹ is
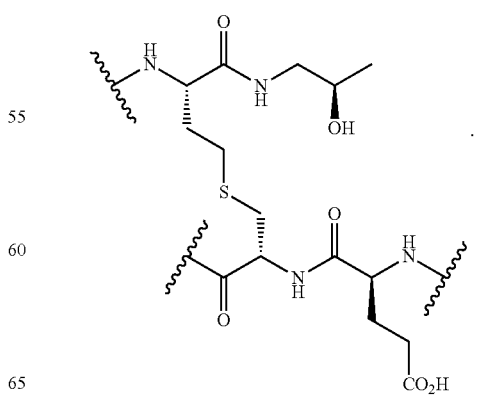
In some embodiments, L¹ is
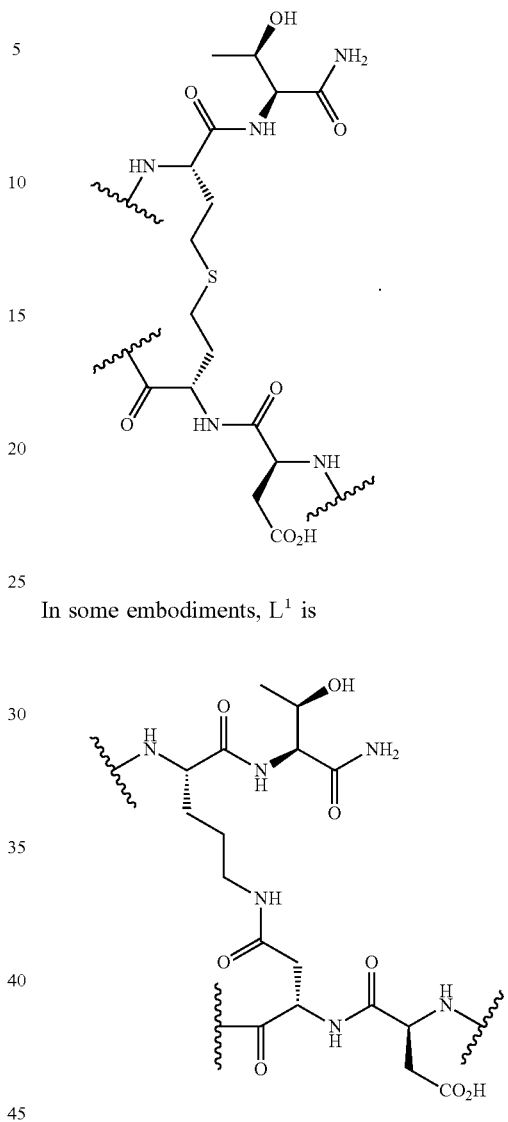
In some embodiments, L¹ is
In some embodiments, L¹ is In some embodiments, $L^1$ is
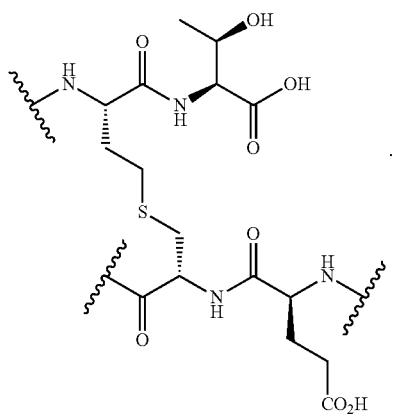 [SMILES: *N[C@@H](CCC(=O)O)C(=O)N[C@@H](CSCC[C@H](N*)C(=O)N[C@H](C(=O)O)[C@@H](C)O)C(*)=O]
In some embodiments, $L^1$ is
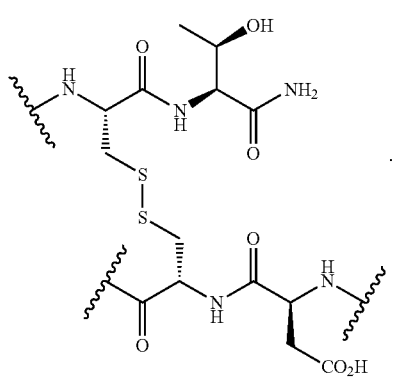 [SMILES: *N[C@@H](CC(=O)O)C(=O)N[C@@H](CSSC[C@H](N*)C(=O)N[C@H](C(N)=O)[C@@H](C)O)C(*)=O]
In some embodiments, $L^1$ is
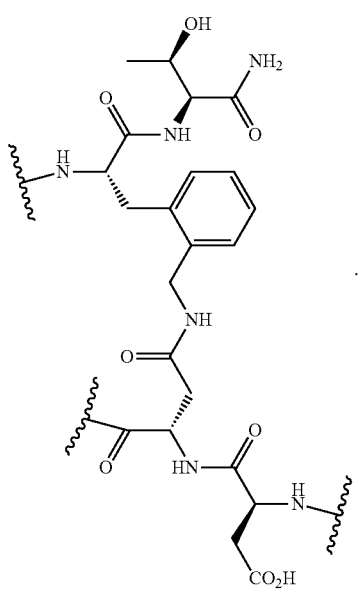 [SMILES: *N[C@@H](CC(=O)O)C(=O)N[C@@H](CC(=O)NCc1ccccc1C[C@H](N*)C(=O)N[C@H](C(N)=O)[C@@H](C)O)C(*)=O]
In some embodiments, $L^1$ is
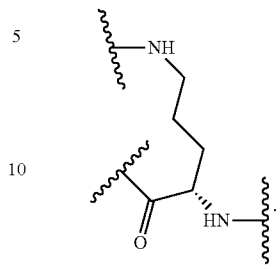
In some embodiments, $L^1$ is
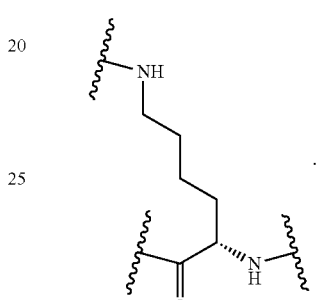
In some embodiments, $L^1$ is
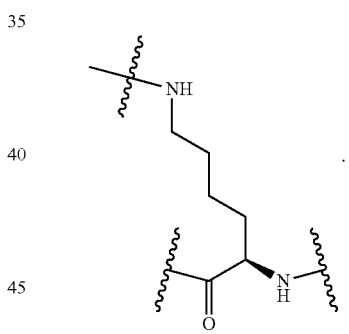
In some embodiments, $L^1$ is
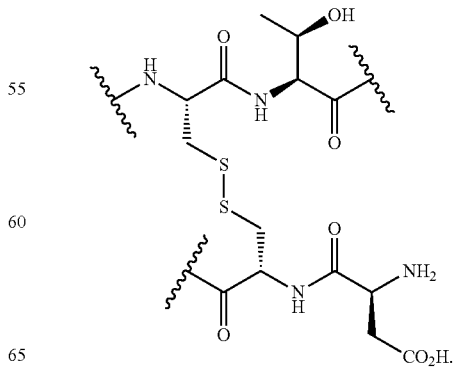

In some embodiments, L¹ is
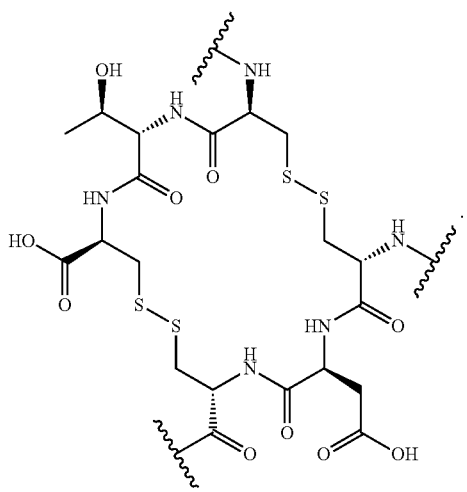 [SMILES: *N[C@H]1CSSC[C@H](N*)C(=O)N[C@@H]([C@@H](C)O)C(=O)N[C@H](C(=O)O)CSSC[C@@H](C(*)=O)NC(=O)[C@H](CC(=O)O)NC1=O]
In some embodiments, L¹ is
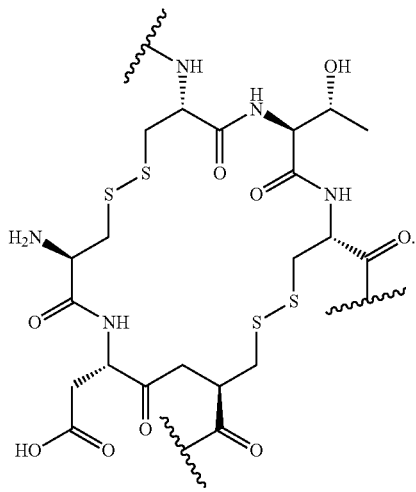 [SMILES: *N[C@H]1CSSC[C@H](N)C(=O)N[C@@H](CC(=O)O)C(=O)C[C@H](C(*)=O)CSSC[C@@H](C(*)=O)NC(=O)[C@H]([C@@H](C)O)NC1=O]
In some embodiments, L¹ is
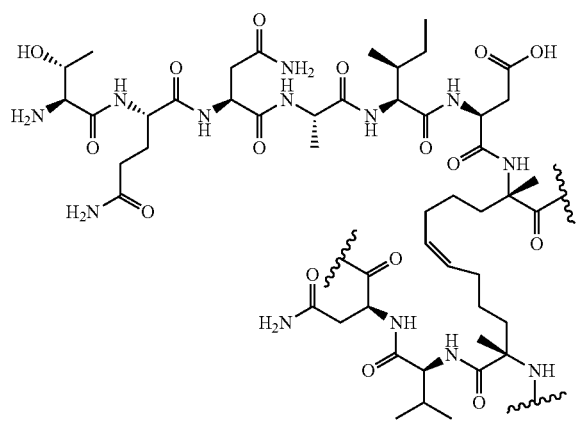
In some embodiments, L¹ is
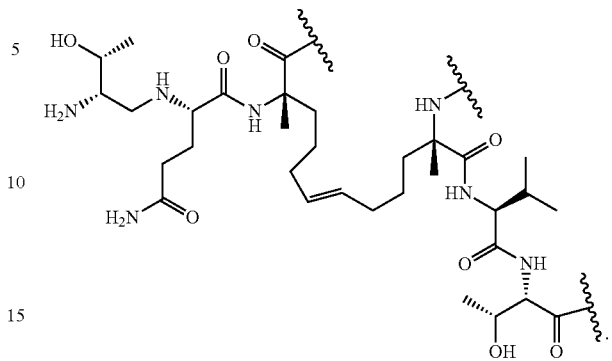
In some embodiments, L¹ is
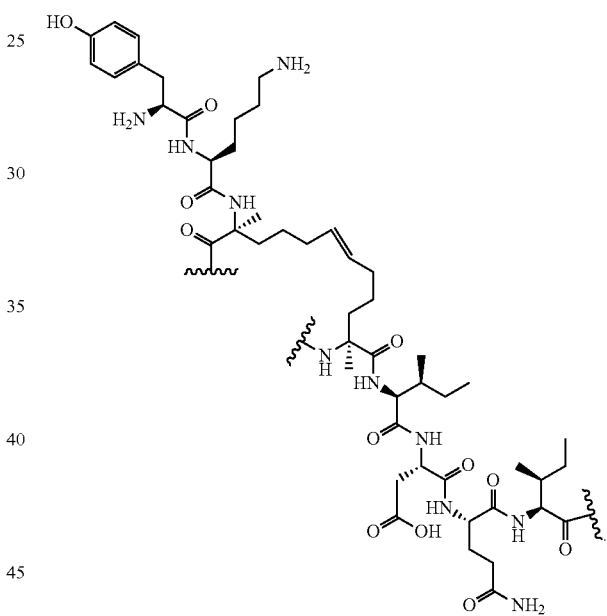
In some embodiments, L¹ is
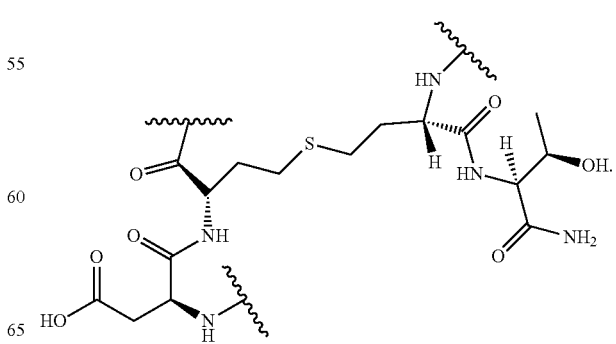

In some embodiments, $L^1$ is

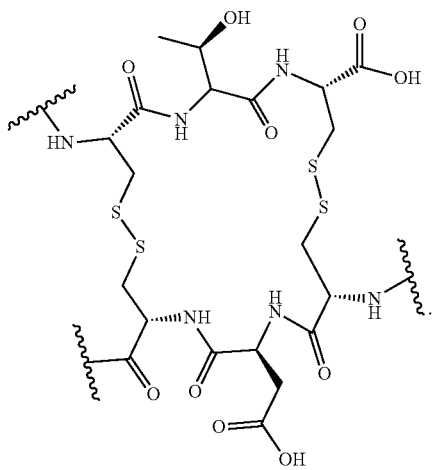 [SMILES: *N[C@H]1CSSC[C@@H](C(*)=O)NC(=O)[C@H](CC(=O)O)NC(=O)[C@@H](N*)CSSC[C@@H](C(=O)O)NC(=O)C([C@@H](C)O)NC1=O]

In some embodiments, $L^1$ is

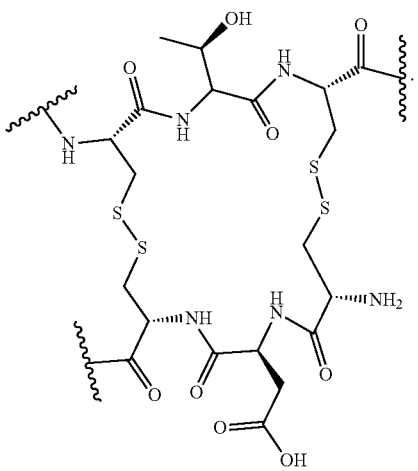 [SMILES: *N[C@H]1CSSC[C@@H](C(*)=O)NC(=O)[C@H](CC(=O)O)NC(=O)[C@@H](N)CSSC[C@@H](C(*)=O)NC(=O)C([C@@H](C)O)NC1=O]

In some embodiments, $L^1$ is

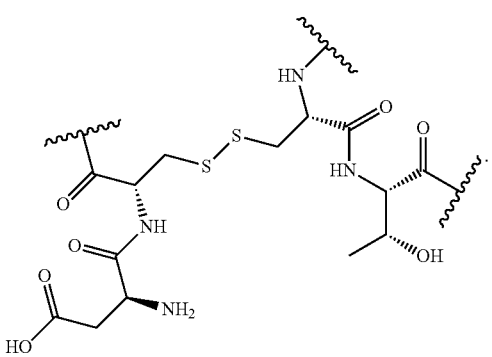 [SMILES: *N[C@@H](CSSC[C@H](NC(=O)[C@@H](N)CC(=O)O)C(*)=O)C(=O)N[C@H](C(*)=O)[C@@H](C)O]

In some embodiments, $L^1$ is selected from those depicted in Table 1, below.

As defined above and described herein, $L^2$ is a covalent bond or a $C_{1-10}$ bivalent straight or branched saturated or unsaturated hydrocarbon chain wherein 1-3 methylene units of the chain are independently and optionally replaced with —S—, —N(R)—, —O—, —C(O)—, —OC(O)—, —C(O)O—, —C(O)N(R)—, —N(R)C(O)—, —S(O)—, —S(O)$_2$—,

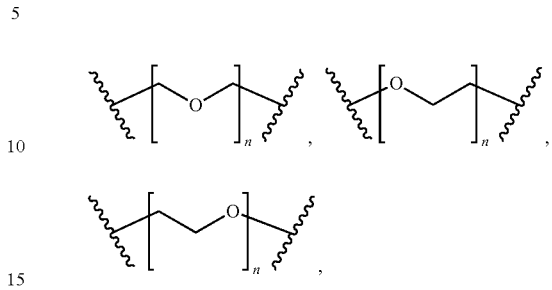

or -Cy$^1$-, wherein each -Cy$^1$- is independently a 5-6 membered heteroarylenyl with 1-4 heteroatoms independently selected from nitrogen, oxygen or sulfur.

In some embodiments, $L^2$ is a covalent bond. In some embodiments, $L^2$ is a $C_{1-10}$ bivalent straight or branched saturated or unsaturated hydrocarbon chain wherein 1-3 methylene units of the chain are independently and optionally replaced with —S—, —N(R)—, —O—, —C(O)—, —OC(O)—, —C(O)O—, —C(O)N(R)—, —N(R)C(O)—, —S(O)—, —S(O)$_2$—,

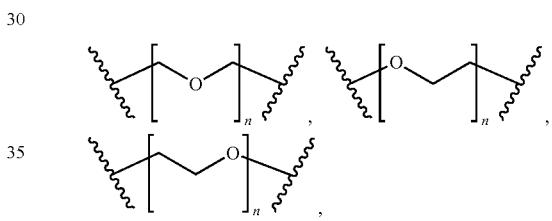

or -Cy$^1$-, wherein each -Cy$^1$- is independently a 5-6 membered heteroarylenyl with 1-4 heteroatoms independently selected from nitrogen, oxygen or sulfur.

In some embodiments, $L^2$ is

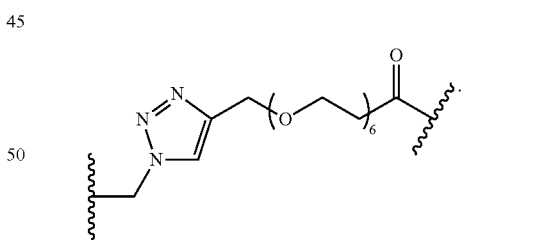

In some embodiments, $L^2$ is

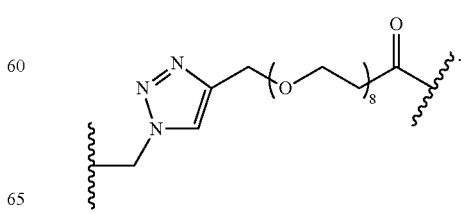

In some embodiments, L² is

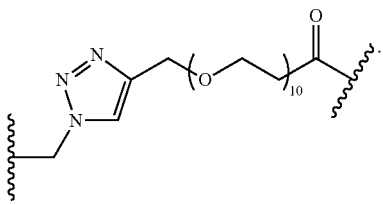

In some embodiments, L² is

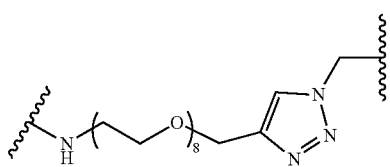

In some embodiments, L² is

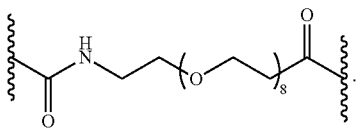

In some embodiments, L² is

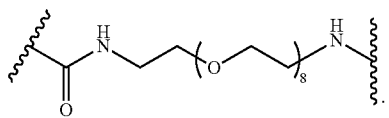

In some embodiments, L² is selected from those depicted in Table 1, below.

In some embodiments, L is L² as described in the present disclosure.

As defined above and described herein, TBT is a target binding moiety.

In some embodiments, TBT is a target binding moiety.

In some embodiments, TBT is

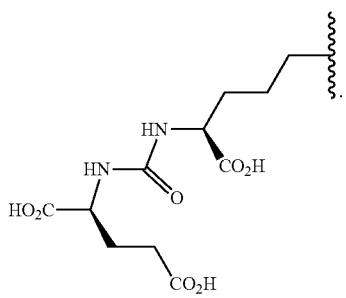 [SMILES: *CCC[C@H](NC(=O)N[C@@H](CCC(=O)O)C(=O)O)C(=O)O]

In some embodiments, TBT is

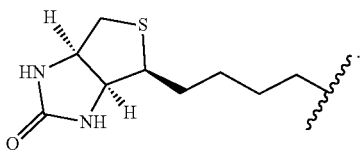 [SMILES: *CCCC[C@@H]1SC[C@@H]2NC(=O)N[C@@H]21]

In some embodiments, TBT is selected from those depicted in Table 1, below.

As defined above and described herein, each of m and n is independently 1, 2, 3, 4, 5, 6, 7, 8, 9, or 10.

In some embodiments, m is 1. In some embodiments, m is 2. In some embodiments, m is 3. In some embodiments, m is 4. In some embodiments, m is 5. In some embodiments, m is 6. In some embodiments, m is 7. In some embodiments, m is 8. In some embodiments, m is 9. In some embodiments, m is 10.

In some embodiments, m is selected from those depicted in Table 1, below.

In some embodiments, n is 1. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10.

In some embodiments, n is selected from those depicted in Table 1, below.

As defined above and described herein, each of $R^7$ is independently hydrogen or an optionally substituted group selected from $C_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur; or: an $R^7$ group and the $R^7$ group attached to the same carbon atom are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur.

In some embodiments, $R^7$ is hydrogen. In some embodiments, $R^7$ is optionally substituted group selected from $C_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur. In some embodiments, $R^7$ is an optionally substituted $C_{1-6}$ aliphatic group. In some embodiments, $R^7$ is an optionally substituted 3-8 membered saturated or partially unsaturated monocyclic carbocyclic ring. In some embodiments, $R^7$ is an optionally substituted phenyl. In some embodiments, $R^7$ is an optionally substituted 8-10 membered bicyclic aromatic carbocyclic ring. In some embodiments, $R^7$ is an optionally substituted 4-8 membered saturated or partially unsaturated monocyclic heterocyclic ring having 1-2 heteroatoms independently selected from nitrogen, oxygen, or sulfur. In some embodiments, $R^7$ is an optionally substituted 5-6 membered monocyclic heteroaromatic ring having 1-4 heteroatoms independently selected from nitrogen, oxygen, or sulfur. In some embodiments, $R^7$ is an optionally substituted 8-10 membered bicyclic heteroaromatic ring having 1-5 heteroatoms independently selected from nitrogen, oxygen, or sulfur.

In some embodiments, $R^7$ is methyl. In some embodiments, $R^7$ is

In some embodiments, $R^7$ is

In some embodiments, $R^7$ is

In some embodiments, $R^7$ is

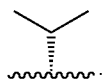

In some embodiments, $R^7$ is

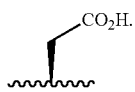

In some embodiments, $R^7$ is

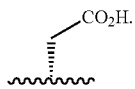

In some embodiments, $R^7$ is

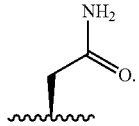

In some embodiments, $R^7$ is

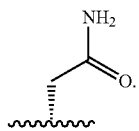

In some embodiments, $R^7$ is

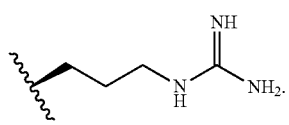

In some embodiments, $R^7$ is

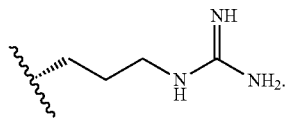

In some embodiments, $R^7$ is

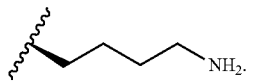

In some embodiments, $R^7$ is

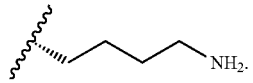

In some embodiments, $R^7$ is

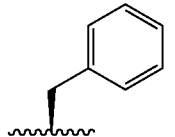

In some embodiments, $R^7$ is

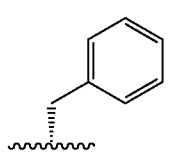

In some embodiments, $R^7$ is

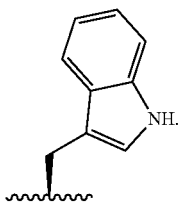

In some embodiments, $R^7$ is

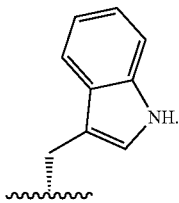

In some embodiments, $R^7$ is

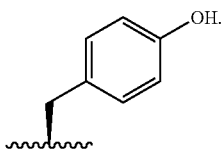

In some embodiments, $R^7$ is

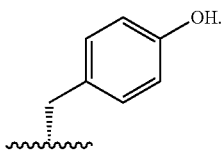

In some embodiments, $R^7$ is

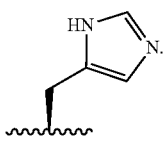

In some embodiments, $R^7$ is

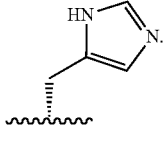

In some embodiments, an $R^7$ group and the $R^{7'}$ group attached to the same carbon atom are taken together with their intervening carbon atom to form a 3-8 membered saturated or partially unsaturated spirocyclic carbocyclic ring. In some embodiments, an $R^7$ group and the $R^{7'}$ group attached to the same carbon atom are taken together with their intervening carbon atom to form a 4-8 membered saturated or partially unsaturated spirocyclic heterocyclic ring having 1-2 heteroatoms independently selected from nitrogen, oxygen, or sulfur.

In some embodiments, $R^7$ is selected from those depicted in Table 1, below.

As defined above and described herein, each of $R^{7'}$ is independently hydrogen or $C_{1-3}$ aliphatic.

In some embodiments, $R^{7'}$ is hydrogen. In some embodiments, $R^{7'}$ is methyl. In some embodiments, $R^{7'}$ is ethyl. In some embodiments, $R^{7'}$ is n-propyl. In some embodiments, $R^{7'}$ is isopropyl.

In some embodiments, $R^{7'}$ is selected from those depicted in Table 1, below.

As defined above and described herein, each of $R^8$ is independently hydrogen, or $C_{1-4}$ aliphatic, or: an $R^8$ group and its adjacent $R^7$ group are optionally taken together with their intervening atoms to form a 4-8 membered saturated or partially unsaturated monocyclic heterocyclic ring having 1-2 heteroatoms independently selected from nitrogen, oxygen, or sulfur.

In some embodiments, $R^8$ is hydrogen. In some embodiments, $R^8$ is $C_{1-4}$ aliphatic. In some embodiments, $R^8$ is methyl. In some embodiments, $R^8$ is ethyl. In some embodiments, $R^8$ is n-propyl. In some embodiments, $R^8$ is isopropyl. In some embodiments, $R^8$ is n-butyl. In some embodiments, $R^8$ is isobutyl. In some embodiments, $R^8$ is tert-butyl.

In some embodiments, an $R^8$ group and its adjacent $R^7$ group are taken together with their intervening atoms to form a 4-8 membered saturated or partially unsaturated monocyclic heterocyclic ring having 1-2 heteroatoms independently selected from nitrogen, oxygen, or sulfur.

In some embodiments, an $R^8$ group and its adjacent $R^7$ group are taken together with their intervening atoms to form

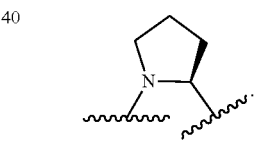

In some embodiments, an $R^8$ group and its adjacent $R^7$ group are taken together with their intervening atoms to form

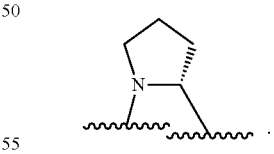

In some embodiments, $R^8$ is selected from those depicted in Table 1, below.

As defined above and described herein, $R^9$ is hydrogen, $C_{1-3}$ aliphatic, or —C(O) $C_{1-3}$ aliphatic.

In some embodiments, $R^9$ is hydrogen. In some embodiments, $R^9$ is $C_{1-3}$ aliphatic. In some embodiments, $R^9$ is —C(O) $C_{1-3}$ aliphatic.

In some embodiments, $R^9$ is methyl. In some embodiments, $R^9$ is ethyl. In some embodiments, $R^9$ is n-propyl. In some embodiments, $R^9$ is isopropyl. In some embodiments, $R^9$ is cyclopropyl.

In some embodiments, R⁹ is —C(O)Me. In some embodiments, R⁹ is —C(O)Et. In some embodiments, R⁹ is —C(O)CH₂CH₂CH₃. In some embodiments, R⁹ is —C(O)CH(CH₃)₂. In some embodiments, R⁹ is —C(O) cyclopropyl.

In some embodiments, R⁹ is selected from those depicted in Table 1, below.

In some embodiments, R is R⁷ as described in the present disclosure. In some embodiments, R^{a2} is R⁷ as described in the present disclosure. In some embodiments, R^{a3} is R⁷ as described in the present disclosure. In some embodiments, R is R⁷ as described in the present disclosure. In some embodiments, R^{a2} is R⁷ as described in the present disclosure. In some embodiments, R^{a3} is R^{7'} as described in the present disclosure. In some embodiments, R is R⁸ as described in the present disclosure. In some embodiments, R^{a2} is R⁸ as described in the present disclosure. In some embodiments, R^{a3} is R⁸ as described in the present disclosure. In some embodiments, R is R^{8'} as described in the present disclosure. In some embodiments, R^{a2} is R^{8'} as described in the present disclosure. In some embodiments, R^{a3} is R^{8'} as described in the present disclosure. In some embodiments, R is R⁹ as described in the present disclosure. In some embodiments, R^{a2} is R⁹ as described in the present disclosure. In some embodiments, R^{a3} is R⁹ as described in the present disclosure.

As defined above and described herein, L³ is a bivalent linker moiety that connects

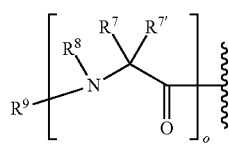

with TBT.

In some embodiments, L³ is a bivalent linker moiety that connects

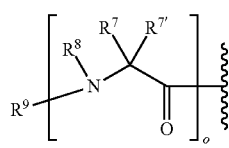

with TBT.

In some embodiments, L³ is

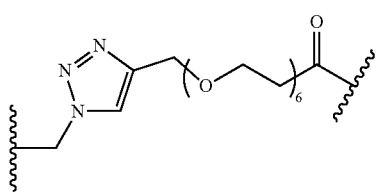

In some embodiments, L³ is

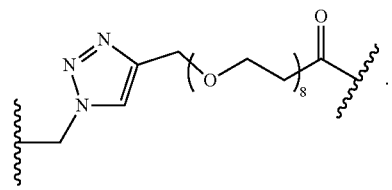

In some embodiments, L³ is

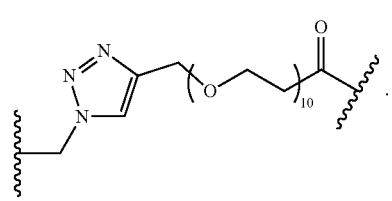

In some embodiments, L³ is

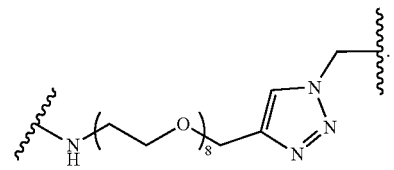

In some embodiments, L³ is

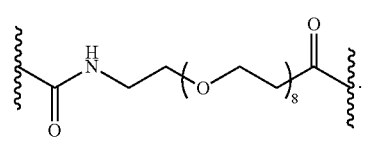

In some embodiments, L³ is

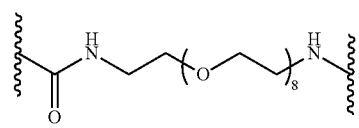

In some embodiments, L³ is selected from those depicted in Table 1, below.

In some embodiments, L is L³ as described in the present disclosure.

As defined above and described herein, o is 1, 2, 3, 4, 5, 6, 7, 8, 9, or 10.

In some embodiments, o is 1. In some embodiments, o is 2. In some embodiments, o is 3. In some embodiments, o is 4. In some embodiments, o is 5. In some embodiments, o is 6. In some embodiments, o is 7. In some embodiments, o is 8. In some embodiments, o is 9. In some embodiments, o is 10.

In some embodiments, o is selected from those depicted in Table 1, below.

In certain embodiments, a useful agent, e.g., an ARM, is a compound of formula II, wherein $L^2$ is

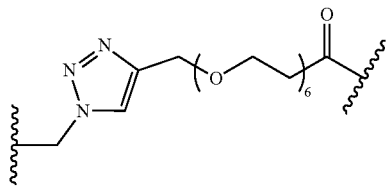

and TBT is

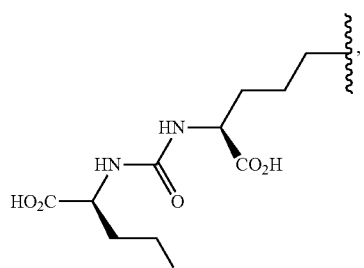

thereby forming a compound of formula II-a:

or a pharmaceutically acceptable salt thereof, wherein each of $L^1$, $R^1$, $R^{1'}$, $R^2$, $R^3$, $R^{3'}$, $R^4$, $R^5$, $R^{5'}$, $R^6$, and m is as defined above and described in embodiments herein, both singly and in combination.

In certain embodiments, a useful agent, e.g., an ARM, is a compound of formula II, wherein $L^2$ is

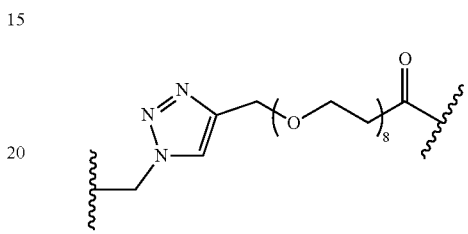

and TBT is

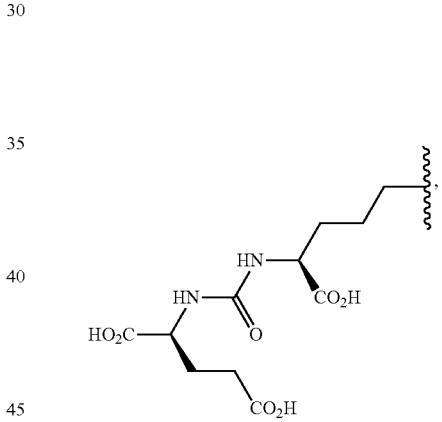

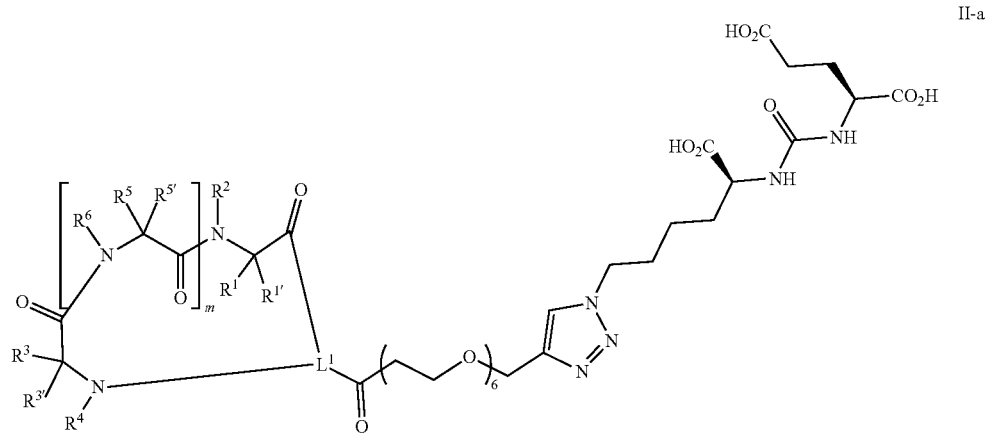

II-a thereby forming a compound of formula II-b:

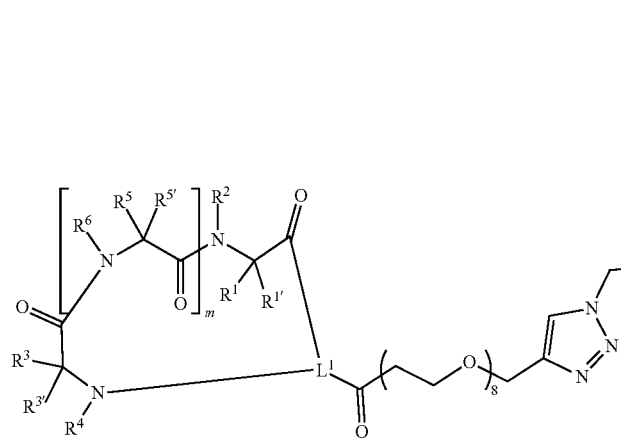

or a pharmaceutically acceptable salt thereof, wherein each of $L^1$, $R^1$, $R^{1'}$, $R^2$, $R^3$, $R^{3'}$, $R^4$, $R^5$, $R^{5'}$, $R^6$, and $m$ is as defined above and described in embodiments herein, both singly and in combination.

In certain embodiments, a useful agent, e.g., an ARM, is a compound of formula II, wherein $L^2$ is

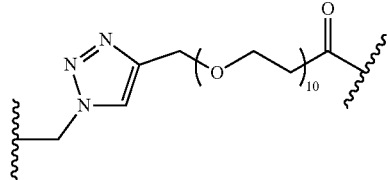

and TBT is

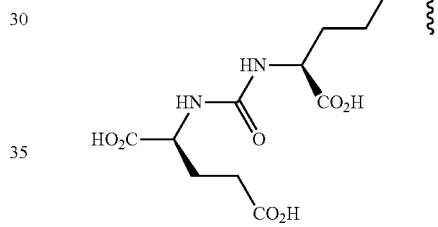

thereby forming a compound of formula II-c:

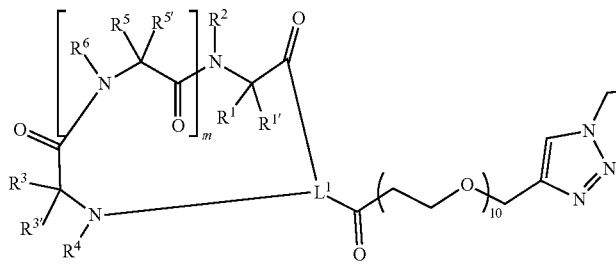

or a pharmaceutically acceptable salt thereof, wherein each of $L^1$, $R^1$, $R^{1'}$, $R^2$, $R^3$, $R^{3'}$, $R^4$, $R^5$, $R^{5'}$, $R^6$, and $m$ is as defined above and described in embodiments herein, both singly and in combination.

In certain embodiments, a useful agent, e.g., an ARM, is a compound of formula II, wherein $L^2$ is

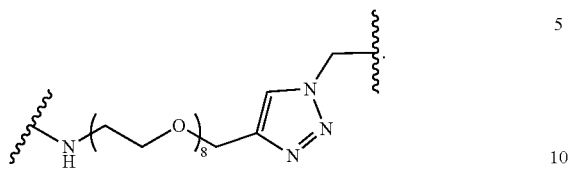

and TBT is

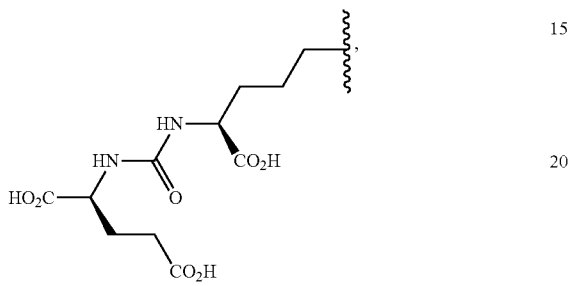

thereby forming a compound of formula II-d:

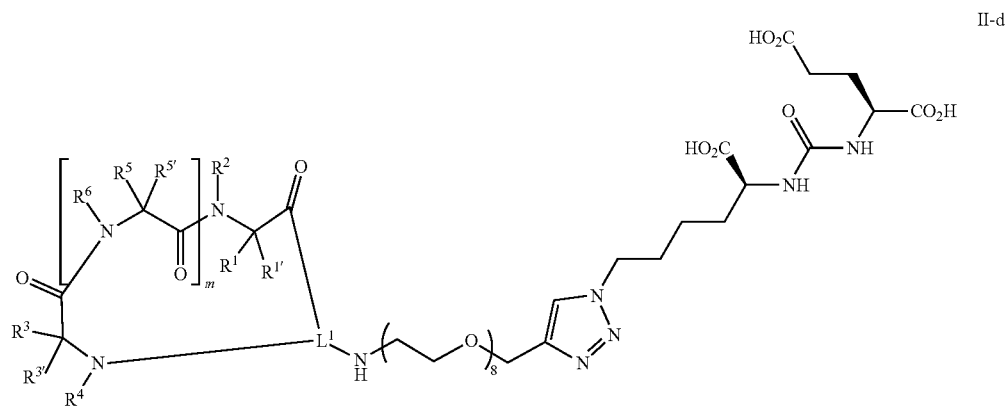

or a pharmaceutically acceptable salt thereof, wherein each of $L^1$, $R^1$, $R^{1'}$, $R^2$, $R^3$, $R^{3'}$, $R^4$, $R^5$, $R^{5'}$, $R^6$, and m is as defined above and described in embodiments herein, both singly and in combination.

In certain embodiments, a useful agent, e.g., an ARM, is a compound of formula II, wherein $L^2$ is

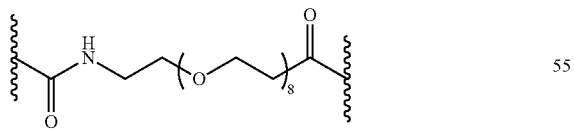

and TBT is

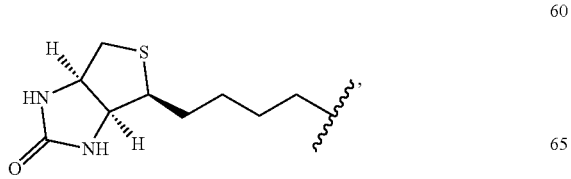

thereby forming a compound of formula II-e:

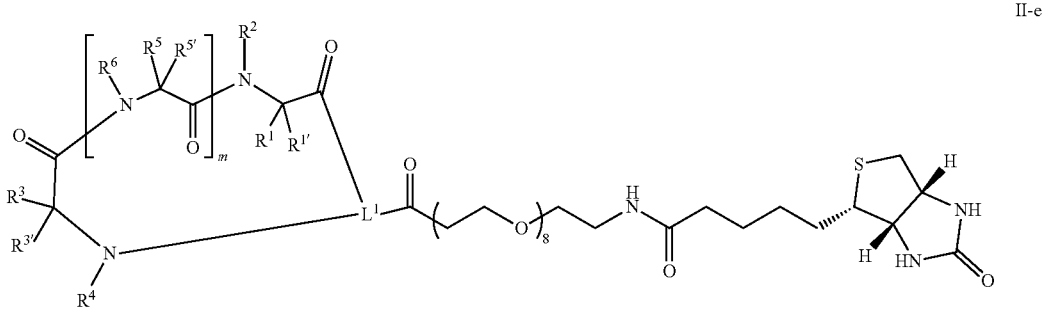

II-e or a pharmaceutically acceptable salt thereof, wherein each of $L^1$, $R^1$, $R^{1'}$, $R^2$, $R^3$, $R^{3'}$, $R^4$, $R^5$, $R^{5'}$, $R^6$, and m is as defined above and described in embodiments herein, both singly and in combination.

In certain embodiments, a useful agent, e.g., an ARM, is a compound of formula II, wherein $L^2$ is

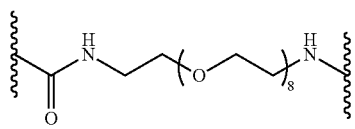

and TBT is

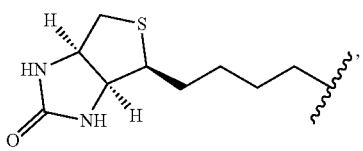 [SMILES: *CCCC[C@@H]1SC[C@@H]2NC(=O)N[C@@H]21]

thereby forming a compound of formula II-f:

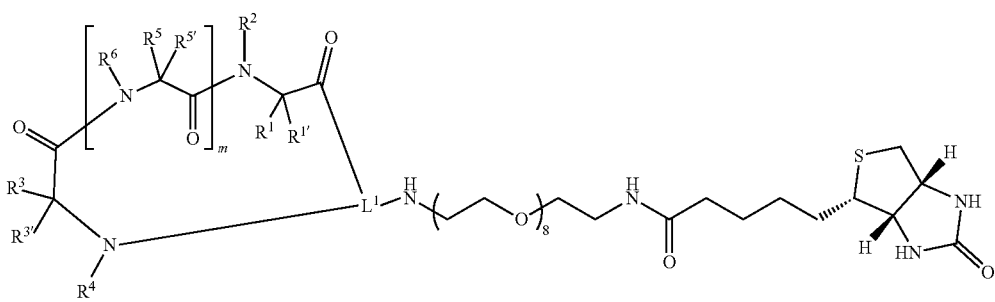

II-f or a pharmaceutically acceptable salt thereof, wherein each of $L^1$, $R^1$, $R^{1'}$, $R^2$, $R^3$, $R^{3'}$, $R^4$, $R^5$, $R^{5'}$, $R^6$, and m is as defined above and described in embodiments herein, both singly and in combination.

In some embodiments, $R^{a1}$ is R as described in the present disclosure. In some embodiments, $R^{a1}$ is optionally substituted $C_{1-4}$ aliphatic.

In some embodiments, $L^{a1}$ is $L^a$ as described in the present disclosure. In some embodiments, $L^{a1}$ is a covalent bond.

In some embodiments, $L^{a2}$ is $L^a$ as described in the present disclosure. In some embodiments, $L^{a2}$ is a covalent bond.

In some embodiments, $L^a$ is a covalent bond. In some embodiments, $L^a$ is an optionally substituted bivalent group selected $C_1$-$C_{10}$ aliphatic or $C_1$-$C_{10}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—. In some embodiments, $L^a$ is an optionally substituted bivalent group selected $C_1$-$C_5$ aliphatic or $C_1$-$C_5$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—. In some embodiments, $L^a$ is an optionally substituted bivalent $C_1$-$C_5$ aliphatic, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R'), —N(R')C(O)N(R')—, —N(R')C(O)O—, —S(O)—, —S(O)$_2$—, —S(O)$_2$N(R')—, —C(O)S—, or —C(O)O—. In some embodiments, $L^a$ is an optionally substituted bivalent $C_1$-$C_5$ aliphatic. In some embodiments, $L^a$ is an optionally substituted bivalent $C_1$-$C_5$ heteroaliphatic having 1-3 heteroatoms independently selected from nitrogen, oxygen and sulfur.

In some embodiments, $R^{a2}$ is R as described in the present disclosure. In some embodiments, $R^{a2}$ is a side chain of a natural amino acid. In some embodiments, $R^{a3}$ is R as described in the present disclosure. In some embodiments, $R^{a3}$ is a side chain of a natural amino acid. In some embodiments, one of $R^{2a}$ and $R^{3a}$ is hydrogen.

In some embodiments, each -Cy- is independently an optionally substituted bivalent group selected from a $C_{3-20}$ cycloaliphatic ring, a $C_{6-20}$ aryl ring, a 5-20 membered heteroaryl ring having 1-10 heteroatoms independently selected from oxygen, nitrogen, sulfur, phosphorus and silicon, and a 3-20 membered heterocyclyl ring having 1-10 heteroatoms independently selected from oxygen, nitrogen, sulfur, phosphorus and silicon. In some embodiments, -Cy- is an optionally substituted ring as described in the present disclosure, for example, for R and $Cy^L$, but is bivalent.

In some embodiments, -Cy- is monocyclic. In some embodiments, Cy- is bicyclic. In some embodiments, -Cy- is polycyclic. In some embodiments, -Cy- is saturated. In some embodiments, -Cy- is partially unsaturated. In some embodiments, -Cy- is aromatic. In some embodiments, -Cy- comprises a saturated cyclic moiety. In some embodiments, -Cy-comprises a partially unsaturated cyclic moiety. In some embodiments, -Cy- comprises an aromatic cyclic moiety. In some embodiments, -Cy- comprises a combination of a saturated, a partially unsaturated, and/or an aromatic cyclic moiety. In some embodiments, -Cy- is 3-membered. In some embodiments, -Cy- is 4-membered. In some embodiments, -Cy- is 5-membered. In some embodiments, -Cy- is 6-membered. In some embodiments, -Cy- is 7-membered. In some embodiments, -Cy- is 8-membered. In some embodiments, -Cy- is 9-membered. In some embodiments, -Cy- is 10-membered. In some embodiments, -Cy- is 11-membered. In some embodiments, -Cy- is 12-membered. In some embodiments, -Cy- is 13-membered. In some embodiments, -Cy- is 14-membered. In some embodiments, -Cy- is 15-membered. In some embodiments, -Cy- is 16-membered. In some embodiments, -Cy- is 17-membered. In some embodiments, -Cy- is 18-membered. In some embodiments, -Cy- is 19-membered. In some embodiments, -Cy- is 20-membered.

In some embodiments, -Cy- is an optionally substituted bivalent $C_{3-20}$ cycloaliphatic ring. In some embodiments, -Cy- is an optionally substituted bivalent, saturated $C_{3-20}$ cycloaliphatic ring. In some embodiments, -Cy- is an optionally substituted bivalent, partially unsaturated $C_{3-20}$ cycloaliphatic ring. In some embodiments, -Cy-His optionally substituted cycloaliphatic as described in the present disclosure, for example, cycloaliphatic embodiments for R.

In some embodiments, -Cy- is an optionally substituted $C_{6-20}$ aryl ring. In some embodiments, -Cy- is optionally substituted phenylene. In some embodiments, Cy- is optionally substituted 1,2-phenylene. In some embodiments, -Cy- is optionally substituted 1,3-phenylene. In some embodiments, -Cy- is optionally substituted 1,4-phenylene. In some embodiments, -Cy- is an optionally substituted bivalent naphthalene ring. In some embodiments, -Cy-His optionally substituted aryl as described in the present disclosure, for example, aryl embodiments for R.

In some embodiments, -Cy- is an optionally substituted bivalent 5-20 membered heteroaryl ring having 1-10 heteroatoms independently selected from oxygen, nitrogen, sulfur, phosphorus and silicon. In some embodiments, -Cy- is an optionally substituted bivalent 5-20 membered heteroaryl ring having 1-10 heteroatoms independently selected from oxygen, nitrogen, and sulfur. In some embodiments, -Cy- is an optionally substituted bivalent 5-6 membered heteroaryl ring having 1-4 heteroatoms independently selected from oxygen, nitrogen, sulfur. In some embodiments, -Cy- is an optionally substituted bivalent 5-6 membered heteroaryl ring having 1-3 heteroatoms independently selected from oxygen, nitrogen, sulfur. In some embodiments, -Cy- is an optionally substituted bivalent 5-6 membered heteroaryl ring having 1-2 heteroatoms independently selected from oxygen, nitrogen, sulfur. In some embodiments, -Cy- is an optionally substituted bivalent 5-6 membered heteroaryl ring having one heteroatom independently selected from oxygen, nitrogen, sulfur. In some embodiments, -Cy- His optionally substituted heteroaryl as described in the present disclosure, for example, heteroaryl embodiments for R. In some embodiments, -Cy- is

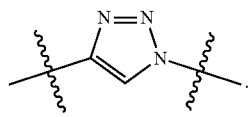 [SMILES: *c1cn(*)nn1]

In some embodiments, -Cy- is an optionally substituted bivalent 3-20 membered heterocyclyl ring having 1-10 heteroatoms independently selected from oxygen, nitrogen, sulfur, phosphorus and silicon. In some embodiments, -Cy- is an optionally substituted bivalent 3-20 membered heterocyclyl ring having 1-10 heteroatoms independently selected from oxygen, nitrogen, and sulfur. In some embodiments, -Cy- is an optionally substituted bivalent 3-6 membered heterocyclyl ring having 1-4 heteroatoms independently selected from oxygen, nitrogen, sulfur. In some embodiments, -Cy- is an optionally substituted bivalent 5-6 membered heterocyclyl ring having 1-4 heteroatoms independently selected from oxygen, nitrogen, sulfur. In some embodiments, -Cy- is an optionally substituted bivalent 5-6 membered heterocyclyl ring having 1-3 heteroatoms independently selected from oxygen, nitrogen, sulfur. In some embodiments, -Cy- is an optionally substituted bivalent 5-6 membered heterocyclyl ring having 1-2 heteroatoms independently selected from oxygen, nitrogen, sulfur. In some embodiments, -Cy- is an optionally substituted bivalent 5-6 membered heterocyclyl ring having one heteroatom independently selected from oxygen, nitrogen, sulfur. In some embodiments, -Cy- is an optionally substituted saturated bivalent heterocyclyl group. In some embodiments, Cy- is an optionally substituted partially unsaturated bivalent heterocyclyl group. In some embodiments, Cy-His optionally substituted heterocyclyl as described in the present disclosure, for example, heterocyclyl embodiments for R.

In some embodiments, each Xaa is independently an amino acid residue. In some embodiments, each Xaa is independently an amino acid residue of an amino acid of formula A-I.

In some embodiments, t is 0. In some embodiments, t is 1-50. In some embodiments, t is z as described in the present disclosure.

In some embodiments, z is 1. In some embodiments, z is 2. In some embodiments, z is 3. In some embodiments, z is 4. In some embodiments, z is 5. In some embodiments, z is 6. In some embodiments, z is 7. In some embodiments, z is 8. In some embodiments, z is 9. In some embodiments, z is 10. In some embodiments, z is 11. In some embodiments, z is 12. In some embodiments, z is 13. In some embodiments, z is 14. In some embodiments, z is 15. In some embodiments, z is 16. In some embodiments, z is 17. In some embodiments, z is 18. In some embodiments, z is 19. In some embodiments, z is 20. In some embodiments, z is greater than 20.

In some embodiments, $R^c$ is R' as described in the present disclosure. In some embodiments, $R^c$ is R as described in the present disclosure. In some embodiments, $R^c$ is —N(R')$_2$, wherein each R' is independently as described in the present disclosure. In some embodiments, $R^c$ is —NH$_2$. In some embodiments, $R^c$ is R—C(O)—, wherein R is as described in the present disclosure.

In some embodiments, a is 1. In some embodiments, a is 2-100. In some embodiments, a is 5. In some embodiments, a is 10. In some embodiments, a is 20. In some embodiments, a is 50.

In some embodiments, b is 1. In some embodiments, b is 2-100. In some embodiments, b is 5. In some embodiments, b is 10. In some embodiments, b is 20. In some embodiments, b is 50.

In some embodiments, a1 is 0. In some embodiments, a1 is 1.

In some embodiments, a2 is 0. In some embodiments, a2 is 1.

In some embodiments, $L^b$ is $L^a$ as described in the present disclosure. In some embodiments, $L^b$ comprises -Cy-. In some embodiments, $L^b$ comprises a double bond. In some embodiments, $L^b$ comprises —S—. In some embodiments, $L^b$ comprises —S—S—. In some embodiments, $L^b$ comprises —C(O)—N(R')—.

In some embodiments, R' is —R, —C(O)R, —C(O)OR, or —S(O)$_2$R, wherein R is as described in the present disclosure. In some embodiments, R' is R, wherein R is as described in the present disclosure. In some embodiments, R' is —C(O)R, wherein R is as described in the present disclosure. In some embodiments, R' is —C(O)OR, wherein R is as described in the present disclosure. In some embodiments, R' is —S(O)$_2$R, wherein R is as described in the present disclosure. In some embodiments, R' is hydrogen. In some embodiments, R' is not hydrogen. In some embodiments, R' is R, wherein R is optionally substituted C$_{1-20}$ aliphatic as described in the present disclosure. In some embodiments, R' is R, wherein R is optionally substituted C$_{1-20}$ heteroaliphatic as described in the present disclosure. In some embodiments, R' is R, wherein R is optionally substituted C$_{6-20}$ aryl as described in the present disclosure. In some embodiments, R' is R, wherein R is optionally substituted C$_{6-20}$ arylaliphatic as described in the present disclosure. In some embodiments, R' is R, wherein R is optionally substituted C$_{6-20}$ arylheteroaliphatic as described in the present disclosure. In some embodiments, R' is R, wherein R is optionally substituted 5-20 membered heteroaryl as described in the present disclosure. In some embodiments, R' is R, wherein R is optionally substituted 3-20 membered heterocyclyl as described in the present disclosure. In some embodiments, two or more R' are R, and are optionally and independently taken together to form an optionally substituted ring as described in the present disclosure.

In some embodiments, each R is independently —H, or an optionally substituted group selected from C$_{1-30}$ aliphatic, C$_{1-30}$ heteroaliphatic having 1-10 heteroatoms independently selected from oxygen, nitrogen, sulfur, phosphorus and silicon, C$_{6-30}$ aryl, C$_{6-30}$ arylaliphatic, C$_{6-30}$ arylheteroaliphatic having 1-10 heteroatoms independently selected from oxygen, nitrogen, sulfur, phosphorus and silicon, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon, or two R groups are optionally and independently taken together to form a covalent bond, or:

two or more R groups on the same atom are optionally and independently taken together with the atom to form an optionally substituted, 3-30 membered, monocyclic, bicyclic or polycyclic ring having, in addition to the atom, 0-10 heteroatoms independently selected from oxygen, nitrogen, sulfur, phosphorus and silicon; or two or more R groups on two or more atoms are optionally and independently taken together with their intervening atoms to form an optionally substituted, 3-30 membered, monocyclic, bicyclic or polycyclic ring having, in addition to the intervening atoms, 0-10 heteroatoms independently selected from oxygen, nitrogen, sulfur, phosphorus and silicon.

In some embodiments, each R is independently —H, or an optionally substituted group selected from C$_{1-30}$ aliphatic, C$_{1-30}$ heteroaliphatic having 1-10 heteroatoms independently selected from oxygen, nitrogen, sulfur, phosphorus and silicon, C$_{6-30}$ aryl, C$_{6-30}$ arylaliphatic, C$_{6}$-30 arylheteroaliphatic having 1-10 heteroatoms independently selected from oxygen, nitrogen, sulfur, phosphorus and silicon, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon, or two R groups are optionally and independently taken together to form a covalent bond, or:

two or more R groups on the same atom are optionally and independently taken together with the atom to form an optionally substituted, 3-30 membered, monocyclic, bicyclic or polycyclic ring having, in addition to the atom, 0-10 heteroatoms independently selected from oxygen, nitrogen, sulfur, phosphorus and silicon.

two or more R groups on two or more atoms are optionally and independently taken together with their intervening atoms to form an optionally substituted, 3-30 membered, monocyclic, bicyclic or polycyclic ring having, in addition to the intervening atoms, 0-10 heteroatoms independently selected from oxygen, nitrogen, sulfur, phosphorus and silicon.

In some embodiments, each R is independently —H, or an optionally substituted group selected from C$_{1-20}$ aliphatic, C$_{1-20}$ heteroaliphatic having 1-10 heteroatoms independently selected from oxygen, nitrogen, sulfur, phosphorus and silicon, C$_{6-20}$ aryl, C$_{6-20}$ arylaliphatic, C$_{6-20}$ arylheteroaliphatic having 1-10 heteroatoms independently selected from oxygen, nitrogen, sulfur, phosphorus and silicon, 5-20 membered heteroaryl having 1-10 heteroatoms independently selected from oxygen, nitrogen, sulfur, phosphorus and silicon, and 3-20 membered heterocyclyl having 1-10 heteroatoms independently selected from oxygen, nitrogen, sulfur, phosphorus and silicon, or two R groups are optionally and independently taken together to form a covalent bond, or:

two or more R groups on the same atom are optionally and independently taken together with the atom to form an optionally substituted, 3-20 membered monocyclic, bicyclic or polycyclic ring having, in addition to the atom, 0-10 heteroatoms independently selected from oxygen, nitrogen, sulfur, phosphorus and silicon.

two or more R groups on two or more atoms are optionally and independently taken together with their intervening atoms to form an optionally substituted, 3-20 membered monocyclic, bicyclic or polycyclic ring having, in addition to the intervening atoms, 0-10 heteroatoms independently selected from oxygen, nitrogen, sulfur, phosphorus and silicon.

In some embodiments, each R is independently —H, or an optionally substituted group selected from $C_{1-30}$ aliphatic, $C_{1-30}$ heteroaliphatic having 1-10 heteroatoms independently selected from oxygen, nitrogen, sulfur, phosphorus and silicon, $C_{6-30}$ aryl, $C_{6-30}$ arylaliphatic, $C_{6-30}$ arylheteroaliphatic having 1-10 heteroatoms independently selected from oxygen, nitrogen, sulfur, phosphorus and silicon, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon.

In some embodiments, each R is independently —H, or an optionally substituted group selected from $C_{1-20}$ aliphatic, $C_{1-20}$ heteroaliphatic having 1-10 heteroatoms independently selected from oxygen, nitrogen, sulfur, phosphorus and silicon, $C_{6-20}$ aryl, $C_{6-20}$ arylaliphatic, $C_{6-20}$ arylheteroaliphatic having 1-10 heteroatoms independently selected from oxygen, nitrogen, sulfur, phosphorus and silicon, 5-20 membered heteroaryl having 1-10 heteroatoms independently selected from oxygen, nitrogen, sulfur, phosphorus and silicon, and 3-20 membered heterocyclyl having 1-10 heteroatoms independently selected from oxygen, nitrogen, sulfur, phosphorus and silicon.

In some embodiments, R is hydrogen. In some embodiments, R is not hydrogen. In some embodiments, R is an optionally substituted group selected from $C_{1-30}$ aliphatic, $C_{1-30}$ heteroaliphatic having 1-10 heteroatoms independently selected from oxygen, nitrogen, sulfur, phosphorus and silicon, $C_{6-30}$ aryl, a 5-30 membered heteroaryl ring having 1-10 heteroatoms independently selected from oxygen, nitrogen, sulfur, phosphorus and silicon, and a 3-30 membered heterocyclic ring having 1-10 heteroatoms independently selected from oxygen, nitrogen, sulfur, phosphorus and silicon.

In some embodiments, R is hydrogen or an optionally substituted group selected from $C_{1-20}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, and sulfur, a 4-7 membered saturated or partially unsaturated heterocyclic ring having 1-3 heteroatoms independently selected from nitrogen, oxygen, and sulfur, a 7-10 membered bicyclic saturated or partially unsaturated heterocyclic ring having 1-5 heteroatoms independently selected from nitrogen, oxygen, and sulfur, or an 8-10 membered bicyclic heteroaryl ring having 1-5 heteroatoms independently selected from nitrogen, oxygen, and sulfur.

In some embodiments, R is optionally substituted $C_{1-30}$ aliphatic. In some embodiments, R is optionally substituted $C_{1-20}$ aliphatic. In some embodiments, R is optionally substituted $C_{1-15}$ aliphatic. In some embodiments, R is optionally substituted $C_{1-10}$ aliphatic. In some embodiments, R is optionally substituted $C_{1-6}$ aliphatic. In some embodiments, R is optionally substituted $C_{1-6}$ alkyl. In some embodiments, R is optionally substituted hexyl, pentyl, butyl, propyl, ethyl or methyl. In some embodiments, R is optionally substituted hexyl. In some embodiments, R is optionally substituted pentyl. In some embodiments, R is optionally substituted butyl. In some embodiments, R is optionally substituted propyl. In some embodiments, R is optionally substituted ethyl. In some embodiments, R is optionally substituted methyl. In some embodiments, R is hexyl. In some embodiments, R is pentyl. In some embodiments, R is butyl. In some embodiments, R is propyl. In some embodiments, R is ethyl. In some embodiments, R is methyl. In some embodiments, R is isopropyl. In some embodiments, R is n-propyl. In some embodiments, R is tert-butyl. In some embodiments, R is sec-butyl. In some embodiments, R is n-butyl. In some embodiments, R is —$(CH_2)_2CN$.

In some embodiments, R is optionally substituted $C_{3-30}$ cycloaliphatic. In some embodiments, R is optionally substituted $C_{3-20}$ cycloaliphatic. In some embodiments, R is optionally substituted $C_{3-10}$ cycloaliphatic. In some embodiments, R is optionally substituted cyclohexyl. In some embodiments, R is cyclohexyl. In some embodiments, R is optionally substituted cyclopentyl. In some embodiments, R is cyclopentyl. In some embodiments, R is optionally substituted cyclobutyl. In some embodiments, R is cyclobutyl. In some embodiments, R is optionally substituted cyclopropyl. In some embodiments, R is cyclopropyl.

In some embodiments, R is an optionally substituted 3-30 membered saturated or partially unsaturated carbocyclic ring. In some embodiments, R is an optionally substituted 3-7 membered saturated or partially unsaturated carbocyclic ring. In some embodiments, R is an optionally substituted 3-membered saturated or partially unsaturated carbocyclic ring. In some embodiments, R is an optionally substituted 4-membered saturated or partially unsaturated carbocyclic ring. In some embodiments, R is an optionally substituted 5-membered saturated or partially unsaturated carbocyclic ring. In some embodiments, R is an optionally substituted 6-membered saturated or partially unsaturated carbocyclic ring. In some embodiments, R is an optionally substituted 7-membered saturated or partially unsaturated carbocyclic ring. In some embodiments, R is optionally substituted cycloheptyl. In some embodiments, R is cycloheptyl. In some embodiments, R is optionally substituted cyclohexyl. In some embodiments, R is cyclohexyl. In some embodiments, R is optionally substituted cyclopentyl. In some embodiments, R is cyclopentyl. In some embodiments, R is optionally substituted cyclobutyl. In some embodiments, R is cyclobutyl. In some embodiments, R is optionally substituted cyclopropyl. In some embodiments, R is cyclopropyl.

In some embodiments, when R is or comprises a ring structure, e.g., cycloaliphatic, cycloheteroaliphatic, aryl, heteroaryl, etc., the ring structure can be monocyclic, bicyclic or polycyclic. In some embodiments, R is or comprises a monocyclic structure. In some embodiments, R is or comprises a bicyclic structure. In some embodiments, R is or comprises a polycyclic structure.

In some embodiments, R is optionally substituted $C_{1-30}$ heteroaliphatic having 1-10 heteroatoms independently selected from oxygen, nitrogen, sulfur, phosphorus and silicon. In some embodiments, R is optionally substituted $C_{1-20}$ heteroaliphatic having 1-10 heteroatoms. In some embodiments, R is optionally substituted $C_{1-20}$ heteroaliphatic having 1-10 heteroatoms independently selected from oxygen, nitrogen, sulfur, phosphorus or silicon, optionally including one or more oxidized forms of nitrogen, sulfur, phosphorus or selenium. In some embodiments, R is optionally substituted $C_{1-30}$ heteroaliphatic comprising 1-10 groups independently selected from

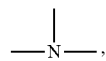

—N=, ≡N, —S—, —S(O)—, —S(O)$_2$—, —O—, =O,

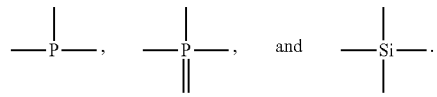

In some embodiments, R is optionally substituted $C_{6-30}$ aryl. In some embodiments, R is optionally substituted phenyl. In some embodiments, R is phenyl. In some embodiments, R is substituted phenyl.

In some embodiments, R is an optionally substituted 8-10 membered bicyclic saturated, partially unsaturated or aryl ring. In some embodiments, R is an optionally substituted 8-10 membered bicyclic saturated ring. In some embodiments, R is an optionally substituted 8-10 membered bicyclic partially unsaturated ring. In some embodiments, R is an optionally substituted 8-10 membered bicyclic aryl ring. In some embodiments, R is optionally substituted naphthyl.

In some embodiments, R is optionally substituted 5-30 membered heteroaryl ring having 1-10 heteroatoms independently selected from oxygen, nitrogen, sulfur, phosphorus and silicon. In some embodiments, R is optionally substituted 5-30 membered heteroaryl ring having 1-10 heteroatoms independently selected from oxygen, nitrogen, and sulfur. In some embodiments, R is optionally substituted 5-30 membered heteroaryl ring having 1-5 heteroatoms independently selected from oxygen, nitrogen, sulfur, phosphorus and silicon. In some embodiments, R is optionally substituted 5-30 membered heteroaryl ring having 1-5 heteroatoms independently selected from oxygen, nitrogen, and sulfur.

In some embodiments, R is an optionally substituted 5-6 membered monocyclic heteroaryl ring having 1-4 heteroatoms independently selected from nitrogen, oxygen, and sulfur. In some embodiments, R is a substituted 5-6 membered monocyclic heteroaryl ring having 1-4 heteroatoms independently selected from nitrogen, oxygen, and sulfur. In some embodiments, R is an unsubstituted 5-6 membered monocyclic heteroaryl ring having 1-4 heteroatoms independently selected from nitrogen, oxygen, and sulfur. In some embodiments, R is an optionally substituted 5-6 membered monocyclic heteroaryl ring having 1-3 heteroatoms independently selected from nitrogen, sulfur, and oxygen. In some embodiments, R is a substituted 5-6 membered monocyclic heteroaryl ring having 1-3 heteroatoms independently selected from nitrogen, oxygen, and sulfur. In some embodiments, R is an unsubstituted 5-6 membered monocyclic heteroaryl ring having 1-3 heteroatoms independently selected from nitrogen, sulfur, and oxygen.

In some embodiments, R is an optionally substituted 5-membered monocyclic heteroaryl ring having 1-4 heteroatoms independently selected from nitrogen, oxygen or sulfur. In some embodiments, R is an optionally substituted 6-membered monocyclic heteroaryl ring having 1-4 heteroatoms independently selected from nitrogen, oxygen, and sulfur.

In some embodiments, R is an optionally substituted 5-membered monocyclic heteroaryl ring having one heteroatom selected from nitrogen, oxygen, and sulfur. In some embodiments, R is optionally substituted pyrrolyl, furanyl, or thienyl.

In some embodiments, R is an optionally substituted 5-membered heteroaryl ring having two heteroatoms independently selected from nitrogen, oxygen, and sulfur. In certain embodiments, R is an optionally substituted 5-membered heteroaryl ring having one nitrogen atom, and an additional heteroatom selected from sulfur or oxygen. In some embodiments, R is an optionally substituted 5-membered heteroaryl ring having three heteroatoms independently selected from nitrogen, oxygen, and sulfur. In some embodiments, R is an optionally substituted 5-membered heteroaryl ring having four heteroatoms independently selected from nitrogen, oxygen, and sulfur.

In some embodiments, R is an optionally substituted 6-membered heteroaryl ring having 1-4 nitrogen atoms. In some embodiments, R is an optionally substituted 6-membered heteroaryl ring having 1-3 nitrogen atoms. In other embodiments, R is an optionally substituted 6-membered heteroaryl ring having 1-2 nitrogen atoms. In some embodiments, R is an optionally substituted 6-membered heteroaryl ring having four nitrogen atoms. In some embodiments, R is an optionally substituted 6-membered heteroaryl ring having three nitrogen atoms. In some embodiments, R is an optionally substituted 6-membered heteroaryl ring having two nitrogen atoms. In certain embodiments, R is an optionally substituted 6-membered heteroaryl ring having one nitrogen atom.

In certain embodiments, R is an optionally substituted 8-10 membered bicyclic heteroaryl ring having 1-4 heteroatoms independently selected from nitrogen, oxygen, and sulfur. In some embodiments, R is an optionally substituted 5,6-fused heteroaryl ring having 1-4 heteroatoms independently selected from nitrogen, oxygen, and sulfur. In certain embodiments, R is an optionally substituted 6,6-fused heteroaryl ring having 1-4 heteroatoms independently selected from nitrogen, oxygen, and sulfur.

In some embodiments, R is 3-30 membered heterocyclic ring having 1-10 heteroatoms independently selected from oxygen, nitrogen, sulfur, phosphorus and silicon. In some embodiments, R is 3-30 membered heterocyclic ring having 1-10 heteroatoms independently selected from oxygen, nitrogen, and sulfur. In some embodiments, R is 3-30 membered heterocyclic ring having 1-5 heteroatoms independently selected from oxygen, nitrogen, sulfur, phosphorus and silicon. In some embodiments, R is 3-30 membered heterocyclic ring having 1-5 heteroatoms independently selected from oxygen, nitrogen, and sulfur.

In some embodiments, R is an optionally substituted 3-7 membered saturated or partially unsaturated heterocyclic ring having 1-3 heteroatoms independently selected from nitrogen, oxygen, and sulfur. In some embodiments, R is a substituted 3-7 membered saturated or partially unsaturated heterocyclic ring having 1-3 heteroatoms independently selected from nitrogen, oxygen, and sulfur. In some embodiments, R is an unsubstituted 3-7 membered saturated or partially unsaturated heterocyclic ring having 1-3 heteroatoms independently selected from nitrogen, oxygen, and sulfur. In certain embodiments, R is an optionally substituted 5-7 membered partially unsaturated monocyclic ring having 1-3 heteroatoms independently selected from nitrogen, oxygen, and sulfur. In certain embodiments, R is an optionally substituted 5-6 membered partially unsaturated monocyclic ring having 1-3 heteroatoms independently selected from nitrogen, oxygen, and sulfur. In certain embodiments, R is an optionally substituted 5-membered partially unsaturated monocyclic ring having 1-3 heteroatoms independently selected from nitrogen, oxygen, and sulfur. In certain embodiments, R is an optionally substituted 6-membered partially unsaturated monocyclic ring having 1-3 heteroatoms independently selected from nitrogen, oxygen, and sulfur. In certain embodiments, R is an optionally substituted 7-membered partially unsaturated monocyclic ring having 1-3 heteroatoms independently selected from nitrogen, oxygen, and sulfur. In some embodiments, R is optionally substituted 3-membered heterocyclic ring having one heteroatom selected from nitrogen, oxygen or sulfur. In some embodiments, R is optionally substituted 4-membered heterocyclic ring having 1-3 heteroatoms independently selected from nitrogen, oxygen, and sulfur. In some embodiments, R is optionally substituted 5-membered heterocyclic ring having 1-3 heteroatoms independently selected from nitrogen, oxygen, and sulfur. In some embodiments, R is optionally substituted 6-membered heterocyclic ring having 1-3 heteroatoms independently selected from nitrogen, oxygen, and sulfur. In some embodiments, R is optionally substituted 7-membered heterocyclic ring having 1-3 heteroatoms independently selected from nitrogen, oxygen, and sulfur.

In some embodiments, R is an optionally substituted 3-membered saturated or partially unsaturated heterocyclic ring having 1-2 heteroatoms independently selected from nitrogen, oxygen, and sulfur. In some embodiments, R is an optionally substituted 4-membered saturated or partially unsaturated heterocyclic ring having 1-2 heteroatoms independently selected from nitrogen, oxygen, and sulfur. In some embodiments, R is an optionally substituted 5-membered saturated or partially unsaturated heterocyclic ring having 1-2 heteroatoms independently selected from nitrogen, oxygen, and sulfur. In some embodiments, R is an optionally substituted 6-membered saturated or partially unsaturated heterocyclic ring having 1-2 heteroatoms independently selected from nitrogen, oxygen, and sulfur. In some embodiments, R is an optionally substituted 7-membered saturated or partially unsaturated heterocyclic ring having 1-2 heteroatoms independently selected from nitrogen, oxygen, and sulfur.

In certain embodiments, R is an optionally substituted 5-6 membered partially unsaturated monocyclic ring having 1-2 heteroatoms independently selected from nitrogen, oxygen, and sulfur. In certain embodiments, R is an optionally substituted tetrahydropyridinyl, dihydrothiazolyl, dihydrooxazolyl, or oxazolinyl group.

In some embodiments, R is an optionally substituted 7-10 membered bicyclic saturated or partially unsaturated heterocyclic ring having 1-5 heteroatoms independently selected from nitrogen, oxygen, and sulfur. In some embodiments, R is optionally substituted indolinyl. In some embodiments, R is optionally substituted isoindolinyl. In some embodiments, R is optionally substituted 1, 2, 3, 4-tetrahydroquinolinyl. In some embodiments, R is optionally substituted 1, 2, 3, 4-tetrahydroisoquinolinyl. In some embodiments, R is an optionally substituted azabicyclo[3.2.1]octanyl.

In some embodiments, R is an optionally substituted 8-10 membered bicyclic heteroaryl ring having 1-5 heteroatoms independently selected from nitrogen, oxygen, and sulfur. In some embodiments, R is an optionally substituted 5,6-fused heteroaryl ring having 1-5 heteroatoms independently selected from nitrogen, oxygen, and sulfur.

In some embodiments, R is optionally substituted $C_{6-30}$ arylaliphatic. In some embodiments, R is optionally substituted $C_{6-20}$ arylaliphatic. In some embodiments, R is optionally substituted $C_{6-10}$ arylaliphatic. In some embodiments, an aryl moiety of the arylaliphatic has 6, 10, or 14 aryl carbon atoms. In some embodiments, an aryl moiety of the arylaliphatic has 6 aryl carbon atoms. In some embodiments, an aryl moiety of the arylaliphatic has 10 aryl carbon atoms. In some embodiments, an aryl moiety of the arylaliphatic has 14 aryl carbon atoms. In some embodiments, an aryl moiety is optionally substituted phenyl.

In some embodiments, R is optionally substituted $C_{6-30}$ arylheteroaliphatic having 1-10 heteroatoms independently selected from oxygen, nitrogen, sulfur, phosphorus and silicon. In some embodiments, R is optionally substituted $C_{6-30}$ arylheteroaliphatic having 1-10 heteroatoms independently selected from oxygen, nitrogen, and sulfur. In some embodiments, R is optionally substituted $C_{6-20}$ arylheteroaliphatic having 1-10 heteroatoms independently selected from oxygen, nitrogen, sulfur, phosphorus and silicon. In some embodiments, R is optionally substituted $C_{6-20}$ arylheteroaliphatic having 1-10 heteroatoms independently selected from oxygen, nitrogen, and sulfur. In some embodiments, R is optionally substituted $C_{6-10}$ arylheteroaliphatic having 1-5 heteroatoms independently selected from oxygen, nitrogen, sulfur, phosphorus and silicon. In some embodiments, R is optionally substituted $C_{6-10}$ arylheteroaliphatic having 1-5 heteroatoms independently selected from oxygen, nitrogen, and sulfur.

In some embodiments, two R groups are optionally and independently taken together to form a covalent bond. In some embodiments, —C=O is formed. In some embodiments, —C=C— is formed. In some embodiments, —C≡C— is formed.

In some embodiments, two or more R groups on the same atom are optionally and independently taken together with the atom to form an optionally substituted, 3-30 membered, monocyclic, bicyclic or polycyclic ring having, in addition to the atom, 0-10 heteroatoms independently selected from oxygen, nitrogen, sulfur, phosphorus and silicon. In some embodiments, two or more R groups on the same atom are optionally and independently taken together with the atom to form an optionally substituted, 3-20 membered monocyclic, bicyclic or polycyclic ring having, in addition to the atom, 0-10 heteroatoms independently selected from oxygen, nitrogen, sulfur, phosphorus and silicon. In some embodiments, two or more R groups on the same atom are optionally and independently taken together with the atom to form an optionally substituted, 3-10 membered monocyclic, bicyclic or polycyclic ring having, in addition to the atom, 0-5 heteroatoms independently selected from oxygen, nitrogen, sulfur, phosphorus and silicon. In some embodiments, two or more R groups on the same atom are optionally and independently taken together with the atom to form an optionally substituted, 3-6 membered monocyclic, bicyclic or polycyclic ring having, in addition to the atom, 0-3 heteroatoms independently selected from oxygen, nitrogen, sulfur, phosphorus and silicon. In some embodiments, two or more R groups on the same atom are optionally and independently taken together with the atom to form an optionally substituted, 3-5 membered monocyclic, bicyclic or polycyclic ring having, in addition to the atom, 0-3 heteroatoms independently selected from oxygen, nitrogen, sulfur, phosphorus and silicon.

In some embodiments, two or more R groups on two or more atoms are optionally and independently taken together with their intervening atoms to form an optionally substituted, 3-30 membered, monocyclic, bicyclic or polycyclic ring having, in addition to the intervening atoms, 0-10 heteroatoms independently selected from oxygen, nitrogen, sulfur, phosphorus and silicon. In some embodiments, two or more R groups on two or more atoms are optionally and independently taken together with their intervening atoms to form an optionally substituted, 3-20 membered monocyclic, bicyclic or polycyclic ring having, in addition to the intervening atoms, 0-10 heteroatoms independently selected from oxygen, nitrogen, sulfur, phosphorus and silicon. In some embodiments, two or more R groups on two or more atoms are optionally and independently taken together with their intervening atoms to form an optionally substituted, 3-10 membered monocyclic, bicyclic or polycyclic ring having, in addition to the intervening atoms, 0-10 heteroatoms independently selected from oxygen, nitrogen, sulfur, phosphorus and silicon. In some embodiments, two or more R groups on two or more atoms are optionally and independently taken together with their intervening atoms to form an optionally substituted, 3-10 membered monocyclic, bicyclic or polycyclic ring having, in addition to the intervening atoms, 0-5 heteroatoms independently selected from oxygen, nitrogen, sulfur, phosphorus and silicon. In some embodiments, two or more R groups on two or more atoms are optionally and independently taken together with their intervening atoms to form an optionally substituted, 3-6 membered monocyclic, bicyclic or polycyclic ring having, in addition to the intervening atoms, 0-3 heteroatoms independently selected from oxygen, nitrogen, sulfur, phosphorus and silicon. In some embodiments, two or more R groups on two or more atoms are optionally and independently taken together with their intervening atoms to form an optionally substituted, 3-5 membered monocyclic, bicyclic or polycyclic ring having, in addition to the intervening atoms, 0-3 heteroatoms independently selected from oxygen, nitrogen, sulfur, phosphorus and silicon.

In some embodiments, heteroatoms in R groups, or in the structures formed by two or more R groups taken together, are selected from oxygen, nitrogen, and sulfur. In some embodiments, a formed ring is 3, 4, 5, 6, 7, 8, 9, 10, 11, 12, 13, 14, 15, 16, 17, 18, 19, or 20-membered. In some embodiments, a formed ring is saturated. In some embodiments, a formed ring is partially saturated. In some embodiments, a formed ring is aromatic. In some embodiments, a formed ring comprises a saturated, partially saturated, or aromatic ring moiety. In some embodiments, a formed ring comprises 5, 6, 7, 8, 9, 10, 11, 12, 13, 14, 15, 16, 17, 18, 19, or 20 aromatic ring atoms. In some embodiments, a formed contains no more than 5, 6, 7, 8, 9, 10, 11, 12, 13, 14, 15, 16, 17, 18, 19, or 20 aromatic ring atoms. In some embodiments, aromatic ring atoms are selected from carbon, nitrogen, oxygen and sulfur.

In some embodiments, a ring formed by two or more R groups (or two or more groups selected from R and variables that can be R) taken together is a $C_{3-30}$ cycloaliphatic, $C_{6-30}$ aryl, 5-30 membered heteroaryl having 1-10 heteroatoms independently selected from oxygen, nitrogen, sulfur, phosphorus and silicon, or 3-30 membered heterocyclyl having 1-10 heteroatoms independently selected from oxygen, nitrogen, sulfur, phosphorus and silicon, ring as described for R, but bivalent or multivalent.

Exemplary compounds of the invention are set forth in Table 1, below.

TABLE 1

Exemplary compounds

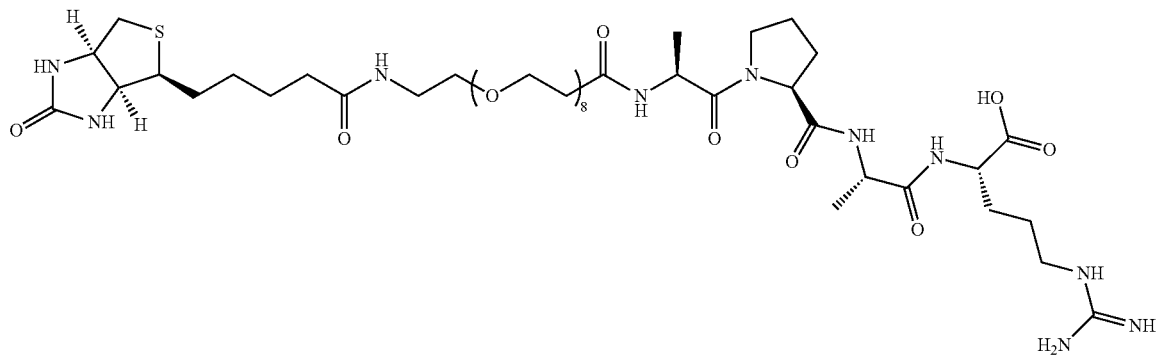

I-1

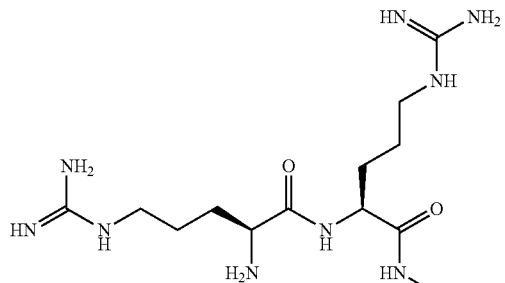

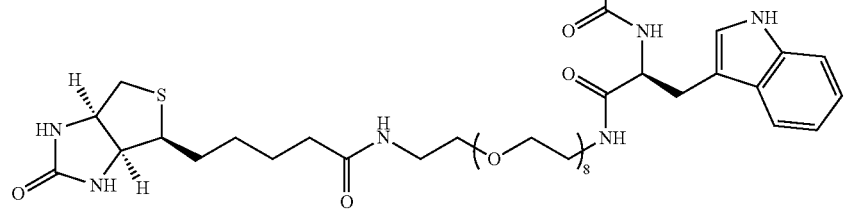

I-2

TABLE 1-continued
Exemplary compounds
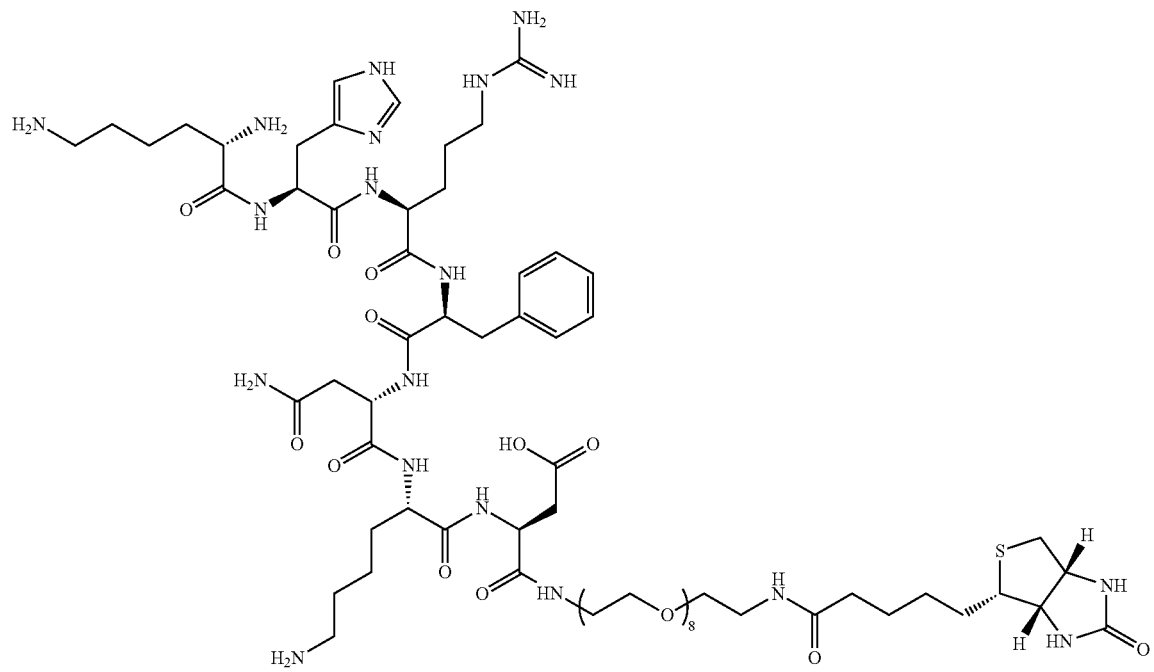
I-3
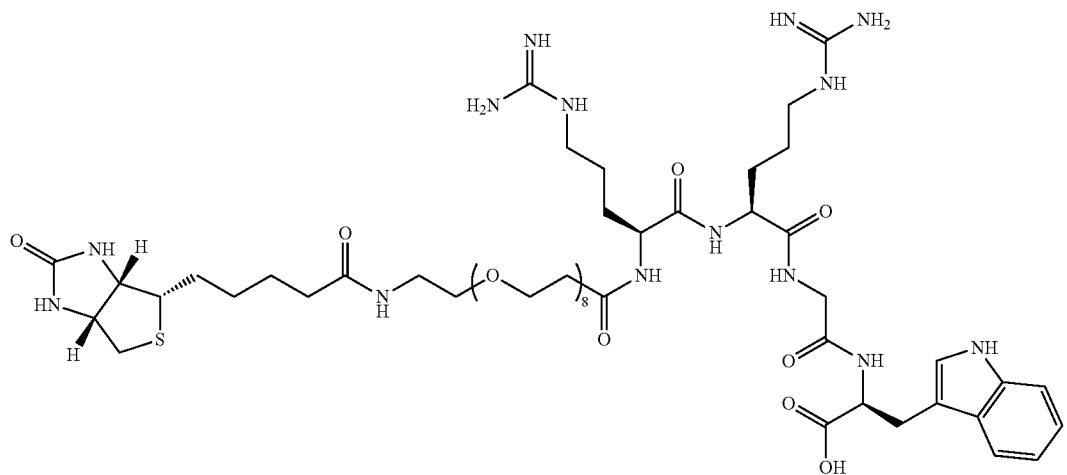
I-4

TABLE 1-continued
Exemplary compounds
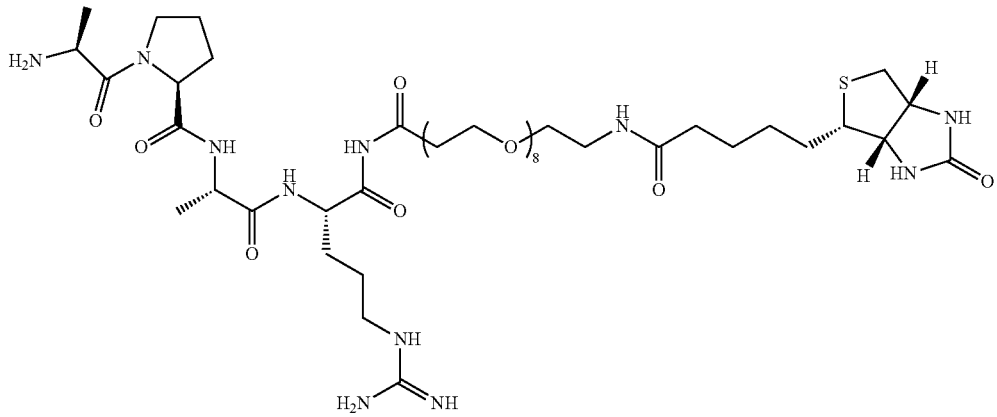
I-5
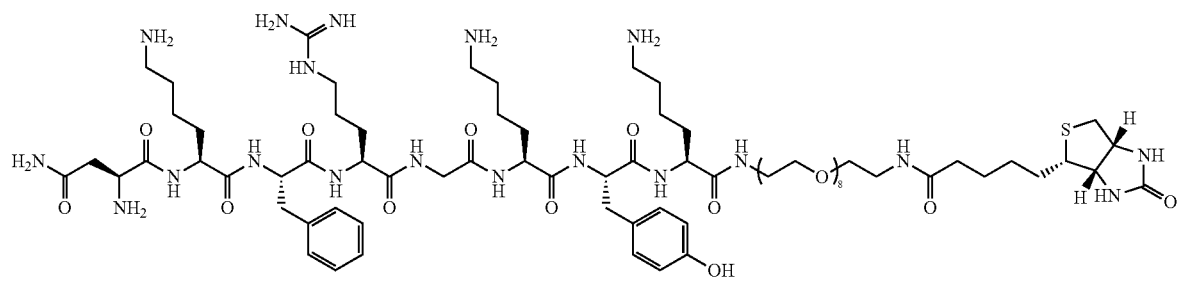
I-6
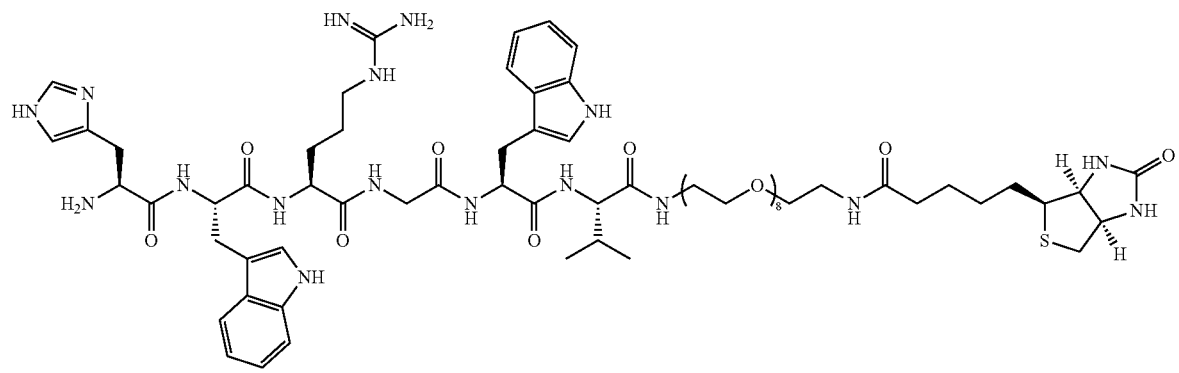
I-7
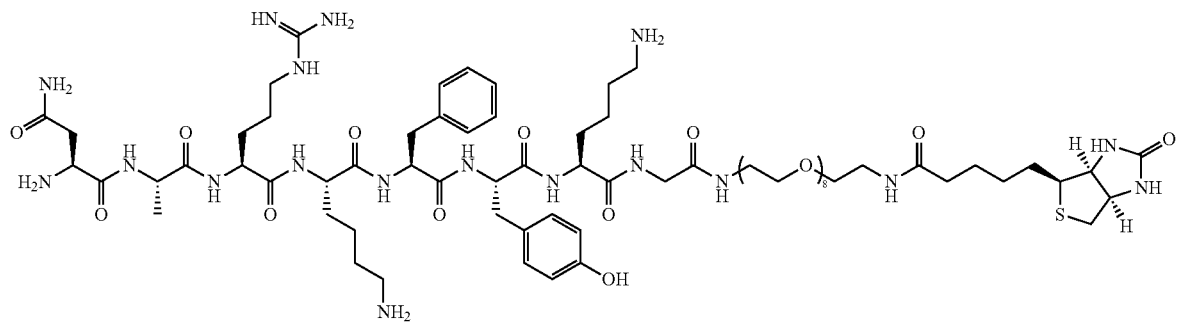
I-8

TABLE 1-continued
Exemplary compounds
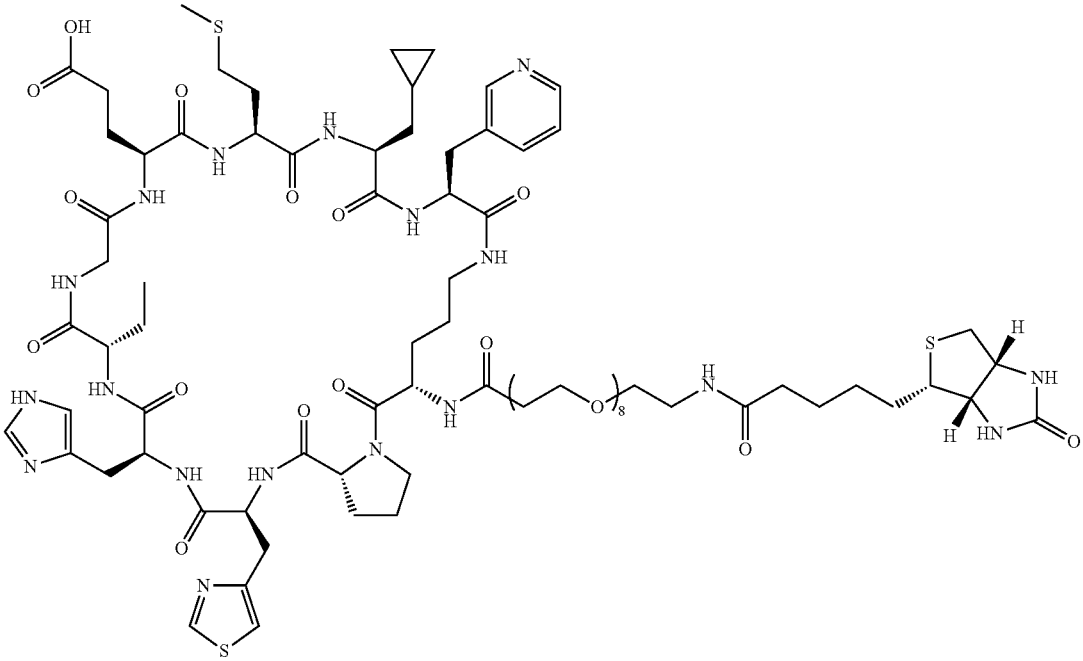
I-9
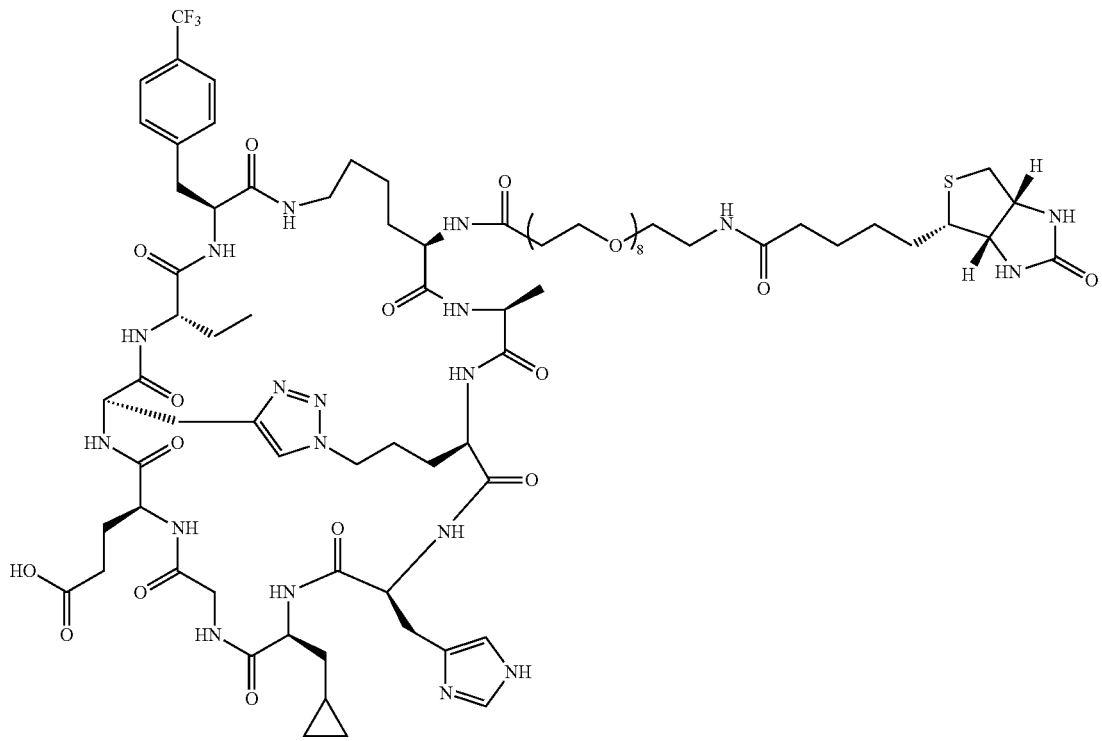
I-10

TABLE 1-continued
Exemplary compounds
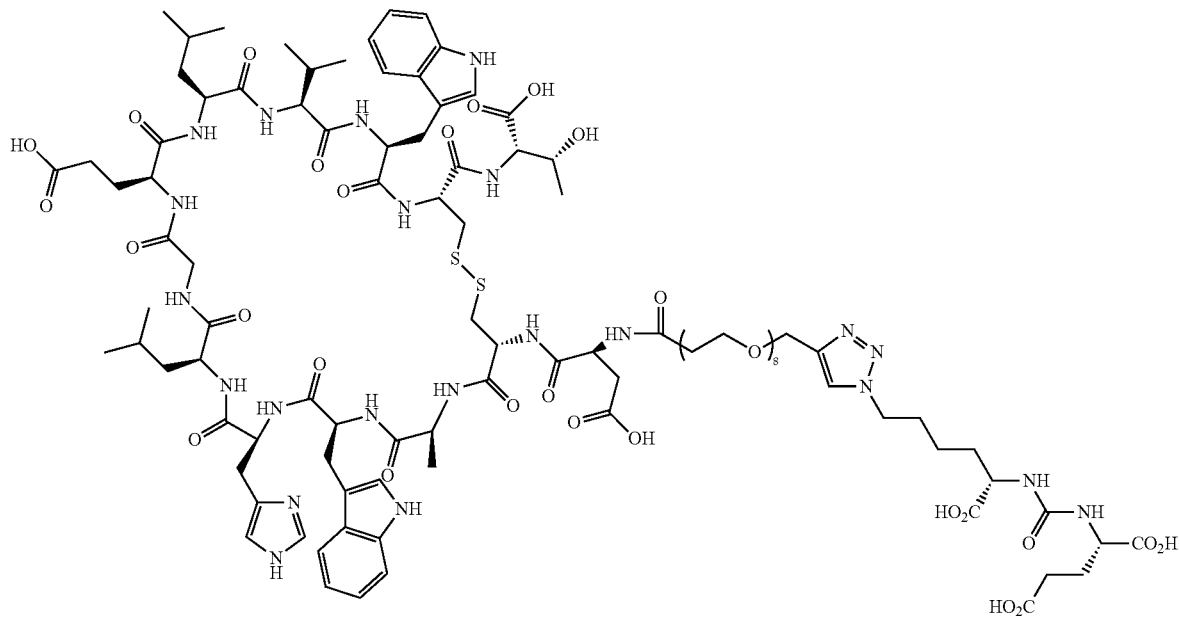
I-11
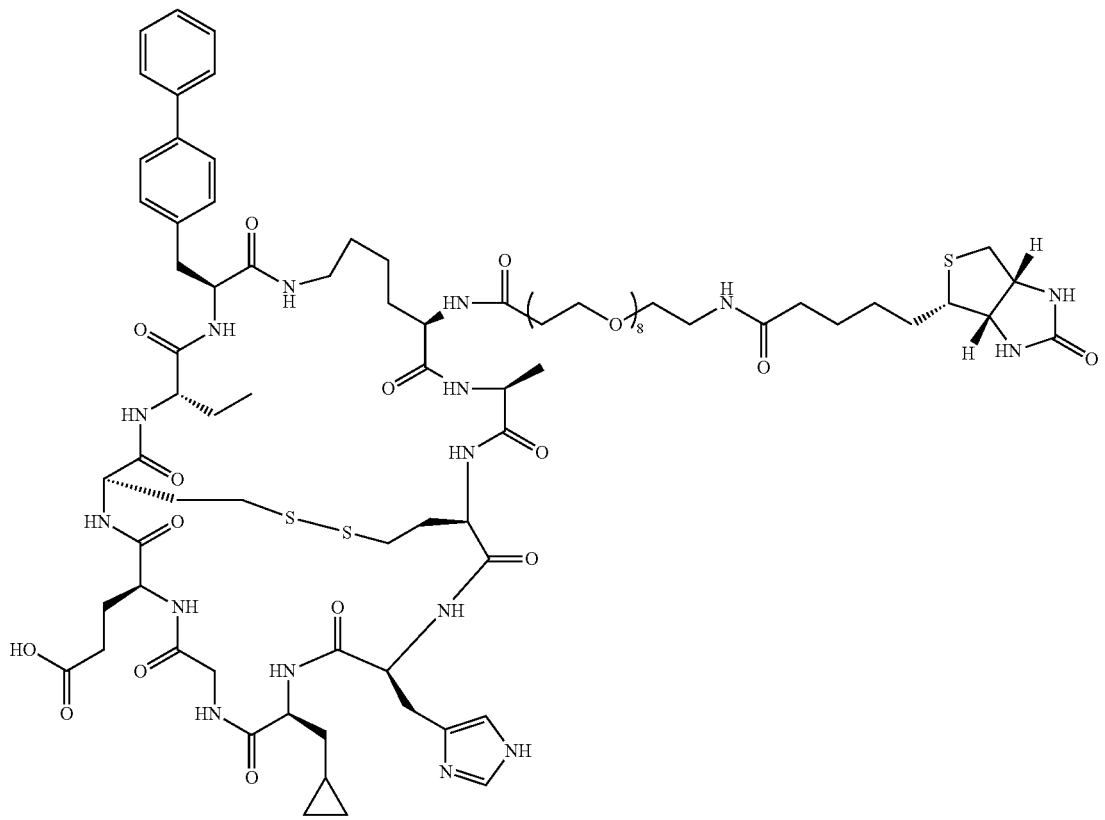
I-12

TABLE 1-continued
Exemplary compounds
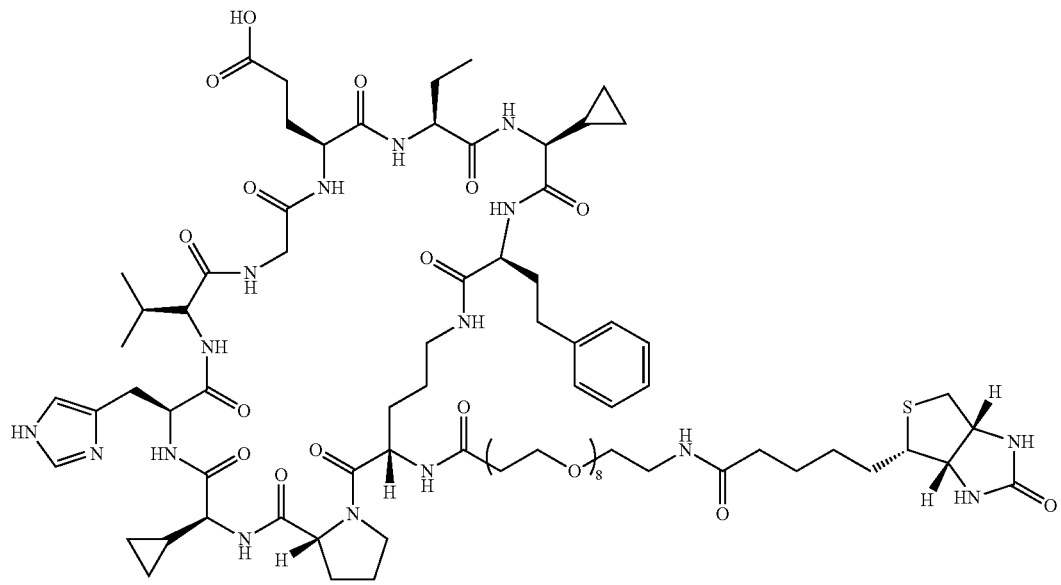
I-13
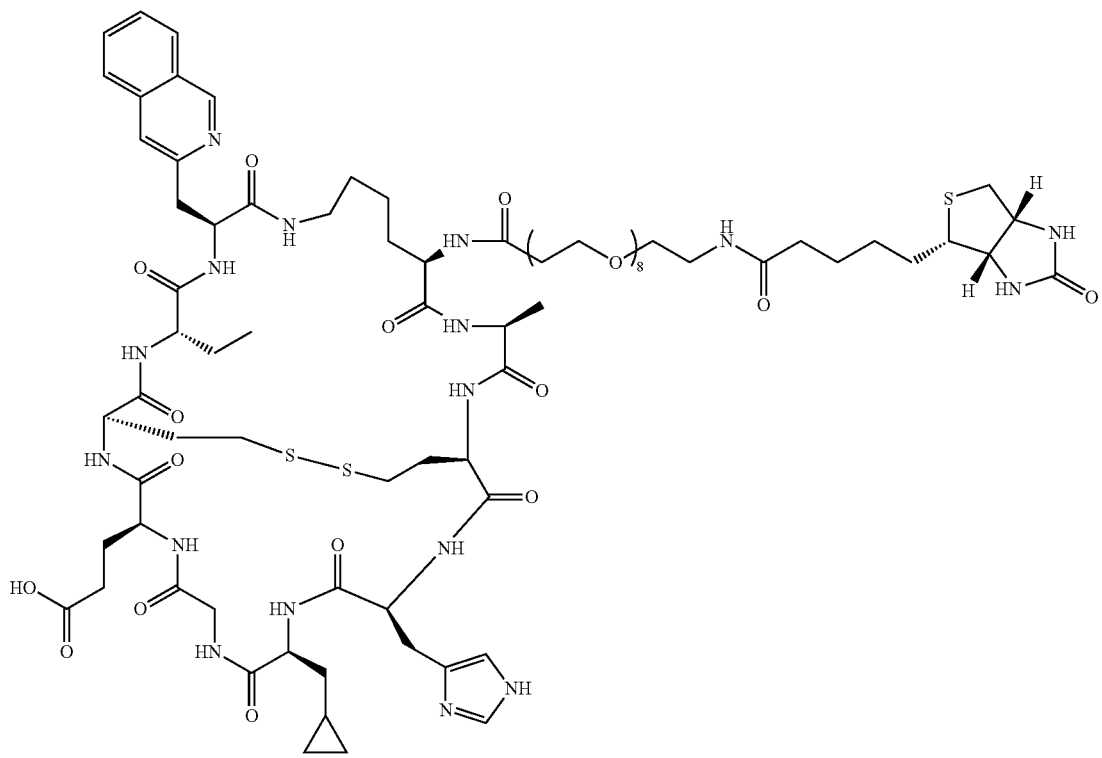
I-14

TABLE 1-continued
Exemplary compounds
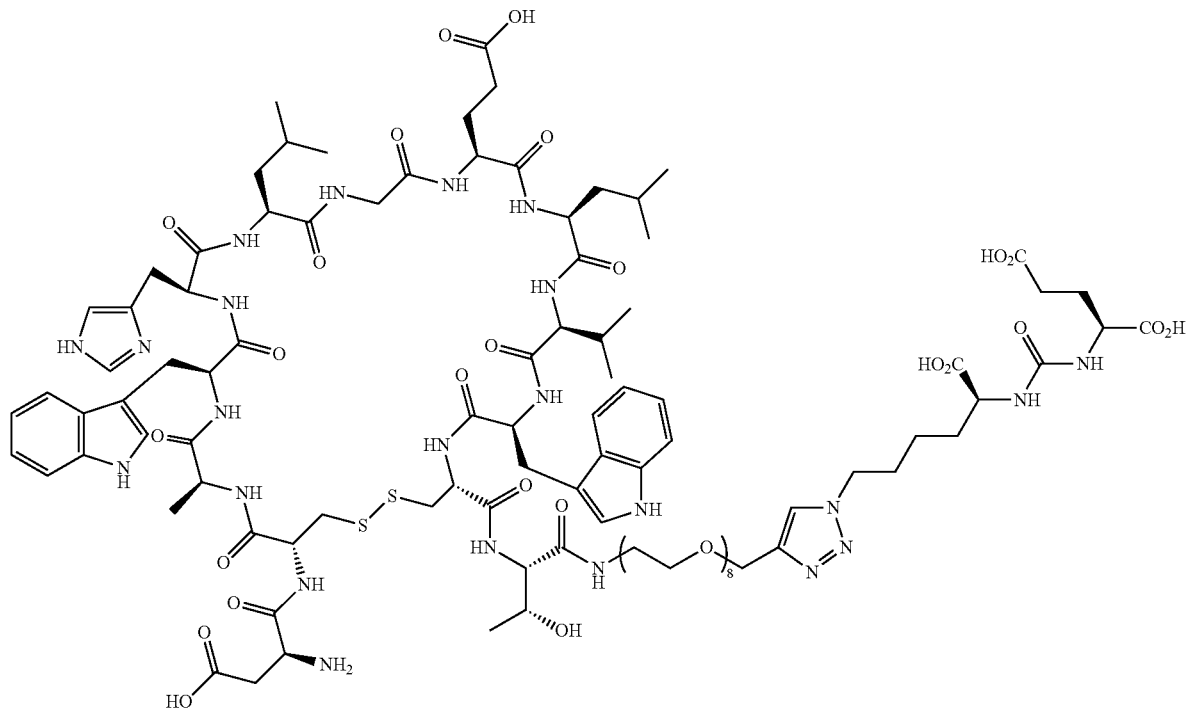
I-15
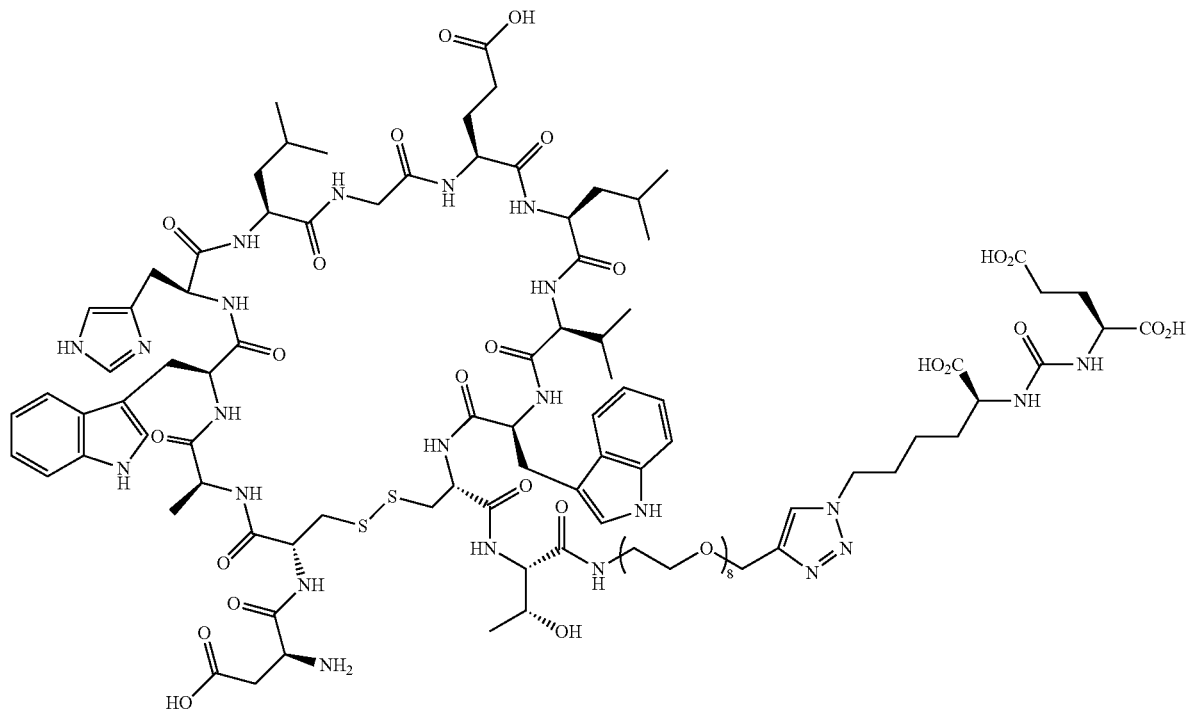
I-16

TABLE 1-continued
Exemplary compounds
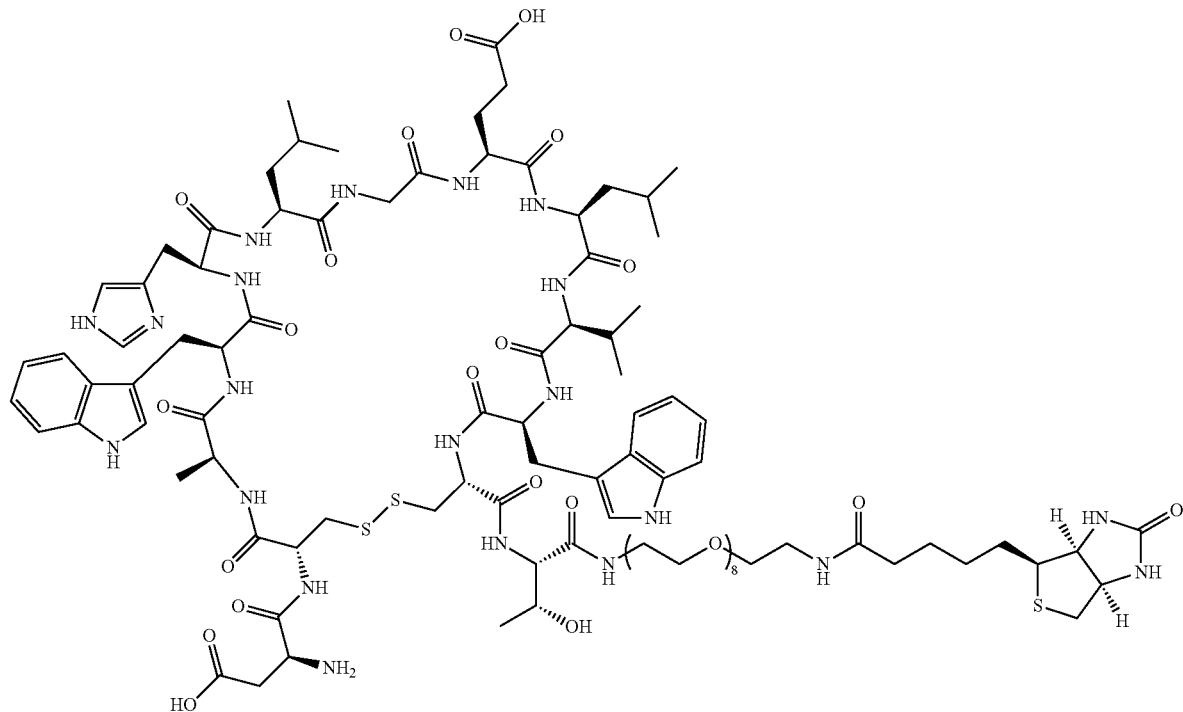
I-17
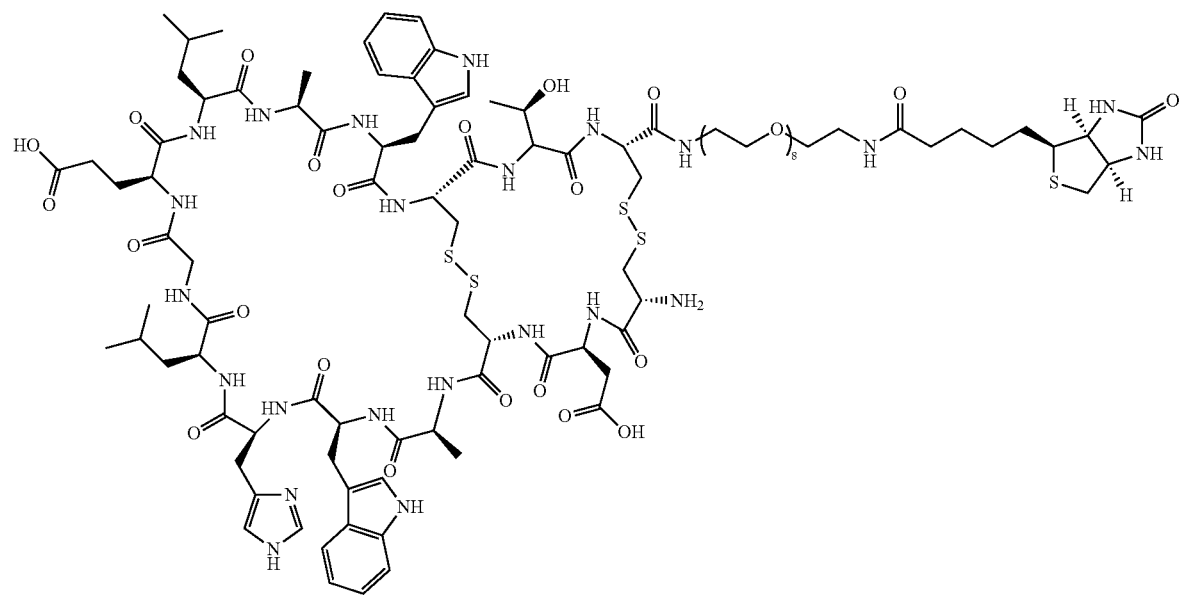
I-18

TABLE 1-continued
Exemplary compounds
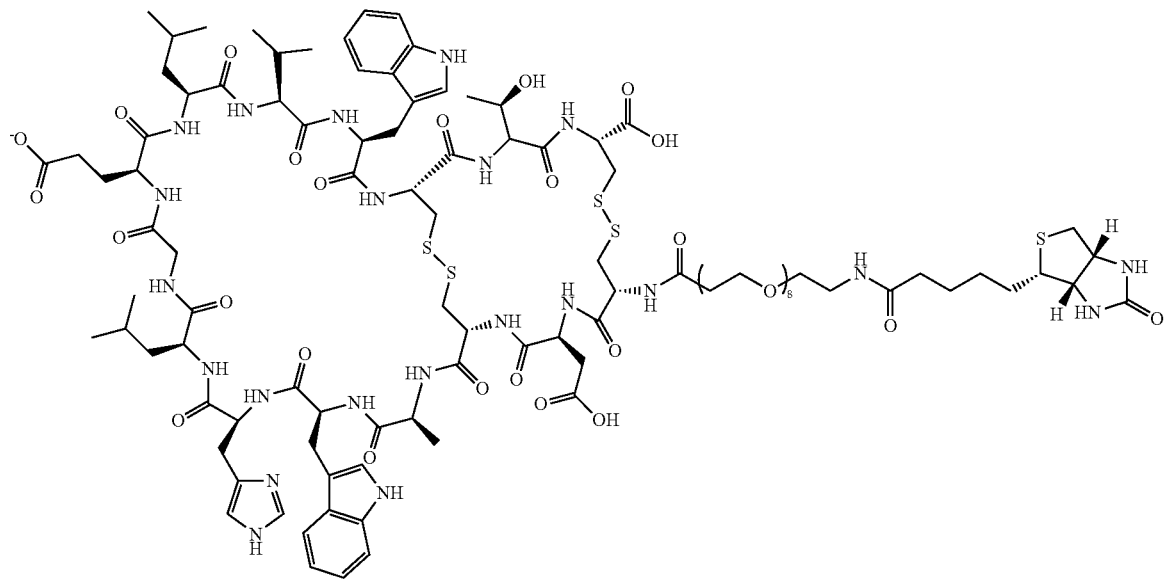
I-19
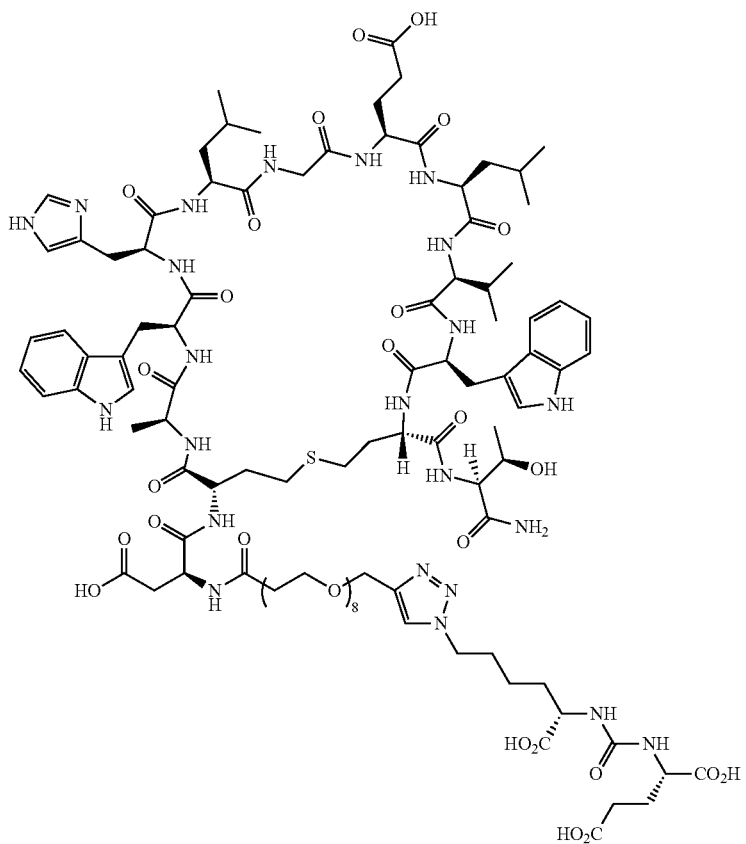
I-20

TABLE 1-continued
Exemplary compounds
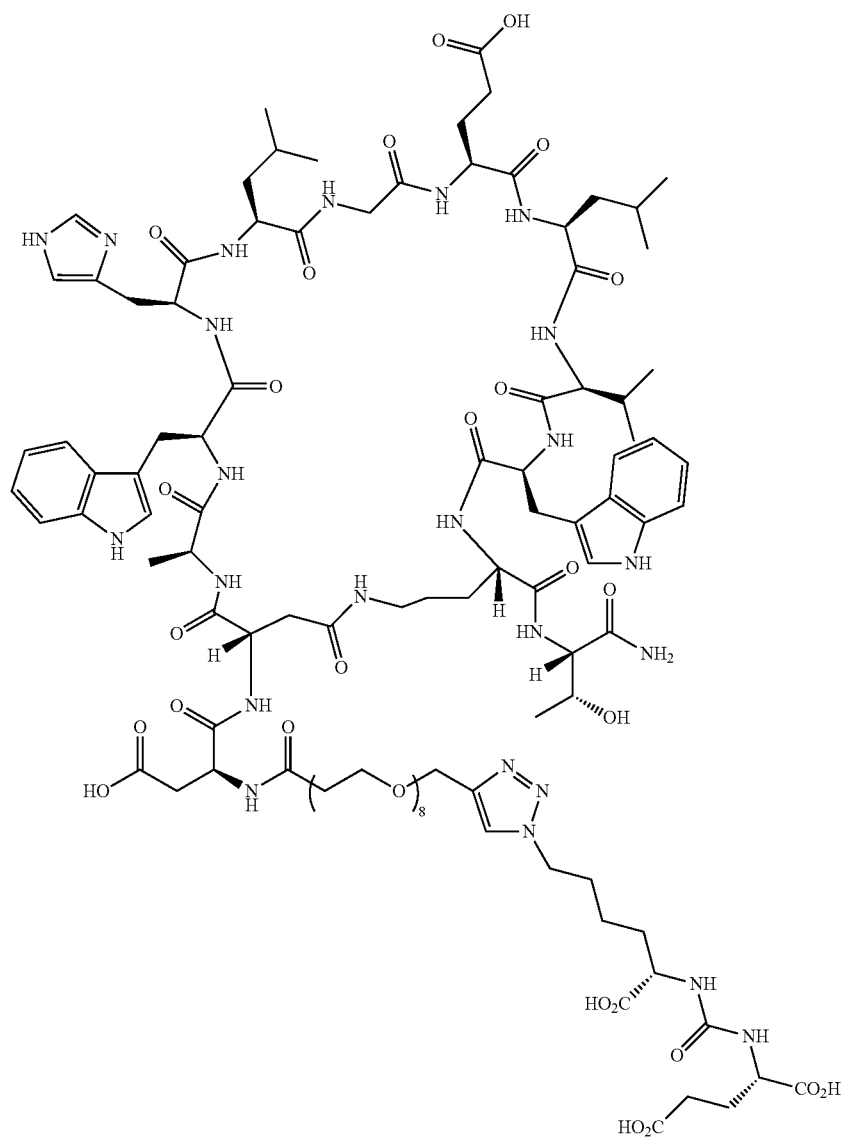
I-21

TABLE 1-continued
Exemplary compounds
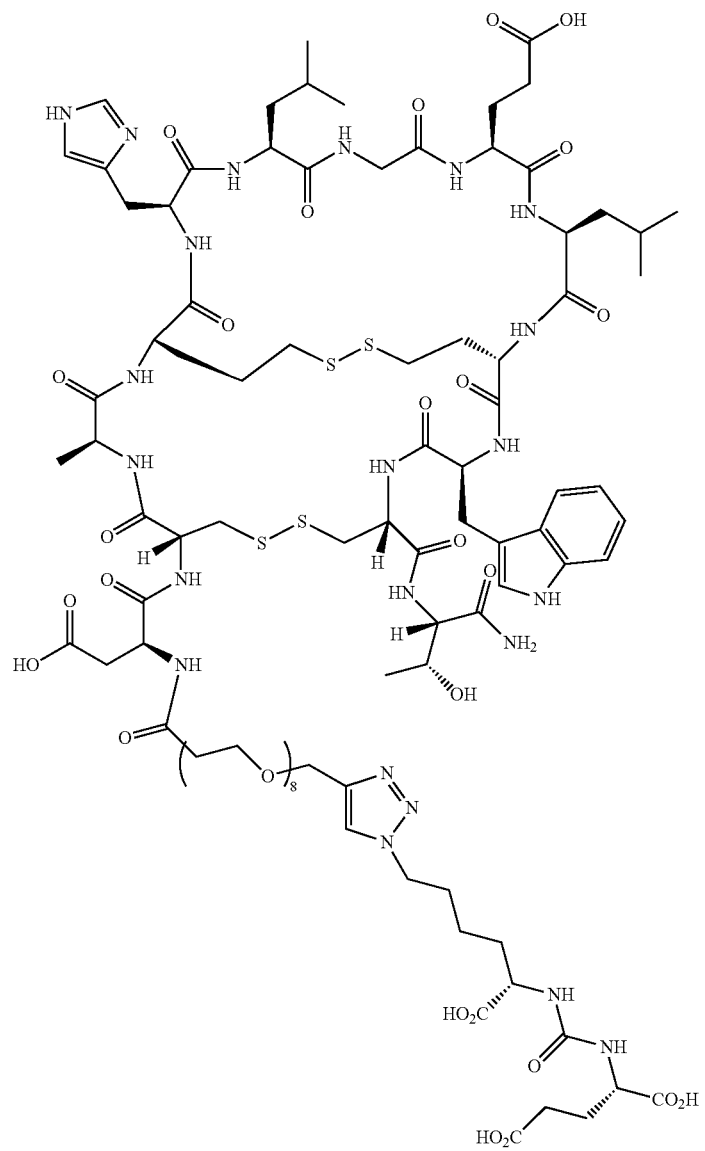
I-22

TABLE 1-continued
Exemplary compounds
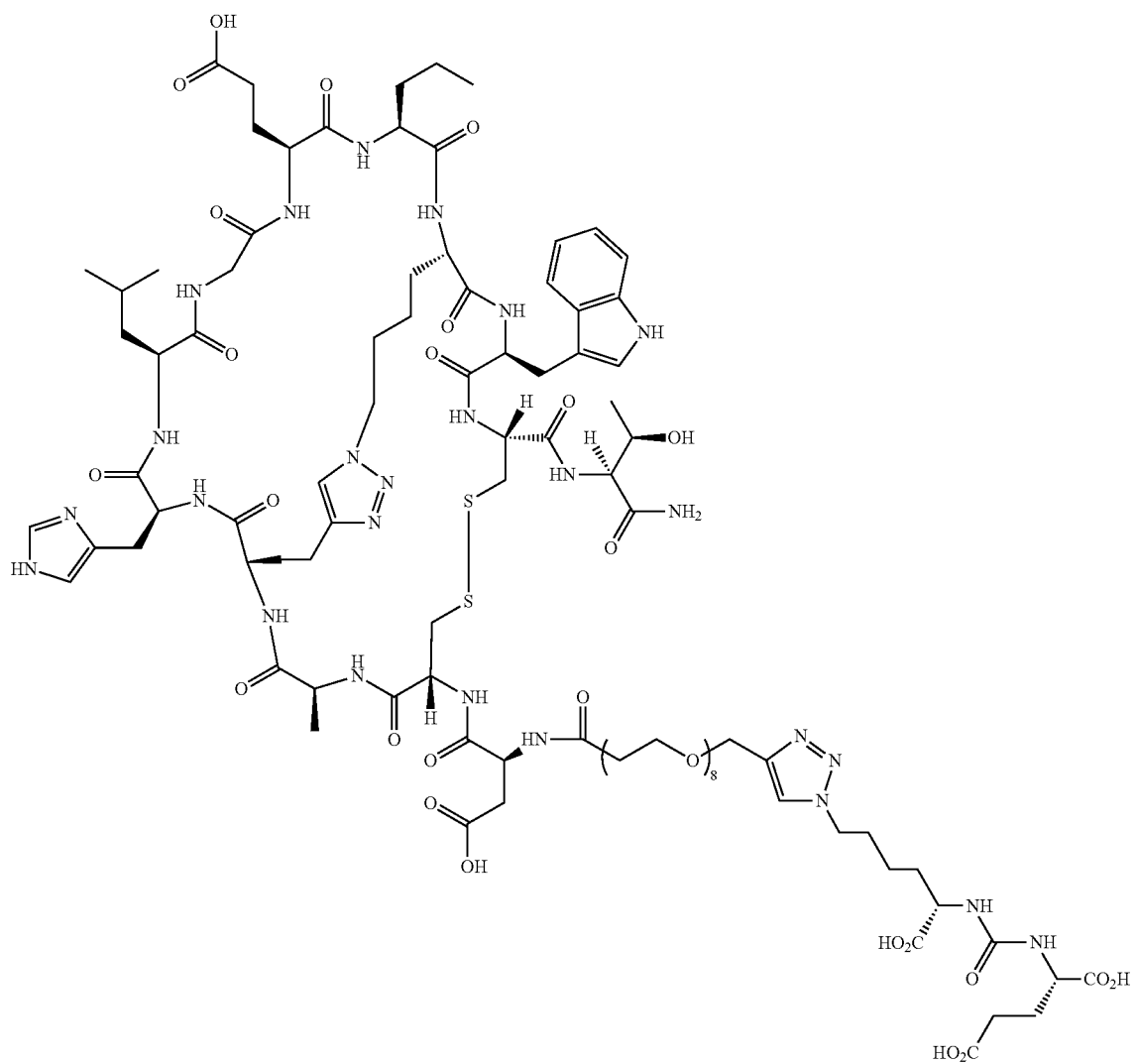
I-23

TABLE 1-continued
Exemplary compounds
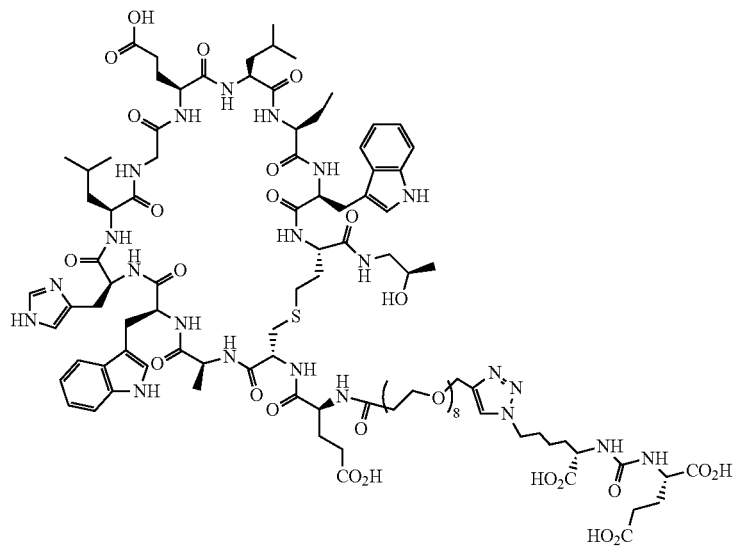
I-24
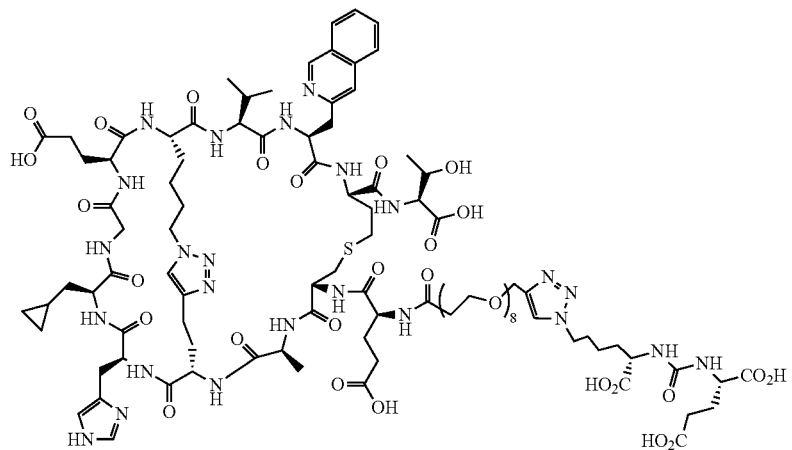
I-25

TABLE 1-continued
Exemplary compounds
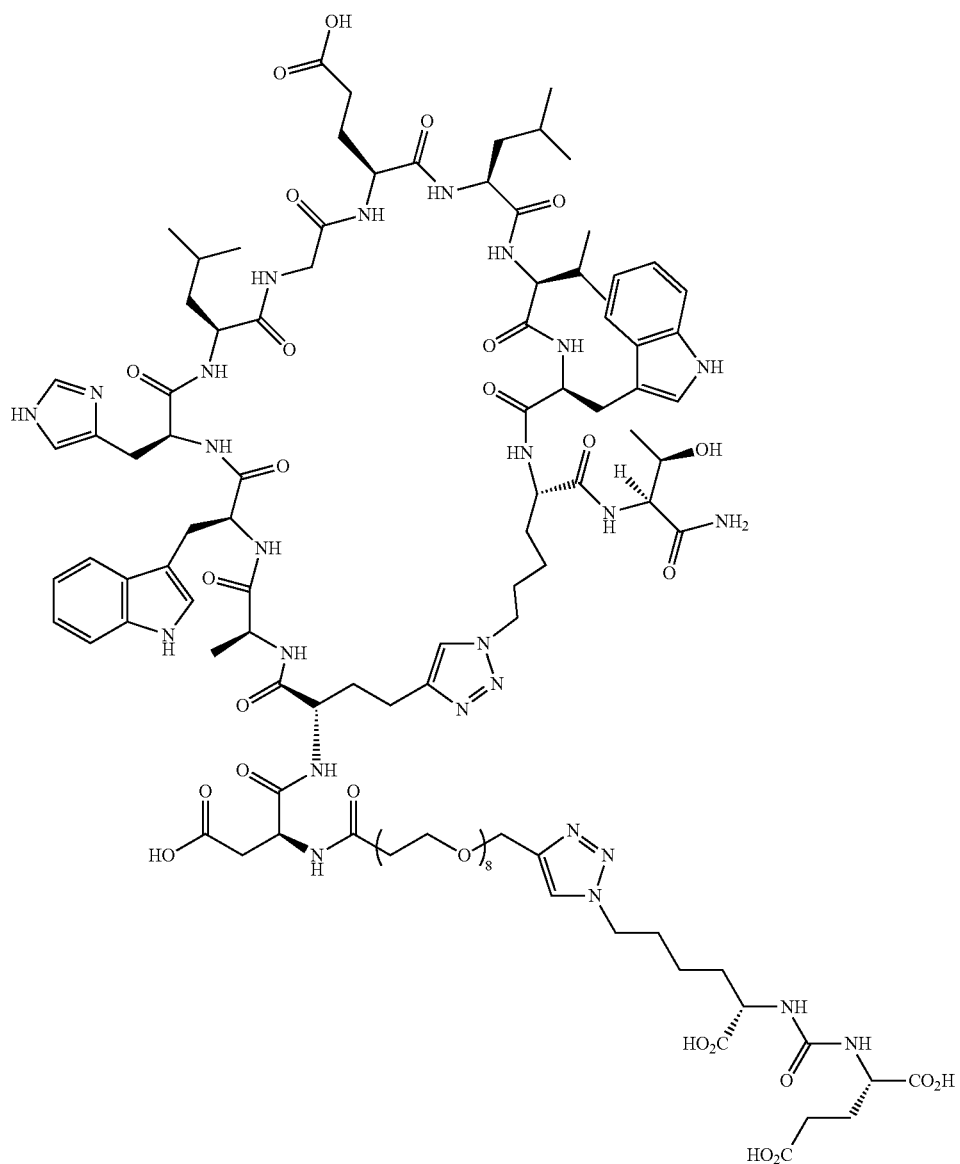
I-26

TABLE 1-continued
Exemplary compounds
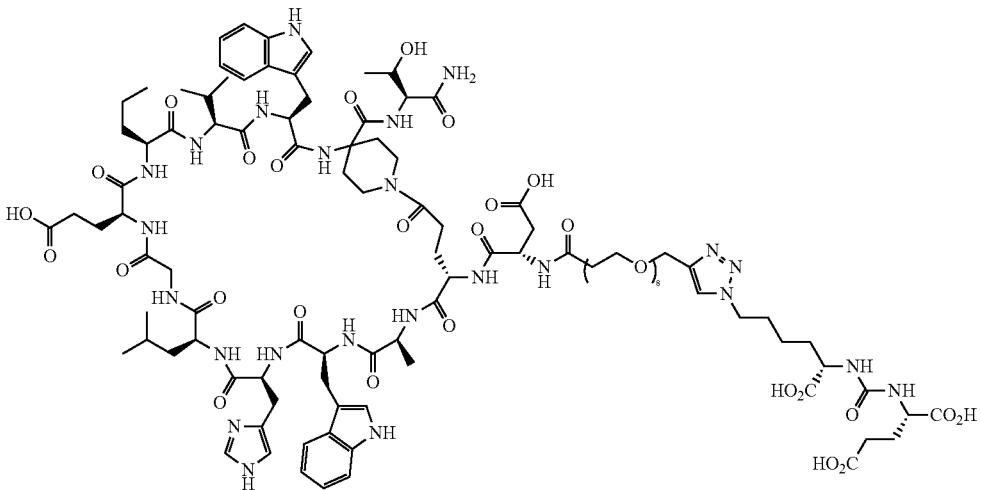
I-27
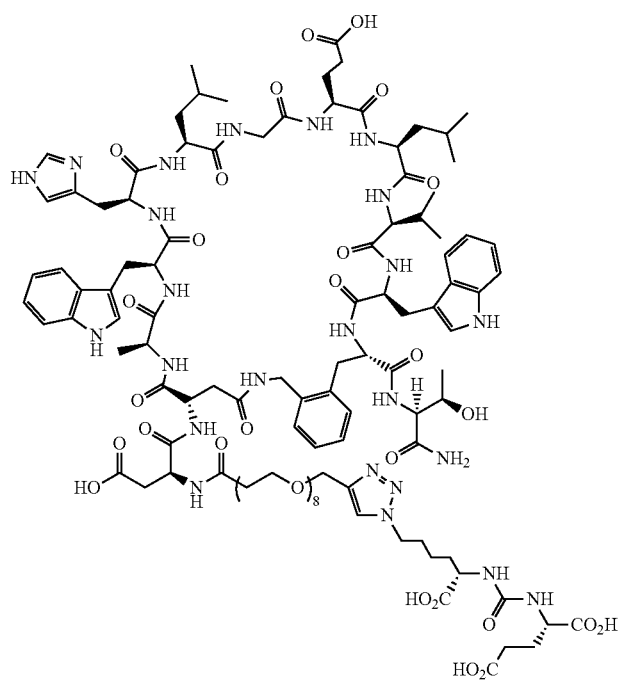
I-28

TABLE 1-continued
Exemplary compounds
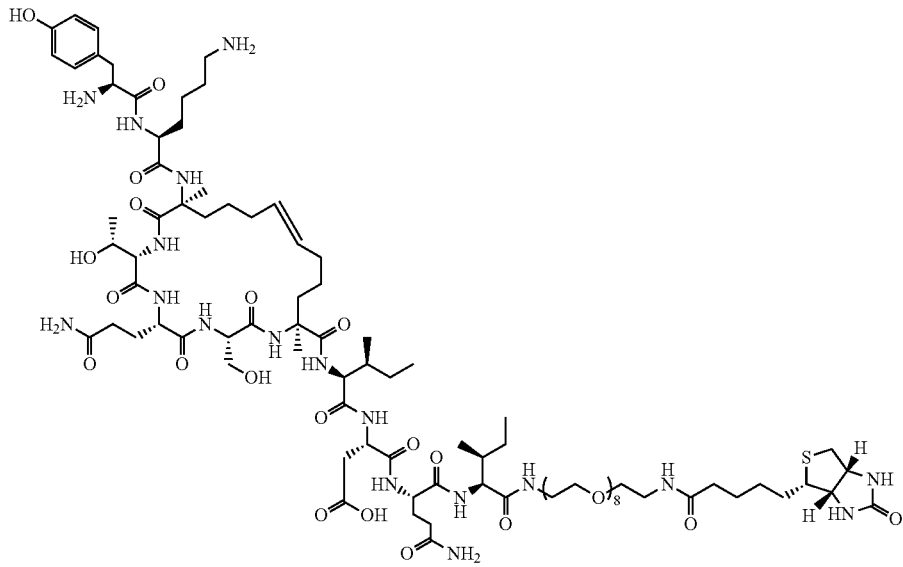
I-29
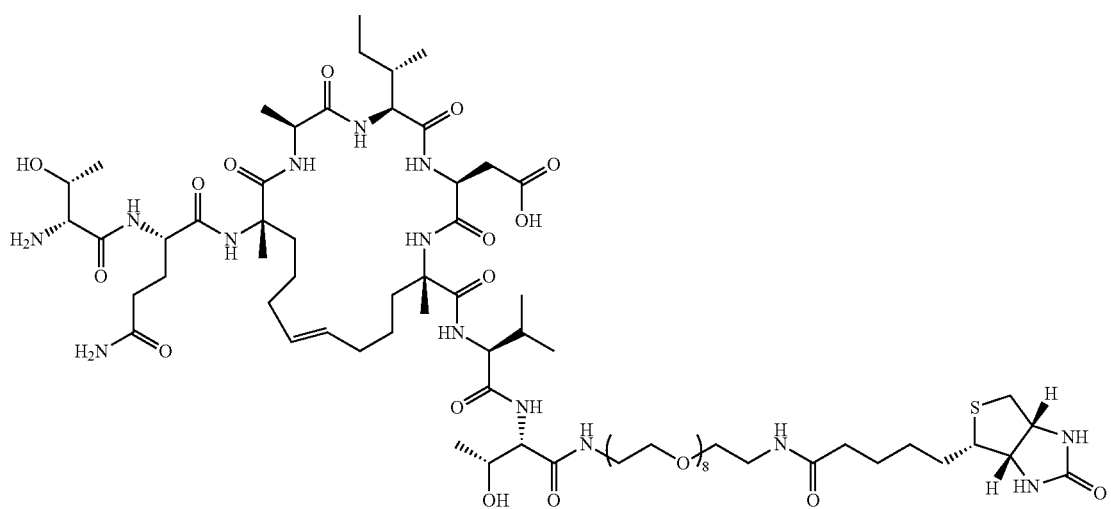
I-30

TABLE 1-continued
Exemplary compounds
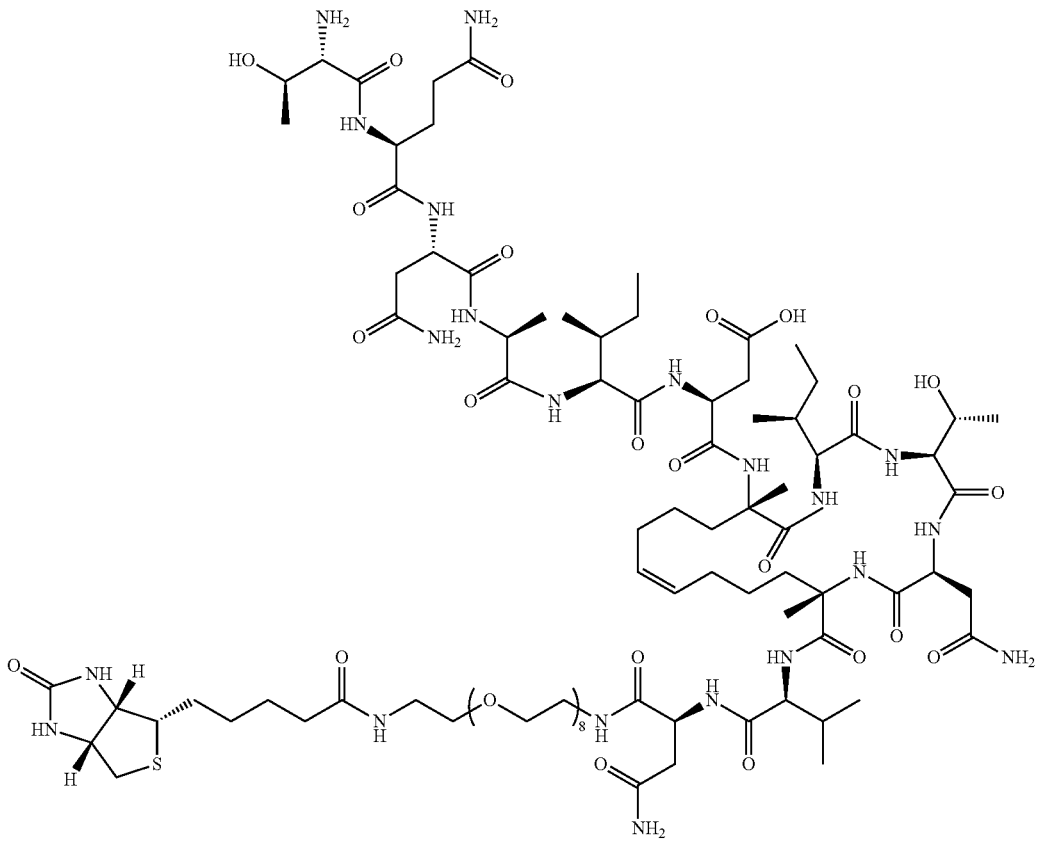
I-31
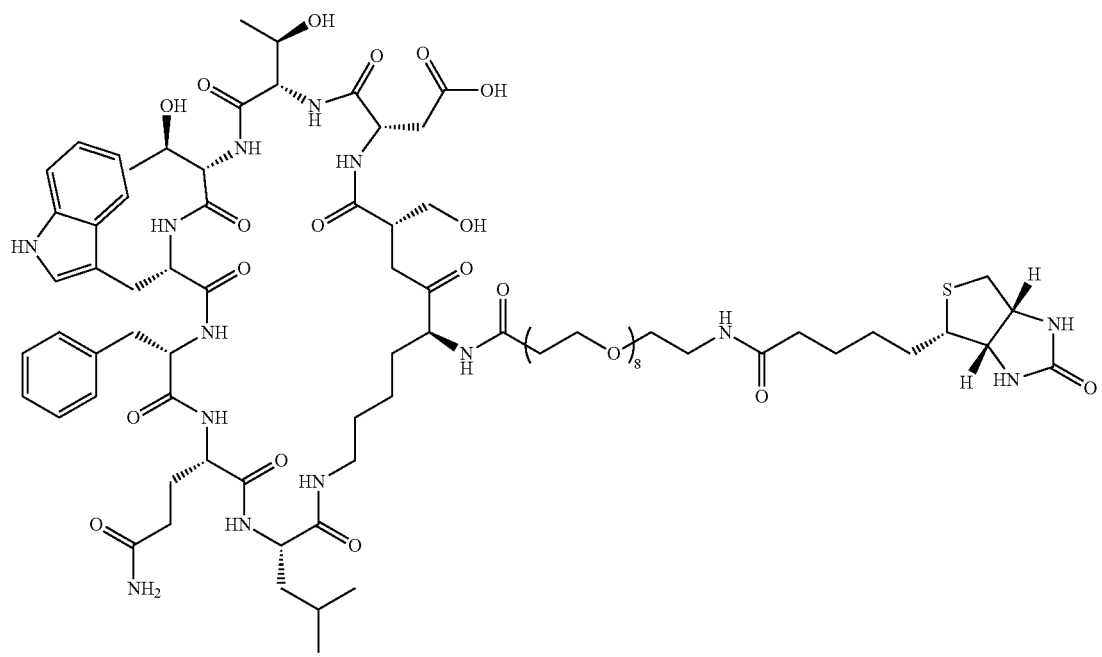
I-32

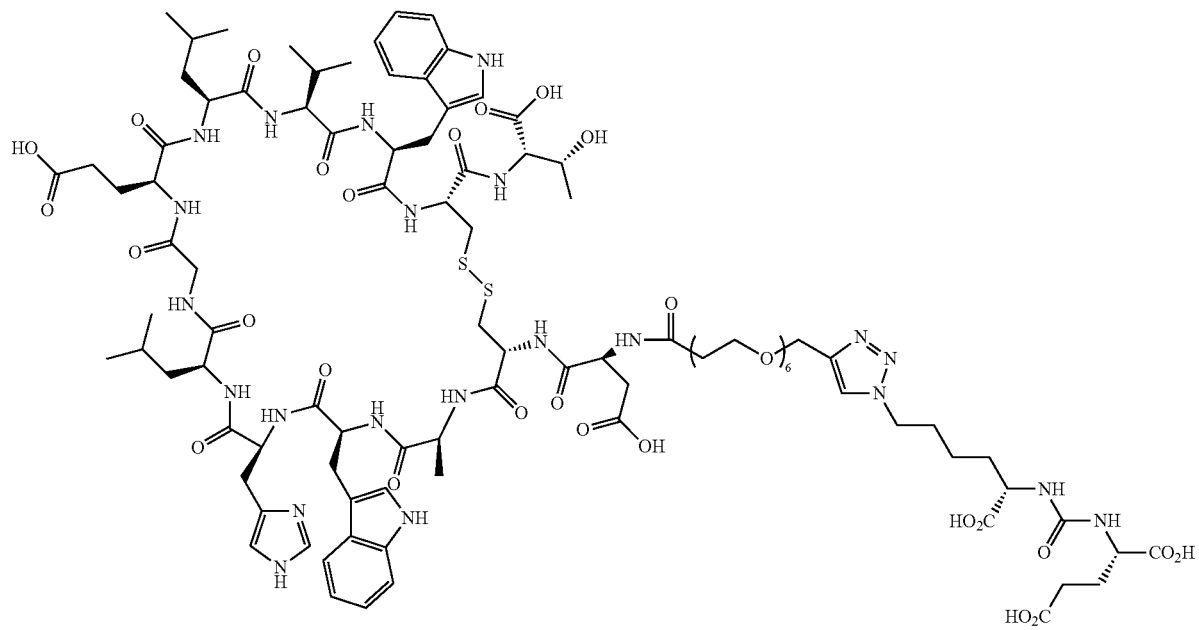

I-33

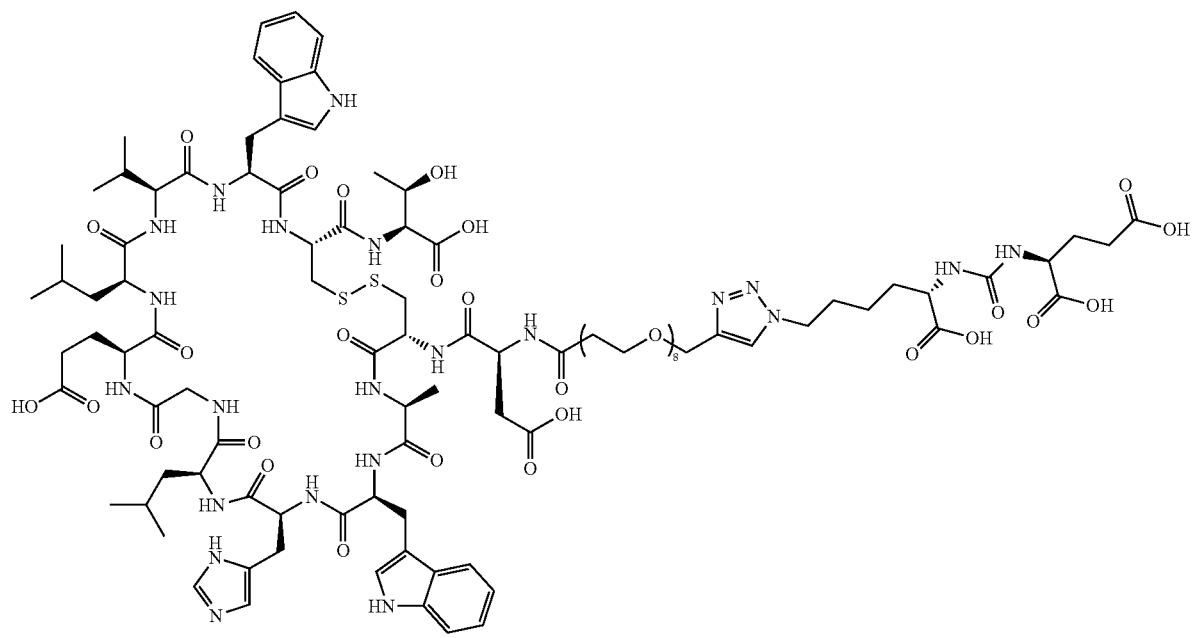

I-34

In some embodiments, an useful ARM is a compound set forth in Table 1, above, or a pharmaceutically acceptable salt thereof.

5. Exemplary Methods of Preparing Immune Cells and ARM Agents

Various technologies in the art may be utilized to prepare immune cells, e.g., NK cells and agents of the present disclosure. Certain methods, including isolation, purification, pre-activation, characterization, assessment, etc., are described in Romee et al., Blood 120, 4751-4760, (2012); Leong et al., Biol. Blood Marrow Transplant. 20, 463-473 (2014); Romee et al., Sci Transl Med. 2016 Sep. 21; 8(357): 357ra123. doi: 10.1126/scitranslmed.aaf2341; etc.

Agents such as ARMs may be prepared, e.g., through synthetic methods as exemplified in the Examples.

For example, in some embodiments, useful compounds, e.g., ARMs, are constructed through cycloaddition reactions, e.g., click chemistry or variants thereof.

In some embodiments, a compound, e.g., useful for preparing an agent of the present disclosure, e.g., an ARM, has the structure of formula IV:

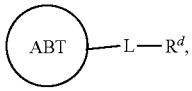

IV or a salt thereof, wherein
ABT is an antibody binding moiety;
L is a linker moiety;
$R^d$ is $-L^a-R'$, wherein $R^d$ comprises —C≡C— or —$N_3$;
each $L^a$ is independently a covalent bond, or an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, N(R')C(O)O—, —S(O)—, —S(O)$_2$—, —S(O)$_2$N(R')—, —C(O)S—, or —C(O)O—;
each -Cy- is independently an optionally substituted bivalent group selected from a $C_{3-20}$ cycloaliphatic ring, a $C_{6-20}$ aryl ring, a 5-20 membered heteroaryl ring having 1-10 heteroatoms independently selected from oxygen, nitrogen, sulfur, phosphorus and silicon, and a 3-20 membered heterocyclyl ring having 1-10 heteroatoms independently selected from oxygen, nitrogen, sulfur, phosphorus and silicon;
each R' is independently —R, C(O)R, —CO$_2$R, or —SO$_2$R;
each R is independently —H, or an optionally substituted group selected from $C_{1-30}$ aliphatic, $C_{1-30}$ heteroaliphatic having 1-10 heteroatoms independently selected from oxygen, nitrogen, sulfur, phosphorus and silicon, $C_{6-30}$ aryl, $C_{6-30}$ arylaliphatic, $C_{6-30}$ arylheteroaliphatic having 1-10 heteroatoms independently selected from oxygen, nitrogen, sulfur, phosphorus and silicon, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon, or
two R groups are optionally and independently taken together to form a covalent bond, or:
two or more R groups on the same atom are optionally and independently taken together with the atom to form an optionally substituted, 3-30 membered, monocyclic, bicyclic or polycyclic ring having, in addition to the atom, 0-10 heteroatoms independently selected from oxygen, nitrogen, sulfur, phosphorus and silicon; or
two or more R groups on two or more atoms are optionally and independently taken together with their intervening atoms to form an optionally substituted, 3-30 membered, monocyclic, bicyclic or polycyclic ring having, in addition to the intervening atoms, 0-10 heteroatoms independently selected from oxygen, nitrogen, sulfur, phosphorus and silicon.

In some embodiments, a compound, e.g., useful for preparing an agent of the present disclosure, e.g., an ARM, has the structure of formula IV-a:

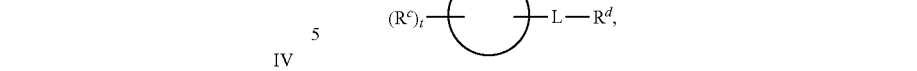

IV-a or a salt thereof, wherein each variable is independently as described in the present disclosure.

In some embodiments, a compound, e.g., useful for preparing an agent of the present disclosure, e.g., an ARM, has the structure of formula IV-b:

$R^c$-(Xaa)$_z$-L-$R^d$,       IV-b or a salt thereof, wherein each variable is independently as described in the present disclosure.

In some embodiments, a compound, e.g., useful for preparing an agent of the present disclosure, e.g., an ARM, has the structure of formula IV-c:

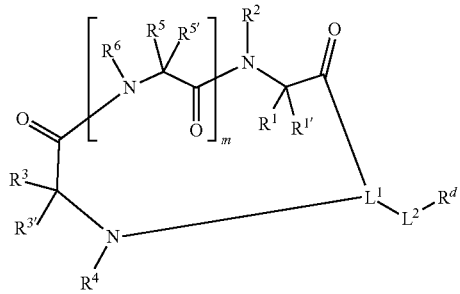

IV-c or a salt thereof, wherein each variable is independently as described in the present disclosure.

In some embodiments, a compound, e.g., useful for preparing an agent of the present disclosure, e.g., an ARM, has the structure of formula IV-d:

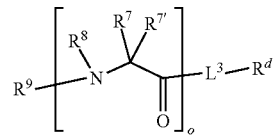

IV-d or a salt thereof, wherein each variable is independently as described in the present disclosure.

In some embodiments, a compound, e.g., useful for preparing an agent of the present disclosure, e.g., an ARM, has the structure of formula V:

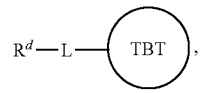

V or a salt thereof, wherein each variable is independently as described in the present disclosure.

In some embodiments, a method for preparing a compound, e.g., an ARM, comprises steps of:
providing a first compound of formula IV, IV-a, IV-b, IV-c, or IV-d, or a salt thereof, wherein the compound comprising a first reactive moiety;

providing a second compound of formula V comprising a second reactive moiety or a salt thereof; and reacting the first compound with the second compound, wherein the first reactive moiety reacts with the second reaction moiety through a cycloaddition reaction.

Many cycloaddition reactions can be utilized in accordance with the present disclosure. In some embodiments, a cycloaddition reaction is a [4+2] reaction. In some embodiments, a cycloaddition reaction is a [3+2] reaction. In some embodiments, a [3+2] reaction is a click chemistry reaction. In some embodiments, a first reactive moiety is —C≡C— and the second reactive moiety is —$N_3$. In some embodiments, a first reactive moiety is —$N_3$ and the second reactive moiety is —C≡C—.

6. Uses, Formulation and Administration

Pharmaceutically Acceptable Compositions

In some embodiments, the present disclosure provides a composition comprising immune cells, e.g., pre-activated memory-like NK cells, and a pharmaceutically acceptable carrier, adjuvant, or vehicle. In some embodiments, the present disclosure provides a composition comprising an agent and a pharmaceutically acceptable derivative thereof and a pharmaceutically acceptable carrier, adjuvant, or vehicle. In some embodiments, the present disclosure provides a composition comprising immune cells and an agent and a pharmaceutically acceptable derivative thereof and a pharmaceutically acceptable carrier, adjuvant, or vehicle. In some embodiments, immune cells and useful agents, e.g., ARMs, are provided in separate compositions. In some embodiments, immune cells and useful agents, e.g., ARMs, are provided in the same compositions.

In many embodiments, immune cells are typically administered at amounts sufficient to provide therapeutic benefits without severe side effects. For example, in some embodiments, immune cells are administered at 0.01-100, 0.1-50, 0.1-20, 0.1-10, 0.05, 0.1, 0.2, 0.3, 0.3, 0.5, 1, 2, 3, 4, 5, 6, 7, 8, 9, 10, 15, 20, 25, 30, 35, 40, 45, 50, 60, 70, 80 or 90 million per kilogram of body weight of a subject.

Agents, e.g., ARMs, are typically administered at amounts that are effective to redirect endogenous antibodies (e.g., endogenous antibodies) and/or fragments thereof selectively to target cells, e.g., cancer cells, thereby inducing antibody-directed, cell-mediated immunity, e.g., cytotoxicity. In certain embodiments, amounts of compounds in compositions of the present disclosure are such that they are effective to redirect endogenous antibodies selectively to cancer cells, thereby inducing antibody-directed, cell-mediated cytotoxicity, in a biological sample or in a subject. In some embodiments, an amount is 0.01-100 mg/kg body weight. In some embodiments, an amount is 0.01-50 mg/kg body weight. In some embodiments, an amount is from about 1 mg/kg to about 25 mg/kg.

In some embodiments, a pharmaceutically acceptable carrier, adjuvant, or vehicle is a non-toxic carrier, adjuvant, or vehicle that does not destroy the pharmacological activity of the compound with which it is formulated. Pharmaceutically acceptable carriers, adjuvants or vehicles that may be used in the compositions of this invention include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat. In some embodiments, immune cells may be provided in a suitable medium.

In some embodiments, an agent may be provided as a pharmaceutically acceptable derivative, which can be a non-toxic salt, ester, salt of an ester or other derivative of a compound of the present disclosure that, upon administration to a recipient, is capable of providing, either directly or indirectly, the agent.

Compositions of the present disclosure may be administered orally, parenterally, by inhalation spray, topically, rectally, nasally, buccally, vaginally or via an implanted reservoir. In some embodiments, parenteral administration includes subcutaneous, intravenous, intramuscular, intra-articular, intra-synovial, intrasternal, intrathecal, intrahepatic, intralesional and intracranial injection or infusion techniques. Preferably, compositions are administered orally, intraperitoneally or intravenously. Preferably, compositions comprising immune cells are administered intravenously. Sterile injectable forms of compositions of this present disclosure may be aqueous or oleaginous suspension. Suspensions may be formulated according to techniques known in the art using suitable dispersing or wetting agents and suspending agents. A sterile injectable preparation may also be a sterile injectable solution or suspension in a non-toxic parenterally acceptable diluent or solvent, for example as a solution in 1,3-butanediol. Among acceptable vehicles and solvents that may be employed are water, Ringer's solution and isotonic sodium chloride solution. In addition, sterile, fixed oils are conventionally employed as a solvent or suspending medium.

In some embodiments, agents, e.g., ARMs, are formulated as compositions for delayed and/or sustained releases. Technologies for sustained release and/or slowed absorption are widely available in the art and can be utilized in accordance with the present disclosure.

In some embodiments, bland fixed oil may be employed including synthetic mono- or di-glycerides. Fatty acids, such as oleic acid and its glyceride derivatives may be useful in the preparation of injectables, as may be natural pharmaceutically-acceptable oils, such as olive oil or castor oil, especially in their polyoxyethylated versions. Such oil solutions or suspensions may also contain a long-chain alcohol diluent or dispersant, such as carboxymethyl cellulose or similar dispersing agents that are commonly used in the formulation of pharmaceutically acceptable dosage forms including emulsions and suspensions. Other commonly used surfactants, such as Tweens, Spans and other emulsifying agents or bioavailability enhancers which are commonly used in the manufacture of pharmaceutically acceptable solid, liquid, or other dosage forms may also be used for the purposes of formulation.

Pharmaceutically acceptable compositions of agents of the present disclosure, e.g., ARMs, may be orally administered in any orally acceptable dosage form, e.g., capsules, tablets, aqueous suspensions or solutions. In the case of tablets for oral use, carriers commonly used include lactose and corn starch. Lubricating agents, such as magnesium stearate, may also be added. For oral administration in a capsule form, useful diluents include lactose and dried cornstarch. When aqueous suspensions are required for oral use, the active ingredient is combined with emulsifying and suspending agents. If desired, certain sweetening, flavoring or coloring agents may also be added.

Solid dosage forms, e.g., for oral administration include capsules, tablets, pills, powders, and granules. In some embodiments, an agent to be delivered, e.g., an ARM, is mixed with at least one inert, pharmaceutically acceptable excipient or carrier such as sodium citrate or dicalcium phosphate and/or a) fillers or extenders such as starches, lactose, sucrose, glucose, mannitol, and silicic acid, b) binders such as, for example, carboxymethylcellulose, alginates, gelatin, polyvinylpyrrolidinone, sucrose, and acacia, c) humectants such as glycerol, d) disintegrating agents such as agar-agar, calcium carbonate, potato or tapioca starch, alginic acid, certain silicates, and sodium carbonate, e) solution retarding agents such as paraffin, f) absorption accelerators such as quaternary ammonium compounds, g) wetting agents such as, for example, cetyl alcohol and glycerol monostearate, h) absorbents such as kaolin and bentonite clay, and i) lubricants such as talc, calcium stearate, magnesium stearate, solid polyethylene glycols, sodium lauryl sulfate, and mixtures thereof. In the case of capsules, tablets and pills, the dosage form may also comprise buffering agents.

Solid compositions may also be employed as fillers in soft and hard-filled gelatin capsules using such excipients as lactose or milk sugar as well as high molecular weight polyethylene glycols and the like. In some embodiments, solid dosage forms of tablets, dragees, capsules, pills, and granules can be prepared with coatings and shells such as enteric coatings and other coatings well known in the pharmaceutical formulating art. In some embodiments, solid compositions may optionally contain opacifying agents and can release the agents to be delivered only, or preferentially, in a certain part of a subject (e.g., a certain part of the intestinal tract), optionally, in a delayed manner. Examples of embedding compositions that can be used include polymeric substances and waxes.

In some embodiments, agents, e.g., ARMs, can be in micro-encapsulated form with one or more excipients as noted above. In some embodiments, solid dosage forms of tablets, dragees, capsules, pills, and granules can be prepared with coatings and shells such as enteric coatings, release controlling coatings and other coatings well known in the pharmaceutical formulating art. In such solid dosage forms the agents to be delivered may be admixed with at least one inert diluent such as sucrose, lactose or starch. Such dosage forms may also comprise, as in normal practice, additional substances, e.g., tableting lubricants and other tableting aids such as magnesium stearate and microcrystalline cellulose. In some embodiments, in the case of capsules, tablets and pills, dosage forms may comprise buffering agents.

Alternatively, pharmaceutically acceptable compositions may be administered in the form of suppositories for rectal administration. These can be prepared by mixing the agent with a suitable non-irritating excipient that is solid at room temperature but liquid at rectal temperature and therefore will melt in the rectum to release the drug. Such materials include cocoa butter, beeswax and polyethylene glycols.

Pharmaceutically acceptable compositions of this invention may also be administered topically, especially when the target of treatment includes areas or organs readily accessible by topical application, including diseases of the eye, the skin, or the lower intestinal tract. Suitable topical formulations can be readily prepared for each of these areas or organs.

For topical applications, pharmaceutically acceptable compositions may be formulated in a suitable ointment containing the active component suspended or dissolved in one or more carriers. Carriers for topical administration of compounds of this invention include, but are not limited to, mineral oil, liquid petrolatum, white petrolatum, propylene glycol, polyoxyethylene, polyoxypropylene compound, emulsifying wax and water. Alternatively, pharmaceutically acceptable compositions can be formulated in a suitable lotion or cream containing the active components suspended or dissolved in one or more pharmaceutically acceptable carriers. Suitable carriers include, but are not limited to, mineral oil, sorbitan monostearate, polysorbate 60, cetyl esters wax, cetearyl alcohol, 2-octyldodecanol, benzyl alcohol and water.

For ophthalmic use, pharmaceutically acceptable compositions may be formulated as micronized suspensions in isotonic, pH adjusted sterile saline, or, preferably, as solutions in isotonic, pH adjusted sterile saline, either with or without a preservative such as benzylalkonium chloride. Alternatively, for ophthalmic uses, pharmaceutically acceptable compositions may be formulated in an ointment such as petrolatum.

Pharmaceutically acceptable compositions may also be administered by nasal aerosol or inhalation. Such compositions are prepared according to techniques well-known in the art of pharmaceutical formulation and may be prepared as solutions in saline, employing benzyl alcohol or other suitable preservatives, absorption promoters to enhance bioavailability, fluorocarbons, and/or other conventional solubilizing or dispersing agents.

Pharmaceutically acceptable compositions of agents, e.g., ARMs, may be formulated for oral administration. Such formulations may be administered with or without food. In some embodiments, pharmaceutically acceptable compositions are administered without food. In other embodiments, pharmaceutically acceptable compositions are administered with food.

It should also be understood that a specific dosage and treatment regimen for a particular subject will depend upon a variety of factors, e.g., the activity of the specific immune cells and/or agents employed, the age, body weight, general health, sex, diet, time of administration, rate of excretion, drug combination, and the judgment of the treating physician and the severity of the particular disease being treated, etc.

Uses

Among other things, the present disclosure encompasses the recognition that certain immune cells, such as pre-activated memory-like NK cells, have improved properties and/or activities toward their targets, e.g., cancer cells, and can be particularly effective for treating conditions, disorders or diseases such as cancer; however, such immune cells, e.g., due to their increased cytotoxicity, may also induce more severe side effects, e.g., as a result of off-targeting. Thus, in some embodiments, the present disclosure provides technologies which expose a subject to both such immune cells and agents, e.g., ARMs that can facilitate targeting of immune cells to desired targets (e.g., cancer cells) and reduce side effects of such immune cell therapy.

In some embodiments, useful agents direct antibodies, e.g., endogenous antibodies, selectively to diseased cells, e.g., cancer cells, thereby inducing and/or promoting an antibody-directed, cell-mediated immune response, e.g., cytotoxicity by immune cells, e.g., pre-activated memory-like NK cells (e.g., cytokine-induced memory-like NK cells). In some embodiments, recruited antibodies comprise one or more endogenous antibodies. In some embodiments, recruited antibodies have specificity toward one or more antigens. In some embodiments, recruited antibodies have specificity toward one or more peptide antigens or proteins.

In some embodiments, recruited antibodies are heterogeneous in that they are not antibodies toward the same antigen or protein.

In some embodiments, useful agents, e.g., ARMs, trigger, generate encourage, and/or enhance one or more immune system activities toward a target. In some embodiments, an immune system activity is or comprises ADCC by NK cells. In some embodiments, an immune system activity is or comprises ADCC by pre-activated memory-like NK cells (e.g., cytokine-induced memory-like NK cells). In some embodiments, a target is a cancer cell. In some embodiments, a target is a cancer cells in a subject.

As described herein, immune cells, such as pre-activated memory-like NK cells (e.g., cytokine-induced memory-like NK cells) and agents such as ARMs are administered such that a subject can be exposed to both. In some embodiments, immune cells (or a dose thereof) are administered prior to an ARM agent (or a dose thereof). In some embodiments, immune cells (or a dose thereof) are administered subsequent to an ARM agent (or a dose thereof). In some embodiments, immune cells (or a dose thereof) are administered concurrently with an ARM agent (or a dose thereof). When administered concurrently, immune cells and ARMs may be administered in one composition or as separate compositions. In some embodiments, immune cells and ARMs are administered within 0, 1, 2, 3, 4, 5, 6, 7, 8, 9, 10, 11, 12, 13, 14, 15, 16, 17, 18, 19, 20, 21, 22, 23 or 24 hours, or 1, 2, 3, 4, 5, 6, 7, 8, 9, 10 days, or 1, 2, 3, 4, 5, 6, 7, 8, 9, 10, 11, 12, 13, 14, 15, 16, 17, 18, 19, 20 weeks, of each other. Immune cells and agents (e.g., ARMs) may be independently administered as a single dose or multiple doses. In some embodiments, administered immune cells, e.g., pre-activated memory-like NK cells, form complexes with administered ARMs together with targets (e.g., cancer cells) and antibodies (or fragments thereof) in a subject, wherein the antibodies (or fragments thereof) interact with the immune cells and ARMs, and the ARMs interact with the antibodies (or fragments thereof) and the targets (e.g., cancer cells).

In some embodiments, "treating" or "treatment" as used herein includes reversing, alleviating, delaying the onset of, or inhibiting the progress of a condition, disorder or disease, or one or more symptoms thereof. In some embodiments, treatment may be administered after one or more symptoms have developed. In other embodiments, treatment may be administered in the absence of symptoms. For example, treatment may be administered to a susceptible individual prior to the onset of symptoms (e.g., in light of a history of symptoms and/or in light of genetic or other susceptibility factors). Treatment may also be continued after symptoms have resolved, for example to prevent or delay their recurrence.

In some embodiments, the present invention provides a method for treating one or more disorders, diseases, and/or conditions wherein the disorder, disease, or condition is a cancer. Among other things, provided technologies (e.g., compounds, compositions, methods, etc.) are particularly useful for preventing and/or treating cancer.

In some embodiments, cancer is a pathological process that results in the formation and growth of a cancerous or malignant neoplasm, i.e., abnormal tissue that grows by cellular proliferation, often more rapidly than normal and continues to grow after the stimuli that initiated the new growth cease. Malignant neoplasms may show partial or complete lack of structural organization and functional coordination with the normal tissue and most invade surrounding tissues, metastasize to several sites, and are likely to recur after attempted removal and to cause the death of the patient unless adequately treated. In some embodiments, as used herein, the term neoplasia includes all cancerous disease states and embraces or encompasses the pathological process associated with malignant hematogenous, ascitic and solid tumors. Representative cancers include, for example, prostate cancer, metastatic prostate cancer, stomach, colon, rectal, liver, pancreatic, lung, breast, cervix uteri, corpus uteri, ovary, testis, bladder, renal, brain/CNS, head and neck, throat, Hodgkin's disease, non-Hodgkin's lymphoma, multiple myeloma, leukemia, melanoma, non-melanoma skin cancer, acute lymphocytic leukemia, acute myelogenous leukemia, Ewing's sarcoma, small cell lung cancer, choriocarcinoma, rhabdomyosarcoma, Wilms' tumor, neuroblastoma, hairy cell leukemia, mouth/pharynx, esophagus, larynx, kidney cancer and lymphoma, among others, which may be treated by one or more compounds according to the present invention.

In some embodiments, a cancer is leukemia. In some embodiments, provided technologies are particularly useful for treating leukemia. In some embodiments, provided technologies are particularly useful for treating acute myeloid leukemia (AML). In some embodiments, a cancer is lymphoma. In some embodiments, a cancer is melanoma.

In some embodiments, prior to administration of the present therapy (e.g., exposure to both administered pre-activated, memory-like NK cells and an ARM), a subject may have been treated with another therapy, e.g., chemotherapy, immunotherapy, surgery, etc. In some embodiments, a subject is susceptible to or suffering from relapsed or refractory cancer. In some embodiments, a subject is susceptible to or suffering from relapsed or refractory leukemia. In some embodiments, a subject is susceptible to or suffering from relapsed or refractory AML.

In some embodiments, treatment can be administered to subjects undergoing a lymphodepletion regimen. In some embodiments, depletion of immune regulatory elements, e.g., with cytotoxic agents or whole body irradiation, may enhance activities of administered immune cells. In some embodiments, subjects are administered cytotoxic agent such as fludarabine, cyclophosphamide, and/or alemtuzumab.

Combination Therapies

In certain embodiments, provided technologies, e.g., those comprising immune cells (e.g., memory-like NK cells) and ARMs, are administered in combination with one or more other therapies. In some embodiments, in addition to immune cells (e.g., memory-like NK cells) and an ARM agent, a subject is administered another therapy. In some embodiments, a subject is suffering from cancer, and such another therapy is a cancer therapy, e.g., chemotherapy, immunotherapy, surgery, etc.

Among other things, technologies of the present disclosure comprising immune cells (e.g., memory-like NK cells) and ARMs can be employed in combination with other therapies, that is, such technologies can be administered concurrently with, prior to, or subsequent to, one or more other therapeutic agents or medical procedures, particularly for treatment of various cancers. In some embodiments, such technologies may be utilized in combination with other antiproliferative compounds. In some embodiments, a therapeutic agent useful for combination is a chemotherapeutic agent or antiproliferative compounds. Exemplary chemotherapy agents include but are not limited to alkylating agents, nitrosourea agents, antimetabolites, antitumor antibiotics, alkaloids derived from plant, topoisomerase inhibitors, hormone therapy medicines, hormone antagonists, aromatase inhibitors, P-glycoprotein inhibitors, platinum complex derivatives, other immunotherapeutic drugs, and other anticancer agents. Further, provided technologies can be used together with hypoleukocytosis (neutrophil) medicines that are cancer treatment adjuvant, thrombopenia medicines, antiemetic drugs, and cancer pain medicines for patient's QOL recovery or be made as a mixture with them. In some embodiments, a therapeutic reagent is an antibody. In some embodiments, a therapeutic agent is an immunomodulatory agent. In some embodiments, an immunomodulatory agent targets cell surface signaling molecules on immune cells. In some embodiments, an immunomodulatory agent targets cell surface signaling molecules on immune cells, wherein the agent is an antagonist blocking a co-inhibitory pathway. In some embodiments, an immunomodulatory agent is a checkpoint blockage agent. In some embodiments, an immunomodulatory agent is an antibody targeting a cell surface signaling protein expressed by immune cells. In some embodiments, an immunomodulatory agent is an antibody targeting a protein selected from PD-1, PD-L1, CTLA4, TIGIT, BTLA, TIM-3, LAG3, B7-H3, and B7-H4. In some embodiments, an immunomodulatory agent is a PD-1 antibody (e.g., nivolumab, pembrolizumab, pidilizumab, BMS 936559, MPDL3280A, etc.). In some embodiments, an immunomodulatory agent is a PD-L1 antibody. In some embodiments, an immunomodulatory agent is a CTLA4 antibody (e.g., ipilimumab). In some embodiments, an immunomodulatory agent is a TIGIT antibody. In some embodiments, an immunomodulatory agent is a BTLA antibody. In some embodiments, an immunomodulatory agent is a Tim-3 antibody. In some embodiments, an immunomodulatory agent is a LAG3 antibody. In some embodiments, an immunomodulatory agent is a B7-H3 antibody. In some embodiments, an immunomodulatory agent is a B7-H4 antibody. In some embodiments, an immunomodulatory agent targets cell surface signaling molecules on immune cells, wherein the agent is an agonist engaging a co-stimulatory pathway. In some embodiments, such an immunomodulatory agent is or comprises an antibody targeting a co-stimulatory receptor. In some embodiments, an antibody activates a T cell co-stimulatory receptor. In some embodiments, an antibody targets a member of the tumor necrosis factor (TNF) receptor superfamily. In some embodiments, an antibody targets a protein selected from CD137 (4-1BB), CD357 (GITR, TNFRS18, AITR), CD134 (OX40) and CD 40 (TNFRSF5). In some embodiments, an antibody is an anti-CD137 antibody (e.g., urelumab). In some embodiments, an antibody is an anti-CD357 antibody. In some embodiments, an antibody is an anti-CD40 antibody. In some embodiments, an antibody is an anti-CD134 antibody. Additional exemplary T cell co-stimulatory and co-inhibitory receptors are described in Chen L, Flies DB., Molecular mechanisms of T cell co-stimulation and co-inhibition. Nat. Rev. Immunol. 2013, 13 (4), 227-42, and Yao S, et al., Advances in targeting cell surface signaling molecules for immune modulation. Nat. Rev. Drug Discov. 2013, 12 (2), 136-40. In some embodiments, a therapeutic agent is an antibodies activating such a stimulatory receptor, or blocking such an inhibitory receptor.

In some embodiments, for a hematological malignancy a useful additional therapeutic agent for combination can be rituximab (Rituxan®), cyclophosphamide (Cytoxan®), doxorubicin (Hydrodaunorubicin®), vincristine (Oncovin®), prednisone, a hedgehog signaling inhibitor, a BTK inhibitor, a JAK/pan-JAK inhibitor, a TYK2 inhibitor, a PI3K inhibitor, a SYK inhibitor, and combinations thereof. In some embodiments, for solid tumors a useful therapeutic agent for combination is selected from rituximab (Rituxan®), cyclophosphamide (Cytoxan®), doxorubicin (Hydrodaunorubicin®), vincristine (Oncovin®), prednisone, a hedgehog signaling inhibitor, a BTK inhibitor, a JAK/pan-JAK inhibitor, a TYK2 inhibitor, a PI3K inhibitor, a SYK inhibitor, and combinations thereof. In some embodiments, a useful additional agent for combination is a Hedgehog (Hh) signaling pathway inhibitor.

In some embodiments, a condition, disorder or disease is diffuse large B-cell lymphoma (DLBCL). In some embodiments, a useful additional agent for combination for DLBCL is selected from rituximab (Rituxan®), cyclophosphamide (Cytoxan®), doxorubicin (Hydrodaunorubicin®), vincristine (Oncovin®), prednisone, a hedgehog signaling inhibitor, and combinations thereof.

In another embodiment, a condition, disorder or disease is multiple myeloma. In some embodiments, a useful additional agent for combination is selected from bortezomib (Velcade®), and dexamethasone (Decadron®), a hedgehog signaling inhibitor, a BTK inhibitor, a JAK/pan-JAK inhibitor, a TYK2 inhibitor, a PI3K inhibitor, a SYK inhibitor in combination with lenalidomide (Revlimid®) and combinations thereof.

In another embodiment, a condition, disorder or disease is Waldenström's macroglobulinemia. In some embodiments, a useful additional therapeutic agent is selected from chlorambucil (Leukeran®), cyclophosphamide (Cytoxan®, Neosar®), fludarabine (Fludara®), cladribine (Leustatin®), rituximab (Rituxan®), a hedgehog signaling inhibitor, a BTK inhibitor, a JAK/pan-JAK inhibitor, a TYK2 inhibitor, a PI3K inhibitor, a SYK inhibitor and combinations thereof.

In some embodiments, one or more other therapeutic agents for combination are or comprise tumor-specific immune cells. In some embodiments, a composition for combination comprises an immunopotentiative substance. Exemplary immunopotentiative substances that can be utilized in combination with provided technologies comprising immune cells and ARMs include various cytokines and tumor antigens. Cytokines that stimulate immune reactions include, for example, GM-CSF, M-CSF, G-CSF, interferon-α, β, γ, IL-1, IL-2, IL-3, and IL-12, etc. Antibodies to block inhibitory receptors and/or to activate stimulatory receptors, which are widely known in the art and described herein, e.g., B7 ligand derivatives, anti-CD3 antibodies, anti-CD28 antibodies, and anti-CTLA-4 antibodies may improve desirable immune reactions. In some embodiments, a therapeutic agent for combination comprises or is a small molecule for immune modulation. In some embodiments, a therapeutic agent is a small molecule that mediating anti-tumor immune activity. In some embodiments, a therapeutic agent is a small molecule that targets an enzyme directly involved in immune regulation. In some embodiments, a therapeutic agent is an indoleamine 2,3-dioxygenase (IDO) inhibitor. In some embodiments, a therapeutic agent is an IDO1 inhibitor, e.g., F001287, indoximod, NLG-919 and INCB024360. In some embodiments, a therapeutic agent is a tryptophan-2,3 dioxygenase (TDO) inhibitor. In some embodiments, a therapeutic agent is an IDO/TDO dual inhibitor. In some embodiments, a therapeutic agent is an IDO-selective inhibitor. In some embodiments, some other embodiments, a therapeutic agent is a TDO-selective inhibitor. In some embodiments, a provided composition comprises an IDO inhibitor. In some embodiments, a provided composition comprises an IDO inhibitor.

In some embodiments, a medical procedure that may be used in combination with compounds, compositions and methods include surgery, radiotherapy (e.g., γ-radiation, neutron beam radiotherapy, electron beam radiotherapy, proton therapy, brachytherapy, systemic radioactive isotopes, etc.), endocrine therapy, biologic response modifiers (e.g., interferons, interleukins, and tumor necrosis factor (TNF), etc.), hyperthermia, cryotherapy, and adoptive T-cell transfer (e.g., TIL therapy, transgenic TCRs, CAR T-cell therapy, etc.). In some embodiments, a medical procedure is surgery. In some embodiments, a medical procedure is radiotherapy.

In some embodiments, antiproliferative compounds that are useful for combination include, but are not limited to aromatase inhibitors; antiestrogens; topoisomerase I inhibitors; topoisomerase II inhibitors; microtubule active compounds; alkylating compounds; histone deacetylase inhibitors; compounds which induce cell differentiation processes; cyclooxygenase inhibitors; MMP inhibitors; mTOR inhibitors; antineoplastic antimetabolites; platin compounds; compounds targeting/decreasing a protein or lipid kinase activity and further anti-angiogenic compounds; compounds which target, decrease or inhibit the activity of a protein or lipid phosphatase; gonadorelin agonists; anti-androgens; methionine aminopeptidase inhibitors; matrix metalloproteinase inhibitors; bisphosphonates; biological response modifiers; antiproliferative antibodies; heparanase inhibitors; inhibitors of Ras oncogenic isoforms; telomerase inhibitors; proteasome inhibitors; compounds used in the treatment of hematologic malignancies; compounds which target, decrease or inhibit the activity of Flt-3; Hsp90 inhibitors such as 17-AAG (17-allylaminogeldanamycin, NSC330507), 17-DMAG (17-dimethylaminoethylamino-17-demethoxy-geldanamycin, NSC707545), IPI-504, CNF1010, CNF2024, CNF1010 from Conforma Therapeutics; temozolomide (Temodal®); kinesin spindle protein inhibitors, such as SB715992 or SB743921 from GlaxoSmithKline, or pentamidine/chlorpromazine from CombinatoRx; MEK inhibitors such as ARRY142886 from Array BioPharma, AZD6244 from AstraZeneca, PD181461 from Pfizer and leucovorin. In some embodiments, an aromatase inhibitor is a compound which inhibits estrogen production, for instance, the conversion of the substrates androstenedione and testosterone to estrone and estradiol, respectively. In some embodiments, it includes steroids, especially atamestane, exemestane and formestane and, in particular, non-steroids, especially aminoglutethimide, roglethimide, pyridoglutethimide, trilostane, testolactone, ketokonazole, vorozole, fadrozole, anastrozole and letrozole. In some embodiments, a combination with a chemotherapeutic agent which is an aromatase inhibitor is particularly useful for the treatment of hormone receptor positive tumors, such as breast tumors.

In some embodiments, an antiestrogen is a compound which antagonizes the effect of estrogens at the estrogen receptor level. In some embodiments, it is selected from tamoxifen, fulvestrant, raloxifene and raloxifene hydrochloride. In some embodiments, a combination with a chemotherapeutic agent which is an antiestrogen is particularly useful for the treatment of estrogen receptor positive tumors, such as breast tumors.

In some embodiments, an anti-androgen is a substance which is capable of inhibiting the biological effects of androgenic hormones. In some embodiments, it is bicalutamide (Casodex™). In some embodiments, gonadorelin agonist is abarelix, goserelin or goserelin acetate.

In some embodiments, a topoisomerase I inhibitor is selected from topotecan, gimatecan, irinotecan, camptothecian and its analogues, 9-nitrocamptothecin and the macromolecular camptothecin conjugate PNU-166148.

In some embodiments, a topoisomerase II inhibitor is selected from anthracyclines such as doxorubicin (including liposomal formulation, such as Caelyx™), daunorubicin, epirubicin, idarubicin and nemorubicin, the anthraquinones mitoxantrone and losoxantrone, and the podophillotoxines etoposide and teniposide.

In some embodiments, a microtubule active agent is selected from microtubule stabilizing, or microtubule destabilizing compounds and microtublin polymerization inhibitors e.g., taxanes, such as paclitaxel and docetaxel; vinca alkaloids, such as vinblastine or vinblastine sulfate, vincristine or vincristine sulfate, and vinorelbine; discodermolides; cochicine and epothilones and derivatives thereof.

In some embodiments, an alkylating agent is cyclophosphamide, ifosfamide, melphalan or nitrosourea (BCNU or Gliadel).

In some embodiments, a histone deacetylase inhibitor or HDAC inhibitor is a compound which inhibits a histone deacetylase and which possesses antiproliferative activity. In some embodiments, an HDAC inhibitor is suberoylanilide hydroxamic acid (SAHA). In some embodiments, an HDAC inhibitor useful for combination is MS275, SAHA, FK228 (formerly FR901228), Trichostatin A or a compound disclosed in U.S. Pat. No. 6,552,065, e.g., N-hydroxy-3-[4-[[[2-(2-methyl-1H-indol-3-yl)-ethyl]-amino]methyl]phenyl]-2E-2-propenamide, or a pharmaceutically acceptable salt thereof, N-hydroxy-3-[4-[(2-hydroxyethyl) {2-(1H-indol-3-yl)ethyl]-amino]methyl]phenyl]-2E-2-propenamide, or a pharmaceutically acceptable salt thereof (particularly the lactate salt).

In some embodiments, a antineoplastic antimetabolite is selected from 5-fluorouracil or 5-FU, capecitabine, gemcitabine, DNA demethylating compounds, such as 5-azacytidine and decitabine, methotrexate and edatrexate, and folic acid antagonists such as pemetrexed.

In some embodiments, a platin compound is carboplatin, cis-platin, cisplatinum or oxaliplatin.

In some embodiments, compounds targeting/decreasing a protein or lipid kinase activity; or a protein or lipid phosphatase activity; or further anti-angiogenic compounds are protein tyrosine kinase and/or serine and/or threonine kinase inhibitors or lipid kinase inhibitors, such as a) compounds targeting, decreasing or inhibiting the activity of the platelet-derived growth factor-receptors (PDGFR), such as compounds which target, decrease or inhibit the activity of PDGFR, especially compounds which inhibit the PDGF receptor, such as an N-phenyl-2-pyrimidine-amine derivative, such as imatinib, SU101, SU6668 and GFB-111; b) compounds targeting, decreasing or inhibiting the activity of the fibroblast growth factor-receptors (FGFR); c) compounds targeting, decreasing or inhibiting the activity of the insulin-like growth factor receptor I (IGF-IR), such as compounds which target, decrease or inhibit the activity of IGF-IR, especially compounds which inhibit the kinase activity of IGF-I receptor, or antibodies that target the extracellular domain of IGF-I receptor or its growth factors; d) compounds targeting, decreasing or inhibiting the activity of the Trk receptor tyrosine kinase family, or ephrin B4 inhibitors; e) compounds targeting, decreasing or inhibiting the activity of the AxI receptor tyrosine kinase family; f) compounds targeting, decreasing or inhibiting the activity of the Ret receptor tyrosine kinase; g) compounds targeting, decreasing or inhibiting the activity of the Kit/SCFR receptor tyrosine kinase, such as imatinib; h) compounds targeting, decreasing or inhibiting the activity of the C-kit receptor tyrosine kinases, which are part of the PDGFR family, such as compounds which target, decrease or inhibit the activity of the c-Kit receptor tyrosine kinase family, especially compounds which inhibit the c-Kit receptor, such as imatinib; i) compounds targeting, decreasing or inhibiting the activity of members of the c-Abl family, their gene-fusion products (e.g. BCR-Abl kinase) and mutants, such as compounds which target decrease or inhibit the activity of c-Abl family members and their gene fusion products, such as an N-phenyl-2-pyrimidine-amine derivative, such as imatinib or nilotinib (AMN107); PD180970; AG957; NSC 680410; PD173955 from ParkeDavis; or dasatinib (BMS-354825); j) compounds targeting, decreasing or inhibiting the activity of members of the protein kinase C (PKC) and Raf family of serine/threonine kinases, members of the MEK, SRC, JAK/pan-JAK, FAK, PDK1, PKB/Akt, Ras/MAPK, PI3K, SYK, TYK2, BTK and TEC family, and/or members of the cyclin-dependent kinase family (CDK) including staurosporine derivatives, such as midostaurin; examples of further compounds include UCN-01, safingol, BAY 43-9006, Bryostatin 1, Perifosine; Ilmofosine; RO 318220 and RO 320432; GO 6976; Isis 3521; LY333531/LY379196; isochinoline compounds; FTIs; PD184352 or QAN697 (a PI3K inhibitor) or AT7519 (CDK inhibitor); k) compounds targeting, decreasing or inhibiting the activity of protein-tyrosine kinase inhibitors, such as compounds which target, decrease or inhibit the activity of protein-tyrosine kinase inhibitors include imatinib mesylate (Gleevec™) or tyrphostin such as Tyrphostin A23/RG-50810; AG 99; Tyrphostin AG 213; Tyrphostin AG 1748; Tyrphostin AG 490; Tyrphostin B44; Tyrphostin B44 (+) enantiomer; Tyrphostin AG 555; AG 494; Tyrphostin AG 556, AG957 and adaphostin (4-{[(2, 5-dihydroxyphenyl)methyl]amino}-benzoic acid adamantyl ester; NSC 680410, adaphostin); 1) compounds targeting, decreasing or inhibiting the activity of the epidermal growth factor family of receptor tyrosine kinases (EGFR1 ErbB2, ErbB3, ErbB4 as homo- or heterodimers) and their mutants, such as compounds which target, decrease or inhibit the activity of the epidermal growth factor receptor family are especially compounds, proteins or antibodies which inhibit members of the EGF receptor tyrosine kinase family, such as EGF receptor, ErbB2, ErbB3 and ErbB4 or bind to EGF or EGF related ligands, CP 358774, ZD 1839, ZM 105180; trastuzumab (Herceptin™), cetuximab (Erbitux™), Iressa, Tarceva, OSI-774, CI-1033, EKB-569, GW-2016, E1.1, E2.4, E2.5, E6.2, E6.4, E2.11, E6.3 or E7.6.3, and 7H-pyrrolo-[2,3-d]pyrimidine derivatives; m) compounds targeting, decreasing or inhibiting the activity of the c-Met receptor, such as compounds which target, decrease or inhibit the activity of c-Met, especially compounds which inhibit the kinase activity of c-Met receptor, or antibodies that target the extracellular domain of c-Met or bind to HGF, n) compounds targeting, decreasing or inhibiting the kinase activity of one or more JAK family members (JAK1/JAK2/JAK3/TYK2 and/or pan-JAK), including PRT-062070, SB-1578, baricitinib, pacritinib, momelotinib, VX-509, AZD-1480, TG-101348, tofacitinib, and ruxolitinib; o) compounds targeting, decreasing or inhibiting the kinase activity of PI3 kinase (PI3K) including ATU-027, SF-1126, DS-7423, PBI-05204, GSK-2126458, ZSTK-474, buparlisib, pictrelisib, PF-4691502, BYL-719, dactolisib, XL-147, XL-765, and idelalisib; and; and q) compounds targeting, decreasing or inhibiting the signaling effects of hedgehog protein (Hh) or smoothened receptor (SMO) pathways, including cyclopamine, vismodegib, itraconazole, erismodegib, and IPI-926 (saridegib).

In some embodiments, PI3K inhibitors are compounds having inhibitory activity against one or more enzymes in the phosphatidylinositol-3-kinase family, including, but not limited to PI3Kα, PI3Kγ, PI3Kδ, PI3Kβ, PI3K-C2α, PI3K-C2β, PI3K-C2γ, Vps34, p110-α, p110-β, p110-γ, p110-δ, p85-α, p85-β, p55-γ, p150, p101, and p87. Examples of PI3K inhibitors useful for combination include ATU-027, SF-1126, DS-7423, PBI-05204, GSK-2126458, ZSTK-474, buparlisib, pictrelisib, PF-4691502, BYL-719, dactolisib, XL-147, XL-765, and idelalisib.

In some embodiments, BTK inhibitor are compounds having inhibitory activity against Bruton's Tyrosine Kinase (BTK), e.g., AVL-292, ibrutinib, etc.

In some embodiments, SYK inhibitors are compounds having inhibitory activity against spleen tyrosine kinase (SYK), e.g., PRT-062070, R-343, R-333, Excellair, PRT-062607, fostamatinib, etc. Further examples of BTK inhibitory compounds can be found in WO2008039218 and WO2011090760.

Examples of SYK inhibitory compounds can be found in WO2003063794, WO2005007623, and WO2006078846.

Examples of PI3K inhibitory compounds can be found in WO2004019973, WO2004089925, WO2007016176, U.S. Pat. No. 8,138,347, WO2002088112, WO2007084786, WO2007129161, WO2006122806, WO2005113554, and WO2007044729.

Examples of JAK inhibitory compounds can be found in WO2009114512, WO2008109943, WO2007053452, WO2000142246, and WO2007070514.

In some embodiments, anti-angiogenic compounds have another mechanism for their activity, e.g. unrelated to protein or lipid kinase inhibition e.g. thalidomide (Thalomid™) and TNP-470.

Examples of proteasome inhibitors useful for use in combination include bortezomib, disulfiram, epigallocatechin-3-gallate (EGCG), salinosporamide A, carfilzomib, ONX-0912, CEP-18770, and MLN9708.

In some embodiments, compounds which target, decrease or inhibit the activity of a protein or lipid phosphatase are, e.g. inhibitors of phosphatase 1, phosphatase 2A, or CDC25, such as okadaic acid or a derivative thereof. In some embodiments, compounds which induce cell differentiation processes are, e.g., retinoic acid, α- γ- or δ-tocopherol or α- γ- or δ-tocotrienol, etc.

In some embodiments, an cyclooxygenase inhibitor is selected from Cox-2 inhibitors, 5-alkyl substituted 2-arylaminophenylacetic acid and derivatives, such as celecoxib (Celebrex™), rofecoxib (Vioxx™), etoricoxib, valdecoxib or a 5-alkyl-2-arylaminophenylacetic acid, such as 5-methyl-2-(2'-chloro-6'-fluoroanilino) phenyl acetic acid, lumiracoxib.

In some embodiments, bisphosphonates are selected from etridonic, clodronic, tiludronic, pamidronic, alendronic, ibandronic, risedronic and zoledronic acid. In some embodiments, mTOR inhibitors are compounds which inhibit the mammalian target of rapamycin (mTOR) and which possess antiproliferative activity such as sirolimus (Rapamune®), everolimus (Certican™), CCI-779 or ABT578.

In some embodiments, a heparanase inhibitor targets, decreases or inhibits heparin sulfate degradation. In some embodiments, it is PI-88. In some embodiments, a biological response modifier is a lymphokine or interferons.

In some embodiments, inhibitors of Ras oncogenic isoforms, such as H-Ras, K-Ras, and/or N-Ras, are compounds which target, decrease or inhibit the oncogenic activity of Ras; for example, a "farnesyl transferase inhibitor" such as L-744832, DK8G557 or R115777 (Zarnestra™). In some embodiments, telomerase inhibitors are compounds which target, decrease or inhibit the activity of telomerase. In some embodiments, compounds which target, decrease or inhibit the activity of telomerase are compounds which inhibit a telomerase receptor, such as telomestatin.

In some embodiments, methionine aminopeptidase inhibitors are compounds which target, decrease or inhibit the activity of methionine aminopeptidase. In some embodiments, a compound which targets, decreases or inhibits the activity of methionine aminopeptidase is bengamide or a derivative thereof.

In some embodiments, proteasome inhibitors are compounds which target, decrease or inhibit the activity of the proteasome. In some embodiments, a proteasome inhibitor is Bortezomib (Velcade™) or MLN 341.

In some embodiments, a matrix metalloproteinase inhibitor ("MMP" inhibitor) is selected collagen peptidomimetic and nonpeptidomimetic inhibitors, tetracycline derivatives, e.g. hydroxamate peptidomimetic inhibitor batimastat and its orally bioavailable analogue marimastat (BB-2516), prinomastat (AG3340), metastat (NSC 683551) BMS-279251, BAY 12-9566, TAA211, MMI270B and AAJ996.

In some embodiments, compounds used in the treatment of hematologic malignancies are selected from FMS-like tyrosine kinase inhibitors, which are compounds targeting, decreasing or inhibiting the activity of FMS-like tyrosine kinase receptors (Flt-3R); interferon, 1-β-D-arabinofuransylcytosine (ara-c) and bisulfan; and ALK inhibitors, which are compounds which target, decrease or inhibit anaplastic lymphoma kinase.

In some embodiments, compounds which target, decrease or inhibit the activity of FMS-like tyrosine kinase receptors (Flt-3R) are compounds, proteins or antibodies which inhibit members of the Flt-3R receptor kinase family, such as PKC412, midostaurin, a staurosporine derivative, SU11248 and MLN518.

In some embodiments, HSP90 inhibitors are compounds targeting, decreasing or inhibiting intrinsic ATPase activity of HSP90; or degrading, targeting, decreasing or inhibiting HSP90 client proteins via the ubiquitin proteosome pathway. In some embodiments, such compounds are selected from 17-allylamino, 17-demethoxygeldanamycin (17AAG), a geldanamycin derivative; other geldanamycin related compounds; radicicol and HDAC inhibitors.

In some embodiments, an antiproliferative antibody is selected from trastuzumab (Herceptin™), Trastuzumab-DM1, erbitux, bevacizumab (Avastin™), rituximab (Rituxan®), PRO64553 (anti-CD40) and 2C$_4$ Antibody.

In some embodiments, for the treatment of acute myeloid leukemia (AML), technologies comprising immune cells (e.g., memory-like NK cells) and ARMs can be used in combination with various leukemia therapies, especially in combination with therapies used for the treatment of AML, e.g., farnesyl transferase inhibitors and/or other drugs useful for the treatment of AML, such as Daunorubicin, Adriamycin, Ara-C, VP-16, Teniposide, Mitoxantrone, Idarubicin, Carboplatinum or PKC412. In some embodiments, an antileukemic compound is Ara-C, a pyrimidine analog, which is the 2'-alpha-hydroxy ribose (arabinoside) derivative of deoxycytidine. In some embodiments, an anti-leukemic compound is a purine analog of hypoxanthine, 6-mercaptopurine (6-MP) or fludarabine phosphate.

In some embodiments, somatostatin receptor antagonists target, treat or inhibit the somatostatin receptor such as octreotide, and SOM230. In some embodiments, a tumor cell damaging approach comprises or is ionizing radiation. Ionizing radiation may occur as either electromagnetic rays (such as X-rays and gamma rays) or particles (such as alpha and beta particles). In some embodiments, ionizing radiation is provided in radiation therapy and is known in In some embodiments, useful agents for combination are EDG binders and ribonucleotide reductase inhibitors. In some embodiments, EDG binders are a class of immunosuppressants that modulate lymphocyte recirculation, such as FTY720. In some embodiments, ribonucleotide reductase inhibitors are pyrimidine or purine nucleoside analogs such as fludarabine and/or cytosine arabinoside (ara-C), 6-thioguanine, 5-fluorouracil, cladribine, 6-mercaptopurine (especially in combination with ara-C against ALL) and/or pentostatin. In some embodiments, ribonucleotide reductase inhibitors are selected from hydroxyurea and 2-hydroxy-1H-isoindole-1,3-dione derivatives.

In some embodiments, useful compounds, proteins or monoclonal antibodies, e.g., those targeting VEGF, are selected from 1-(4-chloroanilino)-4-(4-pyridylmethyl) phthalazine or a pharmaceutically acceptable salt thereof, 1-(4-chloroanilino)-4-(4-pyridylmethyl) phthalazine succinate; Angiostatin™; Endostatin™; anthranilic acid amides; ZD4190; ZD6474; SU5416; SU6668; bevacizumab; or anti-VEGF antibodies or anti-VEGF receptor antibodies, such as rhuMAb and RHUFab, VEGF aptamer such as Macugon; FLT-4 inhibitors, FLT-3 inhibitors, VEGFR-2 IgGI antibody, Angiozyme (RPI 4610) and Bevacizumab (Avastin™).

In some embodiments, photodynamic therapy useful for combination therapy refers to therapy which uses certain chemicals known as photosensitizing compounds to treat or prevent cancers. Examples of photodynamic therapy include treatment with compounds, such as Visudyne™ and porfimer sodium.

In some embodiments, useful angiostatic steroids are compounds which block or inhibit angiogenesis, such as anecortave, triamcinolone, hydrocortisone, 11-α-epihydrocotisol, cortexolone, 17α-hydroxyprogesterone, corticosterone, desoxycorticosterone, testosterone, estrone, and dexamethasone.

In some embodiments, implants containing corticosteroids are implants comprising fluocinolone and/or dexamethasone.

In some embodiments, a chemotherapeutic compound is selected from plant alkaloids, hormonal compounds and antagonists; biological response modifiers, preferably lymphokines or interferons; antisense oligonucleotides or oligonucleotide derivatives; shRNA or siRNA; or miscellaneous compounds or compounds with other or unknown mechanism of action.

In some embodiments, an additional agent for combination is selected from anti-inflammatory, bronchodilatory or antihistamine drug substances. In some embodiments, a suitable anti-inflammatory drug is selected from steroids, in particular glucocorticosteroids such as budesonide, beclamethasone dipropionate, fluticasone propionate, ciclesonide or mometasone furoate; non-steroidal glucocorticoid receptor agonists; LTB4 antagonists such LY293111, CGS025019C, CP-195543, SC-53228, BIIL 284, ONO 4057, SB 209247; LTD4 antagonists such as montelukast and zafirlukast; PDE4 inhibitors such cilomilast (Ariflo® GlaxoSmithKline), Roflumilast (Byk Gulden), V-11294A (Napp), BAY19-8004 (Bayer), SCH-351591 (Schering-Plough), Arofylline (Almirall Prodesfarma), PD189659/ PD168787 (Parke-Davis), AWD-12-281 (Asta Medica), CDC-801 (Celgene), SeICID™CC-10004 (Celgene), VM554/UM565 (Vernalis), T-440 (Tanabe), KW-4490 (Kyowa Hakko Kogyo); A2a agonists; A2b antagonists; and beta-2 adrenoceptor agonists such as albuterol (salbutamol), metaproterenol, terbutaline, salmeterol fenoterol, procaterol, and especially, formoterol and pharmaceutically acceptable salts thereof. In some embodiments, a suitable bronchodilatory drug is selected from anticholinergic or antimuscarinic compounds, in particular ipratropium bromide, oxitropium bromide, tiotropium salts and CHF 4226 (Chiesi), and glycopyrrolate. In some embodiments, an antihistamine drug substance is selected from cetirizine hydrochloride, acetaminophen, clemastine fumarate, promethazine, loratidine, desloratidine, diphenhydramine and fexofenadine hydrochloride, activastine, astemizole, azelastine, ebastine, epinastine, mizolastine, and tefenadine.

In some embodiments, anti-inflammatory drugs useful for combination are those with antagonists of chemokine receptors, e.g. CCR-1, CCR-2, CCR-3, CCR-4, CCR-5, CCR-6, CCR-7, CCR-8, CCR-9 and CCR10, CXCR1, CXCR2, CXCR3, CXCR4, CXCR5, particularly CCR-5 antagonists such as Schering-Plough antagonists SC-351125, SCH-55700 and SCH-D, and Takeda antagonists such as N-[[4-[[[6,7-dihydro-2-(4-methylphenyl)-5H-benzo-cyclohepten-8-yl]carbonyl]amino]phenyl]-methyl]tetrahydro-N,N-dimethyl-2H-pyran-4-aminium chloride (TAK-770).

When used in combination, compositions can be administered alone or in combination with one or more other therapeutic agents. Those additional agents may be administered separately, e.g., as part of a multiple dosage regimen. Alternatively, those agents may be part of a single dosage form, mixed together with a composition comprising immune cells and/or ARMs. Agents may be administered simultaneously, sequentially or within a period of time, e.g., 1, 2, 3, 4, 5, 6, 7, 8, 9, 10, 11, 12, 13, 14, 15, 16, 17, 18, 19, 20, 21, 22, 23, 24, or 25 hours, or 1, 2, 3, 4, 5, 6, 7, 8, 9, 10 days, or 1, 2, 3, 4, 5, 6, 7, 8, 9, 10 weeks, from one another. In some embodiments, subjects are exposed to all agents (e.g., immune cells, ARMs, and an additional agent) in a combination at the same time.

In some embodiments, additional therapeutic agent and technologies comprising immune cells and ARMs act synergistically. Therefore, the amount of additional therapeutic agent in such combinations may be less than that required in a monotherapy utilizing only the therapeutic agent.

Among other things, the present disclosure provides the following Example Embodiments:

1. A method for inducing cell death, inhibiting cell growth and/or reducing the number of cells in a system, comprising administering to the system:
   one or both of:
      a plurality of natural killer cells; and
      an antibody-recruiting molecule (ARM),
         wherein the ARM comprises an antibody binding moiety that can bind to one or more antibodies or fragments thereof, a target-binding moiety that can bind to the cell, and optionally a linker moiety connecting the antibody binding moiety with the target binding moiety.
so that the system is exposed to both and the number of cells in the system is reduced compared to absence of both the natural killer cells and the antibody-recruiting molecule.

2. A method for treating a condition, disorder or disease, comprising administering to a subject suffering therefrom:
   a plurality of natural killer cells; and
   an antibody-recruiting molecule (ARM),
      wherein the ARM comprises an antibody binding moiety that can bind to one or more antibodies or fragments thereof, a target-binding moiety that can bind to the cancer cells, and optionally a linker moiety connecting the antibody binding moiety with the target binding moiety.

3. The method of Embodiment 2, wherein the condition, disorder or disease is cancer.

4. A method for reducing toxicity/side effects of a treatment using natural killer cells, comprising administering to a subject:
   a plurality of natural killer cells; and
   an antibody-recruiting molecule (ARM),
      wherein the ARM comprises an antibody binding moiety that can bind to one or more antibodies or fragments thereof, a target-binding moiety that can bind to a target entity of the treatment, and optionally a linker moiety connecting the antibody binding moiety with the target binding moiety.

5. The method of any one of the preceding Embodiments, wherein the natural killer cells are memory-like natural killer cells.

6. The method of any one of the preceding Embodiments, wherein the natural killer cells are cytokine-induced memory-like natural killer cells.

7. The method of any one of the preceding Embodiments, wherein the natural killer cells have increased expression of inhibitory, activating, and cytokine receptors compared to reference natural killer cells.

8. The method of any one of the preceding Embodiments, wherein the natural killer cells have increased expression of one or more of CD94/NKG2A, NKp30, NKp44, NKp46, NKG2D, CD62L, and CD25 compared to reference natural killer cells.

9. The method of any one of the preceding Embodiments, wherein the natural killer cells have decreased expression of NKp80 compared to reference natural killer cells.

10. The method of any one of the preceding Embodiments, wherein the natural killer cells have increased proliferation compared to reference natural killer cells.

11. The method of any one of the preceding Embodiments, wherein the natural killer cells have increased production of IFN-γ upon stimulation compared to reference natural killer cells.

12. The method of any one of Embodiments 7-11, wherein reference natural killer cells are natural killer cells isolated from a subject without cytokine treatment.

13. The method of any one of the preceding Embodiments, wherein the natural killer cells are induced by IL-12, IL-15 and IL-18.

14. The method of any one of the preceding Embodiments, wherein the natural killer cells and the antibody-recruiting molecule are administered concurrently.

15. The method of any one of the preceding Embodiments, wherein the natural killer cells and the antibody-recruiting molecule are administered as one composition.

16. The method of any one of Embodiments 1-13, wherein the natural killer cells are administered prior to the antibody-recruiting molecule.

17. The method of any one of Embodiments 1-13, wherein the natural killer cells are administered subsequently to the antibody-recruiting molecule.

18. The method of any one of the preceding Embodiments, wherein the natural killer cells are administered at a dose of $0.01\text{-}100 \times 10^6$ per kg body weight of the subject.

19. The method of any one of the preceding Embodiments, wherein the natural killer cells and the ARMs are administered such that a subject is exposed to both.

20. The method of any one of the preceding Embodiments, wherein the antibody binding moiety of the antibody-recruiting molecule is a universal antibody binding moiety.

21. The method of any one of any one of the preceding Embodiments, wherein the target binding moiety of the antibody-recruiting molecule binds to a surface protein of the target cell.

22. The method of any one of any one of the preceding Embodiments, wherein the target binding moiety of the antibody-recruiting molecule binds to CD22.

23. The method of any one of Embodiments 1-21, wherein the target binding moiety of the antibody-recruiting molecule binds to CD33.

24. The method of any one of the preceding Embodiments, wherein the cells are cancer cells.

25. The method of Embodiment 24, where the cancer cells are hematological tumor cells.

26. The method of Embodiment 24, where the cancer cells are solid tumor cells.

27. The method of Embodiment 24, where the cancer is AML.

28. The method of Embodiment 24, wherein the cancer is selected the group consisting of a prostate cancer, metastatic prostate cancer, stomach, colon, rectal, liver, pancreatic, lung, breast, cervix uteri, corpus uteri, ovary, testis, bladder, renal, brain/CNS, head and neck, throat, Hodgkin's disease, non-Hodgkin's lymphoma, multiple myeloma, leukemia, melanoma, non-melanoma skin cancer, acute lymphocytic leukemia, acute myelogenous leukemia, Ewing's sarcoma, small cell lung cancer, choriocarcinoma, rhabdomyosarcoma, Wilms' tumor, neuroblastoma, hairy cell leukemia, mouth/pharynx, esophagus, larynx, kidney cancer and lymphoma.

29. The method of any one of the preceding Embodiments, wherein the natural killer cells are contacted with a GSK3α/β inhibitor.

30. The method of any one of the preceding Embodiments, wherein the ARM is a compound of formula I:

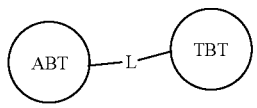

I or a pharmaceutically acceptable salt thereof, wherein:
ABT is an antibody binding moiety;
L is a bivalent linker moiety that connects ABT with TBT; and
TBT is a target binding moiety.

31. The method of any one of Embodiments 1-29, wherein the ARM is a compound of formula II:

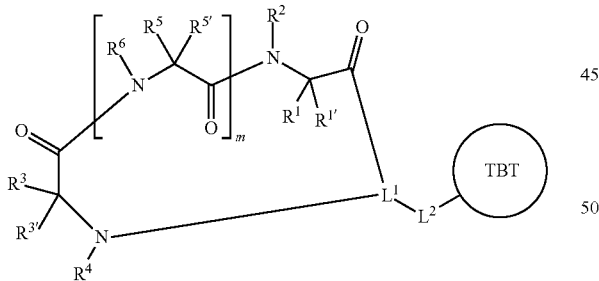

II or a pharmaceutically acceptable salt thereof, wherein:
each of $R^1$, $R^3$ and $R^5$ is independently hydrogen or an optionally substituted group selected from $C_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur; or:

$R^1$ and $R^{1'}$ are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur;

$R^3$ and $R^{3'}$ are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur;

an $R^5$ group and the $R^{5'}$ group attached to the same carbon atom are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur; or two $R^5$ groups are optionally taken together with their intervening atoms to form a $C_{1-10}$ bivalent straight or branched saturated or unsaturated hydrocarbon chain wherein 1-3 methylene units of the chain are independently and optionally replaced with —S—, —SS—, —N(R)—, —O—, —C(O)—, —OC(O)—, —C(O)O—, —C(O)N(R)—, —N(R)C(O)—, —S(O)—, —S(O)$_2$—, or -Cy$^1$-, wherein each -Cy$^1$- is independently a 5-6 membered heteroarylenyl with 1-4 heteroatoms independently selected from nitrogen, oxygen or sulfur;

each of $R^{1'}$, $R^{3'}$ and $R^{5'}$ is independently hydrogen or $C_{1-3}$ aliphatic;

each of $R^2$, $R^4$ and $R^6$ is independently hydrogen, or $C_{1-4}$ aliphatic, or:

$R^2$ and $R^1$ are optionally taken together with their intervening atoms to form a 4-8 membered saturated or partially unsaturated monocyclic heterocyclic ring having 1-2 heteroatoms independently selected from nitrogen, oxygen, or sulfur;

$R^4$ and $R^3$ are optionally taken together with their intervening atoms to form a 4-8 membered saturated or partially unsaturated monocyclic heterocyclic ring having 1-2 heteroatoms independently selected from nitrogen, oxygen, or sulfur; or an $R^6$ group and its adjacent $R^5$ group are optionally taken together with their intervening atoms to form a 4-8 membered saturated or partially unsaturated monocyclic heterocyclic ring having 1-2 heteroatoms independently selected from nitrogen, oxygen, or sulfur;

$L^1$ is a trivalent linker moiety that connects

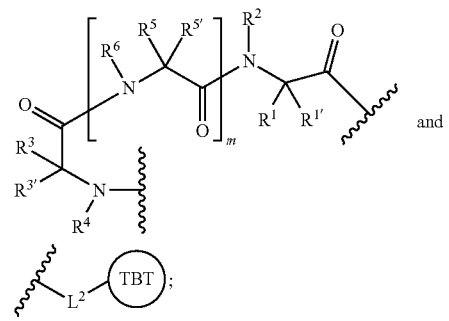

and

L² is a covalent bond or a $C_{1-10}$ bivalent straight or branched saturated or unsaturated hydrocarbon chain wherein 1-3 methylene units of the chain are independently and optionally replaced with —S—, —N(R)—, —O—, —C(O)—, —OC(O)—, —C(O)O—, —C(O)N(R)—, —N(R)C(O)—, —S(O)—, —S(O)$_2$—,

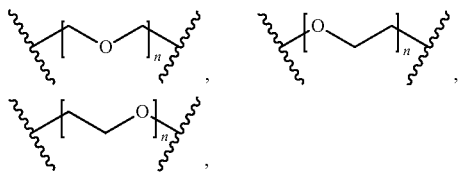

or -Cy¹-, wherein each -Cy¹- is independently a 5-6 membered heteroarylenyl with 1-4 heteroatoms independently selected from nitrogen, oxygen or sulfur;

TBT is a target binding moiety; and each of m and n is independently 1, 2, 3, 4, 5, 6, 7, 8, 9, or 10.

32. The method of any one of Embodiments 1-29, wherein the ARM is a compound of formula III:

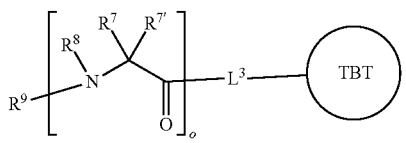

III or a pharmaceutically acceptable salt thereof, wherein:
each of R⁷ is independently hydrogen or an optionally substituted group selected from $C_{1-6}$ aliphatic, a 3-8 membered saturated or partially unsaturated monocyclic carbocyclic ring, phenyl, an 8-10 membered bicyclic aromatic carbocyclic ring, a 4-8 membered saturated or partially unsaturated monocyclic heterocyclic ring having 1-2 heteroatoms independently selected from nitrogen, oxygen, or sulfur, a 5-6 membered monocyclic heteroaromatic ring having 1-4 heteroatoms independently selected from nitrogen, oxygen, or sulfur, or an 8-10 membered bicyclic heteroaromatic ring having 1-5 heteroatoms independently selected from nitrogen, oxygen, or sulfur; or:
an R⁷ group and the R⁷ group attached to the same carbon atom are optionally taken together with their intervening carbon atom to form a 3-8 membered saturated or partially unsaturated spirocyclic carbocyclic ring or a 4-8 membered saturated or partially unsaturated spirocyclic heterocyclic ring having 1-2 heteroatoms independently selected from nitrogen, oxygen, or sulfur;
each of R⁷ is independently hydrogen or $C_{1-3}$ aliphatic;
each of R⁸ is independently hydrogen, or $C_{1-4}$ aliphatic, or:
an R⁸ group and its adjacent R⁷ group are optionally taken together with their intervening atoms to form a 4-8 membered saturated or partially unsaturated monocyclic heterocyclic ring having 1-2 heteroatoms independently selected from nitrogen, oxygen, or sulfur;
R⁹ is hydrogen, $C_{1-3}$ aliphatic, or —C(O) $C_{1-3}$ aliphatic;
L³ is a bivalent linker moiety that connects

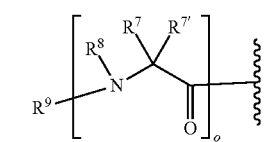

with TBT;
TBT is a target binding moiety; and
o is 1, 2, 3, 4, 5, 6, 7, 8, 9, or 10.

33. The method of Embodiment 31, wherein R² is hydrogen.

34. The method of Embodiment 31, wherein R⁴ is hydrogen.

35. The method of Embodiment 31, wherein R¹' is hydrogen.

36. The method of Embodiment 31, wherein R³' is hydrogen.

37. The method of Embodiment 31, wherein L¹ is

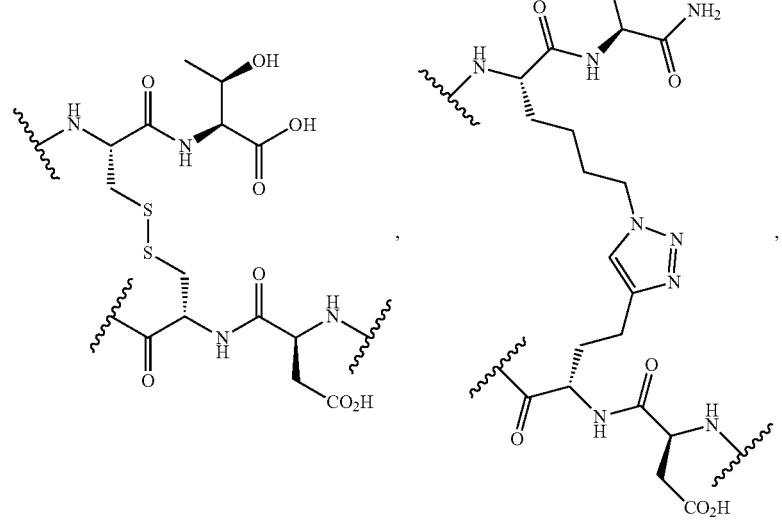

219 220
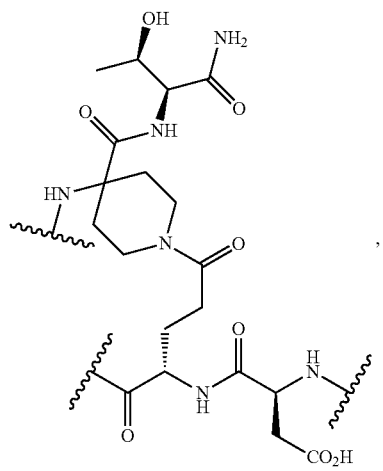 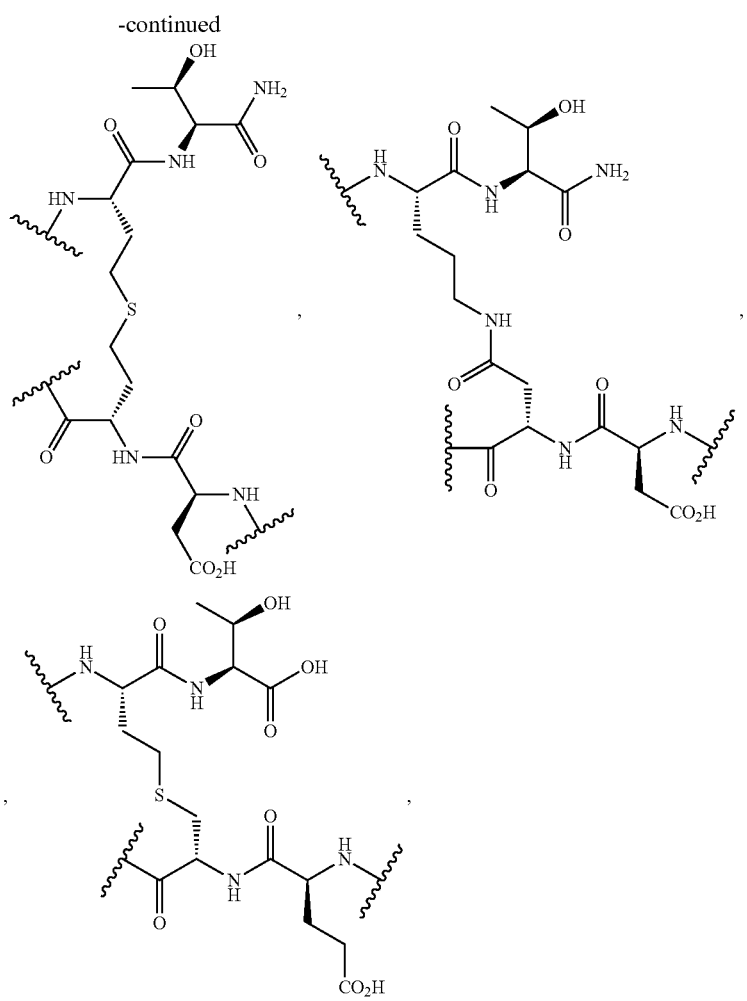
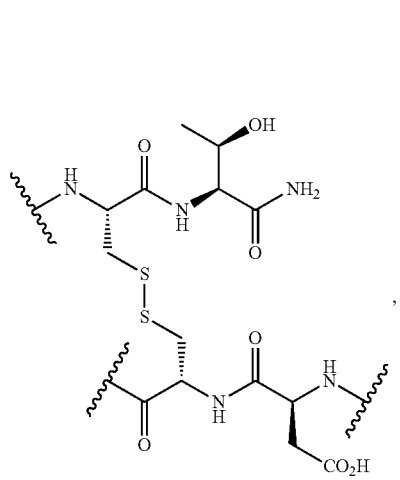 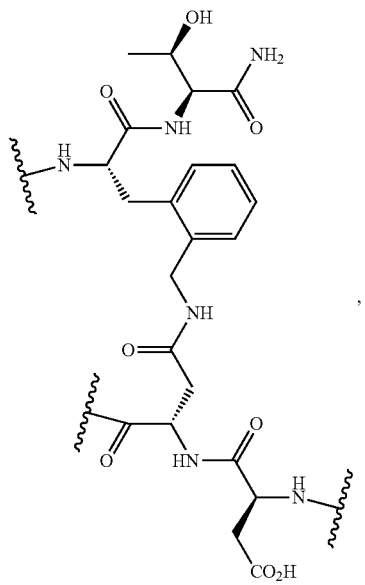 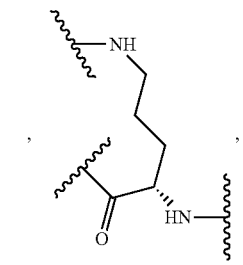

-continued
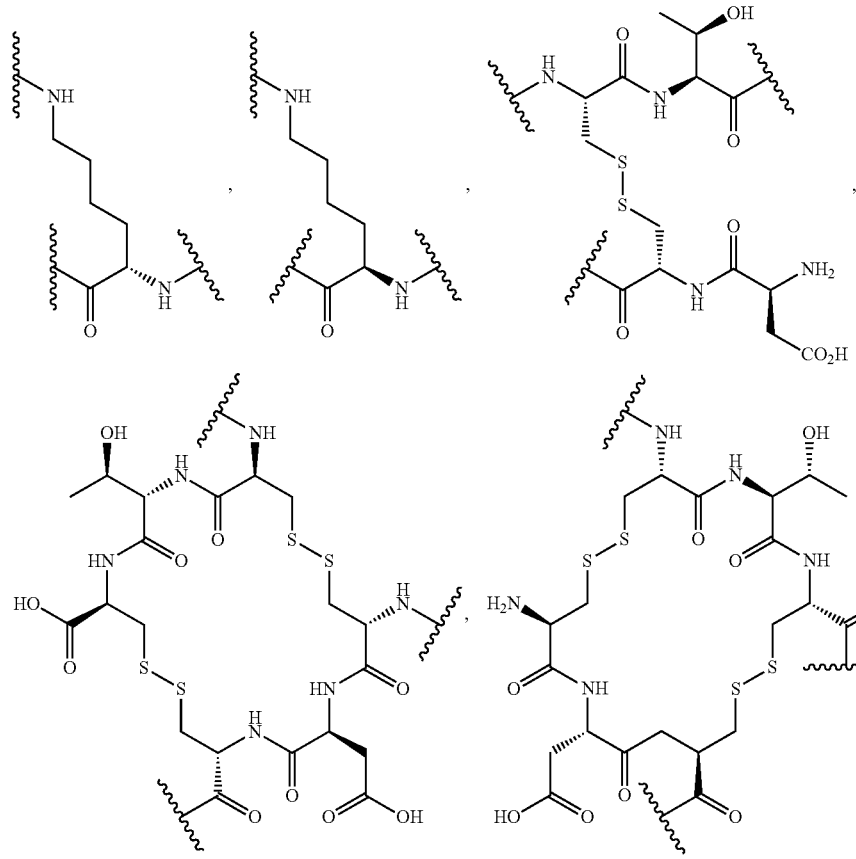
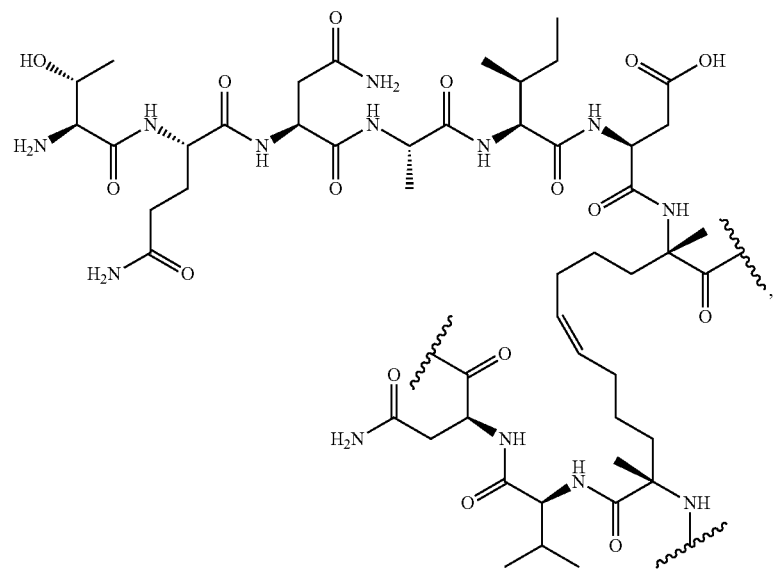

223 224
-continued
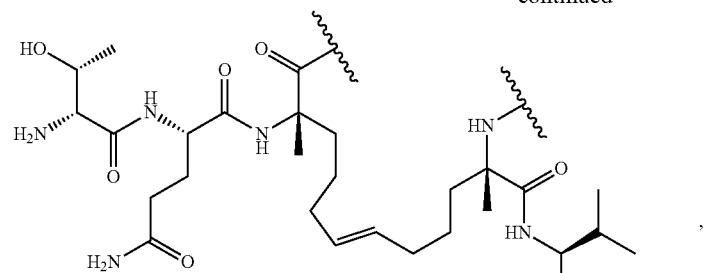
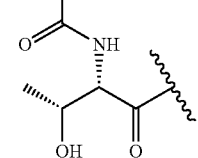,
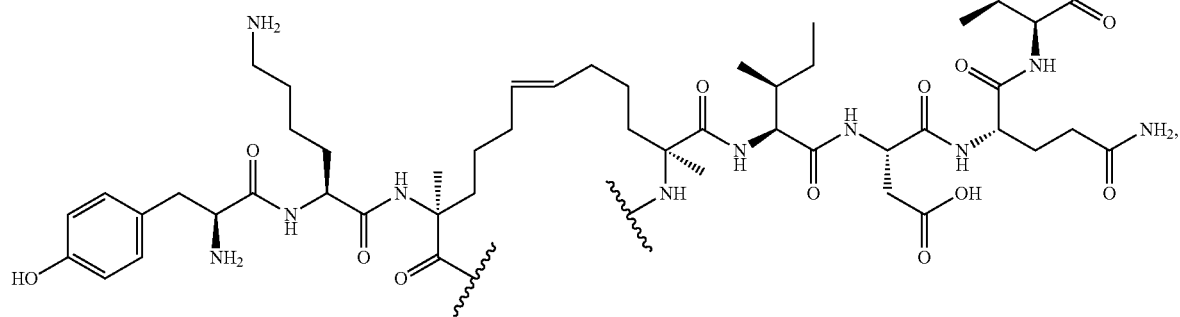
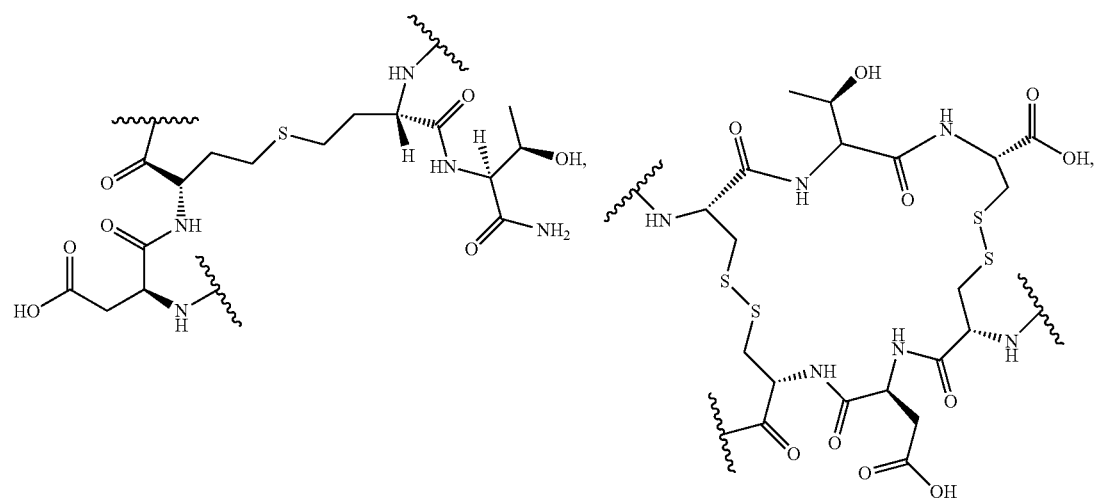

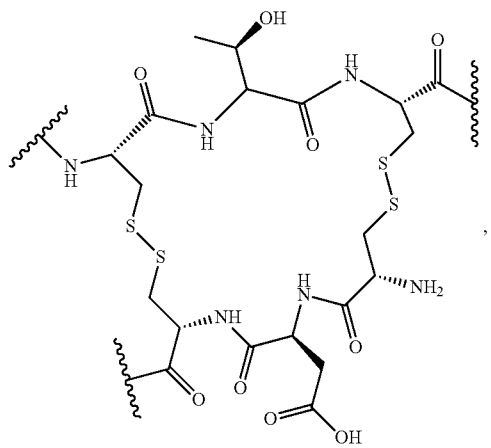

, or

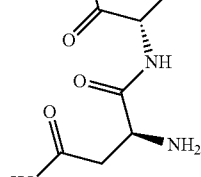

.

38. The method of Embodiment 31, wherein $L^2$ is a $C_{1-10}$ bivalent straight or branched saturated or unsaturated hydrocarbon chain wherein 1-3 methylene units of the chain are independently and optionally replaced with —S—, —N(R)—, —O—, —C(O)—, —OC(O)—, —C(O)O—, —C(O)N(R)—, —N(R)C(O)—, —S(O)—, —S(O)$_2$—,

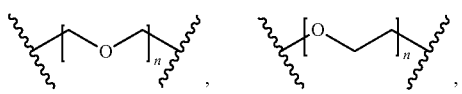

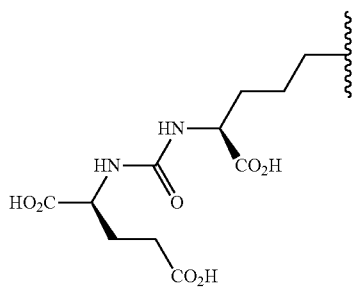

and

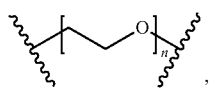

or -Cy$^1$-, wherein each -Cy$^1$- is independently a 5-6 membered heteroarylenyl with 1-4 heteroatoms independently selected from nitrogen, oxygen or sulfur.

39. The method of any one of Embodiments 30 to 38, wherein TBT is selected from the group consisting of

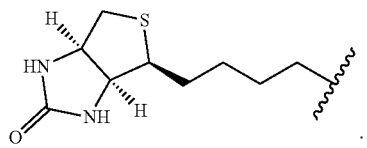

.

40. The method of Embodiment 31, wherein the compound is of one of formulae II-a, II-b, II-c, II-d, II-e or II-f:

II-a

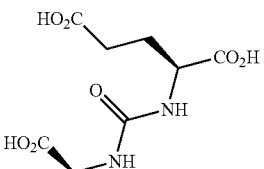

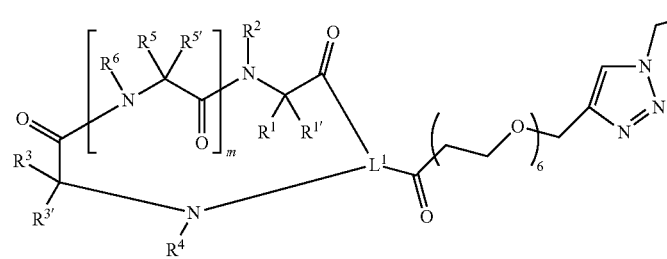

-continued
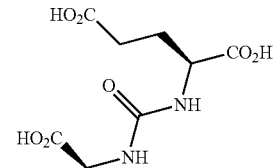
II-b
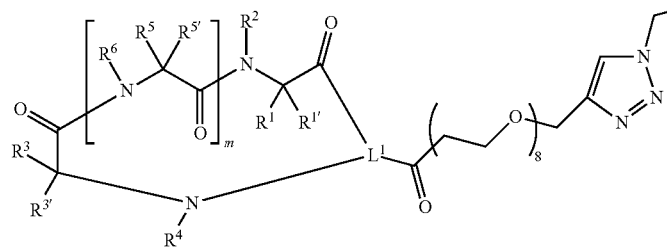
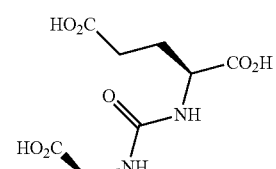
II-c
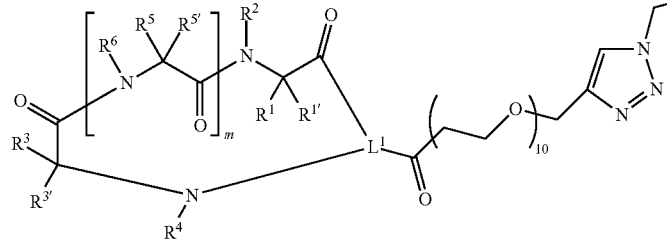
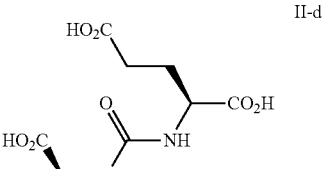
II-d
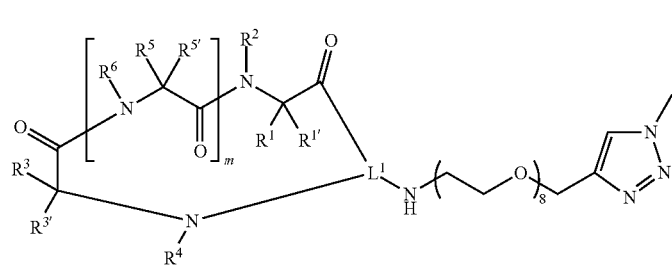

-continued
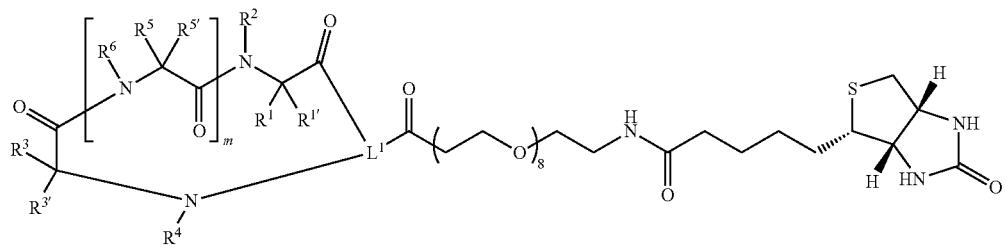
II-e
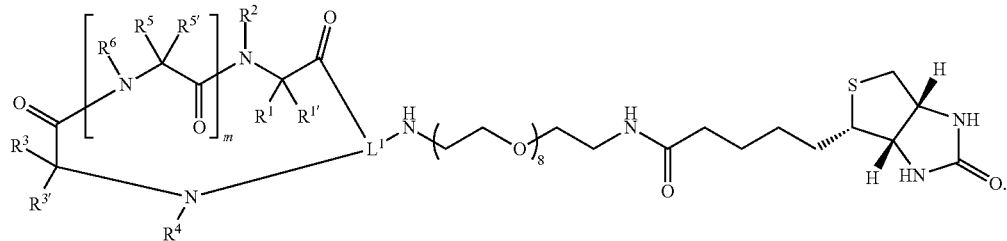
II-f
41. The method of Embodiment 31, wherein $L^2$ is
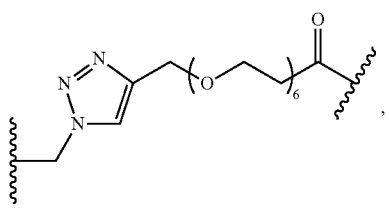
,
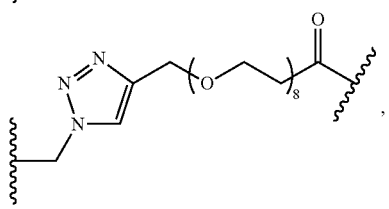
,
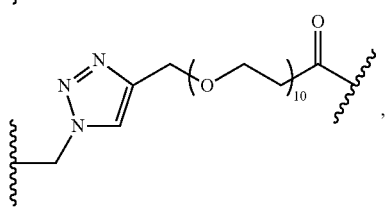
,
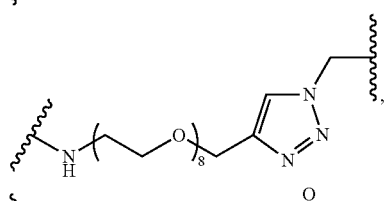
,
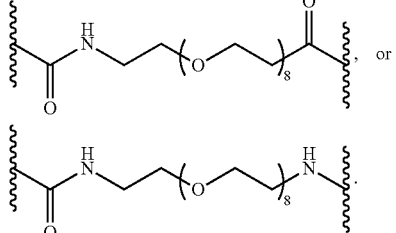
or
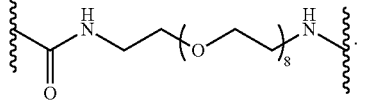
;
42. The method of Embodiment 32, wherein $L^3$ is
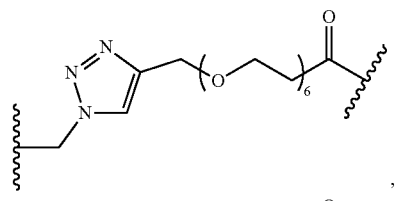
,
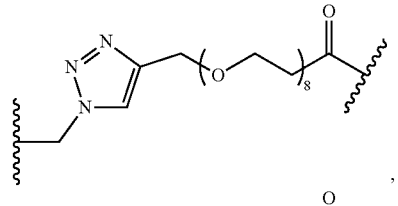
,
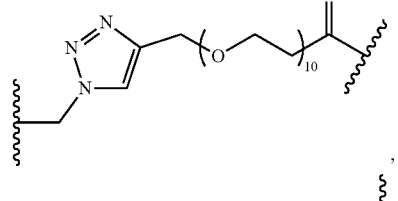
,
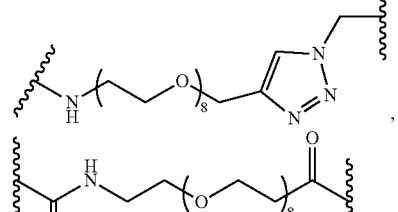
,
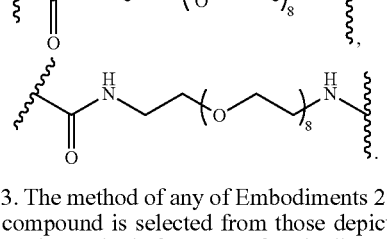
or
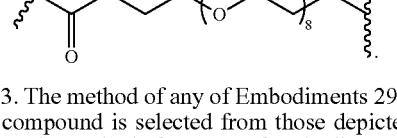
.
43. The method of any of Embodiments 29 to 42, wherein the compound is selected from those depicted in Table 1.
44. The method of any one of Embodiments 1-29, wherein the ARM is a compound having the structure of formula I-a:

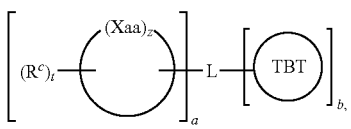

or a salt thereof, wherein:
 each Xaa is independently an amino acid residue;
 t is 0-50;
 z is 1-50;
 L is a linker moiety;
 TBT is a target binding moiety;
 each $R^c$ is independently -$L^a$-R';
 each of a and b is independently 1-200;
 each $L^a$ is independently a covalent bond, or an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—;
 each -Cy- is independently an optionally substituted bivalent group selected from a $C_{3-20}$ cycloaliphatic ring, a $C_{6-20}$ aryl ring, a 5-20 membered heteroaryl ring having 1-10 heteroatoms independently selected from oxygen, nitrogen, sulfur, phosphorus and silicon, and a 3-20 membered heterocyclyl ring having 1-10 heteroatoms independently selected from oxygen, nitrogen, sulfur, phosphorus and silicon;
 each R' is independently —R, —C(O)R, —CO$_2$R, or —SO$_2$R;
 each R is independently —H, or an optionally substituted group selected from $C_{1-30}$ aliphatic, $C_{1-30}$ heteroaliphatic having 1-10 heteroatoms independently selected from oxygen, nitrogen, sulfur, phosphorus and silicon, $C_{6-30}$ aryl, $C_{6-30}$ arylaliphatic, $C_{6-30}$ arylheteroaliphatic having 1-10 heteroatoms independently selected from oxygen, nitrogen, sulfur, phosphorus and silicon, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon, or
 two R groups are optionally and independently taken together to form a covalent bond, or:
 two or more R groups on the same atom are optionally and independently taken together with the atom to form an optionally substituted, 3-30 membered, monocyclic, bicyclic or polycyclic ring having, in addition to the atom, 0-10 heteroatoms independently selected from oxygen, nitrogen, sulfur, phosphorus and silicon; or
 two or more R groups on two or more atoms are optionally and independently taken together with their intervening atoms to form an optionally substituted, 3-30 membered, monocyclic, bicyclic or polycyclic ring having, in addition to the intervening atoms, 0-10 heteroatoms independently selected from oxygen, nitrogen, sulfur, phosphorus and silicon.

45. The method of any one of Embodiments 1-29, wherein the ARM is a compound having the structure of formula I-b:

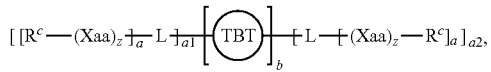

or a salt thereof, wherein:
 each Xaa is independently an amino acid residue;
 each z is independently 1-50;
 each L is independently a linker moiety;
 TBT is a target binding moiety,
 each $R^c$ is independently -$L^a$-R';
 each of a1 and a2 is independently 0-200, wherein at least one of a1 and a2 is not 0;
 b is 1-200;
 each $L^a$ is independently a covalent bond, or an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—;
 each -Cy- is independently an optionally substituted bivalent group selected from a $C_{3-20}$ cycloaliphatic ring, a $C_{6-20}$ aryl ring, a 5-20 membered heteroaryl ring having 1-10 heteroatoms independently selected from oxygen, nitrogen, sulfur, phosphorus and silicon, and a 3-20 membered heterocyclyl ring having 1-10 heteroatoms independently selected from oxygen, nitrogen, sulfur, phosphorus and silicon;
 each R' is independently —R, —C(O)R, —CO$_2$R, or —SO$_2$R;
 each R is independently —H, or an optionally substituted group selected from $C_{1-30}$ aliphatic, $C_{1-30}$ heteroaliphatic having 1-10 heteroatoms independently selected from oxygen, nitrogen, sulfur, phosphorus and silicon, $C_{6-30}$ aryl, $C_{6-30}$ arylaliphatic, $C_{6-30}$ arylheteroaliphatic having 1-10 heteroatoms independently selected from oxygen, nitrogen, sulfur, phosphorus and silicon, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon, or
 two R groups are optionally and independently taken together to form a covalent bond, or:
 two or more R groups on the same atom are optionally and independently taken together with the atom to form an optionally substituted, 3-30 membered, monocyclic, bicyclic or polycyclic ring having, in addition to the atom, 0-10 heteroatoms independently selected from oxygen, nitrogen, sulfur, phosphorus and silicon; or
 two or more R groups on two or more atoms are optionally and independently taken together with their intervening atoms to form an optionally substituted, 3-30 membered, monocyclic, bicyclic or polycyclic ring having, in addition to the intervening atoms, 0-10 heteroatoms independently selected from oxygen, nitrogen, sulfur, phosphorus and silicon.

46. The method of Embodiment 45, wherein a1 is 1 and a2 is 0.

47. The method of Embodiment 45, wherein a1 is 0 and a2 is 1.

48. The method of any one of Embodiments 44-47, wherein a is 1.

49. The method of any one of Embodiments 44-48, wherein b is 1.

50. The method of any one of Embodiments 44-49, wherein -(Xaa)$_z$- is or comprises -X$^3$X$^4$X$^5$X$^6$X$^7$X$^8$X$^9$X$^{10}$X$^{11}$X$^{12}$-, wherein:
 each of X$^3$, X$^4$, X$^5$, X$^6$, X$^7$, X$^8$, X$^9$, X$^{10}$, X$^{11}$, and X$^{12}$ is independently an amino acid residue;
 X$^6$ is Xaa$^A$ or Xaa$^P$;
 X$^9$ is Xaa$^N$; and
 X$^{12}$ is Xaa$^A$ or Xaa$^P$,
 wherein each Xaa$^A$ is independently an amino acid residue whose side chain comprises an aromatic group, each Xaa$^P$ is independently an amino acid residue whose side chain comprises a positively charged side chain, and each Xaa$^N$ is independently an amino acid residue whose side chain comprises a negatively charged side chain.

51. The method of Embodiment 50, wherein X$^5$ is Xaa$^A$.

52. The method of Embodiment 50, wherein X$^5$ is Xaa$^P$.

53. The method of any one of Embodiments 50-52, wherein X$^{12}$ is Xaa$^A$.

54. The method of any one of Embodiments 50-52, wherein X$^{12}$ is Xaa$^P$.

55. The method of any one of Embodiments 50-54, wherein each of X$^7$, X$^{10}$, and X$^{11}$ is independently an amino acid residue with a hydrophobic side chain ("hydrophobic amino acid residue", Xaa$^H$).

56. The method of any one of Embodiments 44-49, wherein -(Xaa)z- is or comprises -X$^3$X$^4$X$^5$X$^6$X$^7$X$^8$X$^9$X$^{10}$X$^{11}$X$^{12}$-, wherein:
 at least two amino acid residues are connected through one or more linkages L$^b$;
 L$^b$ is an optionally substituted bivalent group selected C$_1$-C$_{20}$ aliphatic or C$_1$-C$_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR'), —C(O)N(R')—, —N(R')C(O)N(R')—, —N(R')C(O)O—, —S(O), —S(O)$_2$—, —S(O)$_2$N(R')—, —C(O)S—, or —C(O)O—, wherein L$^b$ is bonded to a backbone atom of one amino acid residue and a backbone atom of another amino acid residue, and comprises no backbone atoms;
 X$^6$ is Xaa$^A$ or Xaa$^P$;
 X$^9$ is Xaa$^N$;
 X$^{12}$ is Xaa$^A$ or Xaa$^P$; and wherein each Xaa$^A$ is independently an amino acid residue whose side chain comprises an aromatic group, each Xaa$^P$ is independently an amino acid residue whose side chain comprises a positively charged side chain, and each Xaa$^N$ is independently an amino acid residue whose side chain comprises a negatively charged side chain.

57. The method of Embodiment 56, wherein X$^5$ and X$^{10}$ are connected by L$^b$.

58. The method of any one of Embodiments 56-57, wherein X$^6$ is Xaa$^A$.

59. The method of any one of Embodiments 56-57, wherein X$^6$ is Xaa$^P$.

60. The method of any one of Embodiments 56-59, wherein X$^{12}$ is Xaa$^A$.

61. The method of any one of Embodiments 56-59, wherein X$^{12}$ is Xaa$^P$.

62. The method of any one of Embodiments 56-61, wherein each of X$^4$, X$^7$, and X$^{11}$ is independently an amino acid residue with a hydrophobic side chain ("hydrophobic amino acid residue", Xaa$^H$).

63. The method of any one of Embodiments 44-49, wherein -(Xaa)$_z$- is or comprises -X$^3$X$^4$X$^5$X$^6$X$^7$X$^8$X$^9$X$^{10}$X$^1$X$^{12}$-, wherein:
 X$^2$ and X$^{12}$ are connected through one or more linkages L$^b$;
 L$^b$ is an optionally substituted bivalent group selected C$_1$-C$_{20}$ aliphatic or C$_1$-C$_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—, wherein L$^b$ is bonded to a backbone atom of one amino acid residue and a backbone atom of another amino acid residue, and comprises no backbone atoms;
 X$^4$ is Xaa$^A$;
 X$^5$ is Xaa$^A$ or Xaa$^P$;
 X$^8$ is Xaa$^N$;
 X$^{11}$ is Xaa$^A$; and
 wherein each Xaa$^A$ is independently an amino acid residue whose side chain comprises an aromatic group, each Xaa$^P$ is independently an amino acid residue whose side chain comprises a positively charged side chain, and each Xaa$^N$ is independently an amino acid residue whose side chain comprises a negatively charged side chain.

64. The method of Embodiment 63, wherein X$^5$ is Xaa$^P$.

65. The method of any one of Embodiments 63-64, wherein X$^5$ is Xaa$^A$.

66. The method of any one of Embodiments 63-65, wherein each of X$^3$, X$^6$, X$^9$, and X$^{11}$ is independently an amino acid residue with a hydrophobic side chain ("hydrophobic amino acid residue", Xaa$^H$).

67. The method of any one of Embodiments 44-49, wherein -(Xaa)$_z$- is or comprises -X$^2$X$^3$X$^4$X$^5$X$^6$X$^7$X$^8$X$^9$X$^{10}$X$^{11}$X$^{12}$-, wherein:
 each of X$^2$, X$^3$, X$^4$, X$^5$, X$^6$, X$^7$, X$^8$, X$^9$, X$^{10}$, X$^{11}$, and X$^{12}$ is independently an amino acid residue;
 at least two amino acid residues are connected through one or more linkages L$^b$;
 L$^b$ is an optionally substituted bivalent group selected C$_1$-C$_{20}$ aliphatic or C$_1$-C$_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—, wherein L$^b$ is bonded to a backbone atom of one amino acid residue and a backbone atom of another amino acid residue, and comprises no backbone atoms;
 X$^5$ is Xaa$^A$ or Xaa$^P$;
 X$^8$ is Xaa$^N$;
 X$^{11}$ is Xaa$^A$; and wherein each Xaa$^A$ is independently an amino acid residue whose side chain comprises an aromatic group, each Xaa$^P$ is independently an amino acid residue whose side chain comprises a positively charged side chain, and each Xaa$^N$ is independently an amino acid residue whose side chain comprises a negatively charged side chain.

68. The method of Embodiment 67, wherein X$^2$ and X$^{12}$ are connected by L$^b$.

69. The method of any one of Embodiments 67-68, wherein X$^4$ and X$^9$ are connected by L$^b$.

70. The method of any one of Embodiments 67-69, wherein X$^5$ is Xaa$^A$.

71. The method of any one of Embodiments 67-69, wherein X$^5$ is Xaa$^P$.

72. The method of any one of Embodiments 67-71, wherein each of X$^3$, X$^6$, and X$^9$ is independently an amino acid residue with a hydrophobic side chain ("hydrophobic amino acid residue", Xaa$^H$).

73. The method of any one of Embodiments 44-49, wherein -(Xaa)$_z$- is or comprises -X$^2$X$^3$X$^4$X$^5$X$^6$X$^7$X$^8$X$^9$X$^{10}$X$^{11}$X$^{12}$X$^{13}$X$^{14}$X$^{15}$X$^{16}$-, wherein:

each of $X^2$, $X^3$, $X^4$, $X^5$, $X^6$, $X^7$, $X^8$, $X^9$, $X^{10}$, $X^{11}$, $X^{12}$, $X^{13}$, $X^{14}$, $X^{15}$, and $X^{16}$ is independently an amino acid residue;

at least two amino acid residues are connected through a linkage $L^b$;

$L^b$ is an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—, wherein $L^b$ is bonded to a backbone atom of one amino acid residue and a backbone atom of another amino acid residue, and comprises no backbone atoms;

$X^3$ is Xaa$^N$;
$X^6$ is Xaa$^A$;
$X^7$ is Xaa$^A$ or Xaa$^P$;
$X^9$ is Xaa$^N$;
$X^{13}$ is Xaa$^A$; and wherein each Xaa$^A$ is independently an amino acid residue whose side chain comprises an aromatic group, each Xaa$^P$ is independently an amino acid residue whose side chain comprises a positively charged side chain, and each Xaa$^N$ is independently an amino acid residue whose side chain comprises a negatively charged side chain.

74. The method of Embodiment 73, wherein $X^2$ are connected to $X^{16}$ by $L^b$.

75. The method of Embodiment 73 or 74, wherein $X^2$ are connected to $X^{16}$ by $L^b$.

76. The method of any one of Embodiments 73-75, wherein $X^7$ is Xaa$^A$.

77. The method of any one of Embodiments 73-75, wherein $X^7$ is Xaa$^P$.

78. The method of any one of Embodiments 73-76, wherein each of $X^5$, $X^8$, and $X^{11}$ is independently an amino acid residue with a hydrophobic side chain ("hydrophobic amino acid residue", Xaa$^H$).

79. The method of any one of Embodiments 44-78, wherein each amino acid residue is independently a residue of an amino acid having the structure of formula A-I:

NH(R$^{a1}$)-L$^{a1}$—C(R$^{a2}$)(R$^{a3}$)-L$^{a2}$—COOH,  A-I or a salt thereof, wherein:

each of R$^{a1}$, R$^{a2}$, R$^{a3}$ is independently -L$^a$-R';
each of L$^{a1}$ and L$^{a2}$ is independently L$^a$;
each L$^a$ is independently a covalent bond, or an optionally substituted bivalent group selected $C_1$-$C_{20}$ aliphatic or $C_1$-$C_{20}$ heteroaliphatic having 1-5 heteroatoms, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—;

each -Cy- is independently an optionally substituted bivalent group selected from a $C_{3-20}$ cycloaliphatic ring, a $C_{6-20}$ aryl ring, a 5-20 membered heteroaryl ring having 1-10 heteroatoms independently selected from oxygen, nitrogen, sulfur, phosphorus and silicon, and a 3-20 membered heterocyclyl ring having 1-10 heteroatoms independently selected from oxygen, nitrogen, sulfur, phosphorus and silicon;

each R' is independently —R, —C(O)R, —CO$_2$R, or —SO$_2$R;

each R is independently —H, or an optionally substituted group selected from $C_{1-30}$ aliphatic, $C_{1-30}$ heteroaliphatic having 1-10 heteroatoms independently selected from oxygen, nitrogen, sulfur, phosphorus and silicon, $C_{6-30}$ aryl, $C_{6-30}$ arylaliphatic, $C_{6-30}$ arylheteroaliphatic having 1-10 heteroatoms independently selected from oxygen, nitrogen, sulfur, phosphorus and silicon, 5-30 membered heteroaryl having 1-10 heteroatoms independently selected from oxygen, nitrogen, sulfur, phosphorus and silicon, and 3-30 membered heterocyclyl having 1-10 heteroatoms independently selected from oxygen, nitrogen, sulfur, phosphorus and silicon, or two R groups are optionally and independently taken together to form a covalent bond, or:

two or more R groups on the same atom are optionally and independently taken together with the atom to form an optionally substituted, 3-30 membered, monocyclic, bicyclic or polycyclic ring having, in addition to the atom, 0-10 heteroatoms independently selected from oxygen, nitrogen, sulfur, phosphorus and silicon; or two or more R groups on two or more atoms are optionally and independently taken together with their intervening atoms to form an optionally substituted, 3-30 membered, monocyclic, bicyclic or polycyclic ring having, in addition to the intervening atoms, 0-10 heteroatoms independently selected from oxygen, nitrogen, sulfur, phosphorus and silicon.

80. The method of Embodiment 79, wherein each L$^a$ is independently a covalent bond, or an optionally substituted bivalent $C_1$-$C_5$ aliphatic, wherein one or more methylene units of the group are optionally and independently replaced with —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)O—, —S(O)—, —S(O)$_2$—, —S(O)$_2$N(R')—, —C(O)S—, or —C(O)O—.

81. The method of Embodiment 79, wherein L$^{a1}$ and L$^{a2}$ are each a covalent bond.

82. The method of any one of Embodiments 56-81, wherein L$^b$ is bonded to two backbone carbon atoms of two different amino acid residues.

83. The method of any one of Embodiments 56-82, wherein a L$^b$ is

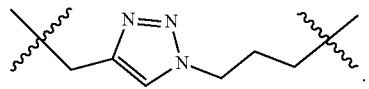 [SMILES: *CCCn1cc(C*)nn1]

84. The method of any one of Embodiments 56-83, wherein a L$^b$ is

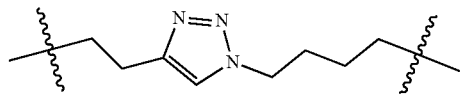 [SMILES: *CCCCn1cc(CC*)nn1]

85. The method of any one of Embodiments 56-84, wherein a L$^b$ is —CH$_2$—S—S—CH$_2$—.

86. The method of any one of Embodiments 56-85, wherein a L$^b$ is —CH$_2$—CH$_2$—S—CH$_2$—.

87. The method of any one of Embodiments 56-86, wherein a L$^b$ is

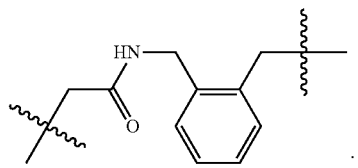 [SMILES: *CC(=O)NCc1ccccc1C*]

88. The method of any one of Embodiments 56-86, wherein a L$^b$ is —CH$_2$CH$_2$CO—N(R')—CH$_2$CH$_2$—.

89. The method of Embodiment 59, wherein the R' are taken together with an R group on the backbone atom that -N(R')—CH$_2$CH$_2$- is bonded to form a ring.

90. The method of any one of Embodiments 1-29, wherein the ARM is an agent comprising:
an antibody binding moiety,
a target binding moiety, and
optionally a linker moiety,
wherein the antibody binding moiety bind to two or more antibodies which have different Fab regions.

91. The method of any one of Embodiments 1-29, wherein the ARM is an agent comprising:
an antibody binding moiety,
a target binding moiety, and
optionally a linker moiety,
wherein the antibody binding moiety bind to Fc regions of antibodies.

92. The method of any one of Embodiments 90 or 91, wherein the agent is a compound of any one of Embodiments 29-89 or a salt thereof.

93. The method of any of the preceding Embodiments, wherein the ARM is administered with an antibody or a fragment thereof.

94. The method of any of the preceding Embodiments, wherein the ARM is administered with IgM or a fragment thereof.

95. In a method of treating a subject by administering a preparation of natural killer cells, the improvement that comprises also administering an antibody-recruiting molecule (ARM), wherein the ARM comprises an antibody binding moiety that can bind to one or more antibodies, or fragments thereof, a target-binding moiety that can bind to a target entity, and optionally a linker moiety connecting the antibody binding moiety with the target binding moiety.

96. The improvement of Embodiment 95, wherein the natural killer cells are natural killer cells of any one of the preceding Embodiments, and/or the ARM is an ARM of any one of the preceding Embodiments.

97. A combination comprising:
a plurality of natural killer cells; and
an antibody-recruiting molecule (ARM), wherein:
the ARM comprises an antibody binding moiety that can bind to one or more antibodies, or fragments thereof, a target-binding moiety that can bind to a target entity, and optionally a linker moiety connecting the antibody binding moiety with the target binding moiety.

98. The combination of Embodiment 97, wherein the natural killer cells are natural killer cells of any one of Embodiments 1-94, and/or the ARM is an ARM of any one of Embodiments 1-94.

99. A composition comprising:
a plurality of natural killer cells; and
an antibody-recruiting molecule (ARM), wherein:
the ARM comprises an antibody binding moiety that can bind to one or more antibodies, or fragments thereof, a target-binding moiety that can bind to a target entity, and optionally a linker moiety connecting the antibody binding moiety with the target binding moiety.

100. The composition of Embodiment 99, wherein the natural killer cells are natural killer cells of any one of Embodiments 1-94, and/or the ARM is an ARM of any one of Embodiments 1-94.

101. The composition of Embodiment 99 or 100, wherein the composition comprises an antibody or a fragment thereof.

102. The composition of Embodiment 99 or 100, wherein the composition comprises IgM.

103. The composition of any one of Embodiments 99-102, wherein the composition comprises a medium which supports the natural killer cells.

EXEMPLIFICATION

Various technologies are available for preparing, characterizing, assessing and/or utilizing immune cells (e.g., memory-like NK cells) and ARMs for utilization in accordance with the present disclosure. Certain such technologies are described below. It will be appreciated that many other technologies are available and may be utilized.

Example 1. Synthesis of ARM Agents

As appreciated by those skilled in the art, many chemistry technologies are available in the art for preparing and characterizing ARM agents. Certain ARM agents are or comprise peptide entities. In some embodiments, such peptides were prepared using standard, automated fluoroenyl-methyloxycarbonyl (Fmoc) solid phase peptide synthesis procedures.

Peptide Synthesis

In some embodiments, peptides were synthesized using standard Fmoc chemistry. An exemplary procedure is described below.

1) Add DCM to a vessel containing CTC Resin (0.1 mmol) and Fmoc-Trp (Boc)-OH (42.5 mg, 0.08 mmol, 0.80 eq) with N$_2$ bubbling.
2) Add DIEA (4.0 eq) dropwise and mix for 2 hours.
3) Add MeOH (0.1 mL) and mix for 30 min.
4) Drain and wash with DMF for 5 times.
5) Add 20% piperidine/DMF and react on 30 min.
6) Drain and wash with DMF for 5 times.
7) Add Fmoc-amino acid solution and mix 30 seconds, then add activation buffer, N$_2$ bubbling for about 1 hour.
8) Repeat step 4 to 7 for next amino acid coupling.

In some embodiments, biotin-PEG8-CH$_2$CH$_2$COOH (1.5 eq) was coupled using HATU (1.5 eq) and DIEA (3.0 eq). In some embodiments, amino acids were coupled by 3 equivalent using HBTU (2.85 eq) and DIEA (6 eq). In some embodiments, 20% piperidine in DMF was used for Fmoc deprotection for a suitable period of time, e.g., 30 min. Coupling reactions were typically monitored by ninhydrin test. Resin was typically washed with DMF for 5 times.

Peptide Cleavage and Purification

An exemplary procedure for peptide cleavage and purification is described below.

1) Add cleavage buffer (95% TFA/2.5% TIS/2.5% H$_2$O) to a flask containing the side chain protected peptide at room temperature and stir for 3 hours.
2) The peptide was precipitated with cold Isopropyl ether and centrifuged (3 min at 3000 rpm).
3) Isopropyl ether washes two additional times.
4) Dry the crude peptide under vacuum 2 hours.
5) Purify the crude peptide by Prep-HPLC (A: 0.1% TFA in H$_2$O, B: ACN) and lyophilized to give the final product (64.3 mg, 52.3% yield).

Purification Conditions

In an exemplary procedure, reverse phase HPLC (Gilson 281) was carried out on Luna C18 (200×25 mm; 10 um) and Gemini C18 (150*30 mm; 5 um) in series. Solvent A: water with 0.075% trifluoroacetic acid; Solvent B: acetonitrile. Gradient: at room temperature, 15% of B to 45% of B within 60 min at 20 mL/min; then 90% B at 20 mL/min over 10 min, UV detection (wavelength=215 nm). The peptide was lyophilized to give the desired product (64.3 mg, 52.3% yield) as a white solid.

All final compounds showed the correct mass for the desired compound.

Example 2. Synthesis of I-13

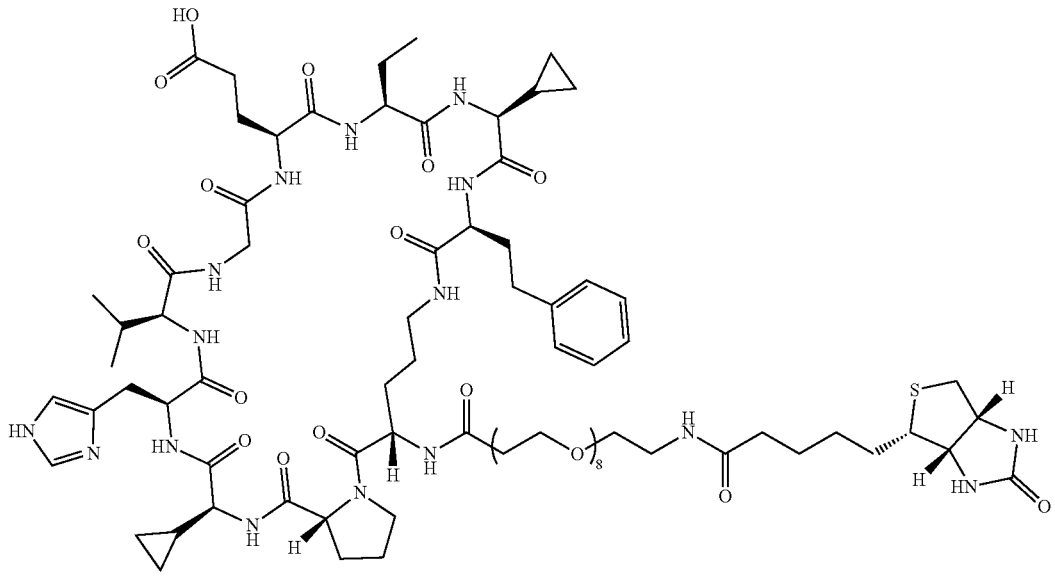

I-13

Peptide Synthesis

The peptide was synthesized using standard Fmoc chemistry.
1) Add DCM to the vessel containing CTC Resin (0.4 mmol) and Fmoc-Gly-OH (356.7 mg, 1.2 mmol, 3.0 eq) with $N_2$ bubbling.
2) Add DIEA (6.0 eq) dropwise and mix for 2 hours.
3) Add MeOH (2 mL) and mix for 30 min.
4) Drain and wash with DMF for 5 times
5) Add 20% piperidine/DMF and react for 30 min.
6) Drain and wash with DMF for 5 times
7) Add Fmoc-amino acid solution and mix 30 seconds, then add activation buffer, $N_2$ bubbling for about 1 hour.
8) Repeat steps 4 to 7 for next amino acid coupling.
9) Dde protecting group was deprotected by 3% hydrazine in DMF for 2 times with each of 20 min.

Synthesized scale: 0.4 mmol.

TABLE 2

Fmoc amino acids utilized in the Synthesis of I-13.

| # | Materials | Coupling reagents |
|---|---|---|
| 1 | Fmoc-Gly-OH (3 eq) | DIEA (6 eq) |
| 2 | Fmoc-Abu-OH (2 eq) | HBTU (1.95 eq) and DIEA (4 eq) |
| 3 | Fmoc-His(Trt)-OH (2 eq) | HBTU (1.95 eq) and DIEA (4 eq) |
| 4 | (S)-2-((((9H-fluoren-9-yl)methoxy)carbonyl)amino)-2-(thiazol-4-yl)aceticacid (2 eq) | HBTU (1.95 eq) and DIEA (4 eq) |
| 5 | Fmoc-D-Pro-OH (2 eq) | HBTU (1.95 eq) and DIEA (4 eq) |
| 6 | Fmoc-Orn(Dde)-OH (2 eq) | HBTU (1.95 eq) and DIEA (4 eq) |
| 7 | Fmoc-NH-PEG8-$CH_2CH_2$COOH (1.5 eq) | HBTU (1.45 eq) and DIEA (4 eq) |
| 8 | D-Biotin (2 eq) | HBTU (1.95 eq) and DIEA (4 eq) |
| 9 | (S)-2-((((9H-fluoren-9-yl)methoxy)carbonyl)amino)-4-phenylbutanoic acid (2 eq) | HBTU (1.95 eq) and DIEA (4 eq) |
| 10 | Fmoc-Cyclopropylalanine (2 eq) | HBTU (1.95 eq) and DIEA (4 eq) |
| 11 | (S)-2-((((9H-fluoren-9-yl)methoxy)carbonyl)amino)butanoic acid (2 eq) | HBTU (1.95 eq) and DIEA (4 eq) |
| 12 | Fmoc-Glu(OtBu)-OH (2 eq) | HBTU (1.95 eq) and DIEA (4 eq) |

20% piperidine in DMF was used for Fmoc deprotection for 30 min. The coupling reaction was monitored by ninhydrin test, and the resin was washed with DMF for 5 times.

Peptide Cleavage, Cyclization, and Purification

6) Add cleavage buffer (1% TFA/99% DCM 14 mL) to the flask containing the side chain protected peptide at room temperature and stir for 0.5 hours.
7) The reaction mixture was filtered and the resulting filtrate was diluted by dry DCM to 1 mM. DIEA was added to adjust the pH to about 8. To above solution was added TBTU (835.30 mg, 1.2 mmol, 3.0 eq) and HOBT (162.15 mg, 1.2 mmol, 3.0 eq) and the resulting solution was reacted for 3-4 h at room temperature. The reaction was monitored by LCMS.
8) After reacted completely, the reaction mixture was washed with 1 N HCl (200 mL) for one time. And the organic phase was dried under vacuum to obtain the crude peptide, which was treated with the cocktail of 95% TFA/2.5% $H_2O$/2.5% TIPS for about 1 h.
9) The crude peptide was precipitated out by methyl tert-butyl ether.
10) Purify the crude peptide by HPLC (A: $H_2O$, B: ACN) to give the final product (78.90 mg, 11.44% yield).

Purification Conditions

Reverse phase HPLC (Gilson 281) was carried out on Luna C18 (200×25 mm; 10 um) and Gemini C18 (150*30 mm; 5 um) in series. Solvent A: water with 0.1% trifluoroacetic acid; Solvent B: acetonitrile with 0.1% trifluoroacetic acid. Gradient: at room temperature, 5% of B to 35% of B within 60 min at 20 mL/min; then 90% B at 20 mL/min over 10 min, UV detection (wavelength=215 nm). The peptide was lyophilized to give the desired product, I-13 (78.90 mg, 11.44%) as a white solid.

Example 3. Synthesis of I-29

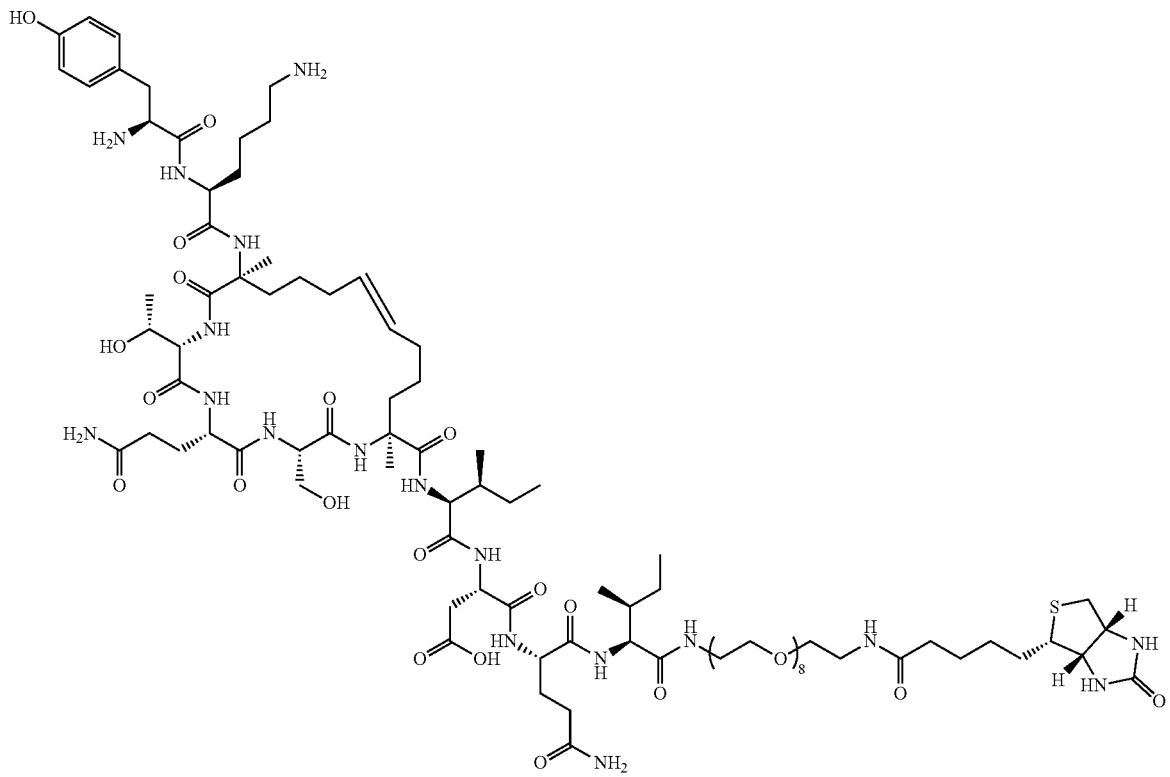

I-29

General Procedure for Preparation of Compound 3.1

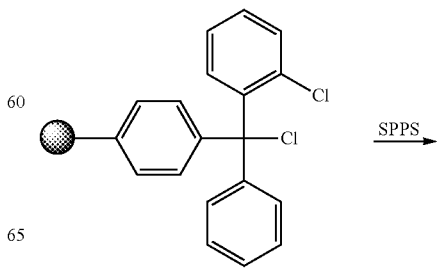

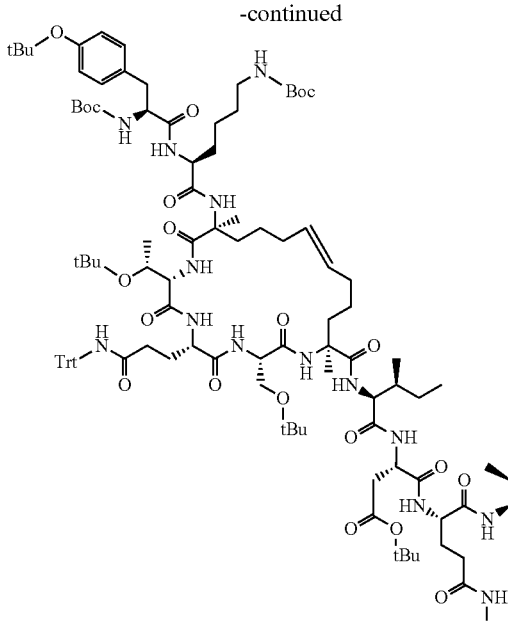

3.1

Peptide Synthesis

The peptide was synthesized using standard Fmoc chemistry.

Synthesis scale: 0.2 mmol.
1) Add DCM to the vessel containing CTC Resin and Fmoc-Ile-OH (70.68 mg, 200.00 μmol, 1 eq) with $N_2$ bubbling.
2) Drain and then DMF wash 30 sec with 3 times.
3) Add 20% piperidine/DMF and mix for 30 min.
4) Drain and then DMF wash 30 sec with 5 times.
5) Add Fmoc-amino acid solution and mix 30 seconds, then add coupling reagents with $N_2$ bubbling for about 1 hour.
6) Repeat step 2 to 5 for next amino acid coupling.
7) When the coupling was finished, the resin in DCE was added Grubb's $1^{st}$ (20%) with $N_2$ bubbling for 16 hours at 25° C.

TABLE 3

Fmoc Amino Acids used in the Preparation of I-29.

| # | Materials | Coupling reagents |
|---|---|---|
| 1 | Fmoc-Ile-OH (1 eq) | DIEA (4 eq) |
| 2 | Fmoc-Gln(Trt)-OH (3 eq) | HBTU (2.9 eq) and DIEA (6 eq) |
| 3 | Fmoc-Asp(OtBu)-OH (3 eq) | HBTU (2.9 eq) and DIEA (6 eq) |
| 4 | Fmoc-Ile-OH(3 eq) | HBTU (2.9 eq) and DIEA (6 eq) |
| 5 | S5 (1.5 eq) | HATU (1.5 eq) and DIEA (3 eq) |
| 6 | Fmoc-Ser(tBu)-OH (3 eq) | HBTU (2.9 eq) and DIEA (6 eq) |
| 7 | Fmoc-Gln(Trt)-OH (3 eq) | HBTU (2.9 eq) and DIEA (6 eq) |
| 8 | Fmoc-Thr(tBu)-OH (3 eq) | HBTU (2.9 eq) and DIEA (6 eq) |
| 9 | S5 (1.5 eq) | HBTU (1.5 eq) and DIEA (3 eq) |
| 10 | Fmoc-Lys(Boc)-OH (3 eq) | HBTU (2.9 eq) and DIEA (6 eq) |
| 11 | Fmoc-Tyr(tBu)-OH (3 eq) | HBTU (2.9 eq) and DIEA (6 eq) |
| 12 | $(Boc)_2O$ (3 eq) | DIEA (6 eq) |

20% piperidine in DMF was used for Fmoc deprotection for 30 min. The coupling reaction was monitored by ninhydrin test, and the resin was washed with DMF for 5 times.

Peptide Cleavage and Work Up
1) Add cleavage buffer (1% TFA/99% DCM) to the flask containing the side chain protected peptide at room temperature and stir for 0.5 hour and filtrated.
2) The filtration is added DIEA to neutralized and extracted with water twice.
3) Dry the crude peptide under vacuum 16 hours to give crude compound as brown solid (290 mg, 64% yield).

General Procedure for Preparation of Compound 3.3

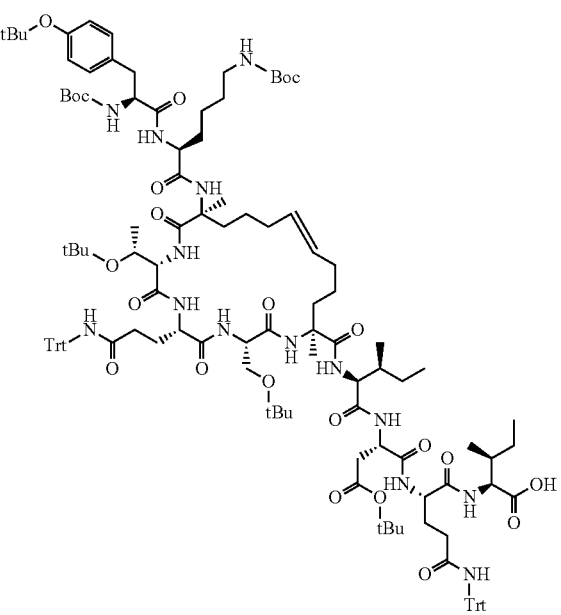

3.1

+

-continued

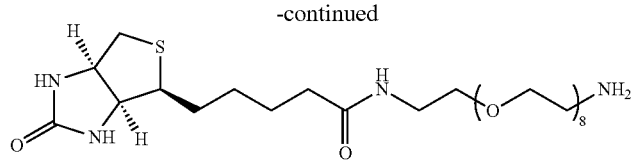

3.2

↓ DIC, HOAT, DCM

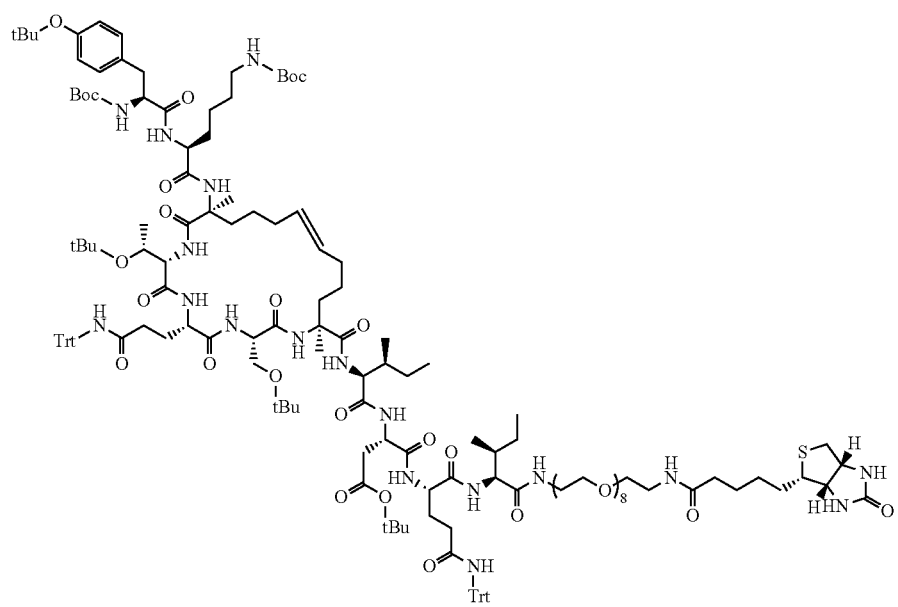

3.3

To a mixture of compound 3.1 (290 mg, 128.61 μmol, 1 eq), compound 3.2 (164.32 mg, 257.23 μmol, 2 eq) and HOAt (35.01 mg, 257.23 μmol, 2 eq) in DCM (10 mL) was added DIC (32.46 mg, 257.23 μmol, 39.83 μL, 2 eq.) in one portion at 25° C. under $N_2$. The mixture was stirred at 25° C. for 5 hours. LC-MS showed compound 3.1 was consumed completely. The reaction mixture was extracted with 1M HCL 30 mL (10 mL*3) and dried over $Na_2SO_4$, filtered and concentrated under reduced pressure to give a crude compound 3.3 (300 mg, 81% yield).

General Procedure for Preparation of I-29

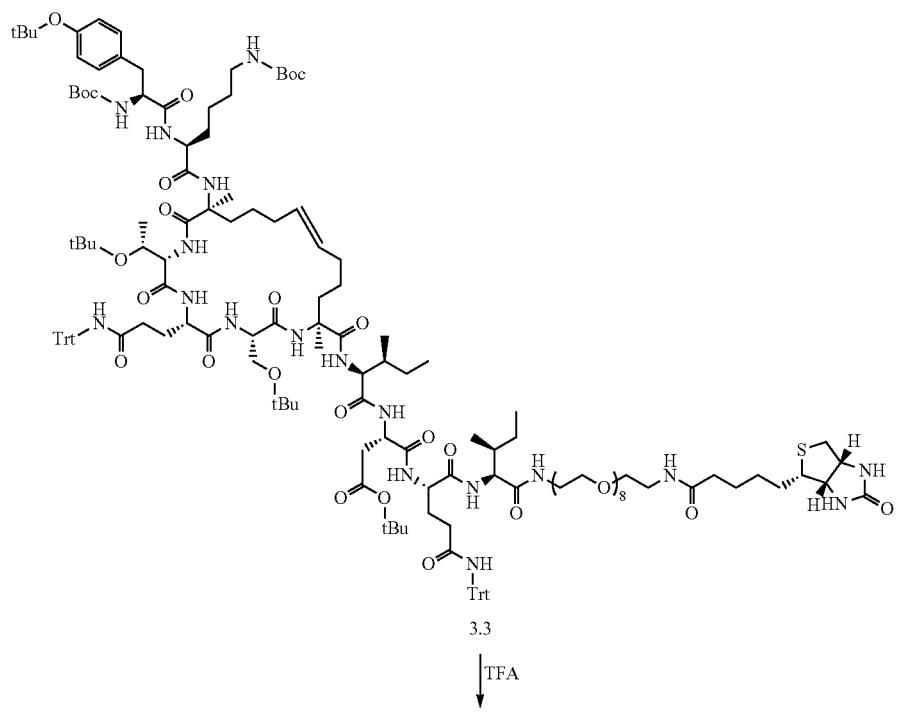

3.3

↓ TFA

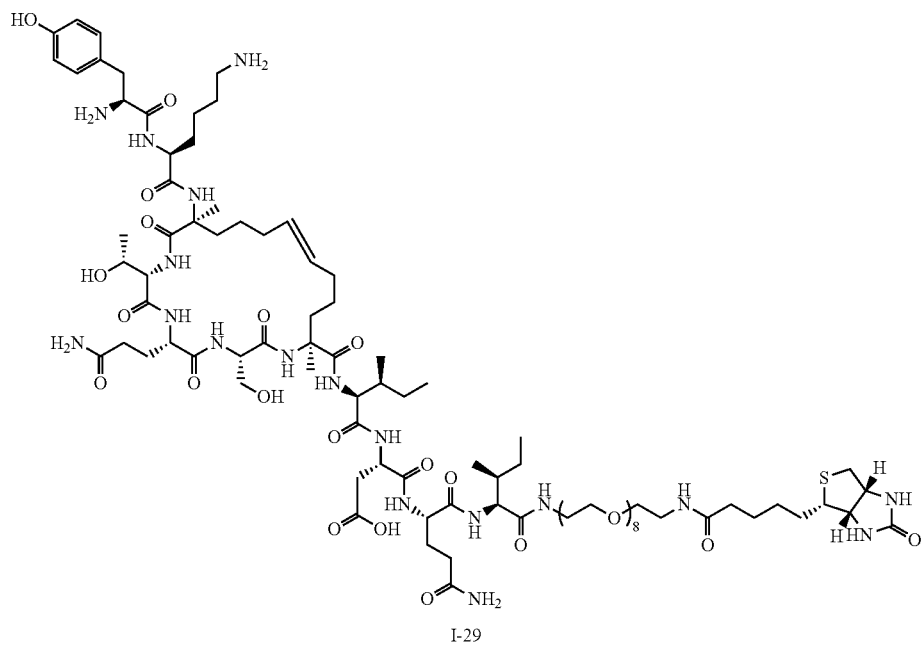

I-29

To a mixture of Compound 3.3 (300 mg, 113.93 µmol, 1 eq) was added 95% TFA/2.5% TIS/2.5% H₂O in one portion at 25° C. The mixture was stirred at 25° C. for 2 hours. LC-MS showed Compound 3.3 was consumed completely. The peptide is precipitated with cold tert-butyl methyl ether and centrifuged (2 min at 3000 rpm). The residue was purified by prep-HPLC (0.075% TFA/H₂O, ACN) to give I-29 (75.5 mg, 38.40 µmol, 33.70% yield) as a white solid.

Example 4. Synthesis of I-30

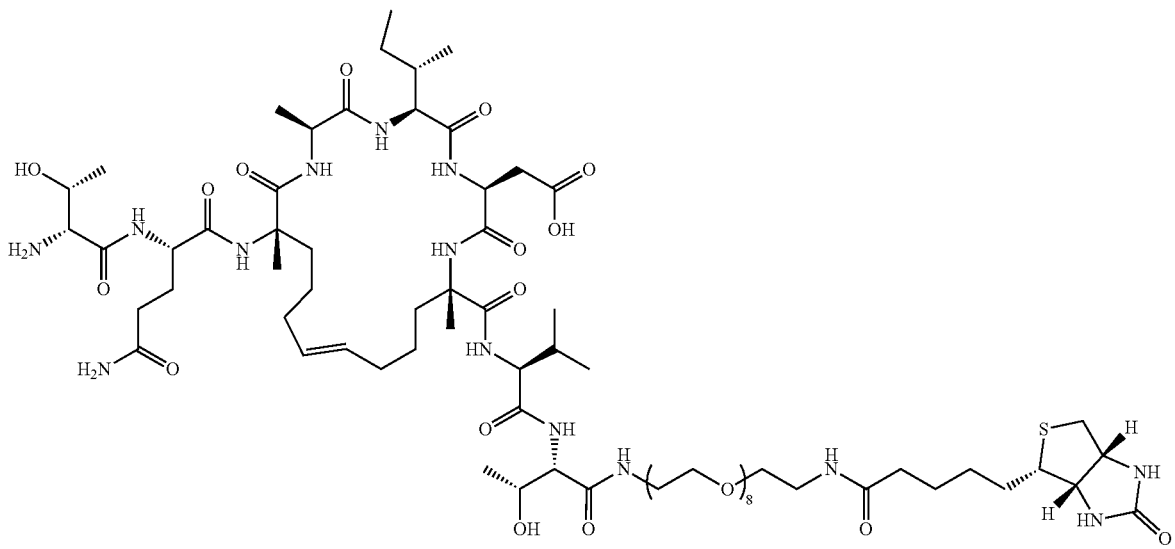

I-30

General Procedure for Preparation of Compound 4.1

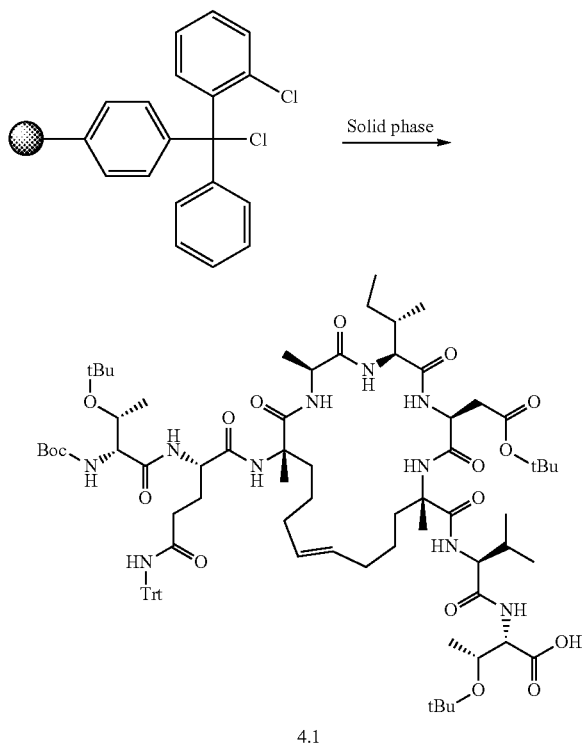

4.1

Peptide Synthesis

The peptide was synthesized using standard Fmoc chemistry.

Synthesis scale: 0.2 mmol.

1) Add DCM to the vessel containing CTC Resin and Fmoc-Thr (tBu)-OH (79.68 mg, 200.00 μmol, 1 eq) with $N_2$ bubbling.
2) Drain and then DMF wash 30 sec with 3 times.
3) Add 20% piperidine/DMF and mix for 30 min.
4) Drain and then DMF wash 30 sec with 5 times.
5) Add Fmoc-amino acid solution and mix 30 seconds, then add coupling reagents with $N_2$ bubbling for about 1 hour.
6) Repeat step 2 to 5 for next amino acid coupling.
7) When the coupling was finished, the resin in DCE was added Grubb's 1st (20%) with $N_2$ bubbling for 16 hours at 25° C.

TABLE 4

Fmoc Amino Acids used in the synthesis of I-30.

| # | Materials | Coupling reagents |
|---|---|---|
| 1 | Fmoc-Thr(tBu)-OH (1 eq) | DIEA (4 eq) |
| 2 | Fmoc-Val-OH (3 eq) | HBTU (2.9 eq) and DIEA (6 eq) |
| 3 | S5 (1.5 eq) | HATU (1.5 eq) and DIEA (3 eq) |
| 4 | Fmoc-Asp(OtBu)-OH (3 eq) | HBTU (2.9 eq) and DIEA (6 eq) |
| 5 | Fmoc-Ile-OH (3 eq) | HBTU (2.9 eq) and DIEA (6 eq) |
| 6 | Fmoc-Ala-OH (3 eq) | HBTU (2.9 eq) and DIEA (6 eq) |
| 7 | S5 (1.5 eq) | HATU (1.5 eq) and DIEA (3 eq) |
| 8 | Fmoc-Gln(Trt)-OH (3 eq) | HBTU (2.9 eq) and DIEA (6 eq) |
| 9 | Fmoc-Thr(tBu)-OH (3 eq) | HBTU (2.9 eq) and DIEA (6 eq) |
| 10 | $(Boc)_2O$ (3 eq) | DIEA (6 eq) |

20% piperidine in DMF was used for Fmoc deprotection for 30 min. The coupling reaction was monitored by ninhydrin test, and the resin was washed with DMF for 5 times.

Peptide Cleavage and Work up

1) Add cleavage buffer (1% TFA/99% DCM) to the flask containing the side chain protected peptide at room temperature and stir for 0.5 hour and filtrated.
2) The filtration is added DIEA to neutralized and extracted with water twice.
3) Dry the crude peptide under vacuum 16 hours to give crude compound as brown solid (110 mg, 36% yield).

General Procedure for Preparation of Compound 4.2

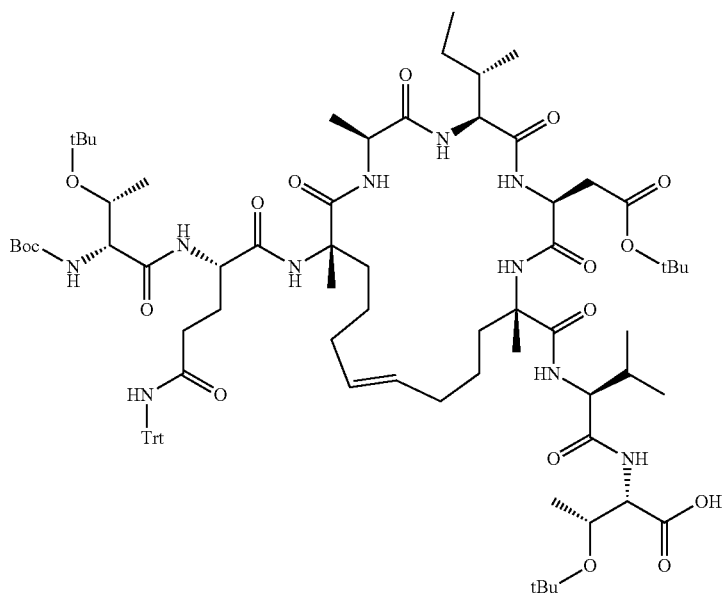

4.1

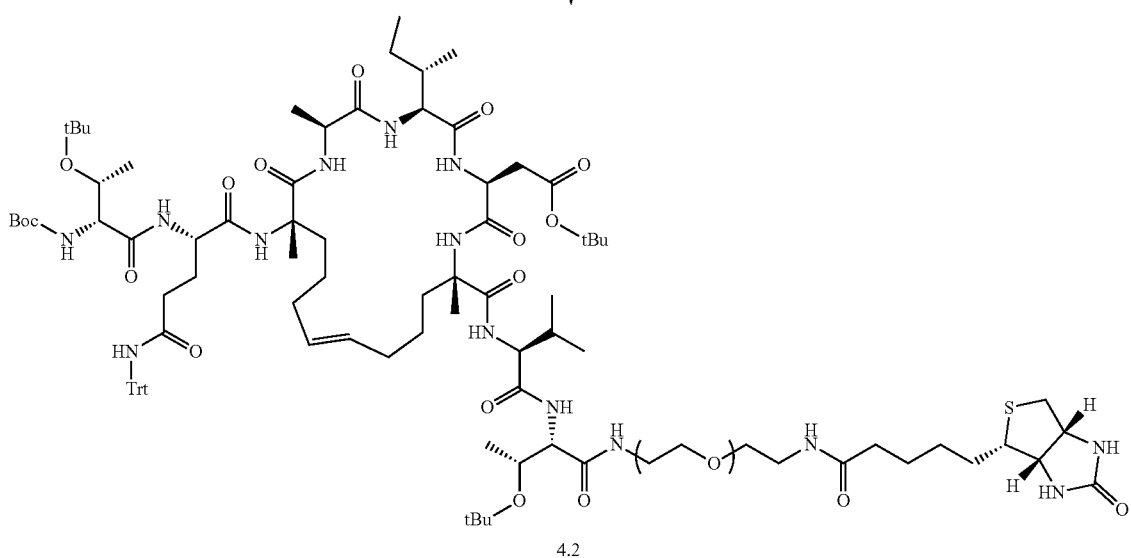

4.2

To a mixture of compound 4.1 (110 mg, 72.9 µmol, 1 eq), NH₂-PEG8-D-Biotin (93.2 mg, 145.9 µmol, 2 eq.) and HOAt (19.86 mg, 145.9 µmol, 2 eq.) in DCM (10 mL) was added DIC (18.41 mg, 145.9 µmol, 22.59 µL, 2 eq.) in one portion at 25° C. under N₂. The mixture was stirred at 25° C. for 5 hours. LC-MS showed compound 4.1 was consumed completely. The reaction mixture was extracted with 1M HCL 30 mL (10 mL*3) and dried over Na₂SO₄, filtered and concentrated under reduced pressure to give a crude compound 4.2 (100 mg, 64.4% yield).

General Procedure for Preparation of I-30

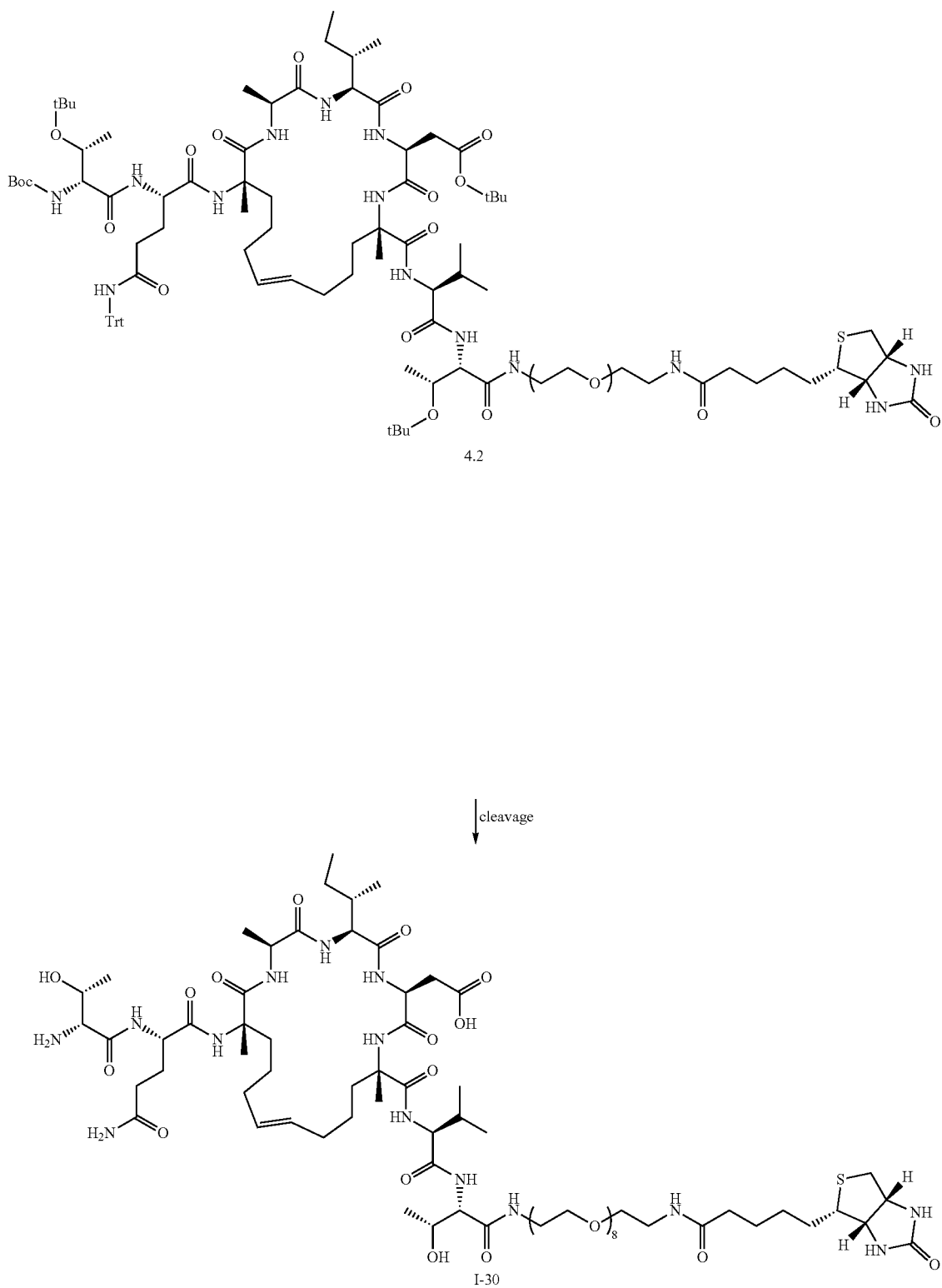

To a mixture of Compound 4.2 (100 mg, 47 μmol, 1 eq) was added 95% TFA/TIS/EDT/H₂O in one portion at 25° C. The mixture was stirred at 25° C. for 2 hours. LC-MS showed Compound 3 was consumed completely. The peptide is precipitated with cold tert-butyl methyl ether and centrifuged (2 min at 5000 rpm). The residue was purified by prep-HPLC (0.075% TFA/H₂O, ACN) to give I-30 (24.2 mg, 15.00 μmol, 32% yield) as a white solid.

Example 5. Synthesis of I-31

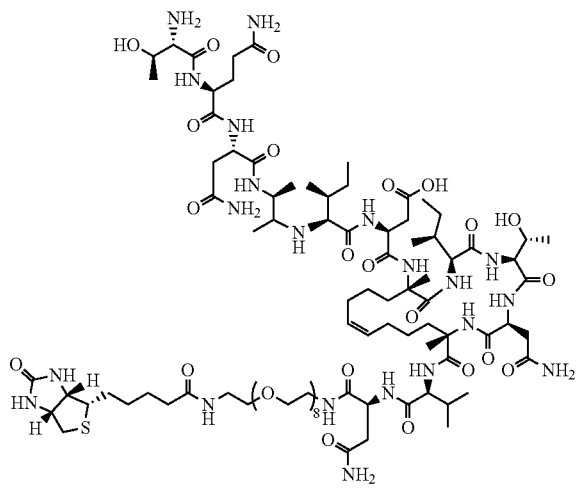

I-31

General Procedure for Preparation of Compound 5.1

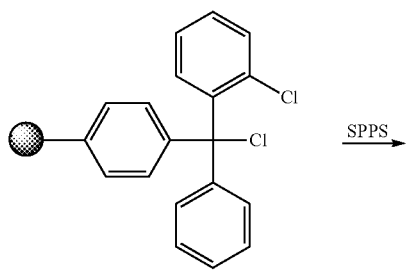

Peptide Synthesis

The peptide was synthesized using standard Fmoc chemistry.
1) Add DCM to the vessel containing CTC Resin and Fmoc-Asn (Trt)-OH (119.2 mg, 200.00 μmol, 1 eq) with $N_2$ bubbling.
2) Drain and then DMF wash 30 sec with 3 times.
3) Add 20% piperidine/DMF and mix for 30 min.
4) Drain and then DMF wash 30 sec with 5 times.
5) Add Fmoc-amino acid solution and mix 30 seconds, then add coupling reagents with $N_2$ bubbling for about 1 hour.
6) Repeat step 2 to 5 for next amino acid coupling.
7) When the coupling was finished, the resin in DCE was added Grubb's 1st (20%) with $N_2$ bubbling for 16 hours at 25° C.

TABLE 5

Fmoc Amino Acids used in the Synthesis of I-31.

| # | Materials | Coupling reagents |
|---|---|---|
| 1 | Fmoc-Asn(Trt)-OH(1 eq) | DIEA (4 eq) |
| 2 | Fmoc-Val-OH (3 eq) | HBTU (2.9 eq) and DIEA (6 eq) |
| 3 | S5 (1.5 eq) | HATU (1.5 eq) and DIEA (3 eq) |

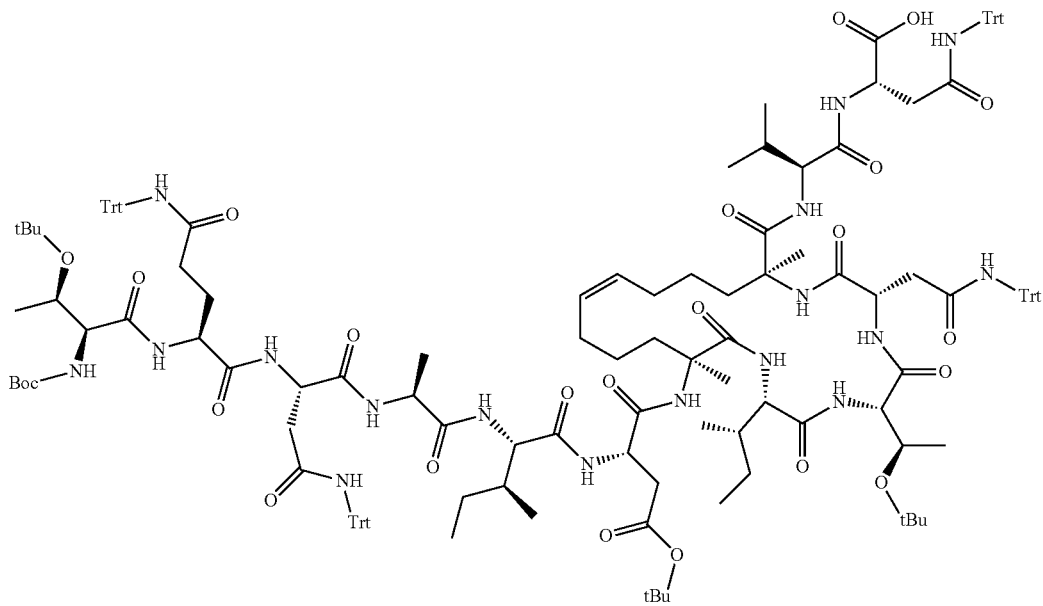

5.1

TABLE 5-continued

Fmoc Amino Acids used in the Synthesis of I-31.

| # | Materials | Coupling reagents |
|---|---|---|
| 4 | Fmoc-Asn(Trt)-OH (3 eq) | HBTU (2.9 eq) and DIEA (6 eq) |
| 5 | Fmoc-Thr(tBu)-OH (3 eq) | HBTU (2.9 eq) and DIEA (6 eq) |
| 6 | Fmoc-Ile-OH (3 eq) | HBTU (2.9 eq) and DIEA (6 eq) |
| 7 | S5 (1.5 eq) | HATU (1.5 eq) and DIEA (3 eq) |
| 8 | Fmoc-Asp(OtBu)-OH (3 eq) | HBTU (2.9 eq) and DIEA (6 eq) |
| 9 | Fmoc-Ile-OH (3 eq) | HBTU (2.9 eq) and DIEA (6 eq) |
| 10 | Fmoc-Ala-OH (3 eq) | HBTU (2.9 eq) and DIEA (6 eq) |
| 11 | Fmoc-Asn(Trt)-OH (3 eq) | HBTU (2.9 eq) and DIEA (6 eq) |
| 12 | Fmoc-Gln(Trt)-OH (3 eq) | HBTU (2.9 eq) and DIEA (6 eq) |
| 13 | Fmoc-Thr(tBu)-OH (3 eq) | HBTU (2.9 eq) and DIEA (6 eq) |
| 14 | (Boc)$_2$O (3 eq) | DIEA (6 eq) |

20% piperidine in DMF was used for Fmoc deprotection for 30 min. The coupling reaction was monitored by ninhydrin test, and the resin was washed with DMF for 5 times.

Peptide Cleavage and Work Up

1) Add cleavage buffer (1% TFA/99% DCM) to the flask containing the side chain protected peptide at room temperature and stir for 0.5 hour and filtrated.
2) The filtration is added DIEA to neutralized and extracted with water twice.
3) Dry the crude peptide under vacuum 16 hours to give crude compound as brown solid (335 mg, 62.29% yield).

General Procedure for Preparation of Compound 5.3

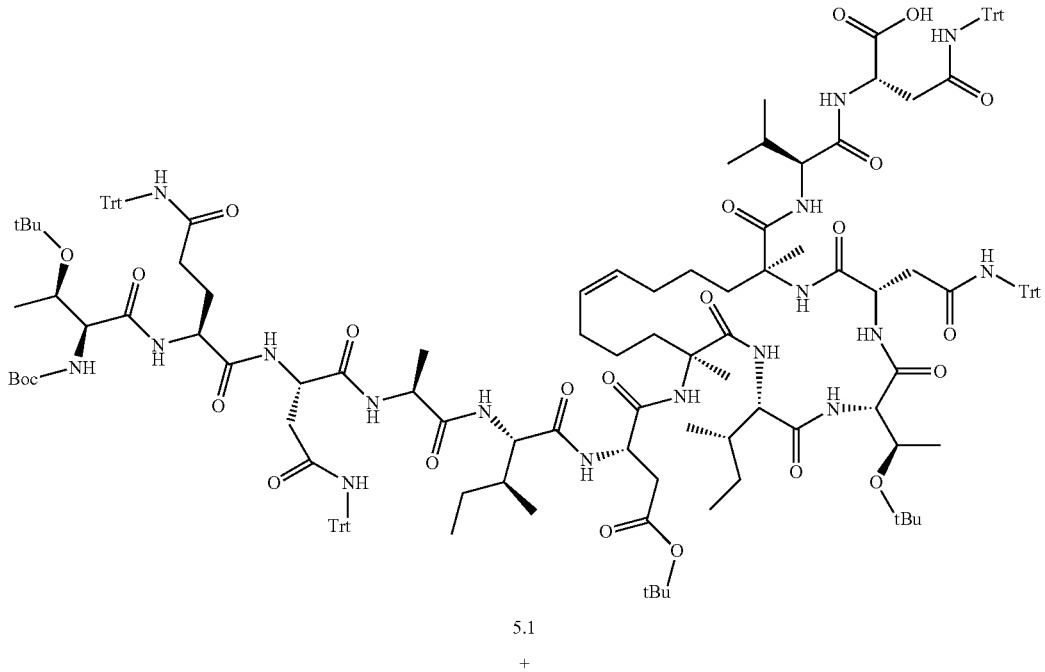

5.1

+

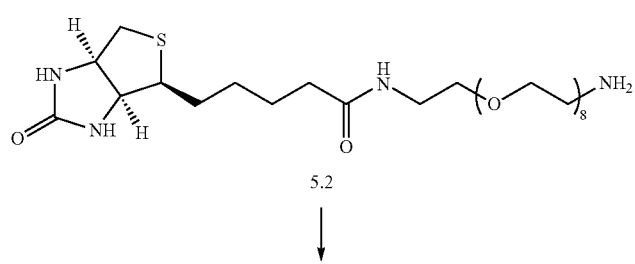

5.2

↓

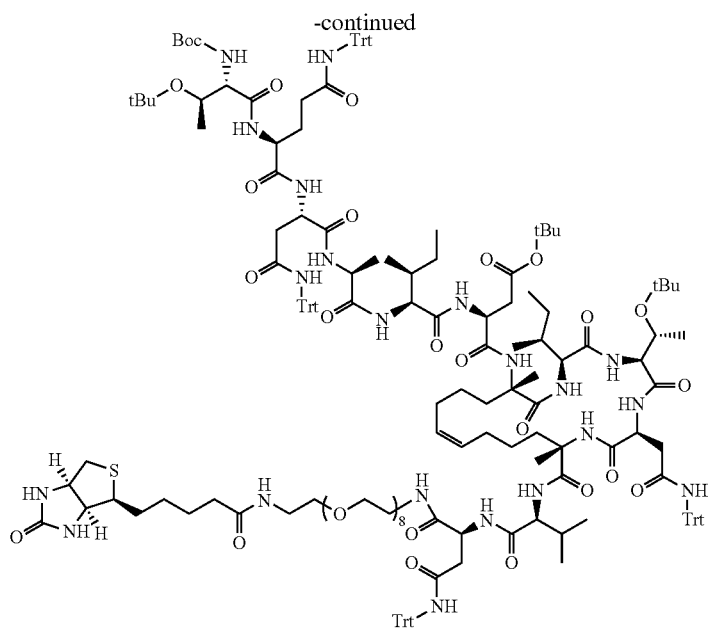

5.3

To a mixture of compound 5.1 (335 mg, 124.52 μmol, 1 eq.), compound 5.2 (159.09 mg, 249.04 μmol, 2 eq) and HOAt (33.9 mg, 249.04 μmol, 2 eq.) in DCM (10 mL) was added DIC (249.04 μmol, 38.59 μL, 2 eq.) in one portion at 25° C. under N₂. The mixture was stirred at 25° C. for 5 hours. LC-MS showed compound 5.1 was consumed completely. The reaction mixture was extracted with 1M HCL 30 mL (10 mL*3). Dried over Na₂SO₄, filtered and concentrated under reduced pressure to give a crude compound 5.3 (350 mg, 84.89% yield).

General Procedure for Preparation of I-31

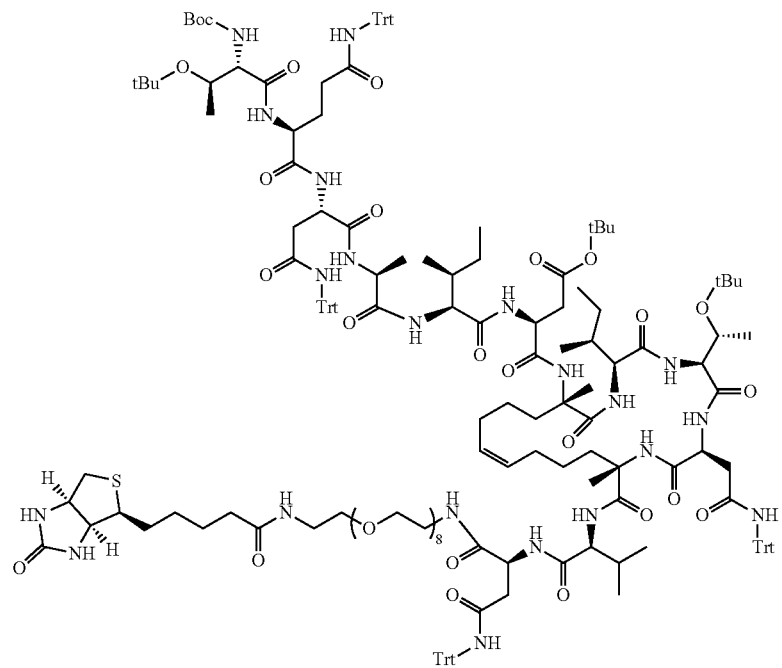

5.3

↓

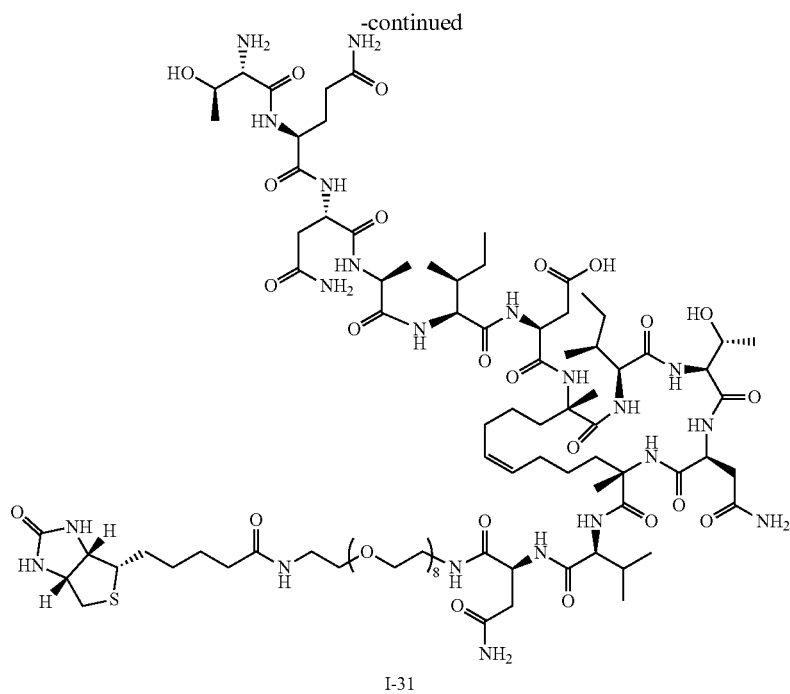

I-31

To a mixture of Compound 5.3 (350 mg, 105.71 μmol, 1 eq) was added 95% TFA/TIS/EDT/H$_2$O in one portion at 25° C. The mixture was stirred at 25° C. for 2 hours. LC-MS showed Compound 5.3 was consumed completely. The peptide is precipitated with cold tert-butyl methyl ether and centrifuged (2 min at 5000 rpm). The residue was purified by prep-HPLC (0.075% TFA/H$_2$O, ACN) to give I-31 (43.8 mg, 21.1 μmol, 20% yield) as a white solid.

Example 6. Synthesis of I-32

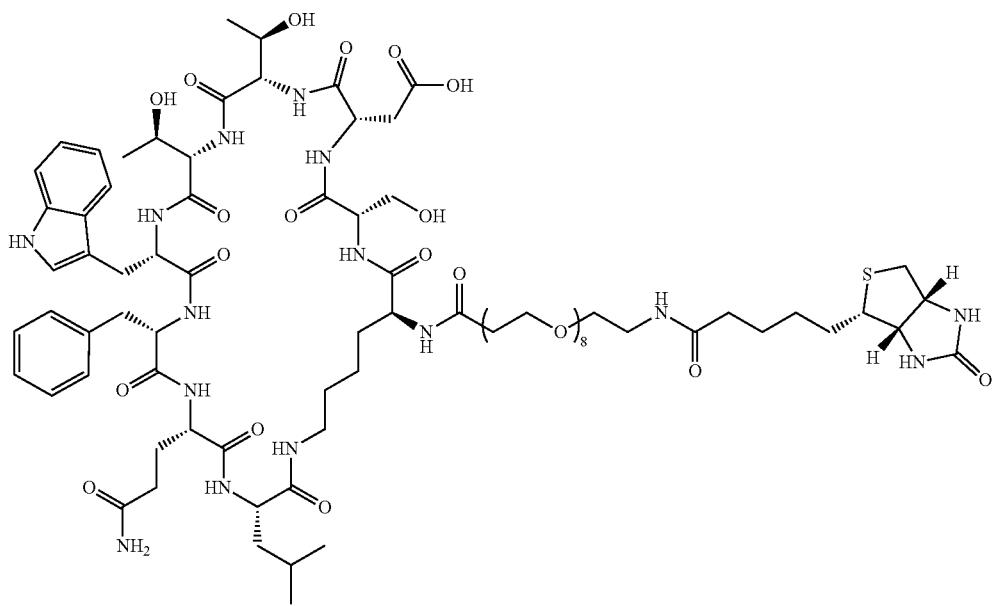

I-32

General Procedure for Preparation of Compound 6.1

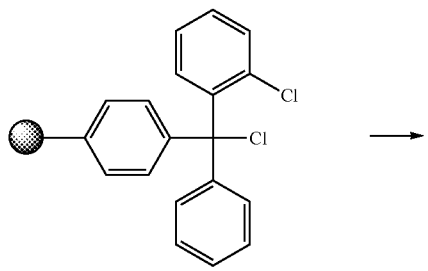

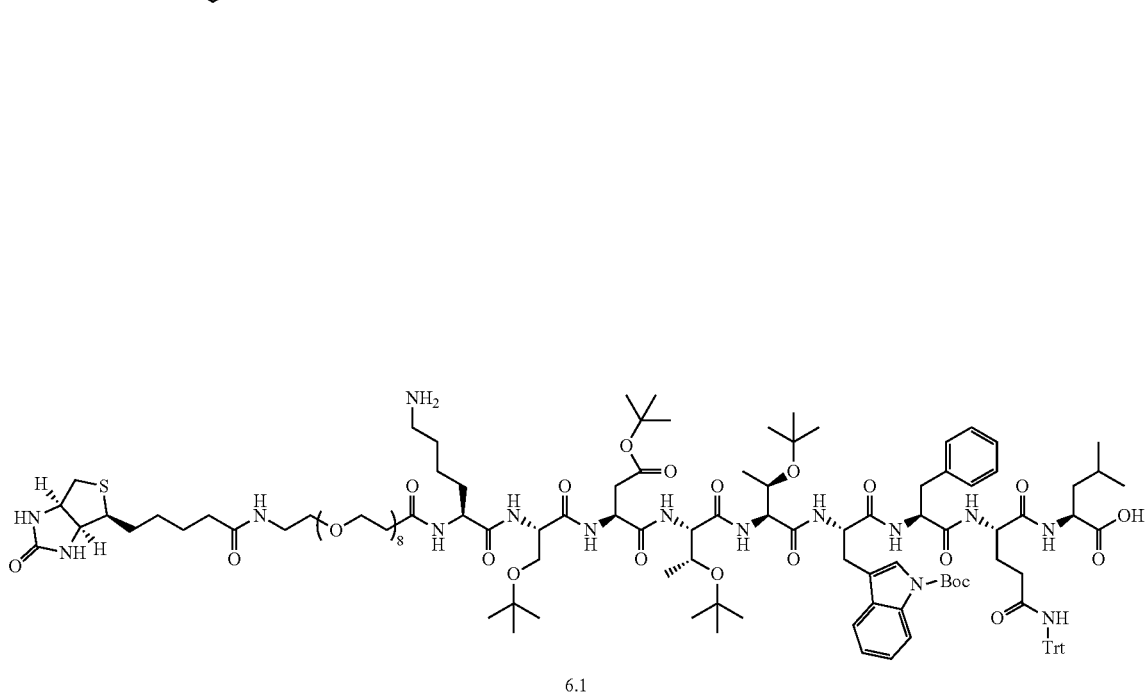

6.1

Peptide Synthesis

The peptide was synthesized using standard Fmoc chemistry.
1) Add DCM to the vessel containing CTC Resin and Fmoc-Leu-OH (70.68 mg, 200.00 μmol, 1 eq) with $N_2$ bubbling.
2) Drain and then DMF wash 30 sec with 3 times.
3) Add 20% piperidine/DMF and mix for 30 min.
4) Drain and then DMF wash 30 sec with 5 times.
5) Add Fmoc-amino acid solution and mix 30 seconds, then add coupling reagents with $N_2$ bubbling for about 1 hour.
6) Repeat step 2 to 5 for next amino acid coupling.

TABLE 6

Fmoc Amino Acids used in the Synthesis of I-32

| # | Materials | Coupling reagents |
|---|---|---|
| 1 | Fmoc-Leu-OH(1 eq) | DIEA (4 eq) |
| 2 | Fmoc-Gln(Trt)-OH (3 eq) | HBTU (2.9 eq) and DIEA (6 eq) |
| 3 | Fmoc-Phe-OH (3 eq) | HBTU (2.9 eq) and DIEA (6 eq) |
| 4 | Fmoc-Tyr(Boc)-OH (3 eq) | HBTU (2.9 eq) and DIEA (6 eq) |
| 5 | Fmoc-Thr(tBu)-OH (3 eq) | HBTU (2.9 eq) and DIEA (6 eq) |
| 6 | Fmoc-Thr(tBu)-OH (3 eq) | HBTU (2.9 eq) and DIEA (6 eq) |
| 7 | Fmoc-Asp(OtBu)-OH (3 eq) | HBTU (2.9 eq) and DIEA (6 eq) |

TABLE 6-continued

Fmoc Amino Acids used in the Synthesis of I-32

| # | Materials | Coupling reagents |
|---|---|---|
| 8 | Fmoc-Ser (tBu)-OH (3 eq) | HBTU (2.9 eq) and DIEA (6 eq) |
| 9 | Fmoc-Lys (Dde)-OH (1.5 eq) | HATU (1.5 eq) and DIEA (3 eq) |
| 10 | Peg$_8$ (1.5 eq) | HATU (1.5 eq) and DIEA (3 eq) |
| 11 | Biotin(1.5 eq) | HATU (1.5 eq) and DIEA (3 eq) |

20% piperidine in DMF was used for Fmoc deprotection for 30 min. The coupling reaction was monitored by ninhydrin test, and the resin was washed with DMF for 5 times.

Peptide Cleavage and Work Up:
1) Add cleavage buffer (1% TFA/99% DCM) to the flask containing the side chain protected peptide at room temperature and stir for 0.5 hour and filtrated.
2) The filtration is added DIEA to neutralized and extracted with water twice.
3) Dry the crude peptide under vacuum 16 hours to give crude compound as white solid (300 mg, 64% yield).

General Procedure for Preparation of Compound 6.2

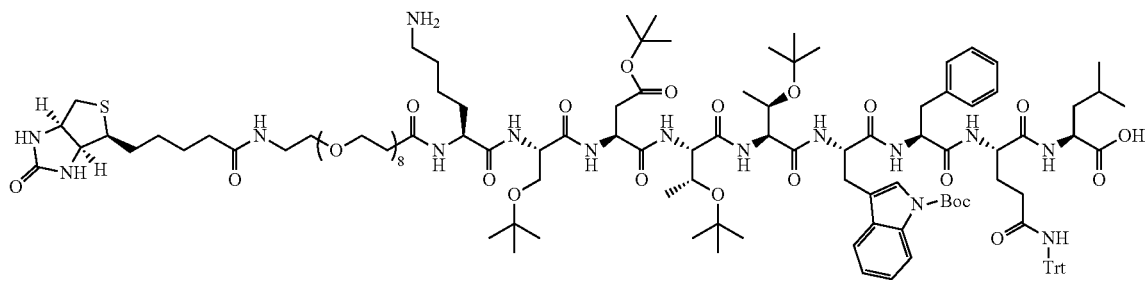

6.1

↓

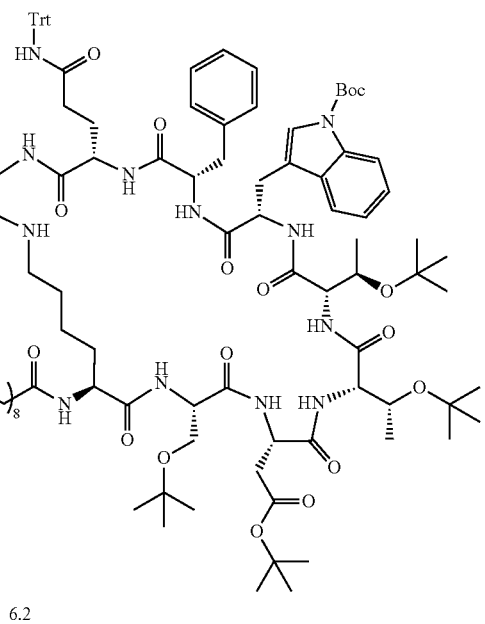

6.2

To a mixture of Compound 6.1 (300 mg, 128.10 µmol, 1 eq.), HOBt (34.62 mg, 256.21 µmol, 2 eq) and TBTU (82.26 mg, 256.21 µmol, 2 eq.) in DCM (200 mL) was added DIEA (66.22 mg, 512.41 µmol, 89.25 µL, 4 eq) dropwise at 25° C. under $N_2$. The mixture was stirred at 25° C. for 30 min. LC-MS showed compound 6.1 was consumed completely. The reaction mixture was diluted with EtOAc 200 mL and extracted with water 200 mL (100 mL*2). The combined organic layers were washed with brine 200 mL (100 mL*2), dried over $Na_2SO_4$, filtered and concentrated under reduced pressure to give crude compound 6.2 (180 mg, 77.46 µmol, 60.47% yield).

General Procedure for Preparation of I-32

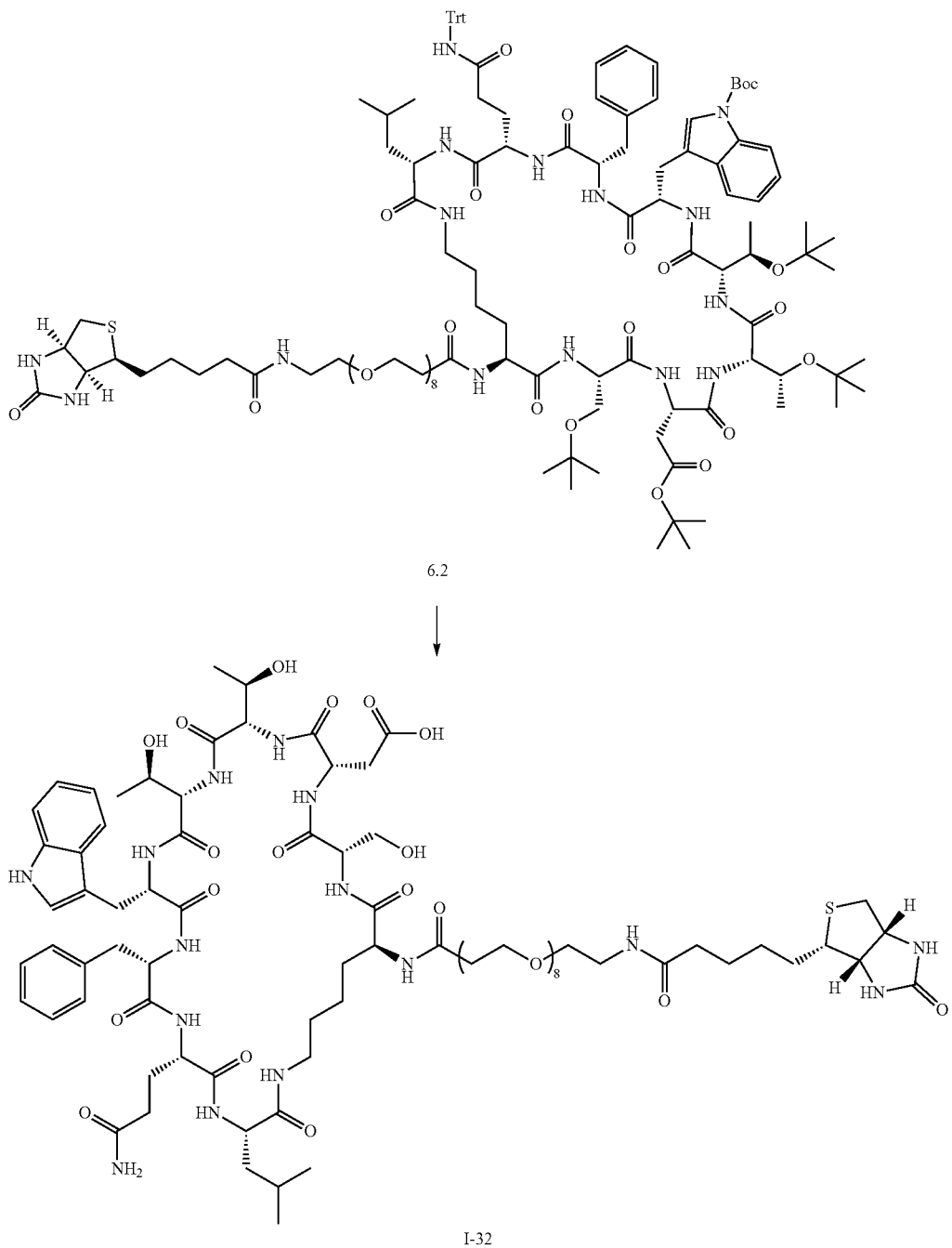

To a mixture of Compound 6.2 (180 mg, 77.46 μmol, 1 eq.) was added 95% TFA/TIS/EDT/H₂O in one portion at 25° C. The mixture was stirred at 25° C. for 2 hours. LC-MS showed Compound 6.2 was consumed completely. The peptide is precipitated with cold tert-butyl methyl ether and centrifuged (2 min at 5000 rpm). The residue was purified by prep-HPLC (0.075% TFA/H₂O, ACN) to give I-32 (2 mg, 1.5% yield) as a white solid.

Other compounds in Table 1 were prepared and characterized similarly using technologies illustrated in the Examples in accordance with the present disclosure.

Example 7. IgG Fc Binding ELISA

As demonstrated herein, ARM agents of the present disclosure can bind to Fc regions of antibodies or fragments thereof. An exemplary assay for assessing interactions between ARMs and Fc regions is described below.

Biotinylated test compounds or protein A control (Pierce: 29989) were added to streptavidin coated ELISA plates (Thermo Fisher: 15502) at 100 L/well (PBS 0.05% tween-20-PBST, with 0.2% BSA). The plate was incubated for 2 h at 25° C. with rotation before the solutions were removed and the plate was washed twice with equal volumes of PBST. Fluorescein conjugated human IgG FC (50 nM in PBST with 0.2% BSA, Rockland: 009-0203) added to the plate at (100 µL/well) and incubated 25° C. for 45 min. The solutions were removed, the plate was washed twice with PBST, patted dry, and read with area scanning of each well (Biotek Synergy $H_1$ microplate reader, 490/525 ex/em).

Table 7 shows the activity of selected compounds of this invention in the IgG FC binding ELISA assay. The compound numbers correspond to the compound numbers in Table 1. Compounds having an activity designated as "A" provided a % signal relative to the standard Protein A at 1,000 nM of 90-120%; compounds having an activity designated as "B" provided a % signal relative to the standard Protein A at 1,000 nM of >4 and <90%; compounds of having an activity designated as "C" provided a % signal relative to the standard Protein A at 1,000 nM of 2-4%; and compounds having an activity designated as "D" provided a % signal relative to the standard Protein A at 1,000 nM of <2%.

TABLE 7

IgG FC binding ELISA Data

| Compound ID | % signal of Protein A at 1,000 nM |
|---|---|
| I-1 | C |
| I-2 | B |
| I-3 | C |
| I-4 | C |
| I-5 | C |
| I-7 | C |
| I-8 | B |
| I-9 | C |
| I-10 | C |
| I-12 | C |
| I-13 | C |
| I-14 | C |
| I-17 | A |
| I-18 | A |
| I-19 | A |

Example 8. CD16a Binding of Recruited Antibodies

In some embodiments, antibodies recruited by ARMs bind to CD16a. Various technologies are available for assessing interactions between antibodies and CD16a and can be utilized in accordance with the present disclosure. An exemplary procedure is described below.

CD16a fluorescent labeling—CD16a158V (Sino Biologicals: 10389-H27H1) at 200 nM (PBST) and combined at an equal volume with Monolith NT His-Tag labeling kit, RED-tris-NTA dye (100 nM). The solution was incubated in the dark at 25° C. with rotation for 45 min before being spun down at 12000 rpm for 15 min to remove any uncomplexed reagent.

Biotinylated molecule immobilization—Biotinylated test compounds or control antibodies (IgG: Rockland 009-0602, IgM: Rockland, IgA: Rockland) were added to streptavidin coated ELISA plates (Thermo Fisher: 15502) at 50 µL/well (PBST with 0.2% BSA). The plate was incubated for 1 h at 25° C. with rotation before the solutions were removed and the plate was washed three times with PBST.

Serum antibody recruitment—Pooled normal human serum (Innovative Research, lot: 20966) was thawed on ice and spun down at 12000 rpm at 4° C. for 10 min prior to use to removed debris and precipitated protein. The supernatant was used to make a 2.5% solution or prepared as a dilution series (PBST with 0.2% BSA). The serum solution was added to the plate (50 µL/well) and incubated for 1 h with rotation. The solutions were removed and the plate was washed three times with PBST.

CD16a binding of recruited antibodies—The labeled CD16a was then added to the wells at 25 nM and incubated for 45 min. The solutions were removed and the plate was washed twice with PBST. The plates were then read with area scanning of each well (Biotek Synergy H1 microplate reader, 650/665 ex/em).

Table 8 shows the activity of selected compounds of this invention in the CD16a Binding of recruited Antibodies assay. The fluorescence readout is normalized to biotinylated IgG and the corresponding biotinylated molecule immobilized at 250 nM. The compound numbers correspond to the compound numbers in Table 1. Compounds having an activity designated as "A" provided a fluorescence readout of >2; compounds having an activity designated as "B" provided a fluorescence readout fluorescence readout of 1.5-2; compounds of having an activity designated as "C" provided a fluorescence readout of 1.0-1.5; and compounds having an activity designated as "D" provided a fluorescence readout of <1.

TABLE 8

CD16a Binding of recruited Antibodies Assay Data

| Compound ID | Fluoresence readout at 250 nM |
|---|---|
| I-17 | A |
| I-18 | C |
| I-19 | B |

Example 9. ADCC Reporter Assay

As described herein, provided technologies are useful for inhibiting and/or killing cancer cells. Such functions of provided technologies can be assessed through various methods available in the art, e.g., ADCC reporter assays described herein.

In one example, LNCaP cells (human prostate cancer derived, ATCC: CRL-1740) were detached and re-suspended in 1% BSA in RPMI. Cell solution was filtered to remove cell aggregate (polystyrene tube with cell strainer, Corning: 352235) before being counted (Life Technologies Countless II cell counter) and plated (10,000 cells in 25 µL/well; Corning plates: 3917). The plated was centrifuged (5 min, 300×g) and the compound solutions (25 µL/well) were added immediately after. The antibody solutions (25 µL/well, IgG1 FC-Thermo Fisher: 10702HNAH5; Dintrophenyl-KLH polyclonal antibody-Thermo Fisher: A-6430) were added following a 45 min incubation at 37° C. The plate was then incubated with the antibody solution for 45 min to allow for cell-ARM-antibody ternary complex formation before the addition of the effector cells (60 K in 25 µL/well, ADCC reporter cells—Promega kit: G7018). The plate was centrifuged (5 min, 300×g) and effector cells were incubated for an 5 h at 37° C. Following the induction period the plate was equilibrated to 25° C. followed the addition of the luciferase substrate (75 µL/well, 1 vial in 10 mL of Bio-Glo assay buffer, Promega kit: G7018). The plate was then centrifuged (5 min, 300×g) and the luminescence was measured (Biotek Synergy H1 microplate reader).

Results from assays using various cells (LNCap, 22Rv1) demonstrated that provided compounds can effectively induce ADCC. An example set of data are present below:

LNCaP target cells and reporter cells with CD16a-158V/V variant

| I-11 | Luminescence (background substracted) | | | | |
|---|---|---|---|---|---|
| [nM] | anti-DNP (20 ug/mL) | | IgG1 FC (200 nM) | | IgG1 FC (20 nM) |
| 2000 | 1374.5 | 1253.5 | 1372 | 1118 | 151.5 | 163.5 |
| 400 | 1842.5 | 1696.5 | 1827 | 1494 | 797.5 | 679.5 |
| 80 | 1635.5 | 1605.5 | 1708 | 1823 | 1251.5 | 1037.5 |
| 16 | 934.5 | 855.5 | 1216 | 1040 | 667.5 | 621.5 |
| 3.2 | 128.5 | 86.5 | 172 | 189 | 165.5 | 123.5 |
| 0 | 15.5 | −15.5 | 8 | −8 | 46.5 | −46.5 |

*The average of antibody/target cells/reporter cell wells without compound were subtracted as background for each of the indicated antibody treatment groups.

Example 10. ARMs Form Complexes with Antibodies and Target Cells

As demonstrated herein, in some embodiments, agents, e.g., ARMs, can recruit antibodies to target cells to form ternary complexes and induce immune activities. Various technologies are suitable for assessing complex formation. One example such assay was described below. Those skilled in the art appreciate that one or more parameters and/or conditions may be adjusted and other assays/reagents/conditions, etc., can also be utilized.

Adherent cells (LNCap, CRL-1740, for example results below) were harvested using Accumax (Sigma-Aldrich A7089-100 ml). Compounds were diluted in DMSO (MP 191418) to 1000× the starting concentration used in the assay into a 96 well polypropylene plate (Corning 3357). They were then serially diluted in ½ log increments to generate 8-12 concentrations in DMSO (assay dependent). These DMSO stocks were then step diluted 1/10 into PBS (VWR Cat. #20012043). The step diluted compound range was then added into the polypropylene assay plate 1/100 the volume of the assay volume. The cells used for the assay were counted and centrifuged and resuspended at a concentration of 100,000 cells per 200 ul in Flow buffer: 1% BSA (American Bio AB01088-00100); 0.5 mM EDTA (VWR 45001-122); PBS (VWR Cat. #20012043) with 20 ug/ml rabbit anti-DNP Alexa 488 (Thermo Fisher Scientific A11097). The cells were then added into the polypropylene plate with the step diluted compounds and incubated at 4 C 30 min. At the end of the incubation, the cells were centrifuged and washed 2× with Flow buffer containing 0.5% Tween 20 (BP337-500). Samples were analyzed on a BD FacsCelesta. Mean fluorescence was analyzed using Graphpad Prism and curves were fit using log (inhibitor) vs. response-Variable slope (four parameters).

Example results were presented below:

| Compound ID | EC50 (nM) |
|---|---|
| I-11 | 6.6 |
| I-33 | 3 |
| I-34 | 8.7 |
| I-16 | 7.4 |

Example 11. Production of Memory-Like NK Cells

Various technologies can be utilized to produce, characterize and assess memory-like NK cells. One procedure for producing such cells comprises cytokine inducement and is described below. See also Romee et al., Sci Transl Med. 2016 Sep. 21; 8(357): 357ra123. doi: 10.1126/scitranslmed.aaf2341.

To generate memory-like and control (reference) cells, PBMC or purified NK cells are plated at, e.g., 3-5×10$^6$ cells/mL and pre-activated for a suitable period of time (e.g., 16±2 hours) using cytokines, e.g., rhIL-12 (10 ng/ml) plus rhIL-18(50 ng/ml) and rhIL-15 (50 ng/ml) or control conditions (e.g., rhIL-15 1 ng/mL), washed 3 times to remove cytokines, and cultured in complete RPMI-1640 medium containing L-glutamine, HEPES, NEAA, penicillin/streptomycin, and 10% human AB serum (Sigma) supplemented with rhIL-15 (1 ng/mL) to support survival. Half of the medium is replaced every 2 days supplemented with rhIL-15. See also Romee, et al., Blood, 120, 4751-4760 (2012).

Example 12. Provided Technologies Can Effectively Kill Cancer Cells

A useful assay for assessing provided technologies is described below. Those skilled in the art appreciated that many other technologies are available and can be utilized in accordance with the present disclosure.

ADCC Daudi KilR & Raji KilR+NK with Dara & RTX: E: T 7.5:1 (37500:5000) 18 h assay.

In one example, assay volume is 100 μL:

4× Target cells 25 μL; Kilr cells made with DiscoveRx 97-0002

4× ARM or medium (control) 25 μL;

4× antibody 25 μL; and

4× Effector cells.

Media used is Opti-mem ThermoFisher 31985070 (serum free to ensure no exogenous antibody).

Conditions and procedures utilized in one experiment:
1. Count Target cells Raji or Daudi cells. 5,000/25 μL=2× 10^5/ml
2. Serial dilute ARM compounds in DMSO-stock 5 mM
   a. Dilute 5 mM compound 15 μL+10.05 μL DMSO=3 mM (1000×3 μM)
   b. Serial dilute 1/3 10 μL 3 mM compound+20 μL DMSO=1 mM
   c. Serial dilute 1/3.3 10 μL 1 mM compound+23 μL DMSO=0.3 mM
   d. Repeat alternating step b & c for a total of 8 concentrations
3. Dilute Pan human IgG antibody (Sigma Aldrich 4506-100 MG-re-suspended in 2 mL Opti-mem)
   a. 50 mg/mL stock diluted 1/1250=40 μg/mL=4×10 μg/mL-2 μL+2.5 mL Opti-mem
   b. Add 25 μL/well to all wells designated to receive compound
4. Daratumumab (Dara) dilution curve: Creative Bio 1 mg/mL working stock enough for 20 wells×25 μL=500 μL
   a. Dilute 1/833=1200 ng/ml=4×300 ng/mL−4 μL+1000 μL Opti-mem
   b. Serial dilute 1/2 500 μL+500 μL Opti-mem
   c. Repeat 8 concentrations total
5. Rituximab (RTX) dilution curve: Creative Bio 1 mg/mL working stock enough for 42 wells=500 μL
   a. Dilute 1/833=1200 ng/ml=4×300 ng/mL−1.2 μL+1000 μL Opti-mem
   b. Serial dilute 1/2 500 μL+500 μL Opti-mem
   c. Repeat 8 concentrations total 6. Step dilute compounds just prior to use:
   a. 2 µL of DMSO/compound from step 13 into 500 µL Opti-mem mix well prior to dispensing
   b. Add 25 µL of step diluted compound into triplicate or quadruplicate wells
7. Add 25 µL Dara/RTX curve/well: triplicate or quadruplicate
8. Add 25 µL media blanks to wells receiving only Dara or RTX
9. Add 25 µL Target cells to all wells
10. Add 25 µL Effector/NK cells to all wells
11. Make an assay control plate containing with triplicate Passive control & Lysis controls
    a. Target kilr cells 25 µL alone q.s. to 100 µL
    b. Target 25 µL+Effector 25 µL cells q.s. to 100 µL
    c. Target 25 µL+Effector 25 µL+Pan human IgG q.s. to 100 µL
    d. Repeat controls a, b, & c (these will receive 2 µL lysis reagent 30 min prior to Kilr detection reagent)
12. Move Kilr reagents from −20 C to 4 C o/n
13. Incubate o/n 37 C
14. The next day, add 2 µL lysis reagent to lysis controls
15. Incubate an additional 30 min
16. Bring plate & reagents to RT
17. Make Kilr detection reagent mix: 100 µL/well
    a. 2 mL both #2 & #3;
    b. 8 mL #1
18. Add 100 µL/well
19. Place on shaker protected from light
20. Incubate dark read luminescence at 1 h Exemplary results are depicted below:

|      | 2.5:1 | 5:1   | 7.5:1 | 10:1  |
|------|-------|-------|-------|-------|
| IC50 | 0.036 | 0.044 | 0.033 | 0.029 |

Example 13. Provided Technologies can Effectively Kill Cancer Cells In Vivo

Many technologies may be utilized for assessing provided technologies in accordance with the present disclosure. In some embodiments, provided technologies may be assessed for safety, efficacy, etc. in clinical trials.

In one clinical trial, allogeneic, HLA-haploidentical, IL-12, IL-15, and IL-18-preactivated NK cells with the addition of saturating amount of ARM targeting CD33 or CD22 are administered to human subjects (ex-vivo dosing of ARMs) with rel/ref AML. Donor NKcells are purified by CD3 depletion followed by CD56-positive selection, preactivated for 12 to 16 hours with rhIL-12, rhIL-15, and rhIL-18 in a good manufacturing practice (GMP) laboratory adding saturating amount of ARM targeting CD33 or CD22, washed, and infused into AML patients who are preconditioned with fludarabine/cyclophosphamide on day 0. After adoptive transfer, low-dose rhIL-2 is administered to support memory-like NK cells through their induced high-affinity IL-2Rαβγ. In some embodiments, results obtained with administration of NK cells are compared with results with ex-vivo addition of ARM compounds.

3×3 dose escalation: 0.5×10 6/kg, 1.0×10 6/kg, and all NK cells generated (capped at 10×10 6/kg) are evaluated.

Donor memory-like NK cells can be tracked in the blood of all patients with informative HLA, e.g., using donor- or patient-specific anti-HLA monoclonal antibodies, and showed increased in average and proliferation (Ki-67+). Similarly, in some embodiments assessments of bone marrow at a time point, e.g., day 8 after infusion, reveal large percentages and absolute numbers of donor memory-like NK cells.

NK cell activation can be assessed, e.g., by measuring IFN-γ production from patients after a short-term ex vivo re-stimulation triggered by K562 leukemia cells. In some embodiments, analyses show an increased frequency of IFN-γ-positive donor, compared to recipient, NK cells. In some embodiments, absolute numbers of donor IFN-γ-producing NK cells are markedly increased, compared to the recipient NK cells in these samples. Similarly, numbers of IFN-γ-positive donor memory-like NK cells can be greater than recipient NK cells in bone marrow.

Antitumor response can be evaluated using IWG response criteria to determine CR/CRi and MLFS by to determine overall response rate and a CR/CRi rate.

In some embodiments, it is observed that technologies with both memory-like NK cells and ARMs are more effective in treating cancer than either memory-like NK cells or ARMs alone. In some embodiments, it is observed that technologies with both memory-like NK cells and ARMs have less side effects, and/or less severe side effects compared to memory-like NK cells alone.

Example 14. Provided Technologies Can Effectively Kill Cancer Cells Without Causing Significant Side Effects Cancer therapies can have various side effects. For example, those utilizing antibodies toward certain cancer antigens may harm, inhibit or kill non-cancer cells comprising the same antigens. Among other things, the present disclosure present results, below, confirming that provided technologies, while being effective toward cancer cells expressing various antigens, have much less side effects/toxicity compared to other technologies including antibody-based technologies targeting the same antigen. For example, compared to other technologies, provided technologies do not significantly reduce number of non-cancer cells expressing the same targets.

Certain Useful Procedures

PBMC isolation: Leukopheresis product from a donor with body mass index (BMI) between 19-25, under 50 years old, not on immuno-suppressive drugs for at least 2 weeks with an estimated PBMC cell count of >10^10 was obtained from Key Biologics (subject ID 20982200) and transported at ambient temperature. Leukopheresis bag was wiped down with 70% EtOH, a small slit was made and contents were pipetted off into tubes. Leukopak contents were diluted 1:1 with PBS without Ca++/Mg++ and 20 ml of this mixture was layered on top of 25 mL of Ficoll. Tubes were then centrifuged at 400 g for 30 minutes without brakes. PBMCs were harvested from the interface into separate tubes, and tubes were filled to 50 mL with PBS. Cells were centrifuged for 10 min at 120 g to get rid of platelets. Supernatant was poured off and cells were re-suspended in RPMI 10% FBS at a concentration of 7-10×10^6 cells/ml. Cells were cultured overnight at 37C in a 5% $CO_2$ atmosphere until NK cell isolation.

NK cell isolation: PBMC were centrifuged at 400 g for 10 min and re-suspended in EasySep buffer. NK cells were isolated using NK cell isolation kits from STEMCELL Technologies according to kit's manufacturers' instructions. NK cell purity and phenotype was assessed by trypan Blue and flow cytometry using the following antibody cocktail: anti-CD56PE, CD3 APC, and viability was determined using staining with Trypan Blue exclusion dye, and by flow cytometry using Near Infra-Red Fixable viability dye (Thermo Fisher).

CIML NK cell generation: Isolated NK cells were re-suspended at 2×10^6 cells/ml in XVIVO 10% Human Serum and the following concentrations IL-15 (50 ng/ml), IL-12 (10 ng/ml), IL-18(50 ng/ml) for 12 to 18 hrs. Cells were harvested and tested for purity and viability by Trypan Blue staining and by Flow Cytometry using Near Infra-Red Fixable viability dye (Thermo Fisher), CD3 APC (Biolegend) and CD56 PE (Biolegend).

Treatment with a CD38 ARM: An ARM targeting CD38 was dissolved in DMSO to make a 25 mM stock solution. The stock was then serially diluted in 100% DMSO to achieve 1000× concentrations to be used in the experiment. The 100% DMSO compound stock was then added to a tube and media was added to a volume of 1000 µL per 1 µL of compound and vortexed for 1 minute to ensure a homogenous mixture. NK cell pellets were directly re-suspended in the CD38 ARM solutions at cell density of 5×10$^6$ cells/mL.

The structure of the CD38 ARM is:

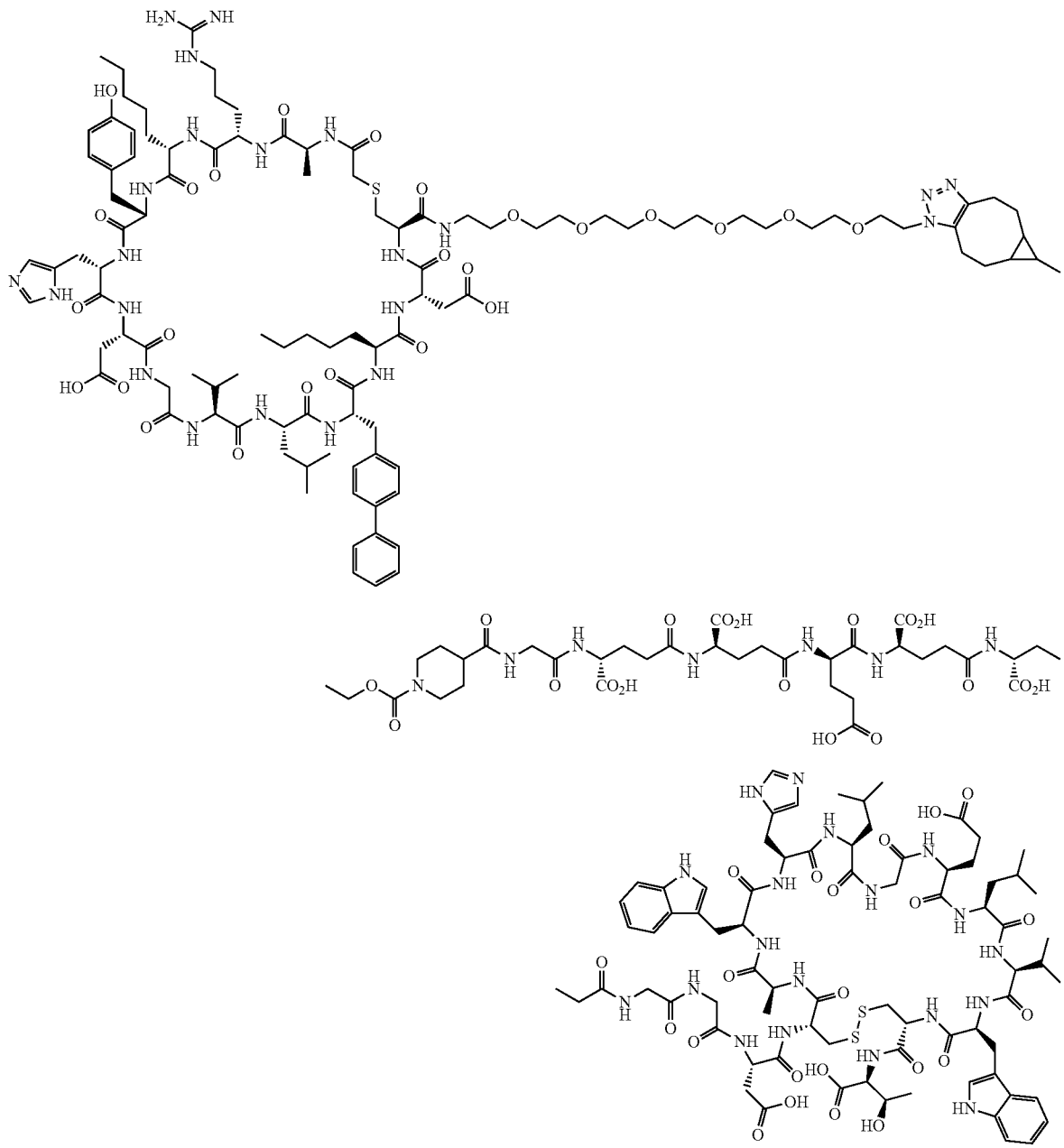

Exemplary Preparation of the CD38 ARM

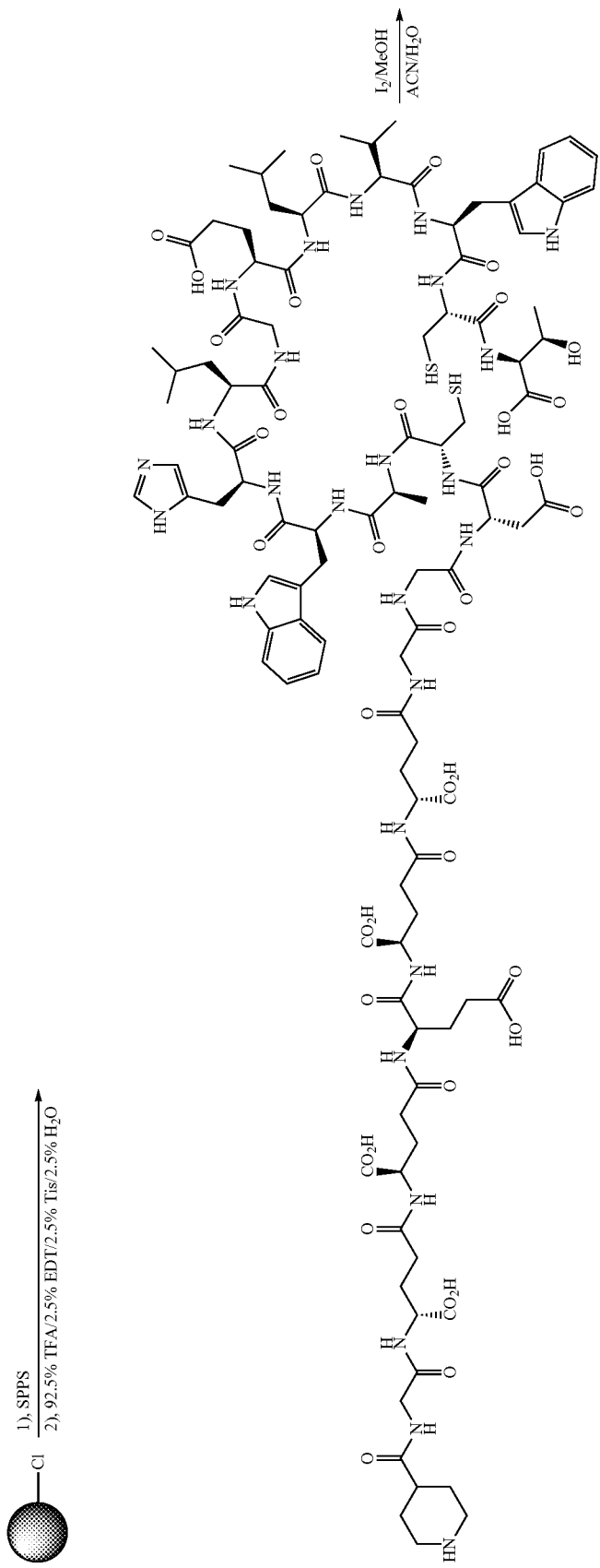

-continued
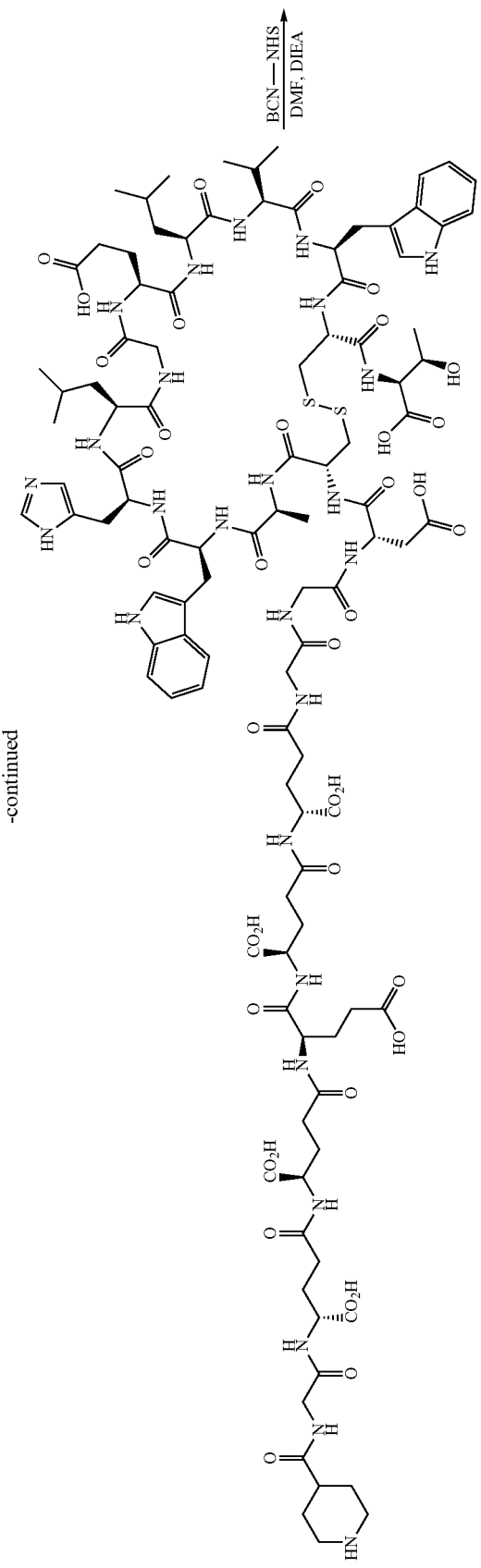
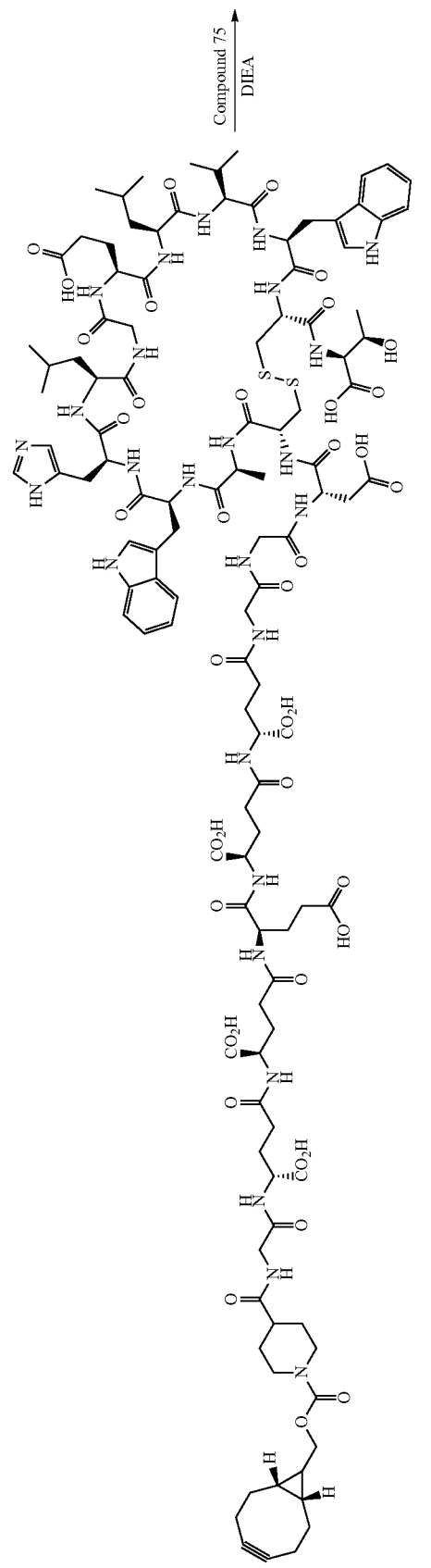

281
-continued
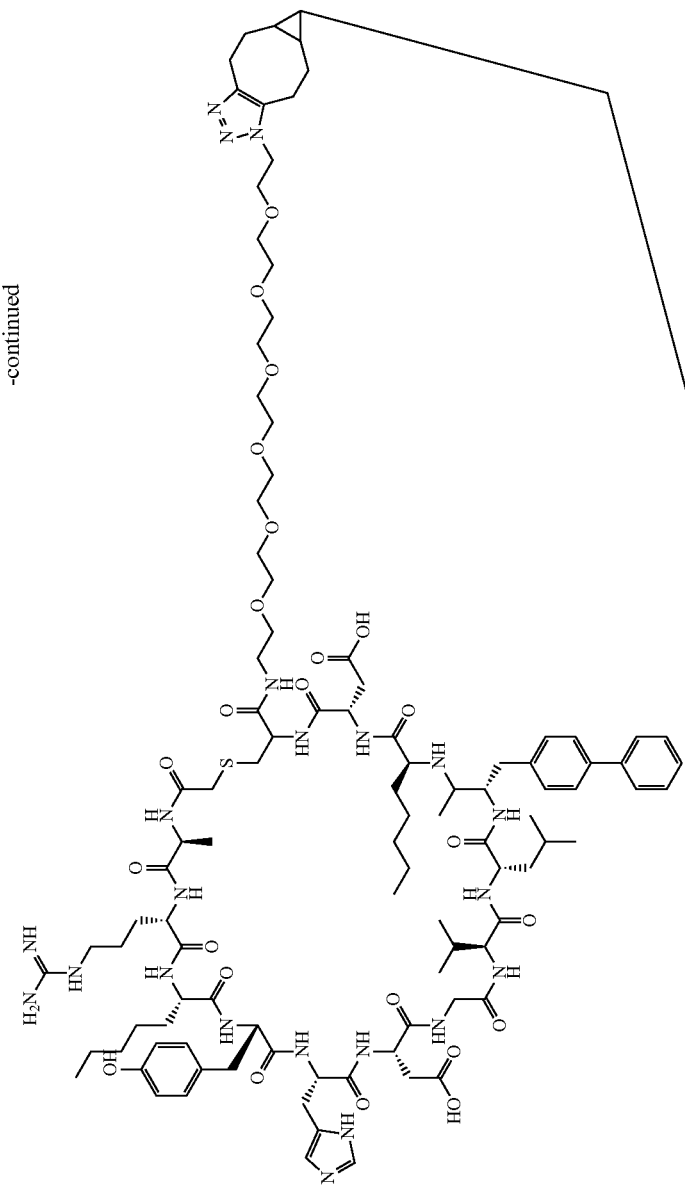
282
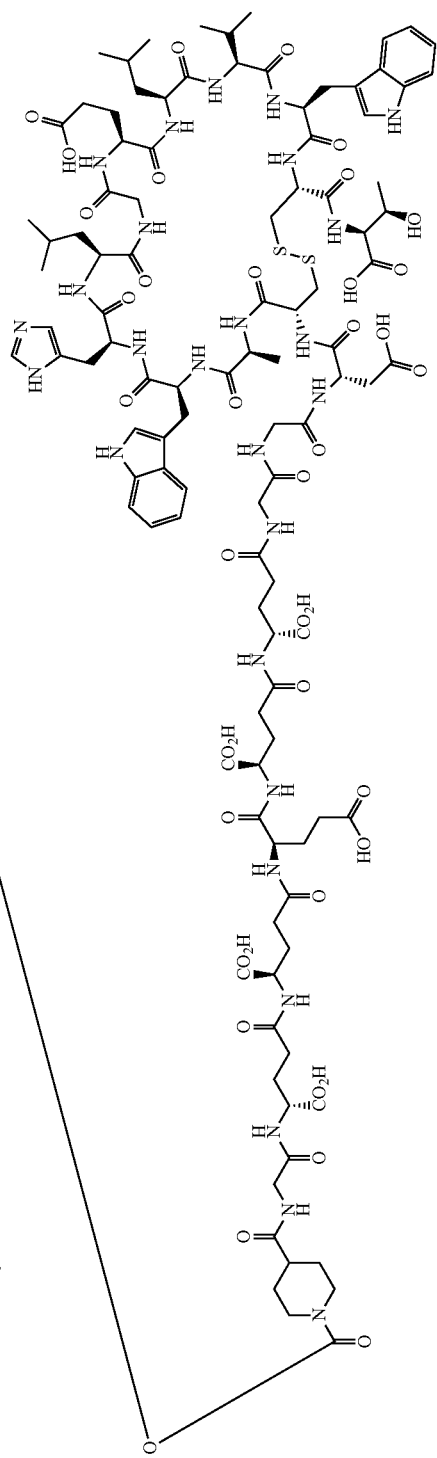

Exemplary Peptide Synthesis. Peptide were synthesized using standard Fmoc chemistry, for example:
1) Add DCM to the vessel containing CTC Resin (1.00 mmol, 1.00 g, 1.00 mmol/g) and Fmoc-Thr (tBu)-OH (3218 mg, 0.800 mmol, 0.80 eq.) with $N_2$ bubbling.
2) Add DIEA (4.00 eq.) dropwise and mix for 2 hours.
3) Add MeOH (1.00 mL) and mix for 30 min.
4) Drain and wash with DMF for 5 times.
5) Add 20% piperidine/DMF and react on 30 min.
6) Drain and wash with DMF for 5 times.
7) Add Fmoc-amino acid solution and mix for 30 sec first, then add activation solution, and the coupling reaction lasts for 1 hr with continuous $N_2$ bubbling.
8) Repeat step 4 to 7 for next amino acid coupling.

| # | Materials | Coupling reagents |
|---|---|---|
| 1 | Fmoc-Thr(tBu)-OH (0.80 eq) | DIEA (4.00 eq) |
| 2 | Fmoc-Cys(Trt)-OH (3.00 eq) | HBTU(2.85 eq) and DIEA (6.00 eq) |
| 3 | Fmoc-Trp(Boc)-OH (3.00 eq) | HBTU(2.85 eq) and DIEA (6.00 eq) |
| 4 | Fmoc-Val-OH (3.00 eq) | HBTU(2.85 eq) and DIEA (6.00 eq) |
| 5 | Fmoc-Leu-OH (3.00 eq) | HBTU(2.85 eq) and DIEA (6.00 eq) |
| 6 | Fmoc-Glu(OtBu)-OH (3.00 eq) | HBTU(2.85 eq) and DIEA (6.00 eq) |
| 7 | Fmoc-Gly-OH (3.00 eq) | HBTU(2.85 eq) and DIEA (6.00 eq) |
| 8 | Fmoc-Leu-OH (3.00 eq) | HBTU(2.85 eq) and DIEA (6.00 eq) |
| 9 | Fmoc-His(Trt)-OH (3.00 eq) | HATU(2.85 eq) and DIEA (6.00 eq) |
| 10 | Fmoc-Trp(Boc)-OH (3.00 eq) | HATU(2.85 eq) and DIEA (6.00 eq) |
| 11 | Fmoc-Ala-OH (3.00 eq) | HATU(2.85 eq) and DIEA (6.00 eq) |
| 12 | Fmoc-Cys(Trt)-OH (3.00 eq) | HATU(2.85 eq) and DIEA (6.00 eq) |
| 13 | Fmoc-Asp(OtBu)-OH (3.00 eq) | HATU(2.85 eq) and DIEA (6.00 eq) |
| 14 | Fmoc-Gly-Gly-OH (3.00 eq) | HATU(2.85 eq) and DIEA (6.0 eq) |
| 15 | Fmoc-D-gamaGlu(OtBu)-OH (3.00 eq) | HATU(2.85 eq) and DIEA (6.0 eq) |
| 16 | Fmoc-D-gamaGlu(OtBu)-OH (3.00 eq) | HATU(2.85 eq) and DIEA (6.00 eq) |
| 17 | Fmoc-D-Glu(OtBu)-OH (3.00 eq) | HATU(2.85 eq) and DIEA (6.00 eq) |
| 18 | Fmoc-D-gamaGlu(OtBu)-OH (3.00 eq) | HATU(2.85 eq) and DIEA (6.00 eq) |
| 19 | Fmoc-D-gamaGlu(OtBu)-OH (3.00 eq) | HATU(2.85 eq) and DIEA (6.00 eq) |
| 20 | Fmoc-Gly-OH (3.00 eq) | HATU(2.85 eq) and DIEA (6.00 eq) |
| 21 | Fmoc-piperidine-4-carboxylic acid (3.00 eq) | HATU(2.85 eq) and DIEA (6.00 eq) |

Synthesis scale: 0.8 mmol
20% piperidine in DMF was used for Fmoc deprotection for 30 min.
The coupling reaction was monitored by ninhydrin test.
After last amino acid coupling, N-terminal Fmoc was removed, and the resin was washed with MeOH for 3 times, and then dried under vacuum.
Peptide Cleavage and Purification:
Add cleavage cocktail (95% TFA/2.5% EDT/2.5% $H_2O$/2.5% TIS) to the flask containing the side chain protected peptide at room temperature and stir for 2 hr.
The peptide is precipitated with cold isopropyl ether and collected by centrifugation (3 min at 3000 rpm).
The precipitate is washed with cold isopropyl ether for two additional times.
Dry the crude peptide under vacuum for 2 hr.
Dissolve the crude peptide in ACN/$H_2O$ (1:1, 800 mL in total) Adjust pH to 8 by $NaHCO_3$ and stir for 16 hr, and the disulfide bond is formed through air oxidation, where the completion of the reaction is indicated by LCMS.
Lyophilize the reaction mixture to get the crude peptide.
Purify the crude peptide by prep-HPLC (TFA condition) to give the compound 2 (102 mg).
A mixture of compound 2 (102 mg, 1.0 eq.) and BCN-NHS (13.3 mg, 1.1 eq.) was dissolved in DMF (2 mL), and then DIEA (6.00 eq.) was added slowly. The mixture was stirred at 20° C. for 8 hr. LCMS showed the reaction was complete. The mixture was then directly purified by prep-HPLC (TFA condition), and compound 3 (43.0 mg, 39.4% yield) was obtained as a white solid.

A mixture of compound 3 (43.0 mg, 1.0 eq.) and compound 75 (32.6 mg, 1.0 eq., prepared using certain similar technologies) was dissolved in DMF (2.0 mL), and the reaction was stirred at 20° C. for 8 hr. LCMS showed the reaction was complete, and then the mixture was directly purified by prep-HPLC. Fractions with desired m/z (e.g., 1158.8, 927.2, 772.7, etc.) were combined and lyophilized to produce the CD38 ARM (41.1 mg, 56.9% yield, 98.4% purity) as a white solid. Purification conditions:

| | Separation condition |
|---|---|
| Sample Preparation | Dissolve in DMF/$H_2O$ |
| Instrument | Gilson GX-215 |
| Mobile Phase | A: $H_2O$ (0.075% TFA in $H_2O$) B: $CH_3CN$ |
| Gradient | 20-50%-60 min. Retention time: 53 min |
| Column | Luna C18, 25*200 mm, 10 um, 110A + Gemin C18, 150*30 mm, 5 um, 110A |
| Flow | Rate 20 mL/min |
| Wavelength | 220/254 nm |
| Oven Tem. | Room temperature |

CIML NK cell Fratricide assay: NK cells were directly re-suspended in solutions generated for each concentration of the CD38 ARM at a density of 5×10^6 cells per milliliter. Similarly, NK cell pellets were re-suspended in Daratumumab control antibody solutions (a range of 3 ug/ml to 0.01 ug/ml in PBS 5% HSA). Resulting NK cell suspensions were aliquoted at 55 ul/well of a 96 well v-bottom plate and were incubated for 2 hrs. at 37° C. in a 5% $CO_2$ atmosphere.
CIML NK cell SUDHL-4 cell ADCC assay: SUDHL-4 cells were labelled with CFSE and re-suspended in XVIVO15 media containing 20% Human serum. Cells were aliquoted at 10,000 cells/well, 18 ul/well of 96 well V-bottom plates. NK cells (in PBS 5% HSA) were added at a 9:1 ratio (90,000 NK cell per well) in an equal volume (18 ul per well). Co-cultures were incubated overnight at 37° C. in a 5% CO2 atmosphere. Next day, cells were washed, and stained with the following reagents: Near Infra-Red Fixable viability dye (Thermo Fisher), CD3 FITC (Biolegend) and CD56 PE (Biolegend). Percentages of Dead SUDHL-4 cells were calculated by gating on CFSE+ cells that are also positive for Near Infrared Live Dead dye.

Certain Results

Purity and viability of NK cells and CIML NK cells: Among other things, the present disclosure provides highly pure and viable NK cell populations following isolation from PBMC. Peripheral blood mononuclear cells were isolated form leukopheresis product PBMC viability post-isolation was >99% by Trypan blue and by flow cytometric analysis. After isolation using magnetic bead assisted negative selection, NK cell were 90% pure, and more than 99% viable both by Trypan blue and flow cytometry. T cell (CD3+CD56-cells) contamination in the NK cell fraction was found to be 2.8% on a day of isolation. After NK cells were isolated, they were divided into two treatment groups-CIML NK cells and non-CIML (control cells). CIML NK cells were incubated overnight in XIVO15 media containing 10% human sera and IL-12, IL-15, and IL-18, whereas control, non-CIML NK cells, did not receive the cytokine treatment. After an overnight incubation, purity and viability were assessed in the cultured cell populations. In one experiment, CIML and non-CIML control NK cells were 50% viable by Trypan Blue. CIML NK cells were 75% viable by Flow Cytometry, whereas viability of control non-CIML NK cells by flow cytometry method was at 78%. At the time of harvest, T cell contamination in both cultures was 1.2-1.8%.

Provided Technologies Demonstrated Significantly Low Toxicity Compared to Corresponding Technologies Comprising Antibody Toward the Same Targets.

NK cell fratricide (death directed at NK cells in the same culture) was assessed by flow cytometry following a 2 hr incubation with the CD38 ARM at indicated concentrations in the presence or absence of 500 μg/ml intravenous immune globulin (IVIG). FIG. 1 illustrates frequencies of dead NK cells as a function of daratumumab, a CD38 directed therapeutic antibody, or the CD38 ARM concentrations in culture supernatants.

As demonstrated, provided technologies shown significantly less toxicity than corresponding technologies using antibodies, e.g., when assessed by reduction of cell number of non-cancer cells. For example, at just 2 hours post-incubation, for CIML NK cells, daratumumab treatment at 3 μg/ml or 20.1 nM, resulted in a 4% increase in the percentage of dead NK cells present in the cultured media compared to no increase with the CD38 ARM+/−IVIG, FIG. 1. In a culture of non-CIML NK cells daratumumab treatment produced a total increase in dead NK cells of 5.6% over DMSO treated control, whereas treatment with the highest concentration of the CD38 ARM (25 uM) resulted in a 1.7% increase (the CD38 ARM at 25 uM vs DMSO control), and 0.93% increase in dead NK cells (the CD38 ARM IvIG vs DMSO IVIG control). FIG. 1 (B) represents data normalized to a DMSO treated control. As shown, no apparent NK cell fratricide was detected with even the highest doses of the CD38 ARM, in sharp contrast to daratumumab, a CD38 therapeutic antibody approved by FDA for treatment of multiple myeloma.

Provided Technologies can Effectively Reduce Numbers of Target Cancer Cells.

Figure 2:
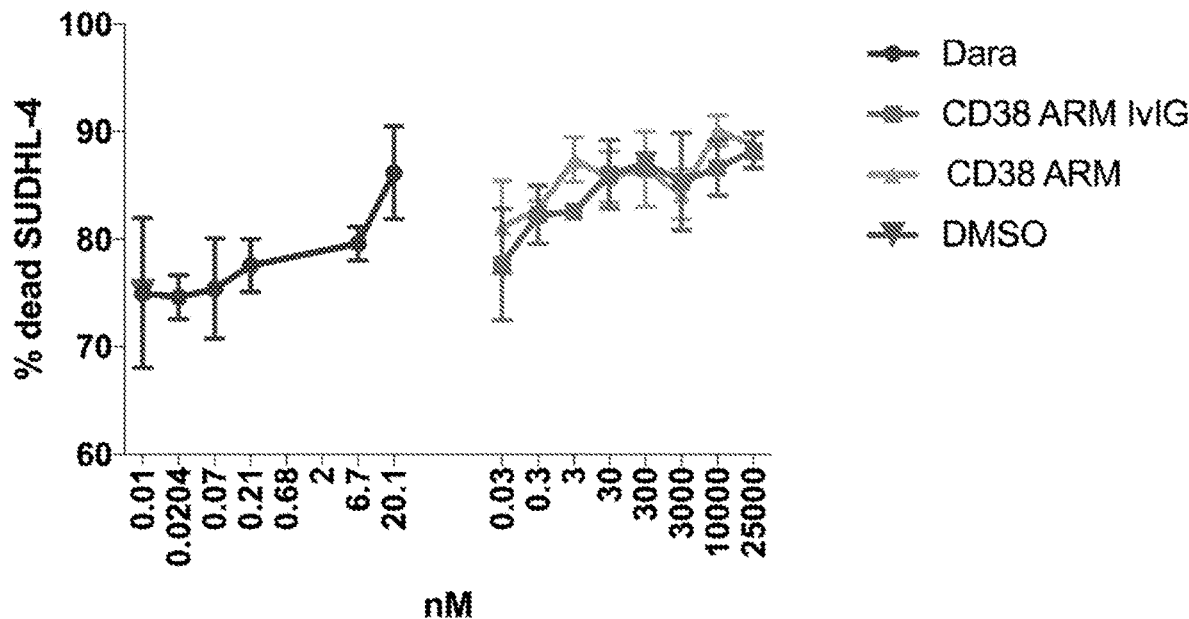
FIG. 2. Provided technologies can effectively kill cancer cells. A. Frequencies of dead SUDHL-4 cells in NK-SUDHL-4 co-cultures. B. Frequencies of dead SUDHL-4 cells in NK-SUDHL-4 co-cultures, normalized to DMSO treated controls.
Figure 2:
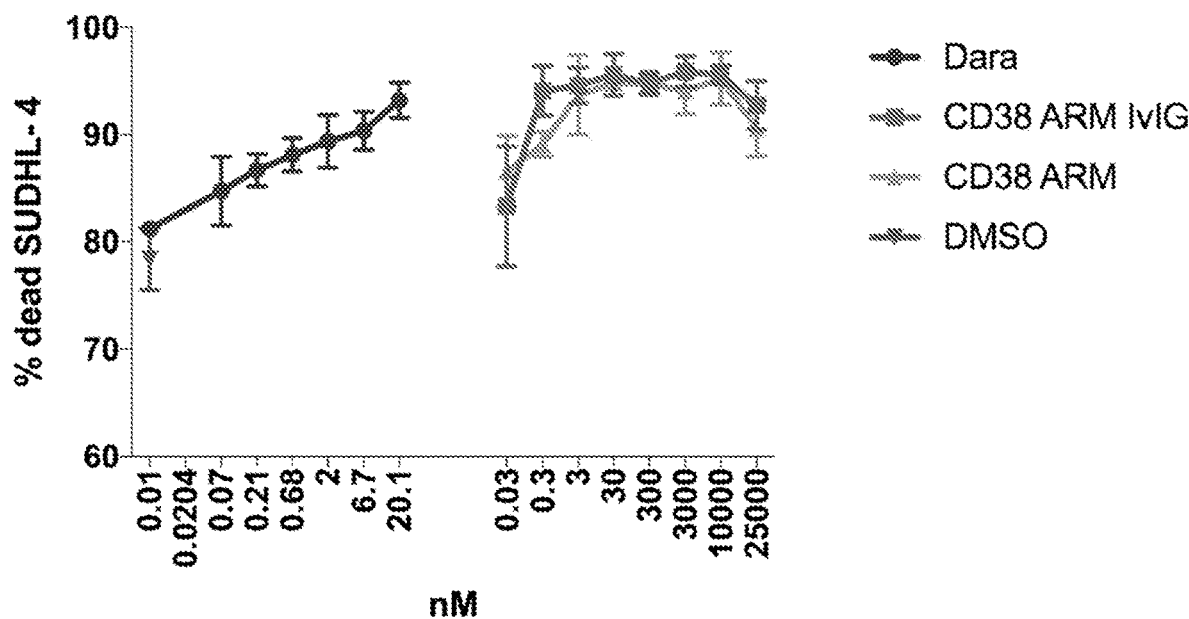
Figure 2:
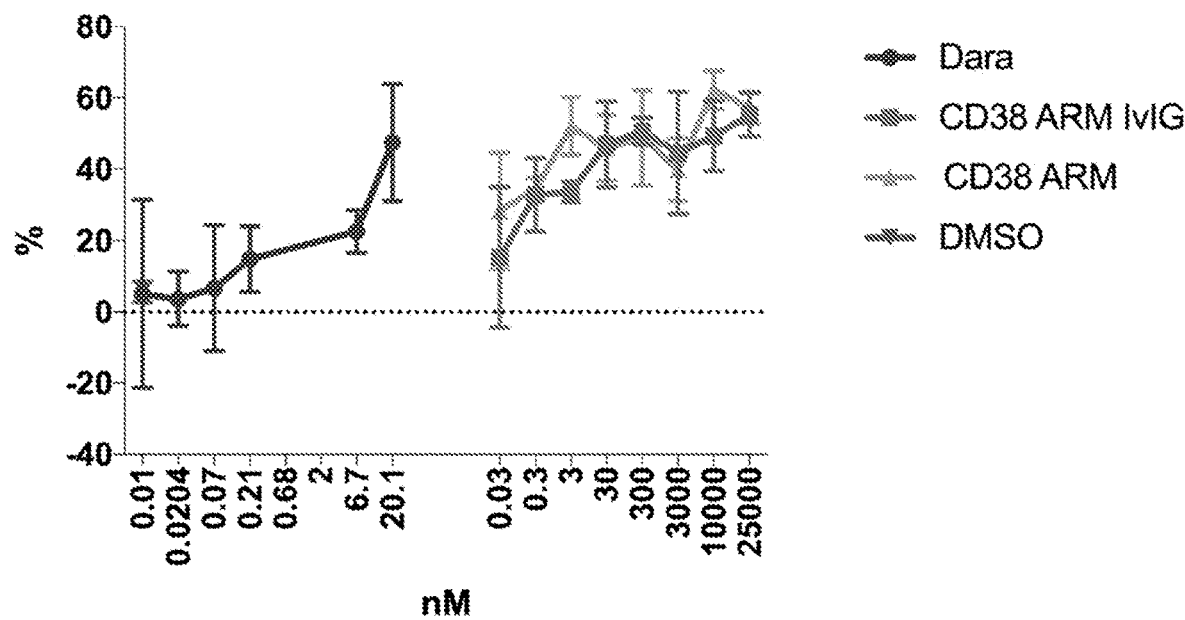
Figure 2:
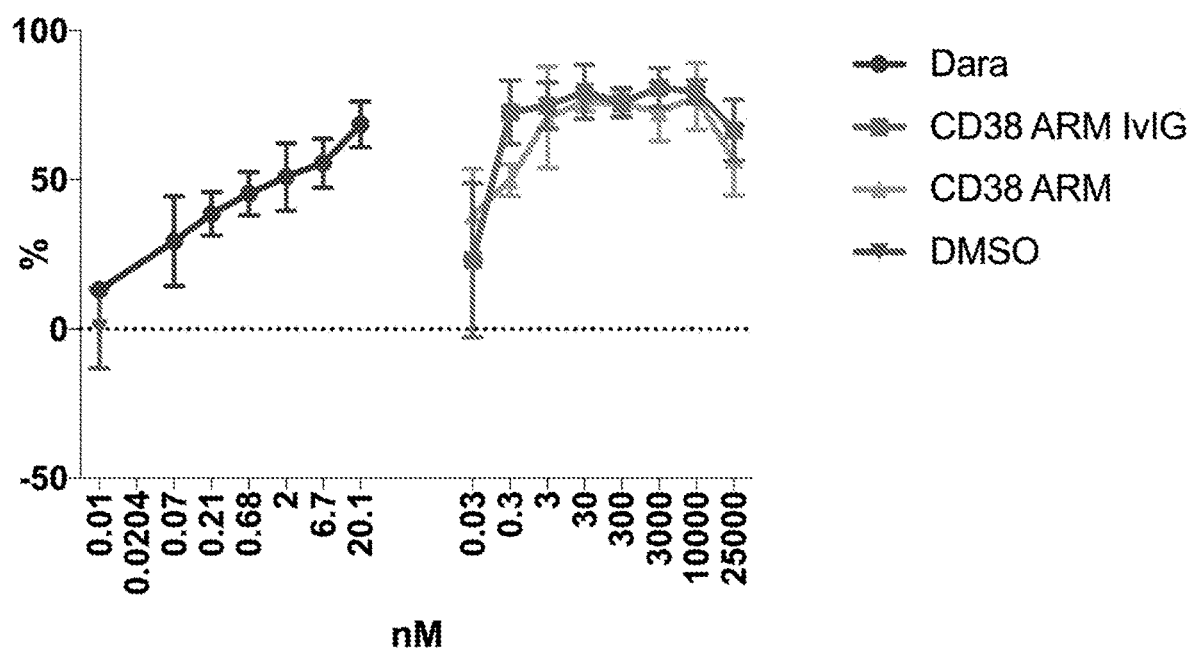

Antibody dependent cell cytotoxicity assay was performed to measure the effects of CIML NK cells alone and in combination with the CD38 ARM on target SUDHL-4 multiple myeloma cells. Baseline activity was assessed by using NK cells that have not been stimulated with cytokine cocktail (non-CIML NK cells). FIG. 2 represents frequencies of dead SUDHL-4 cells in NK-SUDHL-4 cell co-cultures after 18 hours of incubation.

As demonstrated from data presented in FIG. 2B, CIML NK cells are potent killers of SUDHL-4 target cells at the baseline (DMSO treated controls). Additional target cell killing over DMSO-treated control level was achieved by CIML NK cell in combination with the CD38 ARM-a 66% increase in killing over background was observed. Further, as demonstrated herein provided technologies can effectively utilize IgG present in human serum and do not require administration of additional antibodies, e.g. exogenous antibodies like those utilized in antibody-based therapies. Data using CD38-targeting daratumumab were also included. As demonstrated herein, provided technologies are highly effective in killing cancer cells while being less toxic compared to antibody-based technologies.

Example 15. Provided Technologies can Effectively Kill Intended Cells with Low Toxicity Among other things, the present example confirms that provided technologies can effectively reduce the number of cancer cells. In the present example, a CD38 ARM (as in the example above), cytokine induced memory like NK cells (CIML NK cells), and optionally intravenous immunoglobulin (IVIG) were utilized. Among other things, the present disclosure confirms activity of provided technologies against multiple myeloma patient bone marrow plasma cells.

Materials, Methods and Equipment

Test and Control Articles
  CD38 ARM (25 mM solution in DMSO)
  Daratumumab (Darzalex)-Parexel DRE0607
  IVIG Human Immune Globulin Intravenous, Flebogamma-Grifols NDC 61935-0005-5

Materials and Equipment
  Bovine Serum Albumin (BSA) Heat Shock, Fraction V-American Bio AB01088-00100
  Phosphate Buffered Saline (PBS)-Gibco 10010, (−) Ca (−) Mg, pH 7.4
  IVIG Human Immune Globulin Intravenous, Flebogamma-Grifols NDC 61935-0005-5, 100 mg/ml-Dilute to 1 mg/ml in PBS
  Biotinylated/His tagged Human CD38 Protein, Avi Tag-Acro Biosystems CD8-H82E7
  Neutravidin-Invitrogen 31000, 1 mg/ml
  Dimethyl Sulfoxide (DMSO) Sigma-Aldrich 276855
  Bovine Serum Albumin (BSA) Heat Shock, Fraction V-American Bio AB01088-00100
  Ethylenediaminetetraacetic acid (EDTA) VWR 97062-656
  Flow buffer-PBS pH 7.4+0.05% (w/v) BSA, 2 mM EDTA
  Assay Plate, 96-well V-Bottom—VWR Corning 3357
  Attune NxT Flow Cytometer and Attune NxT Software
  96 well 2 ml deep well plate USA Scientific, Cat #1896-2110
  Ficoll (R) Paque Plus, GE Healthcare, Cat #17-1440-03
  EasySEP™ Human NK cell isolation kit STEMCELL Technologies Cat #17955
  Human IL-15 premium grade Miltenyi Biotec Cat #130-095-764
  Human IL-12 premium grade Miltenyi Biotec Cat 130-096-705
  Human IL-18 R&D Systems Cat #9124-IL-010
  Specialty Cell Culture Medium, Lonza X-VIVO15, Thermo Fischer Scientific Cat #BW04-744Q Human Serum AB off the Clot Gemini Bioproducts, Cat #100-318

Albumin from human serum, Sigma Aldrich, Cat #A5843-5G

RBC lysis buffer 10× (Tonbo Biosciences Cat #TNB-4300-L100

Minimal residual disease antibody staining panel:

| Antigen | Fluorophore | Clone | Vendor | Catalog # |
|---------|-------------|-------|--------|-----------|
| CD138 | BV421 | MI15 | BD Biosciences | 562935 |
| CD27 | BV510 | O323 | Biolegend | 302835 |
| CD38 ME | FITC | multiepitope | Cytognos | CYT-38F2 |
| CD56 | PE | 5.1H111 | Biolegend | 362508 |
| CD45 | PERCPCY5.5 | HI30 | Biolegend | 304028 |
| CD19 | PECY7 | HIB19 | Biolegend | 302216 |
| CD117 | APC | 104D2 | BD | 341096 |

Patient bone marrow and blood were obtained from Discovery Life Sciences.

Protocols

Patient bone marrow (3 ml) and blood (20 ml) were shipped at ambient temperature from Discovery Biosciences. Bone marrow was diluted 1:1 with PBS, and 50 µl of bone marrow-PBS mixture was aliquoted into 96 deep well plates. Bone marrow cells were incubated overnight until CIML cells were added next day.

PBMC were isolated from blood by Ficoll density gradient centrifugation. PBMC were centrifuged at 400 g for 10 min and re-suspended in EasySep buffer. NK cells were isolated using NK cell isolation kits from STEMCELL Technologies according to kit's manufacturers' instructions.

NK cells were re-suspended at $1\times10^6$ cells/ml in XVIVO15, 10% Human Serum, IL-15 (50 ng/ml), IL-12 (10 ng/ml), IL-18(50 ng/ml), and incubated for 18 hrs. Following overnight incubation with cytokines, NK cells were washed twice with PBS 5% Human Serum Albumin, counted and re-suspended at a cell density of $2\times10^5$ cells/ml of XVIVO15 media. Twenty microliters (4000 cells) were added per each well containing 50 µl of bone marrow: PBS mixture. Daratumumab (3 ug/ml [20 nM] to 0.3 ug/ml [2 nM]) and the CD38 ARM (25 µM to 3 µM final concentration) were made up to a 10× of the final concentration to be used in the assay and 8 µl of the CD38 ARM or 7 µl of Daratumumab 10× stock solutions were added to pertinent wells. To the CD38 ARM treated wells, human IVIG was added to a final concentration of 10 µg/ml. Control wells received XVIVO15 media. Well contents were mixed by pipetting up and down and plates were centrifuged at 400 g for 1 min.

The assay was then incubated for 4 hrs. at 37° C. 5% $CO_2$. Following the incubation, 1 ml of 1× red blood cell lysis buffer was added to each well and cells were incubated for 15 min at room temperature. Plates were centrifuged at 400 g for 3 minutes, and another round red blood cell lysis and centrifugation was performed. Cells were then re-suspended 200 µl of FACS buffer and centrifuged. Buffer was discarded, and cells were re-suspended in a 100 µl of fluorescent antibody mixture. Cells were incubated for 15 min at 4° C., to wash 200 µl of FACS Buffer was added per each well, cells were centrifuged at 400 g for 3 min, and supernatants were discarded. Washing was repeated 2 more times. Finally, cells were re-suspended in 200 µl of FACS Buffer and analyzed using Attune Flow Cytometer. Data were analyzed using FlowJo software and graphed using GraphPad Prism.

Provided Technologies Reduce Number of Plasma Cells.

Figure 3:
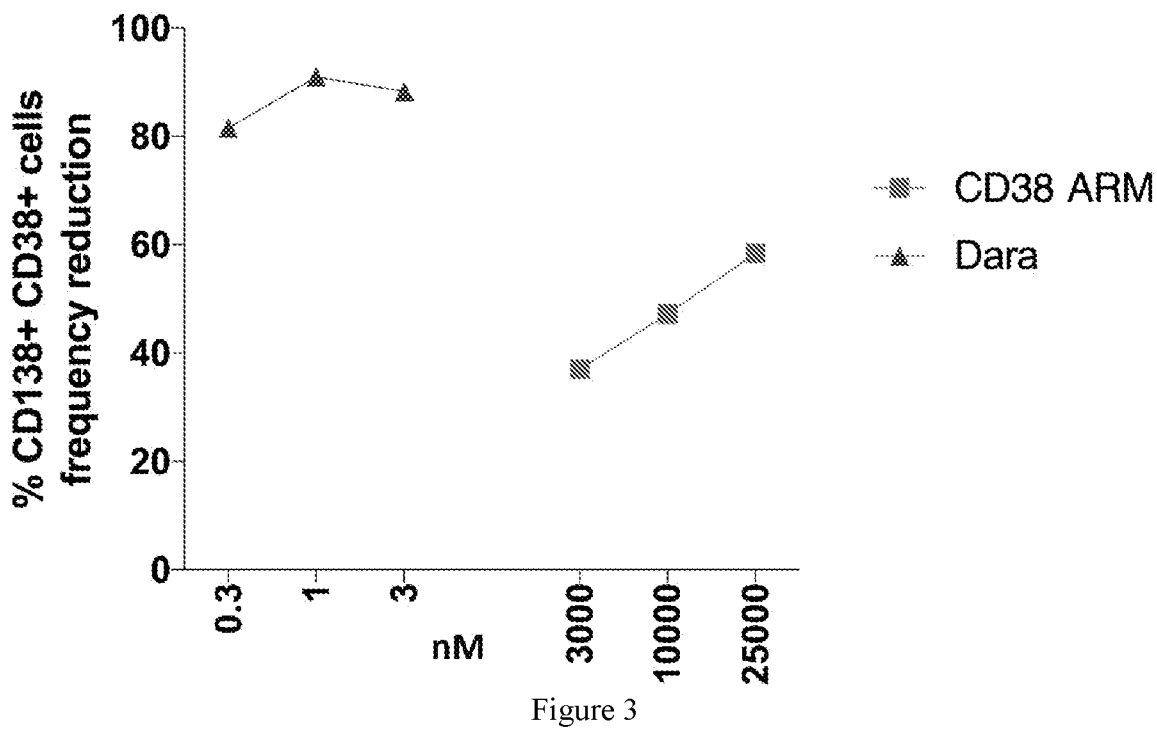
FIG. 3. Provided technologies can reduce the number of plasma cells.

FIG. 3 shows the percent reduction in the frequencies of CD38+CD138+ cells in patient bone marrow after a 4 hr incubation in the presence of autologous patient CIML NK cells and daratumumab or a CD38 ARM. As demonstrated in FIG. 3, a CD38 ARM effectively reduced frequency of plasma cells (CD38+CD138+) compared to control untreated bone marrow incubated with CIML NK cells.

Provided Technologies do not Significantly Impact Immune Cell Populations.

Figure 4:
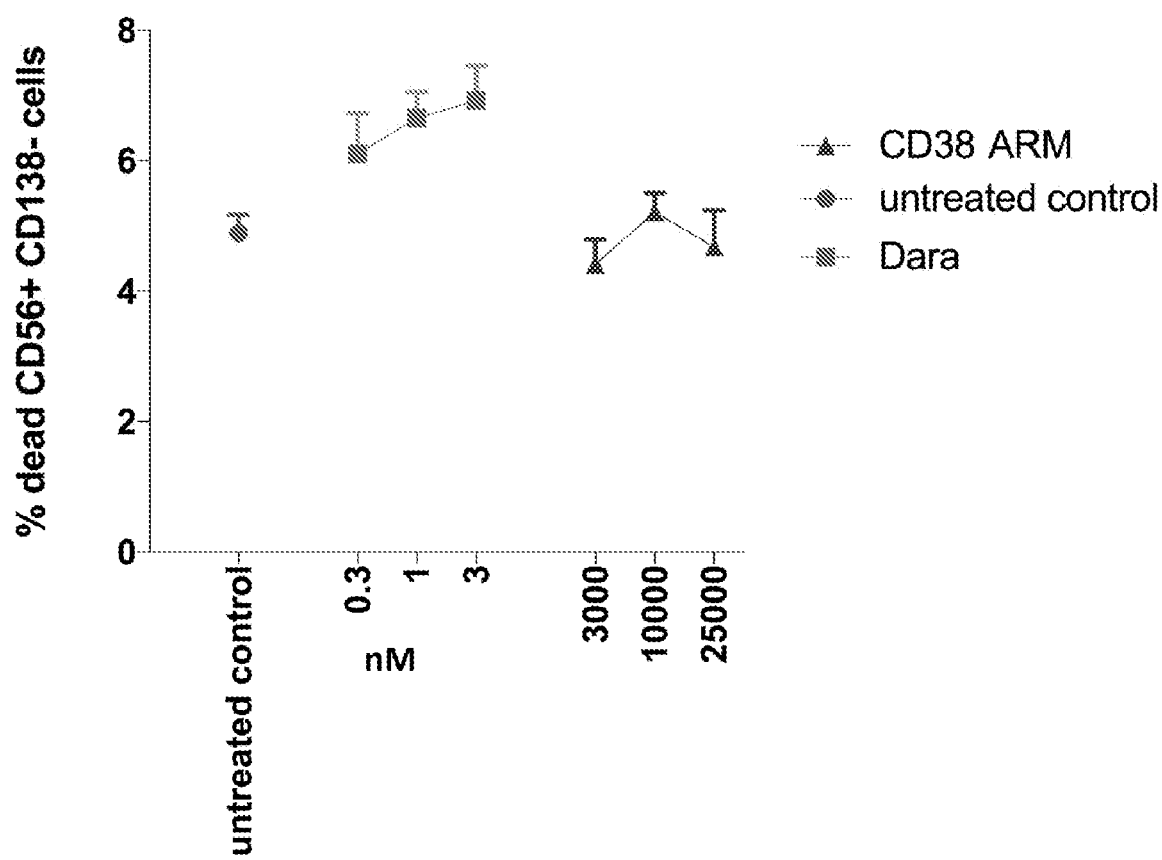
FIG. 4. No or low level of undesired NK cell fratricide by provided technologies.

Among other things, the present example further confirms that provided technologies are of low toxicity, particularly when compared to therapies utilizing antibodies toward the same targets as ARMs. As shown in FIG. 4 (frequencies of CD56+CD138−CIML NK cells when co-incubated with patients bone marrow and Daratumumab or CD38 ARM for 4 hrs.), NK cell numbers did not change in the presence of a CD38 ARM, while daratumumab showed a dose-dependent increase in NK cell fratricide.

While various embodiments have been described and illustrated herein, those of ordinary skill in the art will readily envision a variety of other means and/or structures for performing the functions and/or obtaining the results and/or one or more of the advantages described in the present disclosure, and each of such variations and/or modifications is deemed to be included. More generally, those skilled in the art will readily appreciate that all parameters, dimensions, materials, and configurations described herein are meant to be example and that the actual parameters, dimensions, materials, and/or configurations may depend upon the specific application or applications for which the teachings of the present disclosure is/are used. Those skilled in the art will recognize, or be able to ascertain using no more than routine experimentation, many equivalents to the embodiments of the present disclosure. It is, therefore, to be understood that the foregoing embodiments are presented by way of example only and that, within the scope of the appended claims and equivalents thereto, claimed technologies may be practiced otherwise than as specifically described and claimed. In addition, any combination of two or more features, systems, articles, materials, kits, and/or methods, if such features, systems, articles, materials, kits, and/or methods are not mutually inconsistent, is included within the scope of the present disclosure.

The invention claimed is:

1. A composition comprising:
a plurality of natural killer cells; and
an antibody-recruiting molecule (ARM), wherein:
the ARM is a compound of the formula

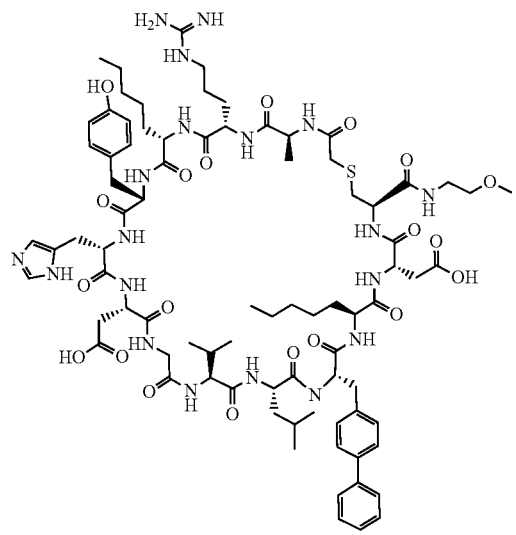

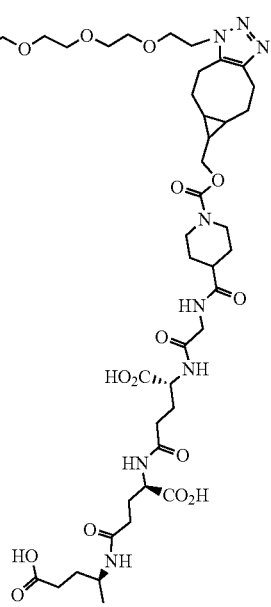

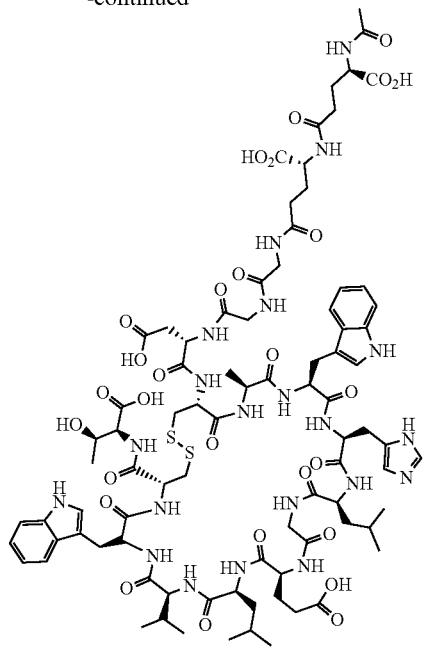

or a pharmaceutically acceptable salt thereof.

2. The composition of claim 1, wherein the natural killer cells are memory-like natural killer cells or cytokine-induced memory-like natural killer cells induced by IL-12, IL-15 and IL-18.

3. An ARM of the formula

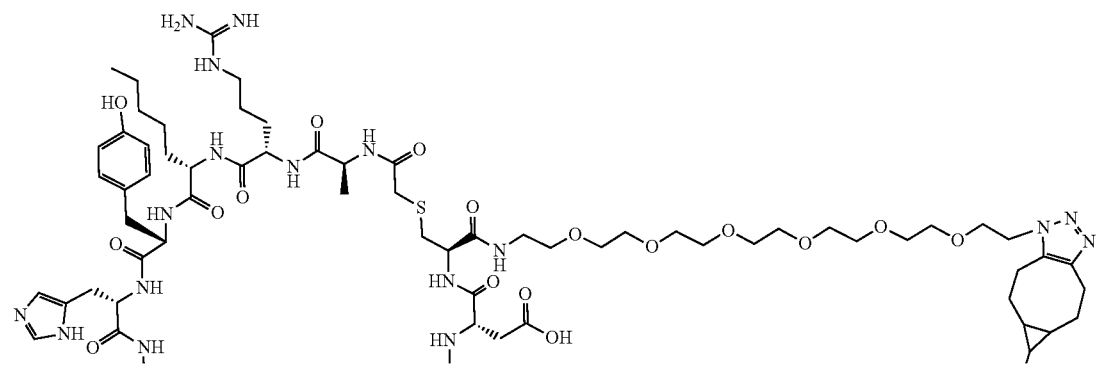

-continued

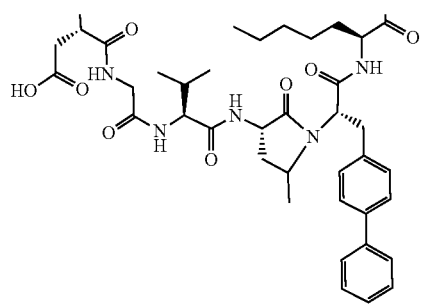

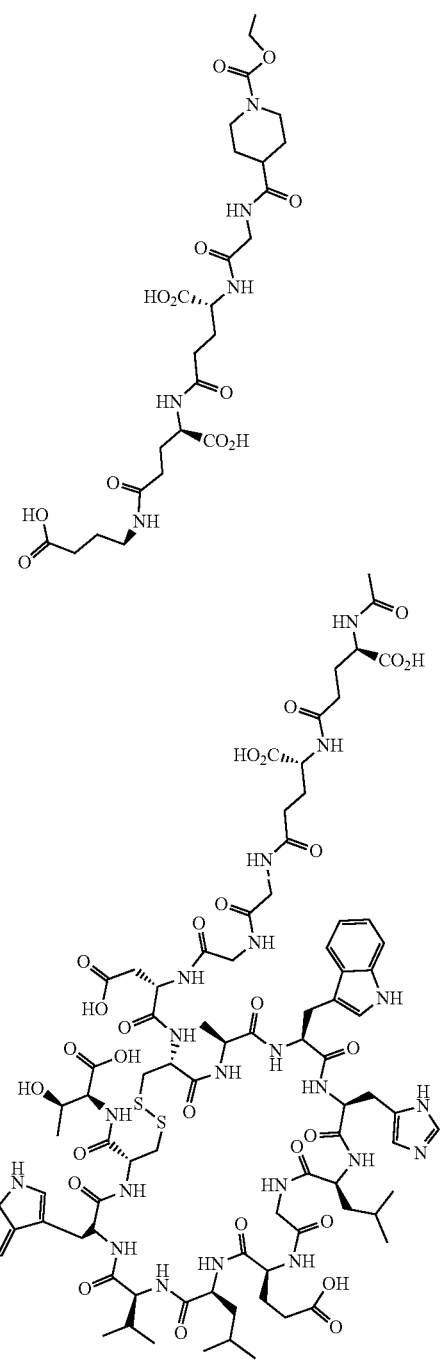

or a pharmaceutically acceptable salt thereof.

4. A pharmaceutical composition comprising a compound or salt of claim 3, and a pharmaceutically acceptable excipient.

5. A method for inducing cancer cell death, inhibiting cancer cell growth, and/or reducing the number of cancer cells in a human subject, comprising administering to the human subject:
- the antibody-recruiting molecule (ARM), or pharmaceutically acceptable thereof of claim 3, and
- a plurality of natural killer cells;
- so that the system is exposed to both the ARM and the plurality of natural killer cells and the number of cancer cells in the system is reduced compared to absence of both the natural killer cells and the antibody recruiting molecule.

6. A method for treating cancer, comprising administering to a subject suffering therefrom:
- a plurality of natural killer cells;
- a therapeutically effective amount of the antibody-recruiting molecule (ARM) or pharmaceutically acceptable salt thereof of claim 3.

7. The method of claim 6, wherein the cancer is multiple myeloma.

8. The method of claim 5, wherein the method includes administering natural killer cells and the natural killer cells are memory-like natural killer cells.

9. The method of claim 5, wherein the method includes administering natural killer cells and the natural killer cells are cytokine-induced memory-like natural killer cells induced by IL-12, IL-15 and IL-18.

10. The method of claim 8, wherein the natural killer cells and the ARM are administered concurrently, optionally in one composition.

11. The method of claim 8, wherein the natural killer cells are administered prior to or subsequently to the ARM.

12. The method of claim 8, wherein the ARM is administered with an antibody or a fragment thereof.

* * * * *